United States Patent
Raimondi et al.

[15] 3,660,118
[45] May 2, 1972

[54] COATED APPLE CONFECTION MAKING MACHINE

[72] Inventors: Vito O. Raimondi, Chicago; William V. Raimondi, Cicero, both of Ill.

[73] Assignee: Beatrice Caramel Apple Co., Inc., Chicago, Ill.

[22] Filed: June 25, 1970

[21] Appl. No.: 49,888

[52] U.S. Cl. ........................................................99/450.7
[51] Int. Cl. .........................................................A23g 3/12
[58] Field of Search ..........................107/1, 8; 118/13, 16

[56] References Cited

UNITED STATES PATENTS

| | | | |
|---|---|---|---|
| 1,814,008 | 7/1931 | Parnell | 107/8 B |
| 1,879,234 | 9/1932 | Hermann | 107/8 B |
| 3,272,152 | 9/1966 | Williams | 107/8 B X |
| 3,550,188 | 12/1970 | Howard, Jr. et al. | 107/8 F X |
| 2,745,374 | 5/1956 | Pikal | 118/16 |

Primary Examiner—James R. Boler
Attorney—Charles B. Cannon

[57] ABSTRACT

A cyclically operated coated apple confection making machine includes a handle stick storage hopper from which handle sticks are discharged one at a time at a first work station and are inserted automatically into handle stick-gripping and apple-holding devices, carried by a main movable endless or rotary turntable carrier, by which the handle sticks are automatically inserted into apples carried by a movable endless or rotary turntable apple carrier at a second apple pick-up work station. If an apple is not picked up at the second and apple pick-up work station the handle stick is automatically ejected from the handle stick-gripping and apple-holding device at a third work station. The handle sticks and attached apples are then moved through a caramel container in which they are rotated to coat the apples with a coating of caramel. The caramel-coated apples are then moved to a fifth work station where whey are lowered into and rotated in a first receptacle or tray for ground nuts so as to coat the caramel-coated apples with an outer coating of layer of ground nuts. The caramel-coated and ground nut-coated apples are then moved to a sixth work station at which the completed coated apple confections, with attached handle sticks, are discharged into a second receptacle or tray where they are given a further coating of ground nuts. The caramel container has a heating unit therebelow and the caramel container and its heating unit are automatically raised in small increments relative to the handle stick-gripping and apple-holding devices as the rotational cycle of the main movable endless or rotary turntable carrier embodied in the machine progresses so as to assure an adequate coating of caramel on the apples as the supply of caramel in the caramel container is consumed in use. A nut storage hopper has a nut-grinding mechanism therein and ground nut level-responsive means in the first ground nut receptacle or tray, which is responsive to the level of ground nuts therein, controls the operation of the nut-grinding mechanism in such a manner as to assure an adequate supply of ground nuts in the first ground nut receptacle or tray at all times.

62 Claims, 149 Drawing Figures

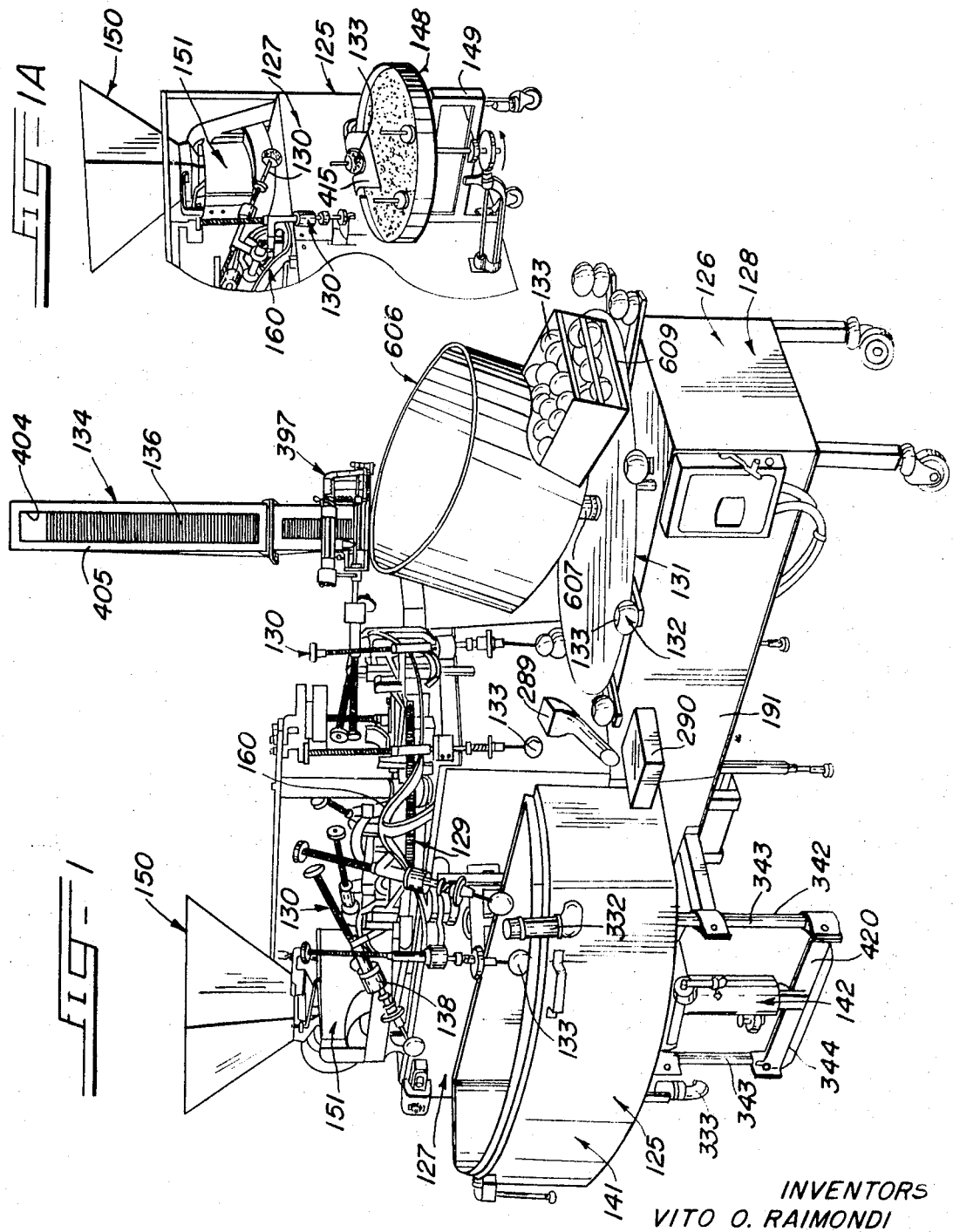
INVENTORS
VITO O. RAIMONDI
WILLIAM V. RAIMONDI
BY Charles B. Cannon
ATTY

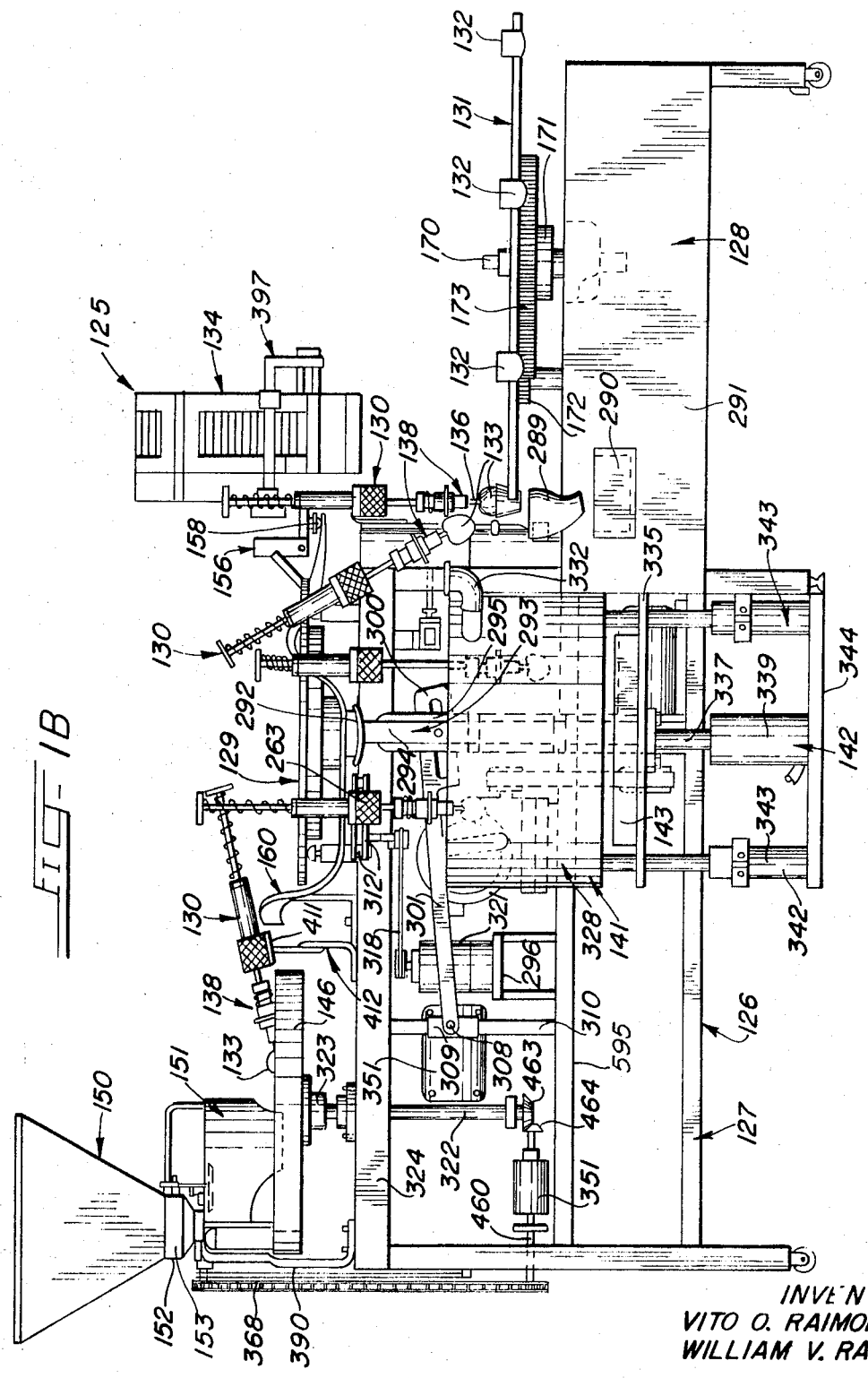

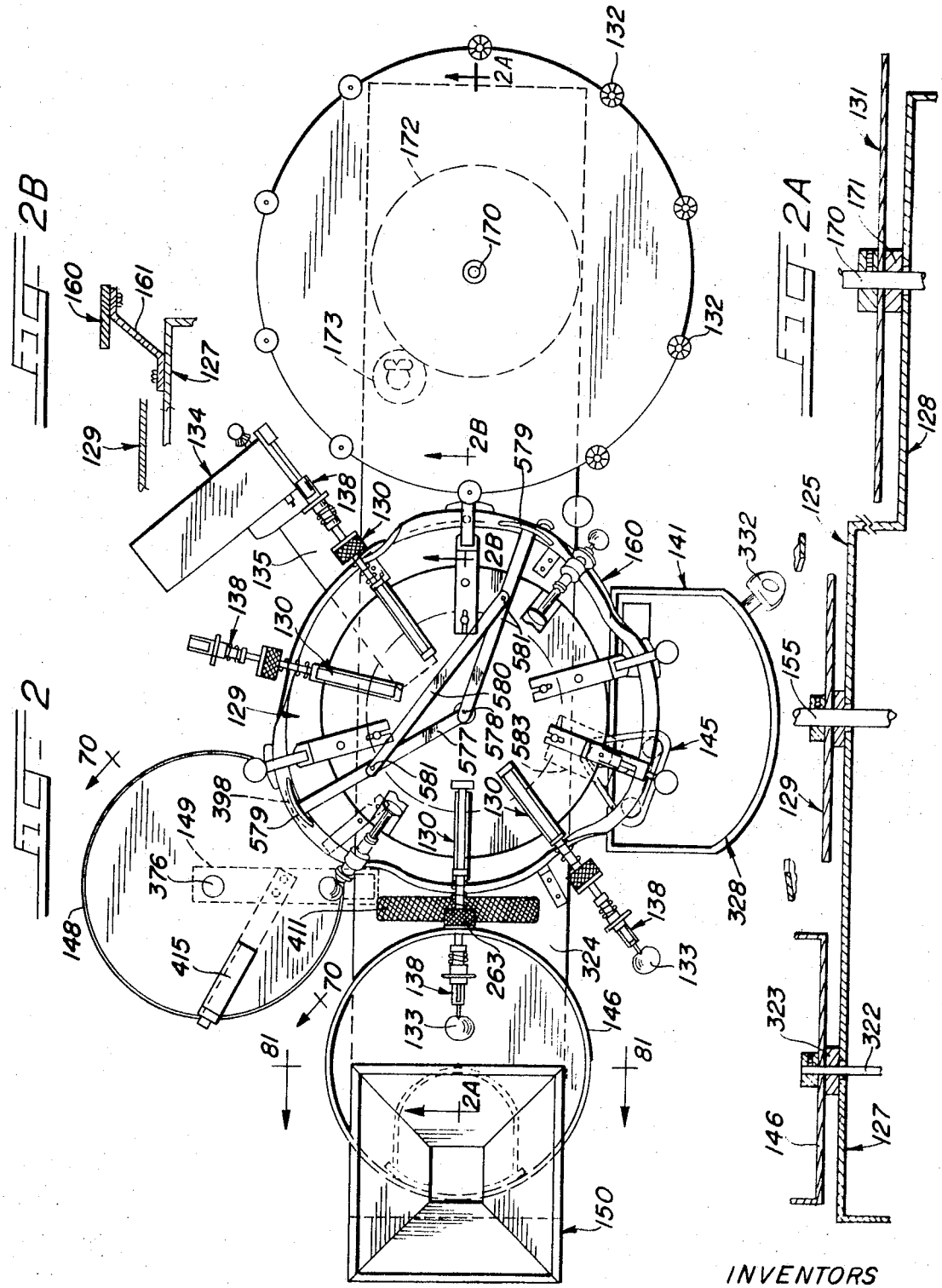

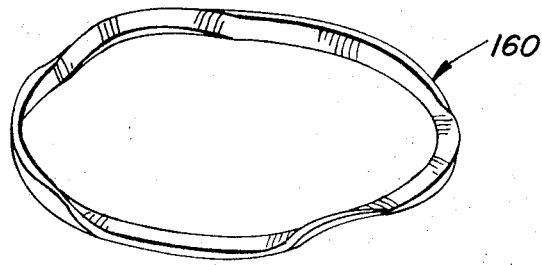
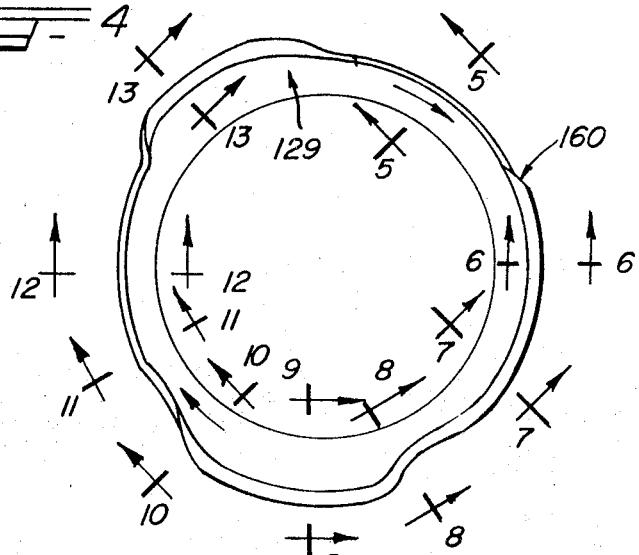
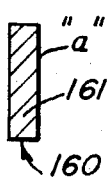
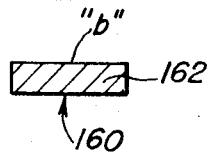
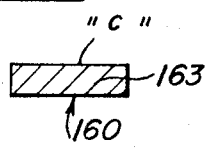
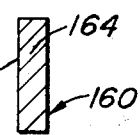
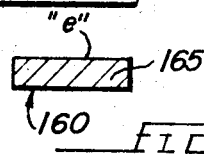
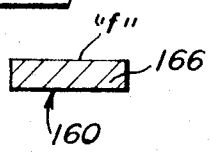
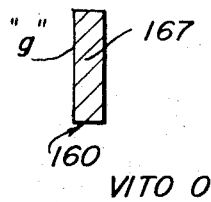
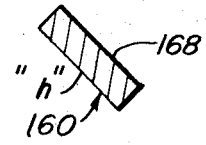
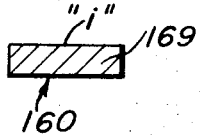
INVENTORS.
VITO O. RAIMONDI
WILLIAM V. RAIMONDI
BY Charles R. Cannon
ATTY

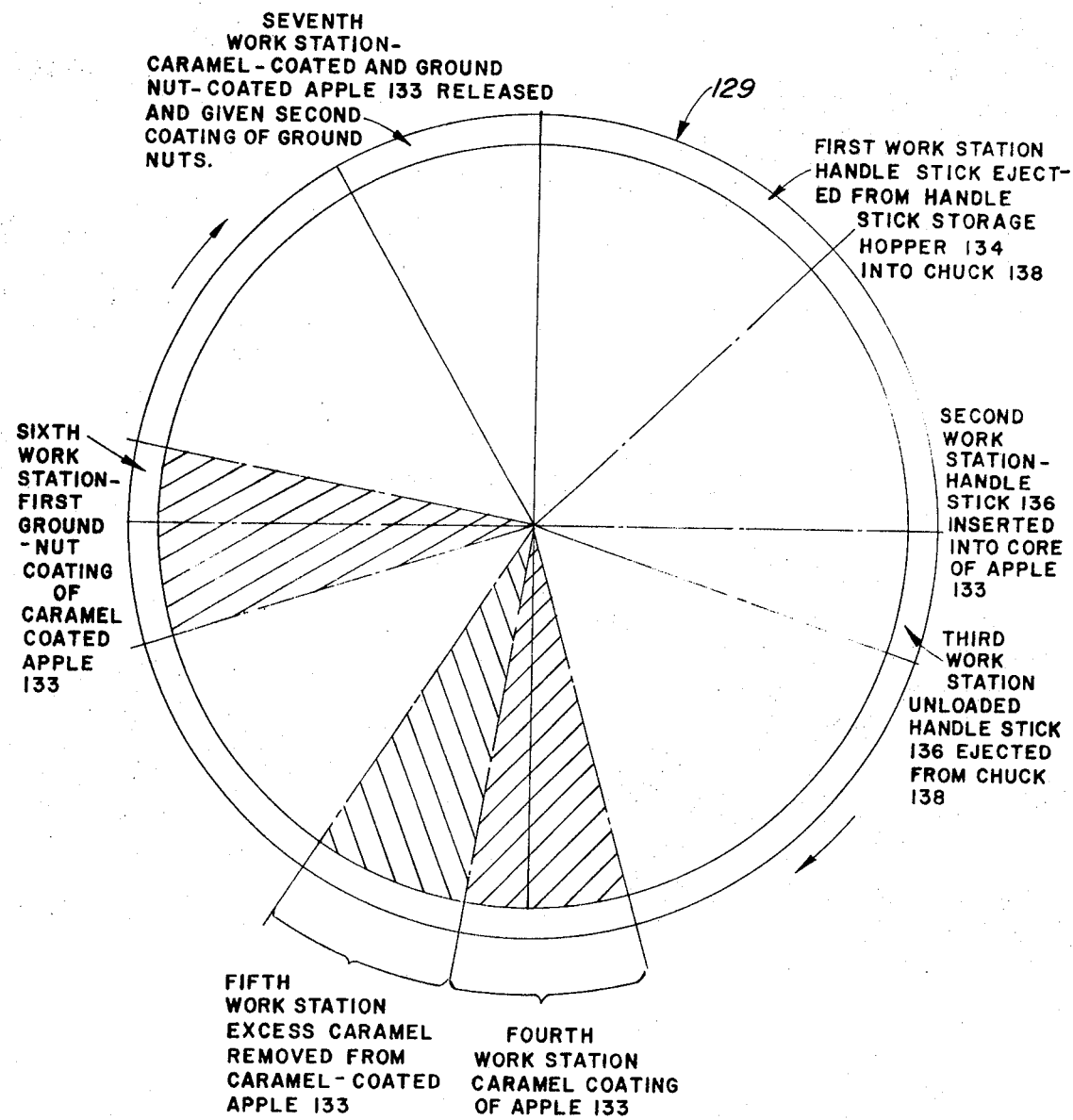

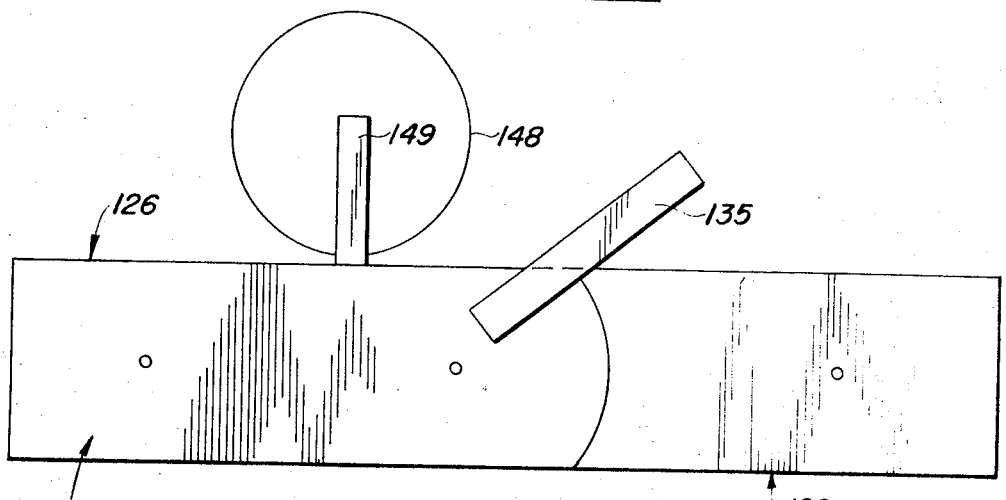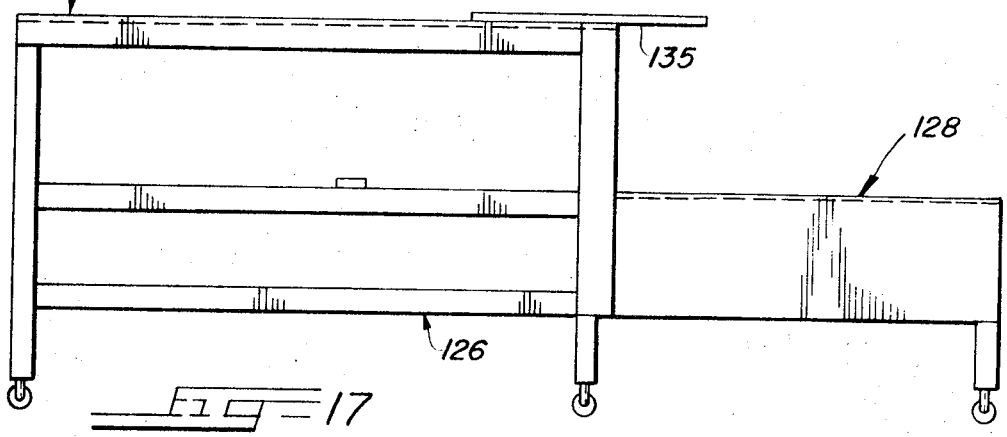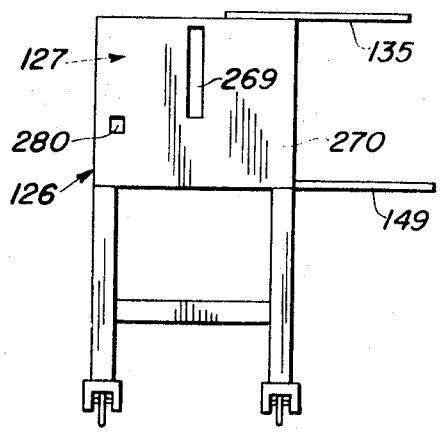

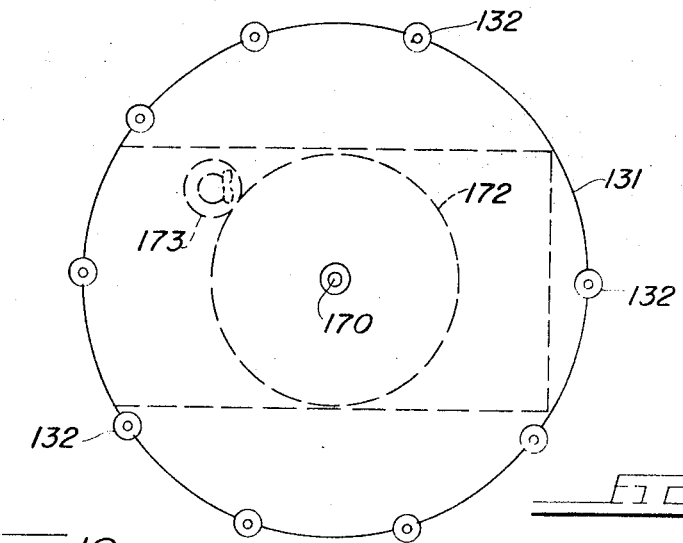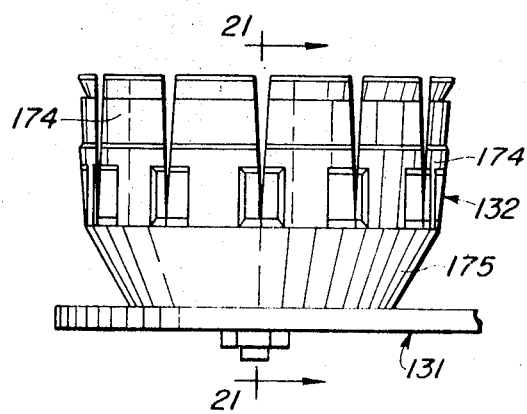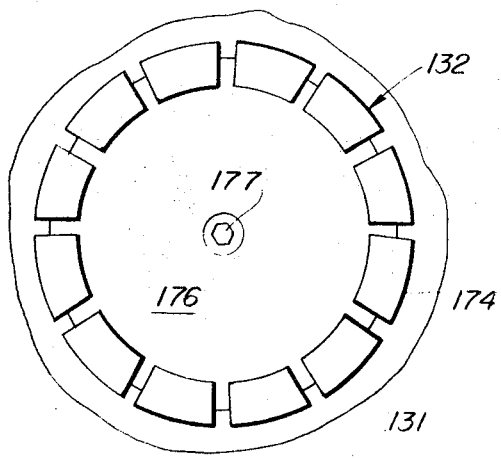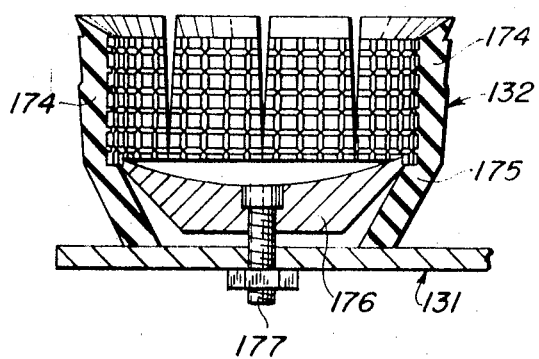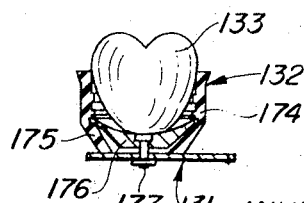

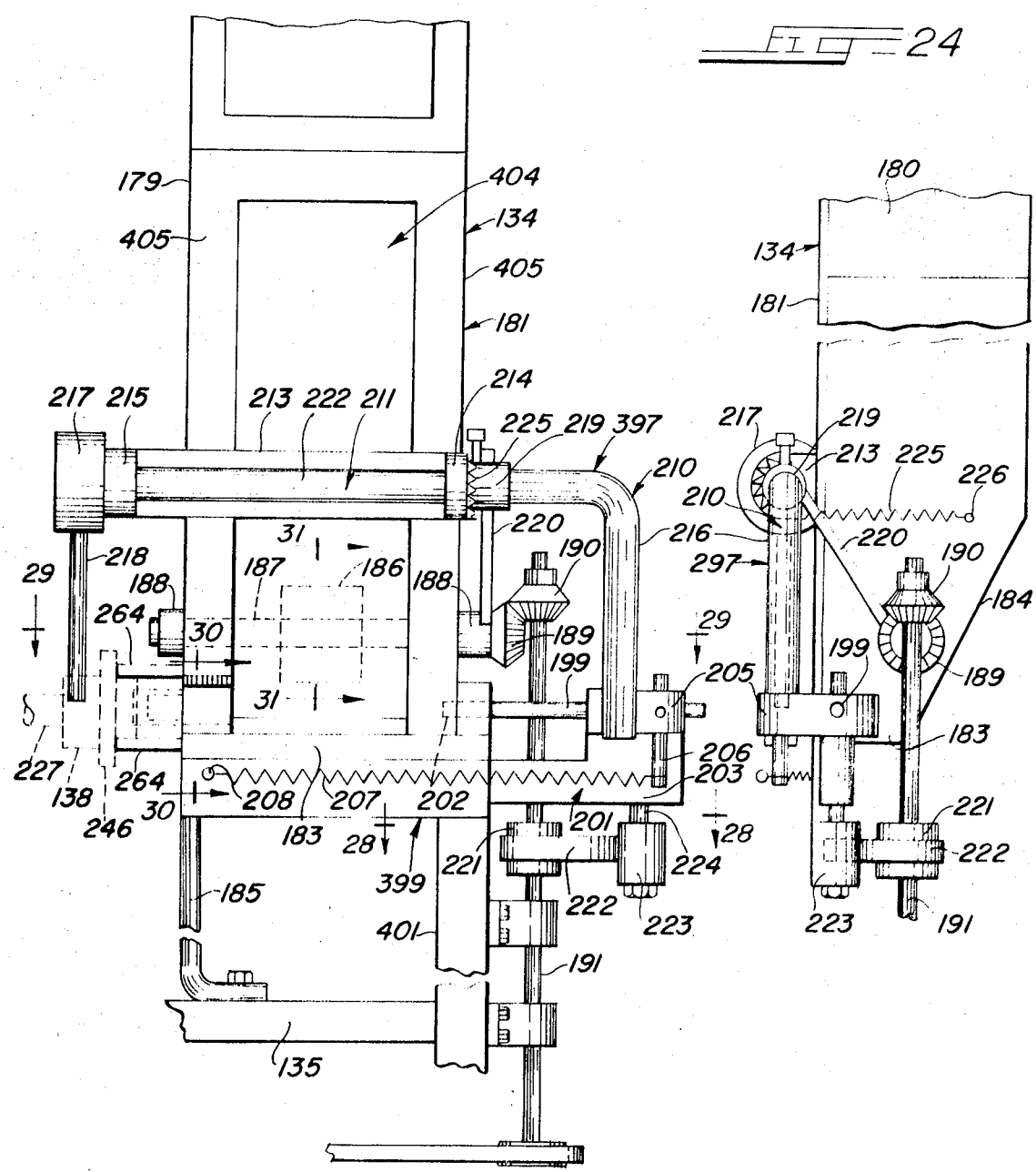

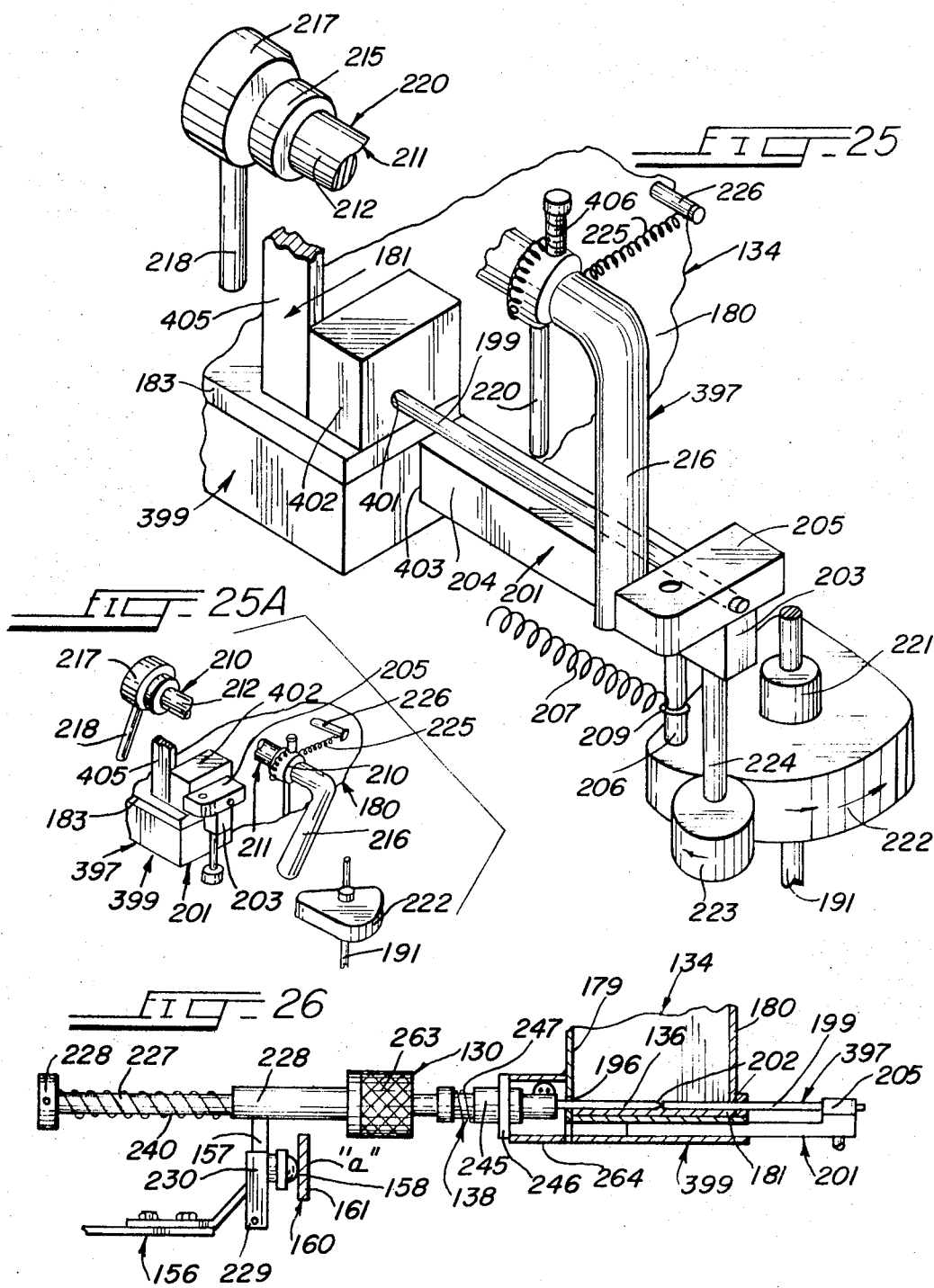

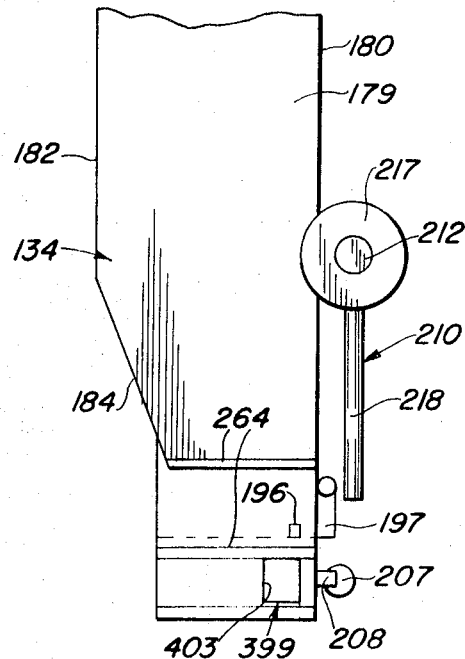
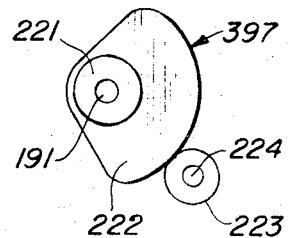
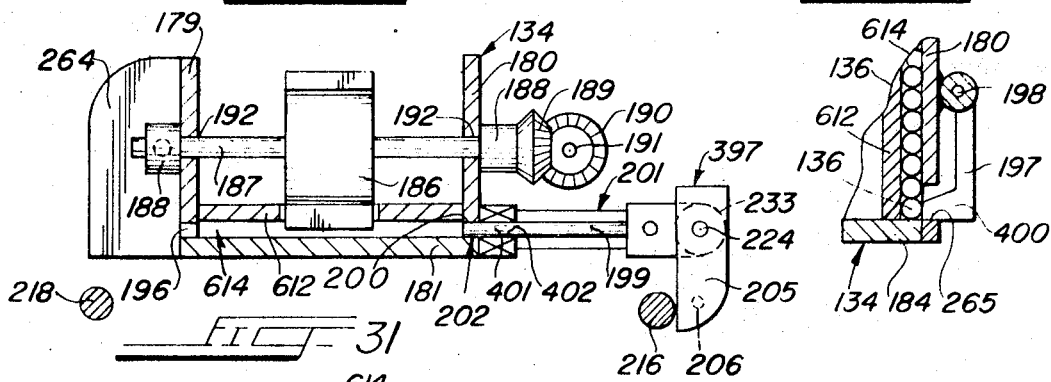
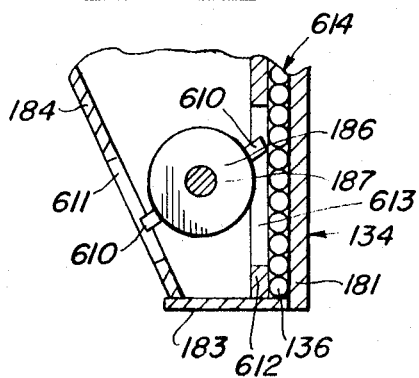

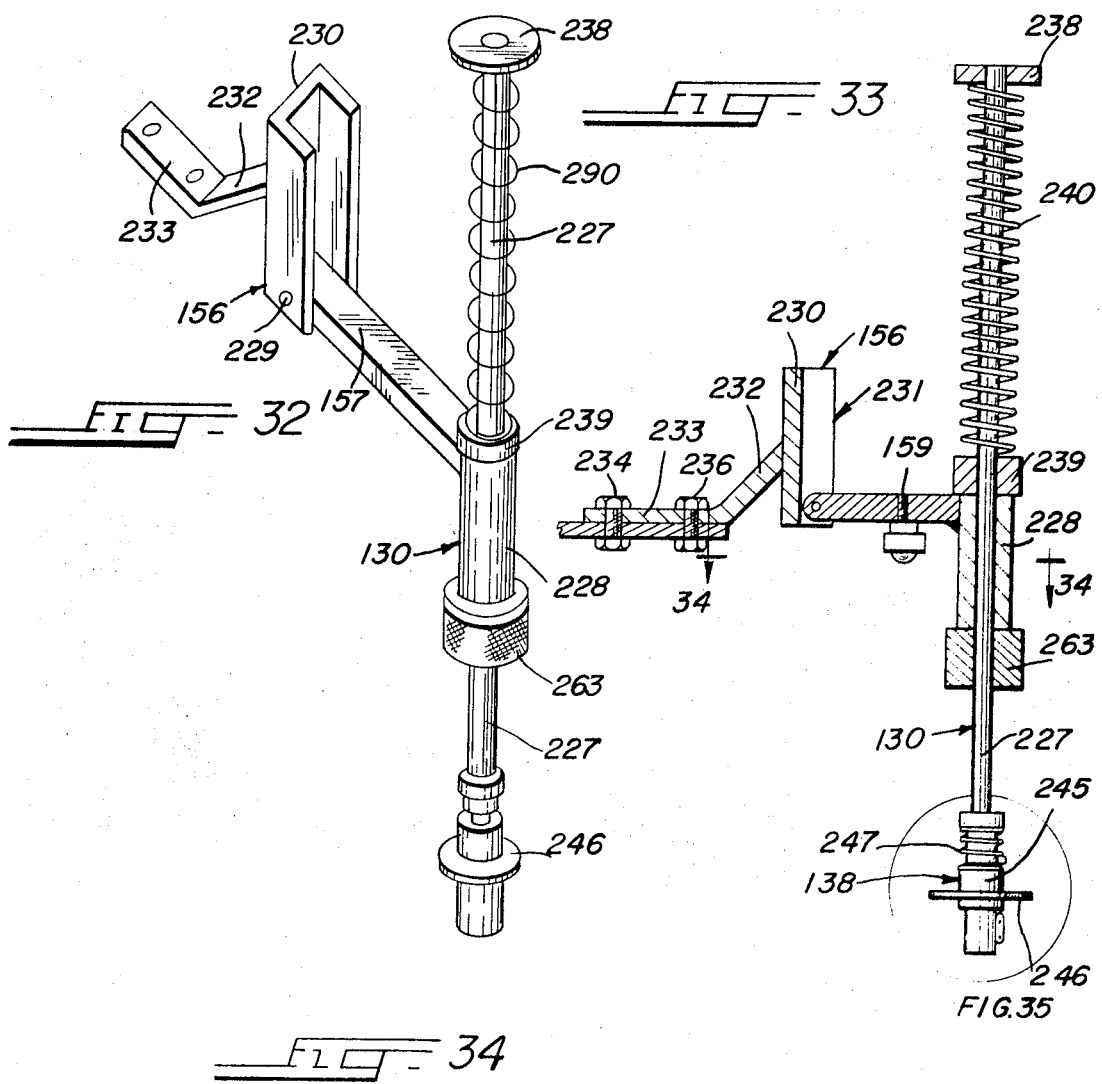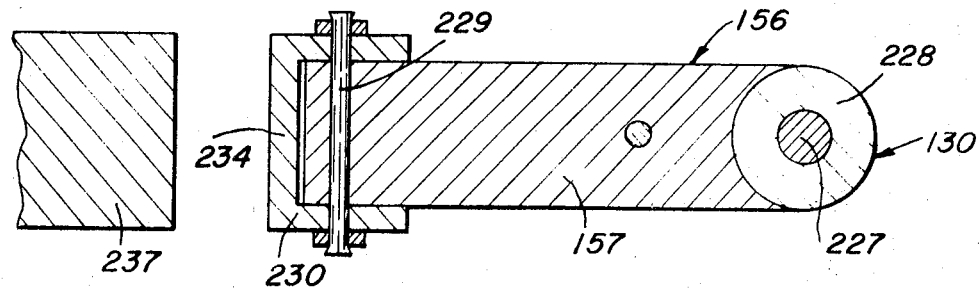

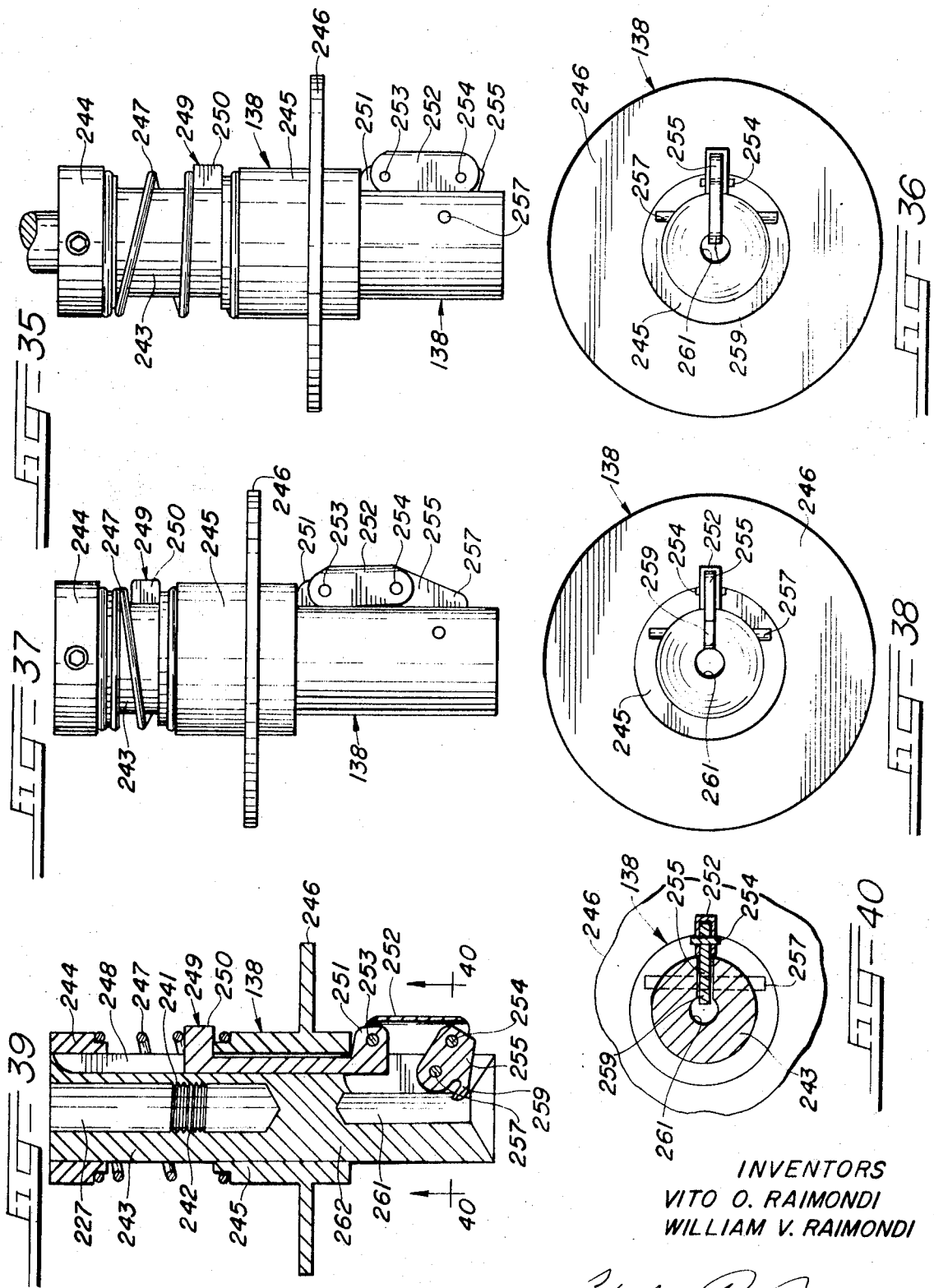

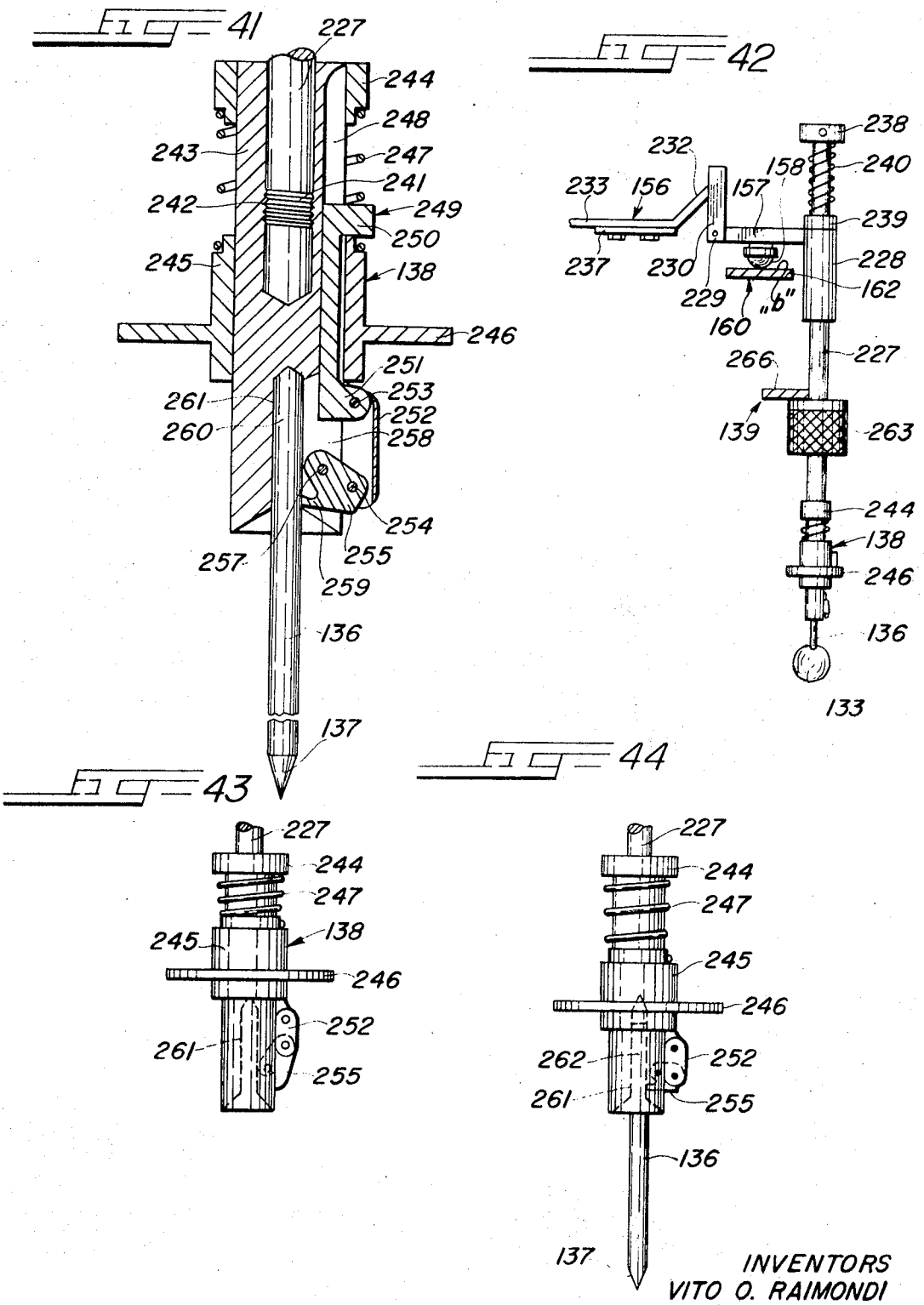

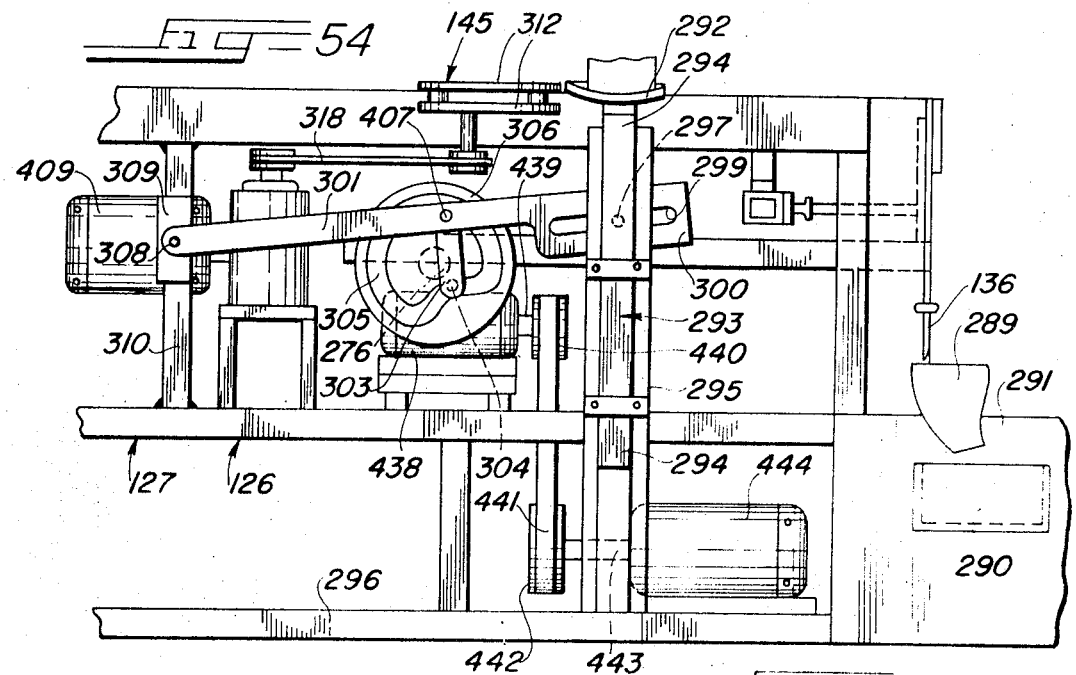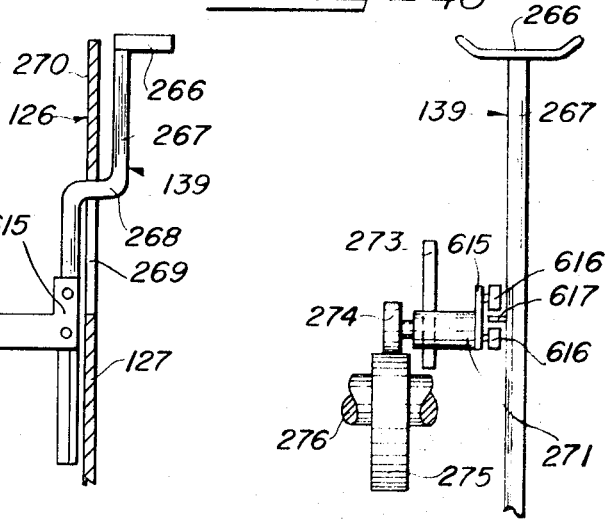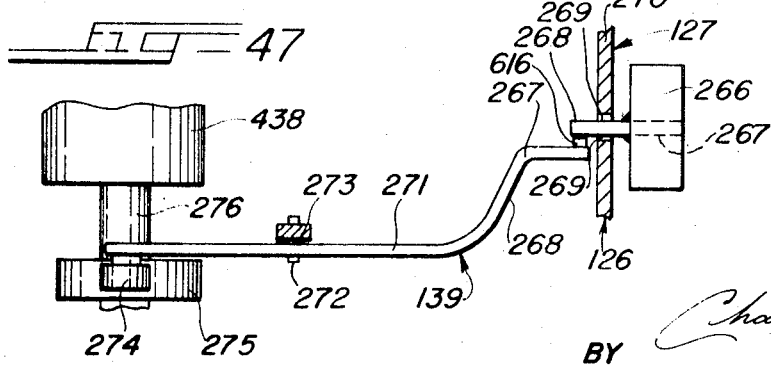

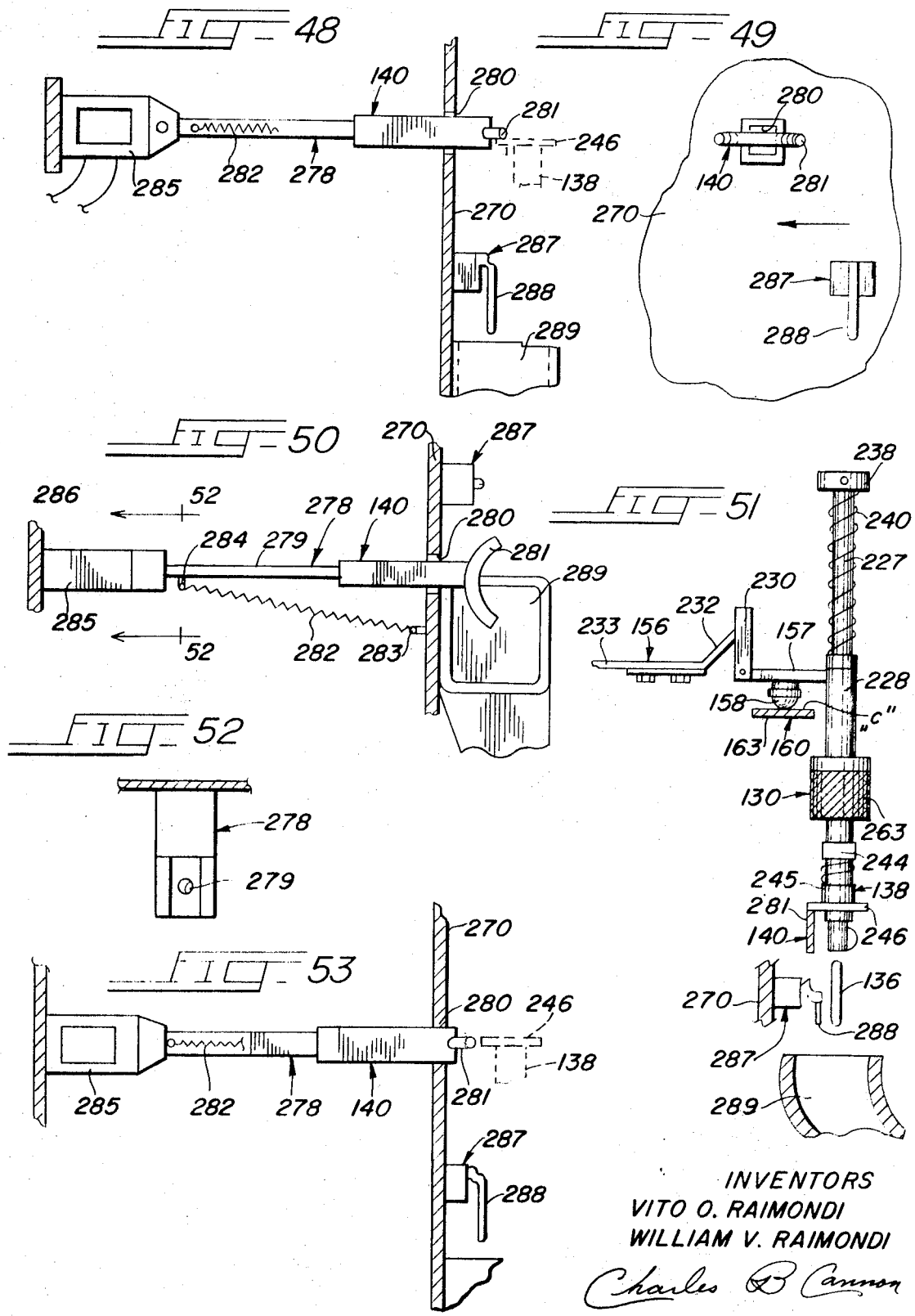

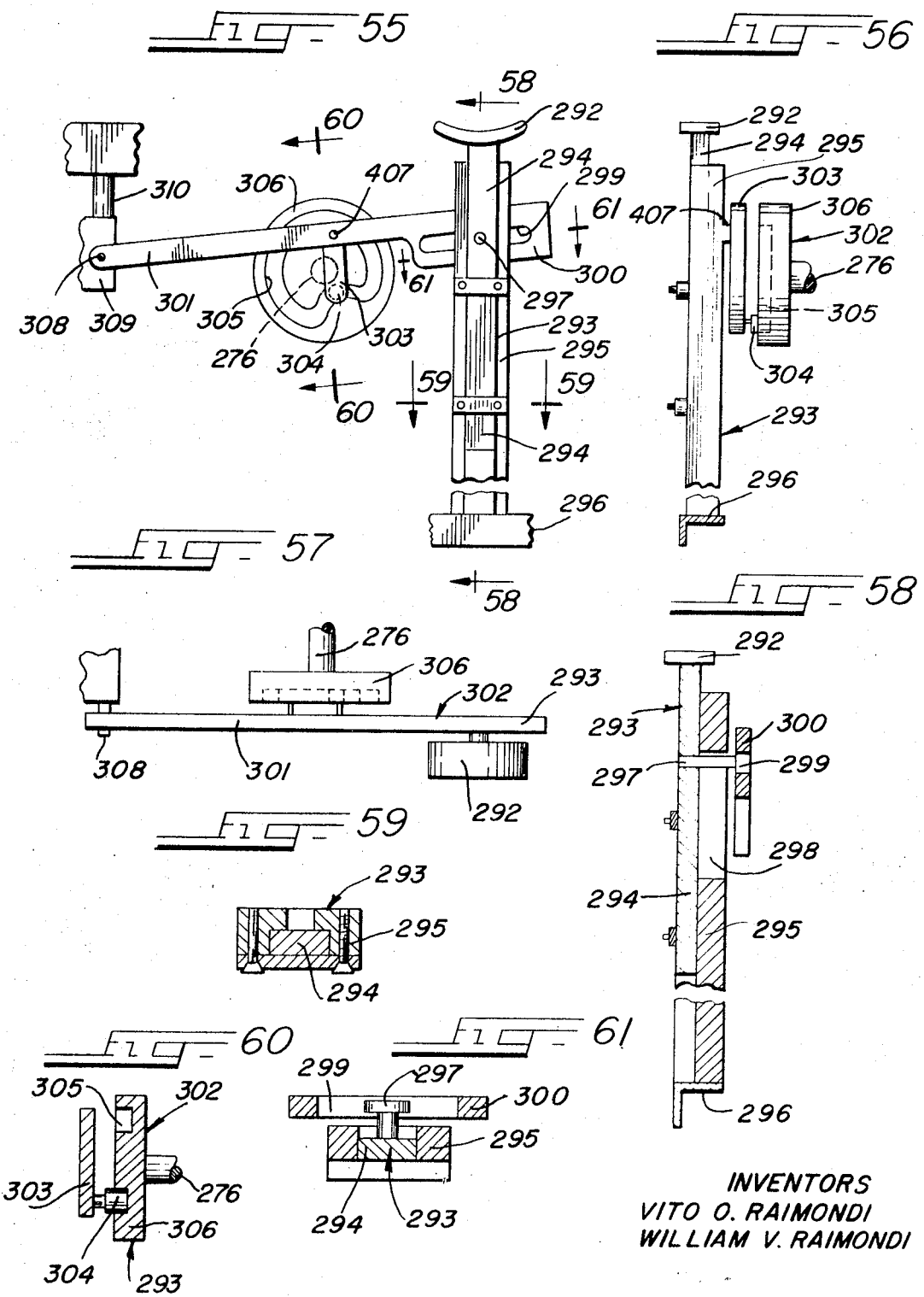

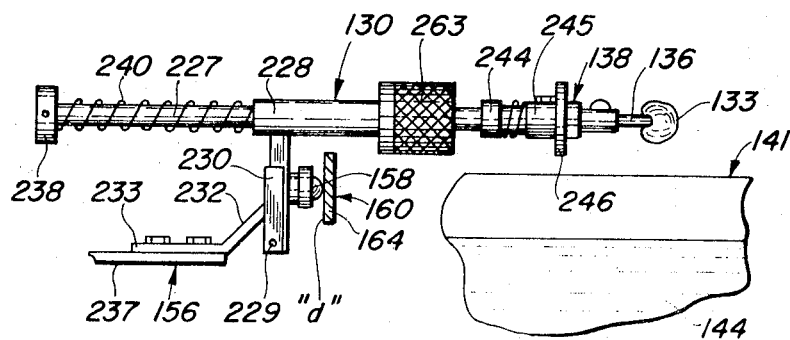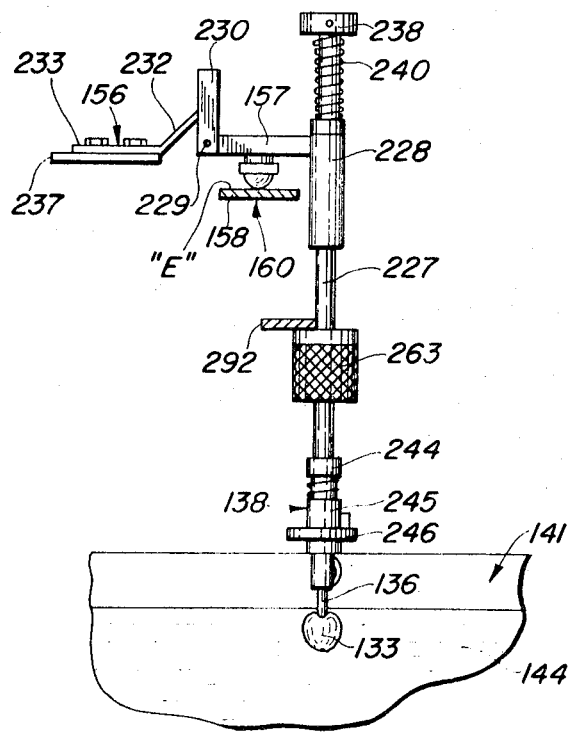

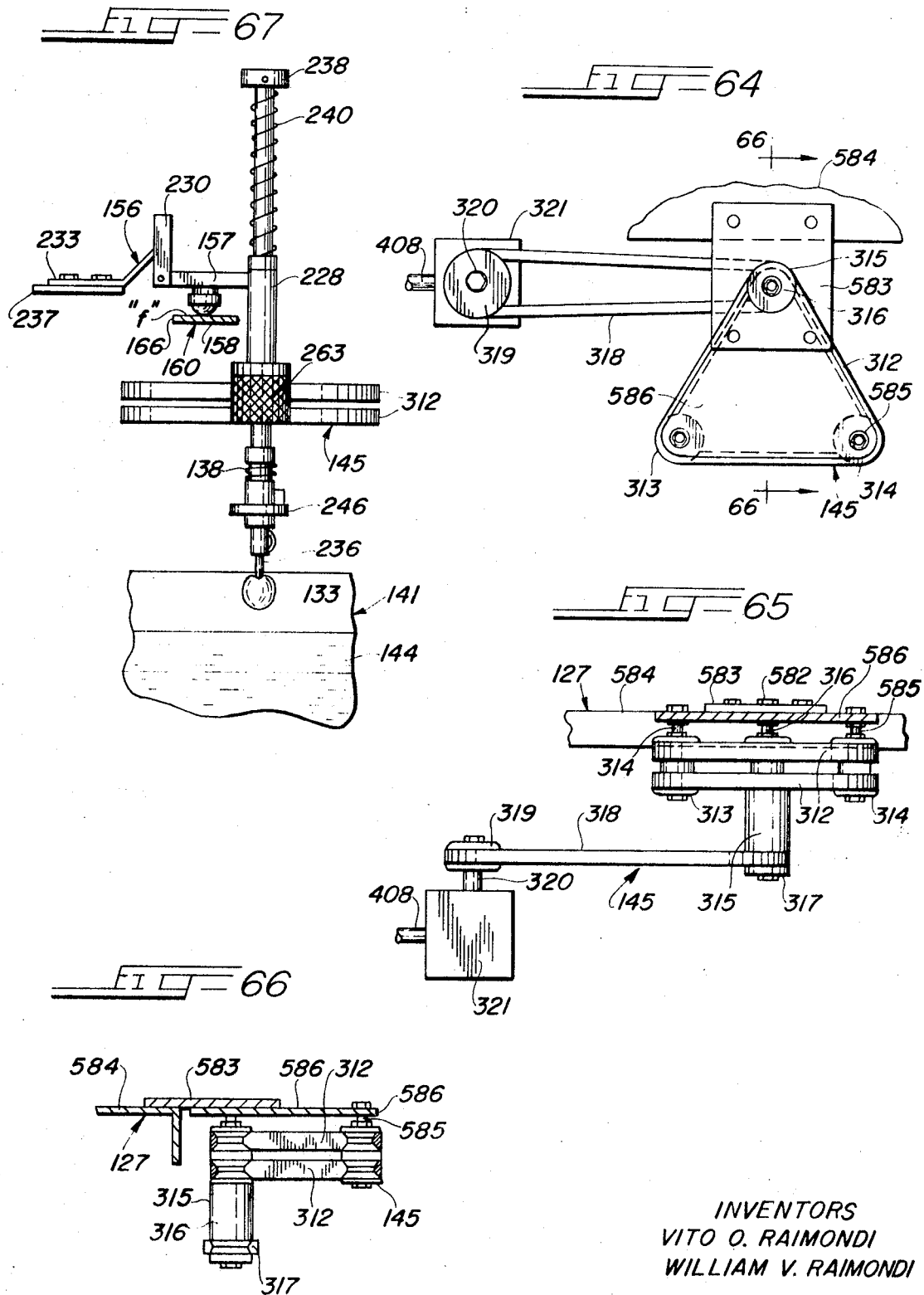

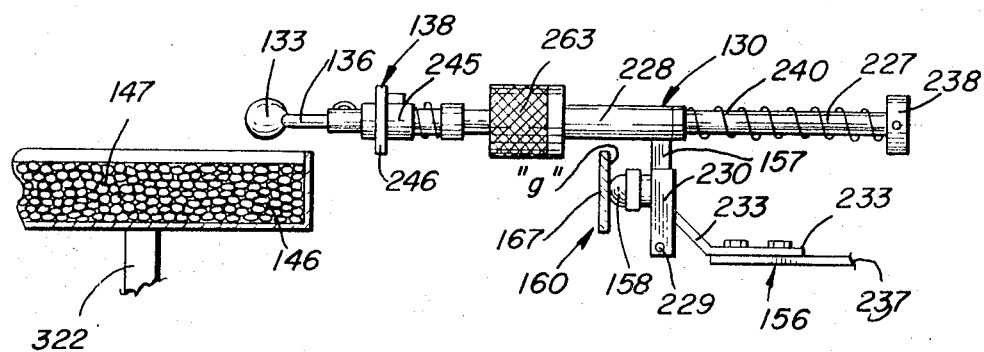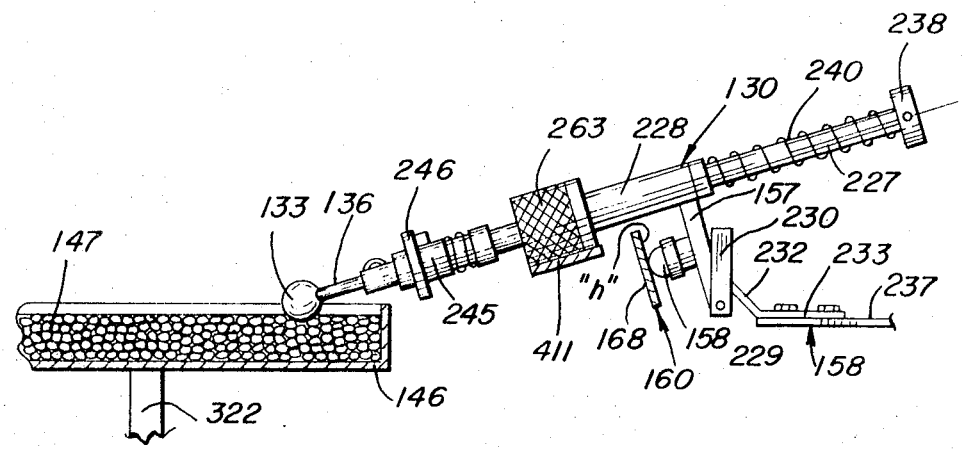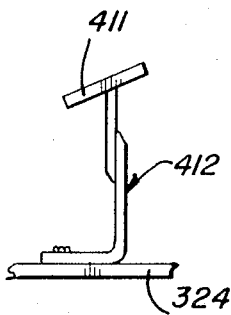

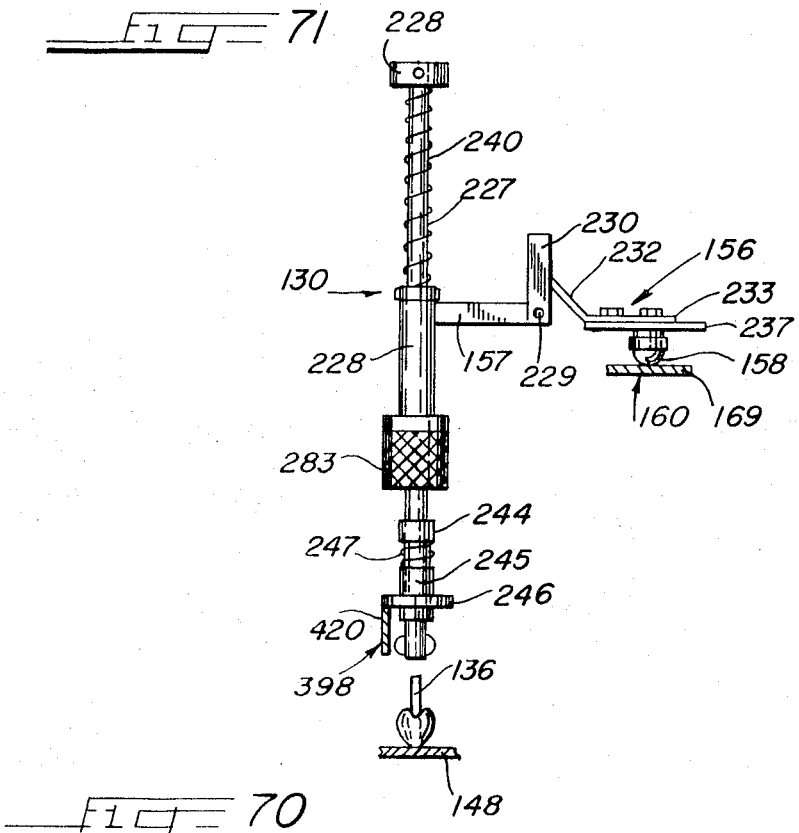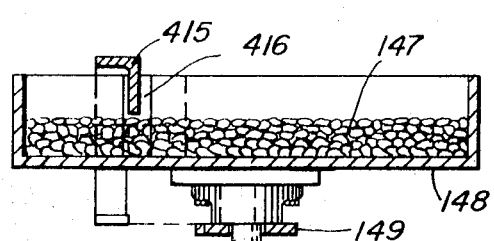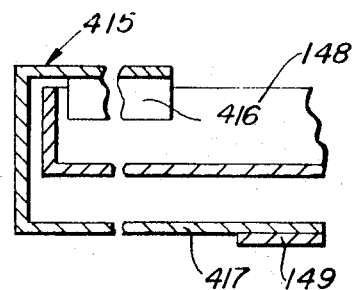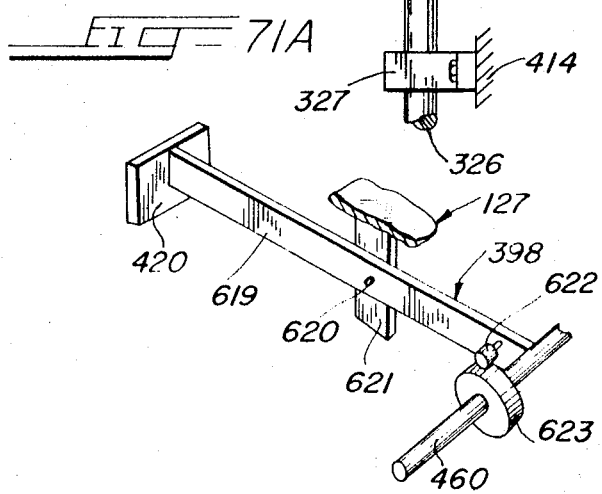

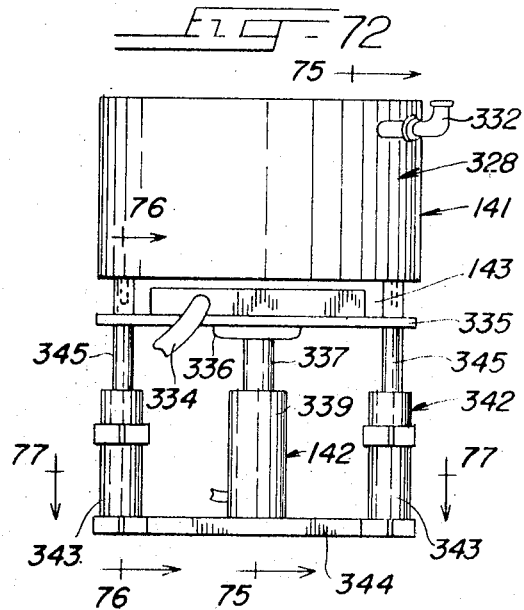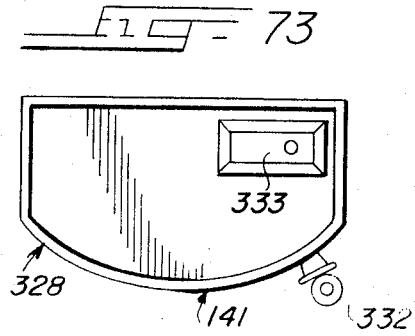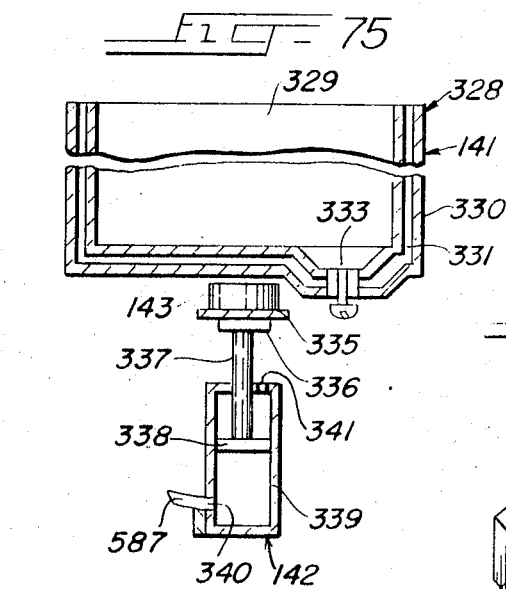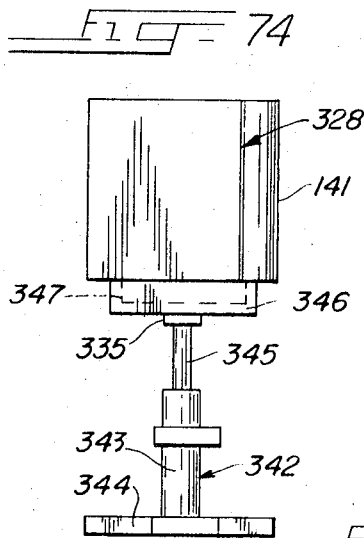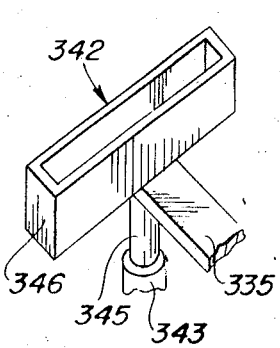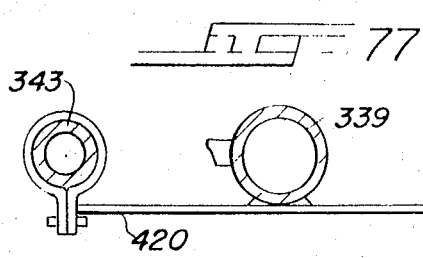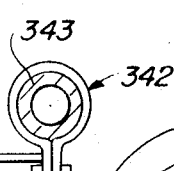

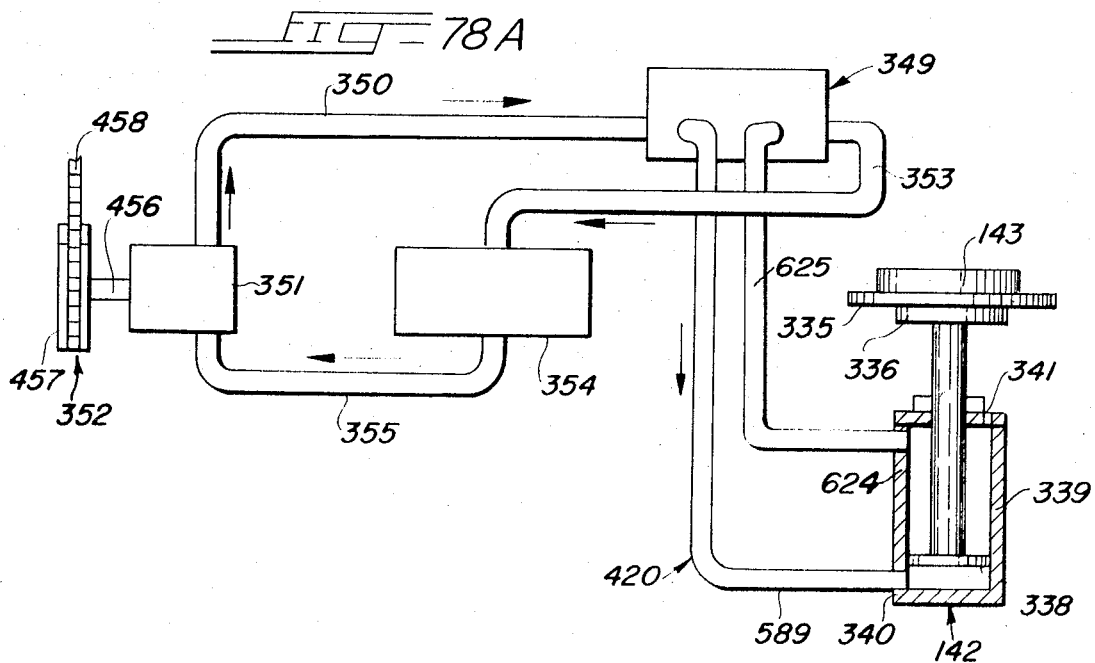

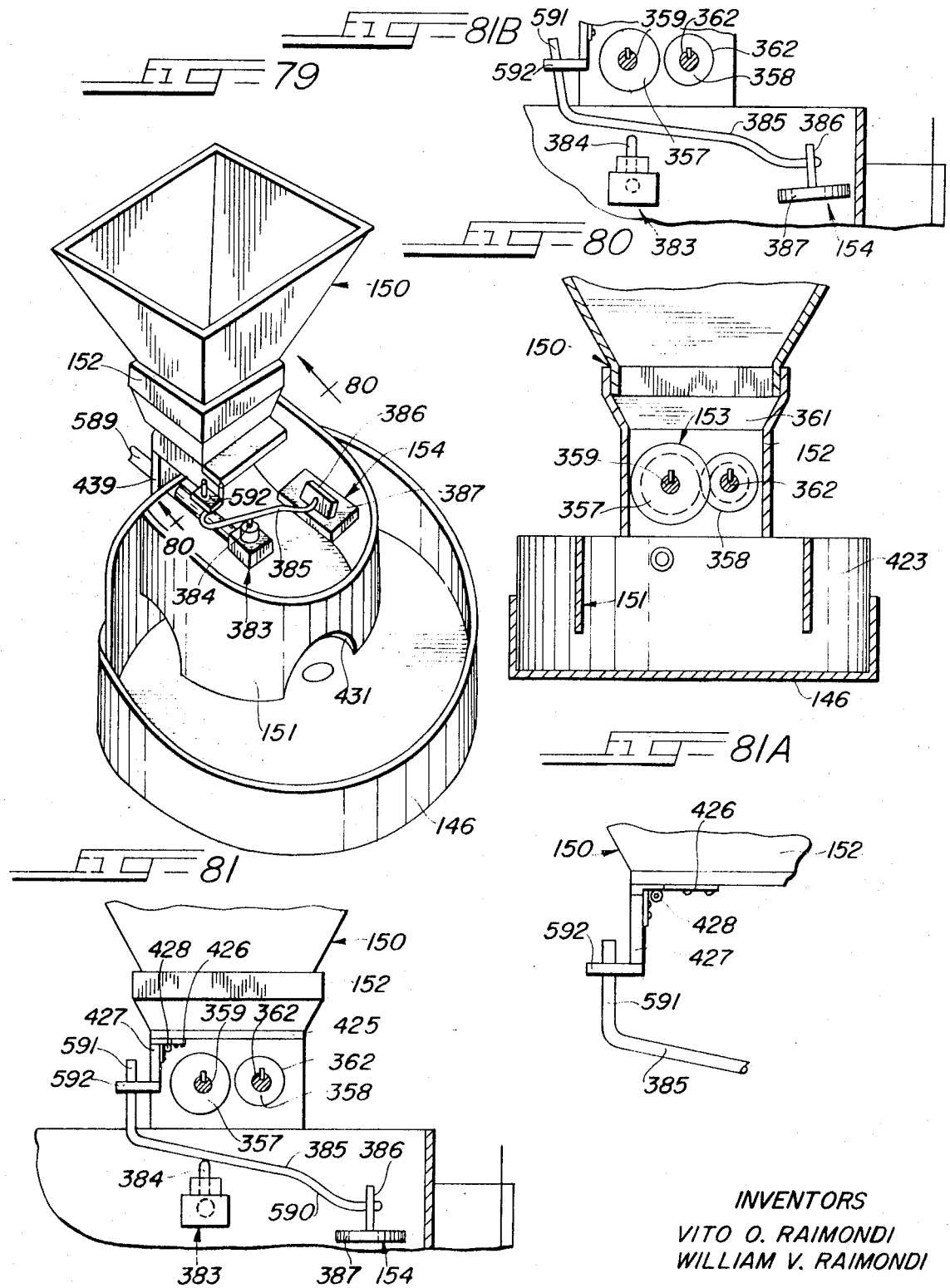

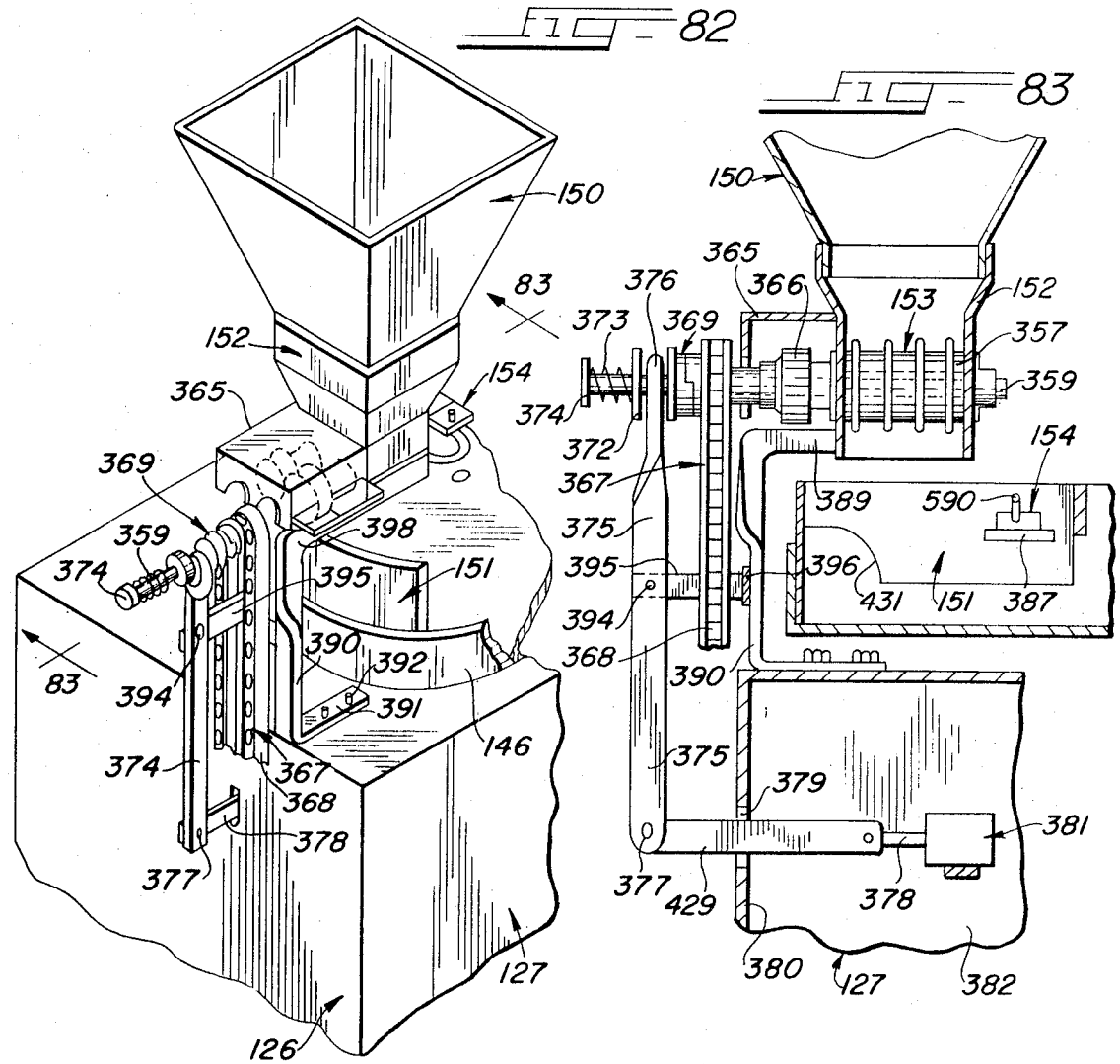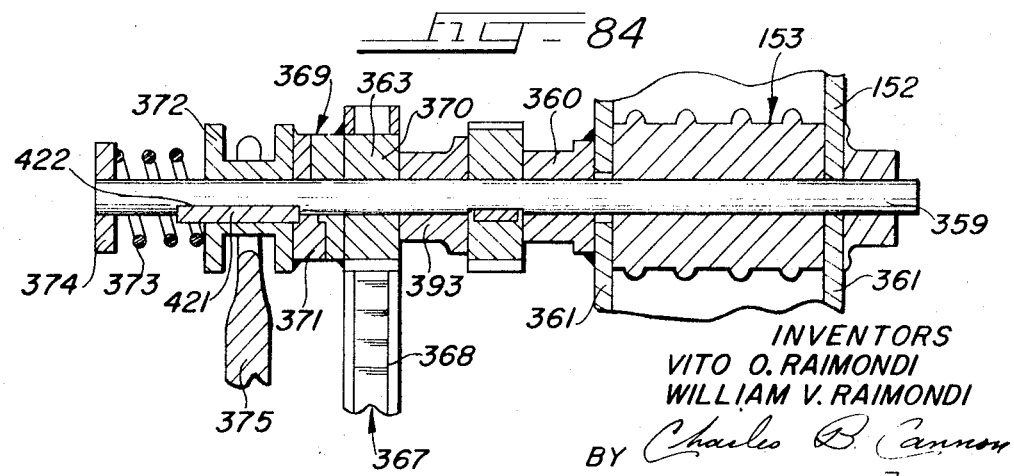

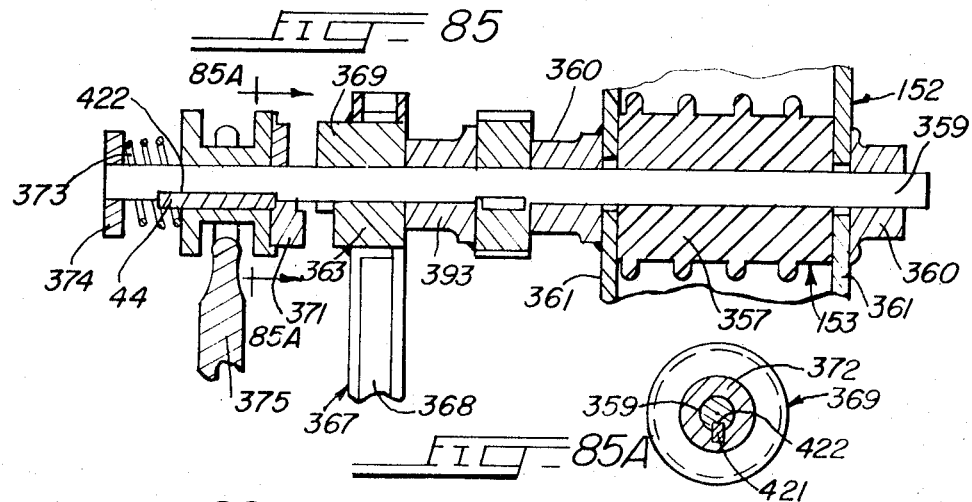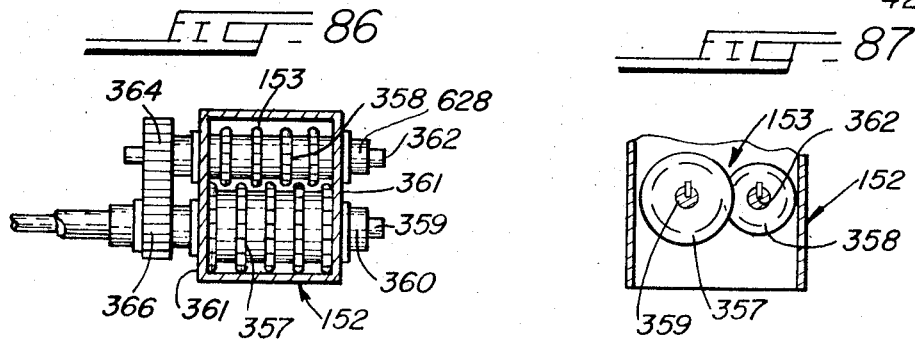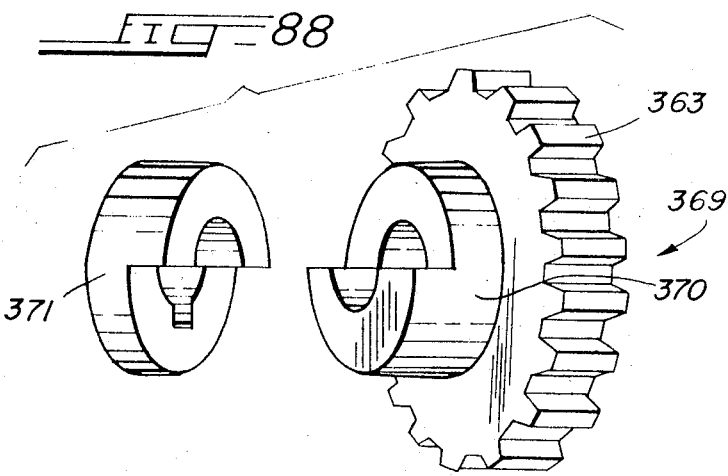

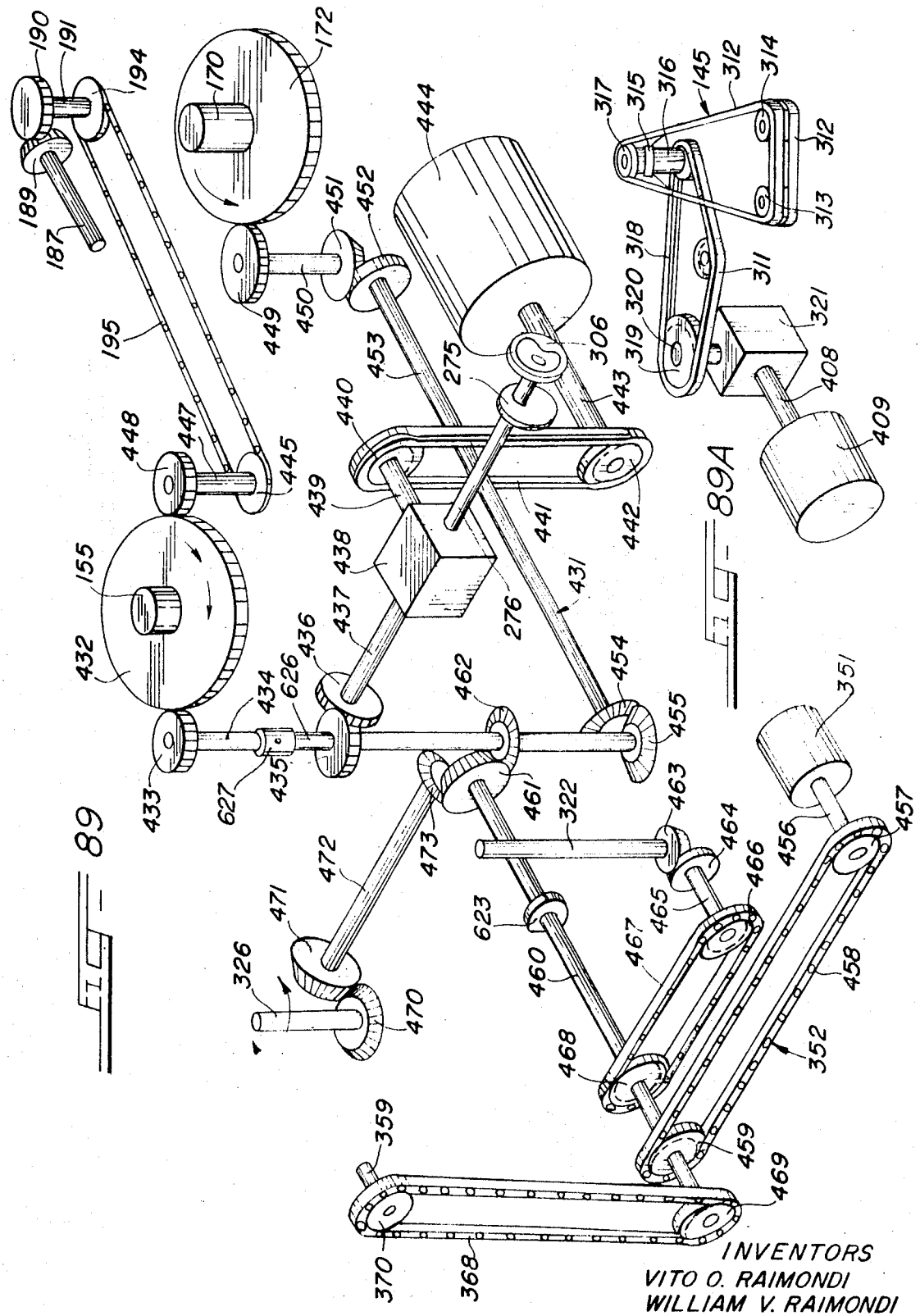

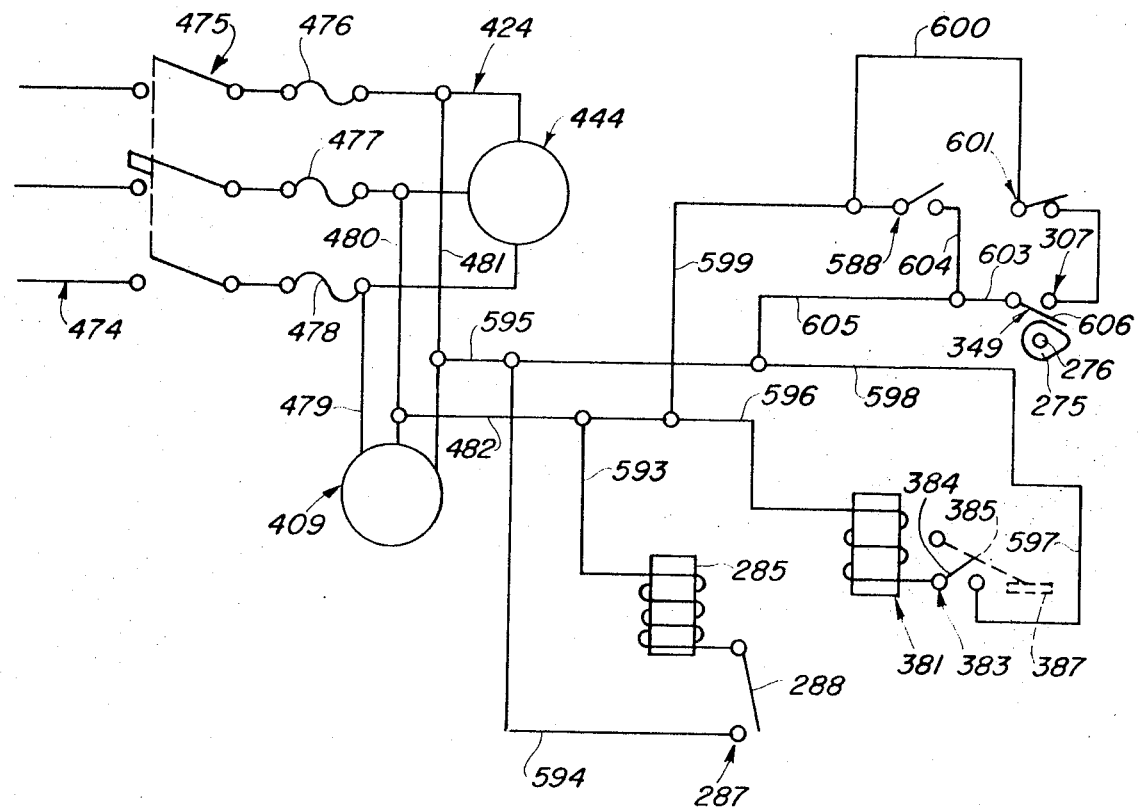

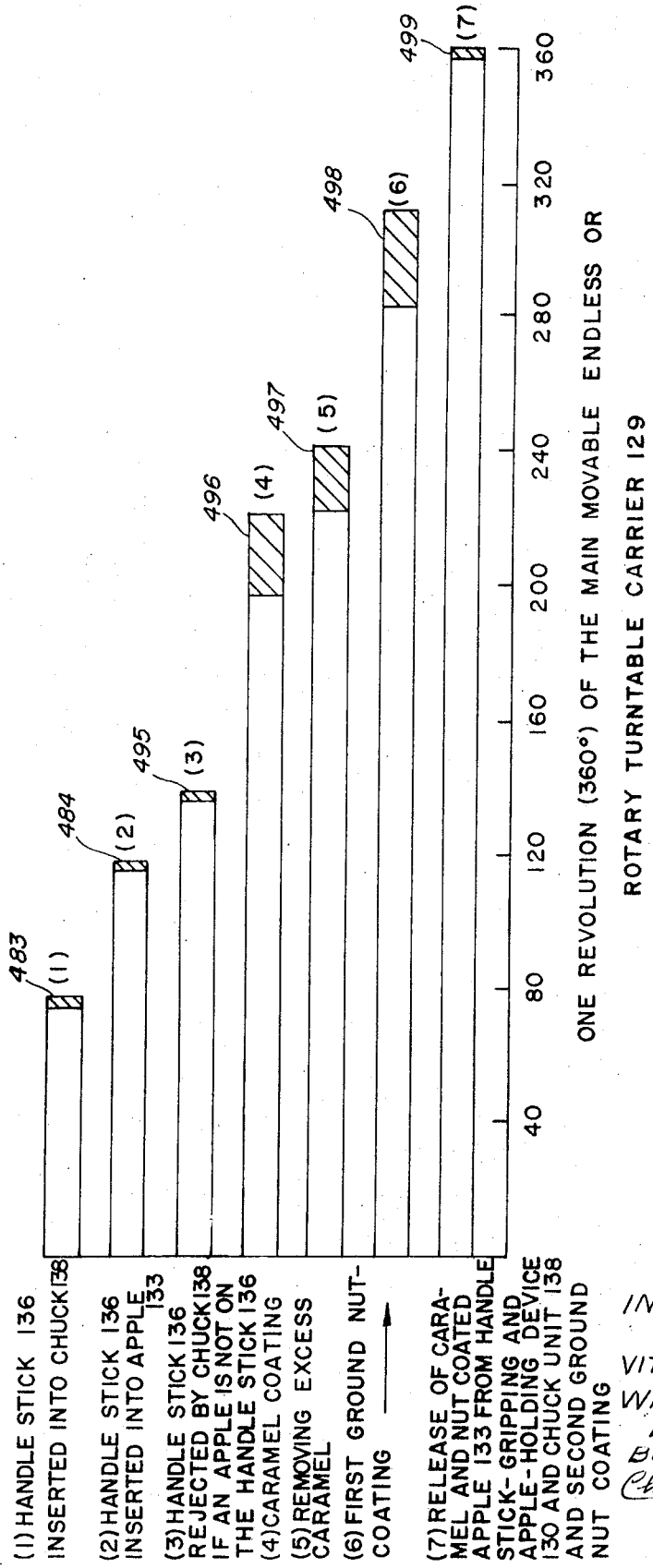

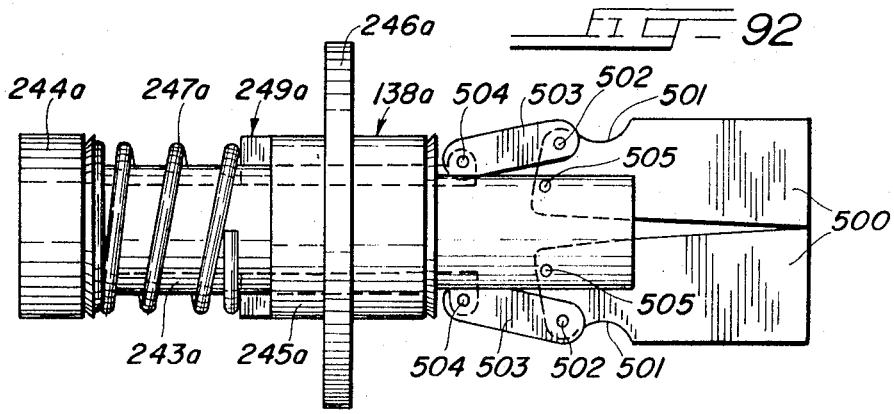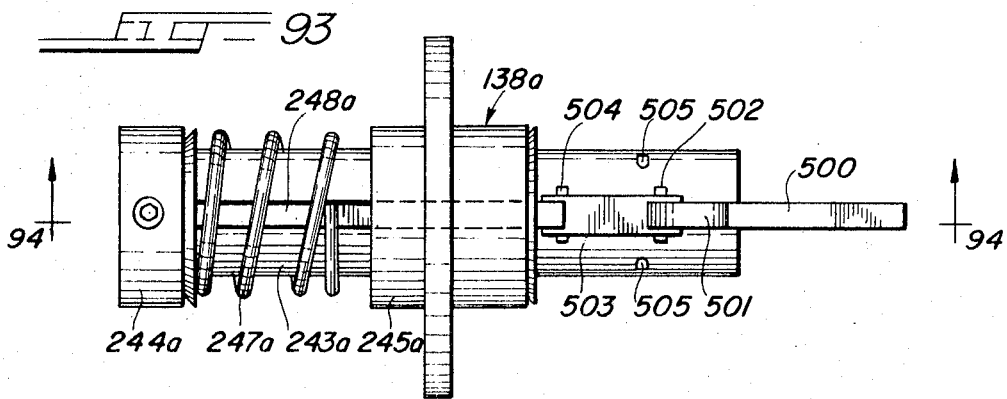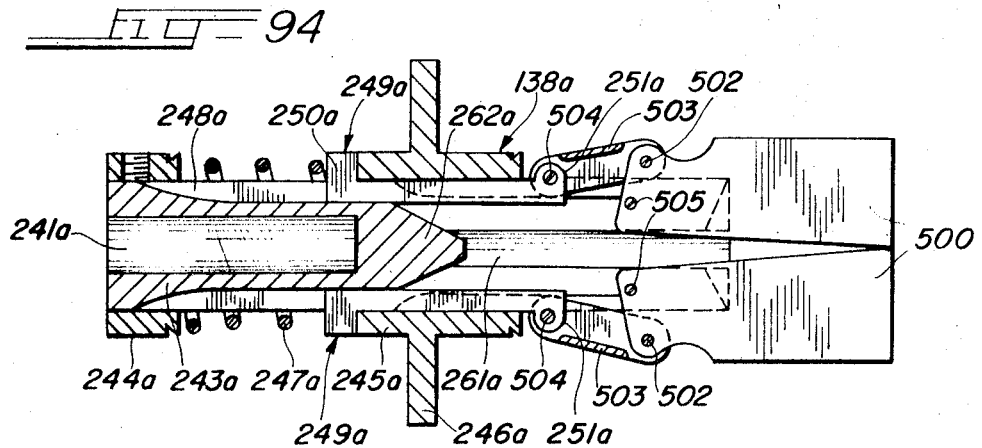

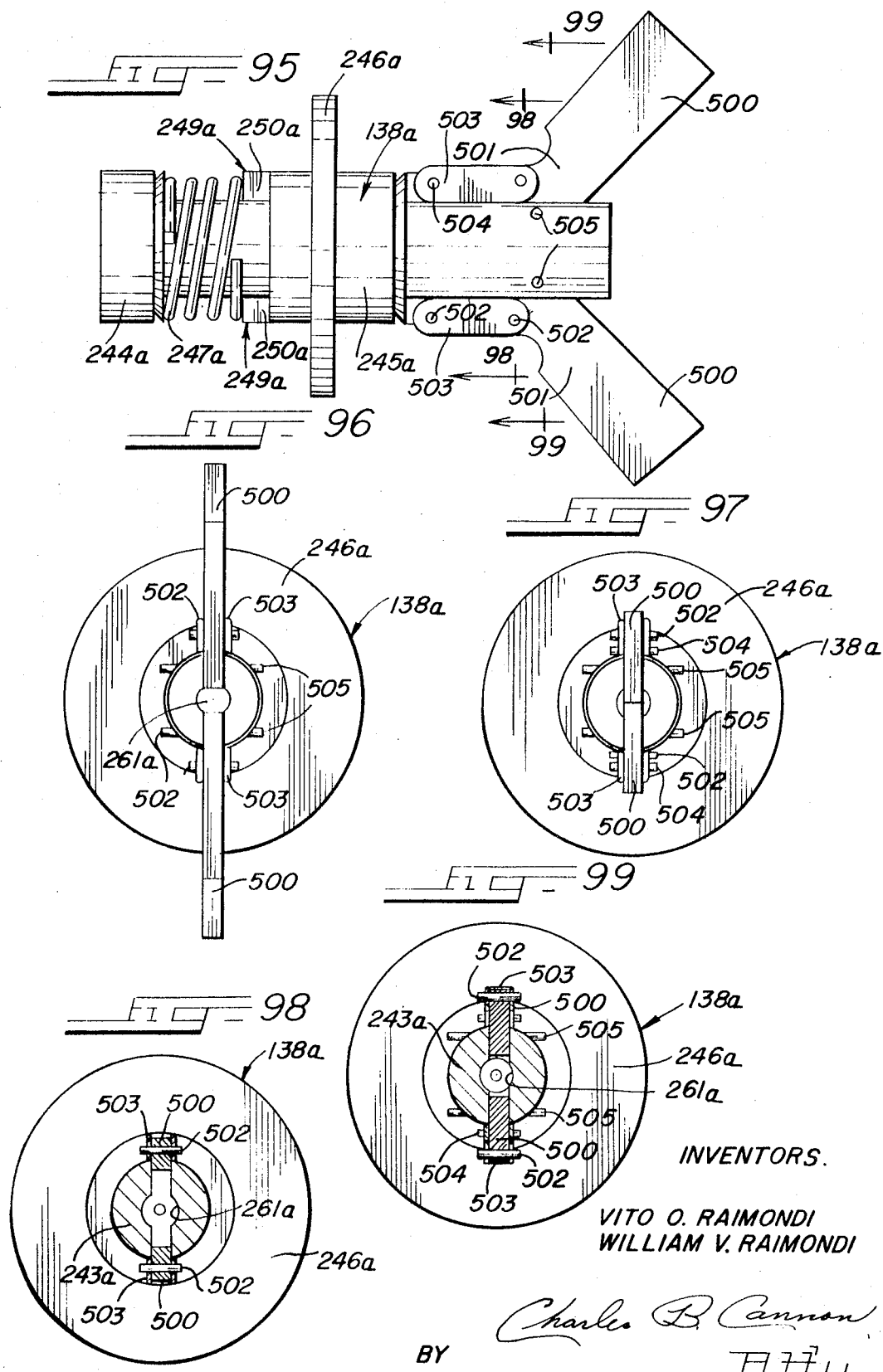

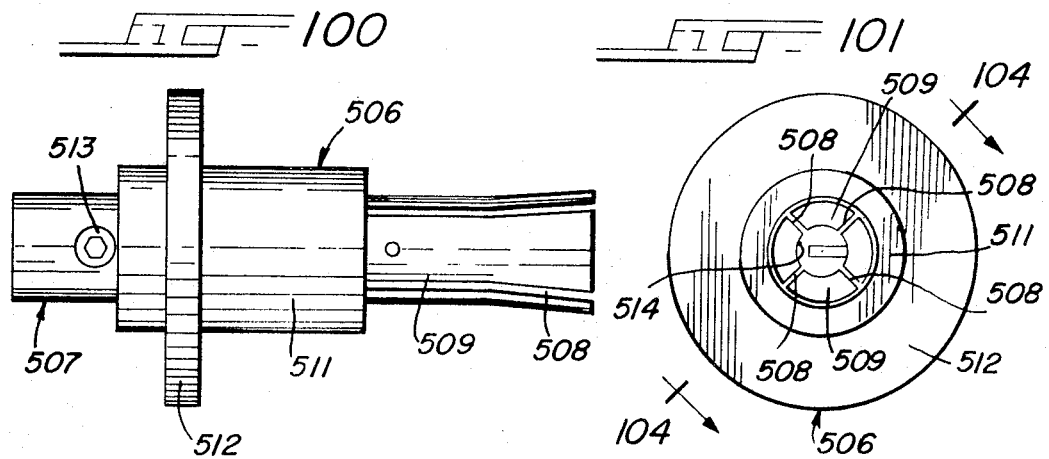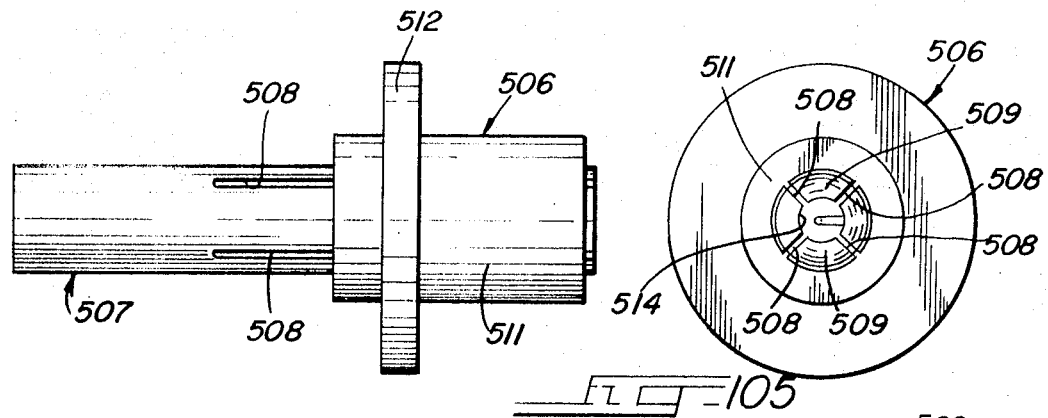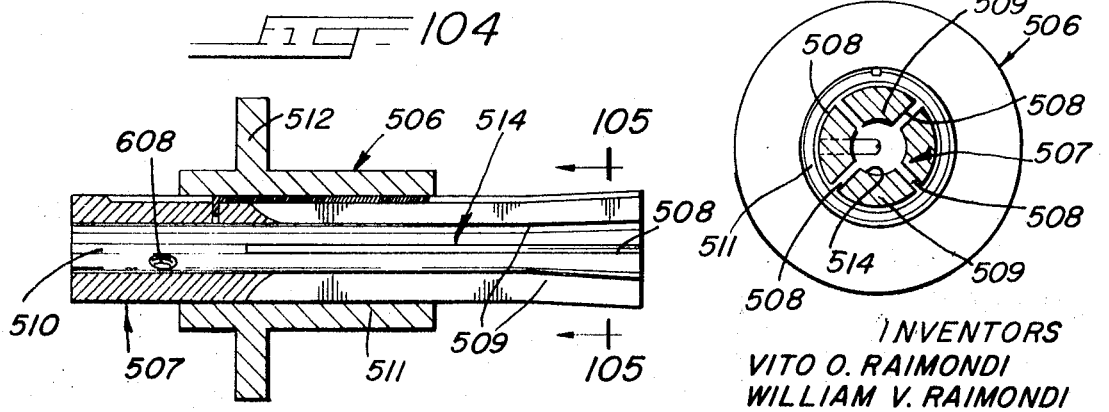

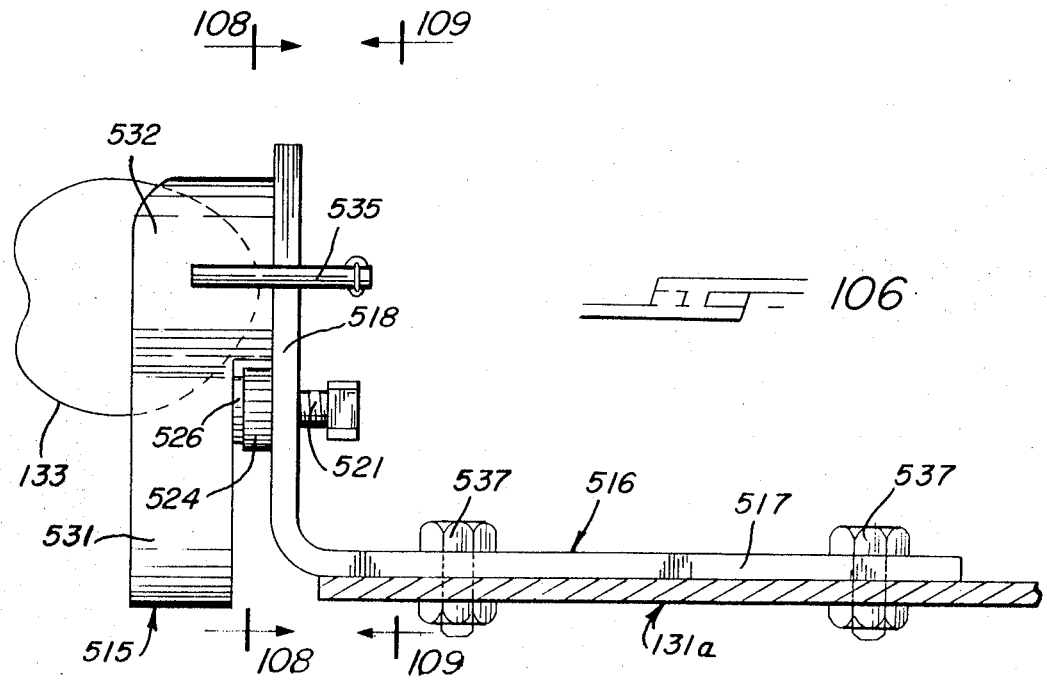
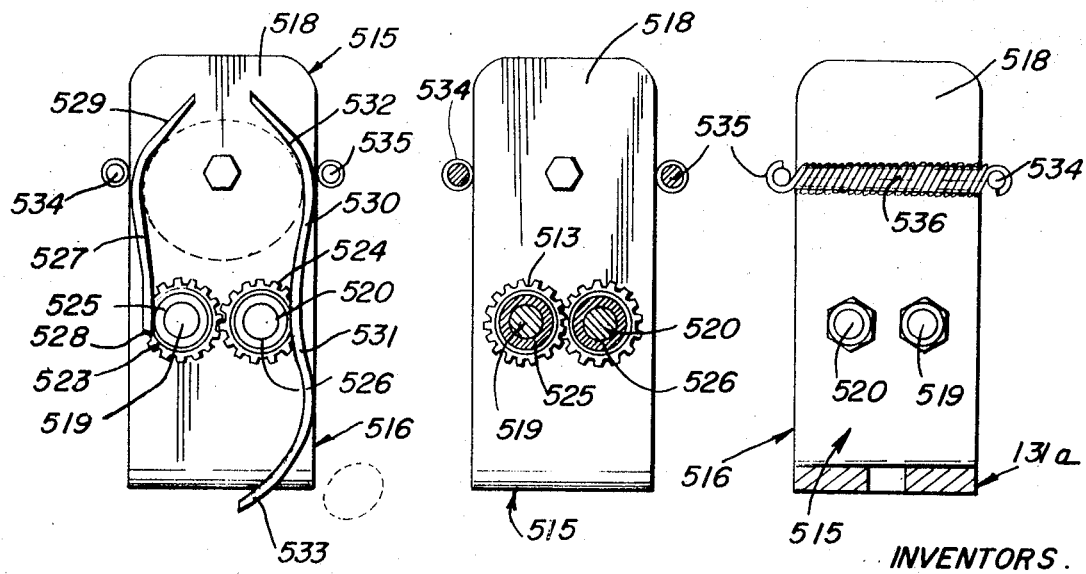

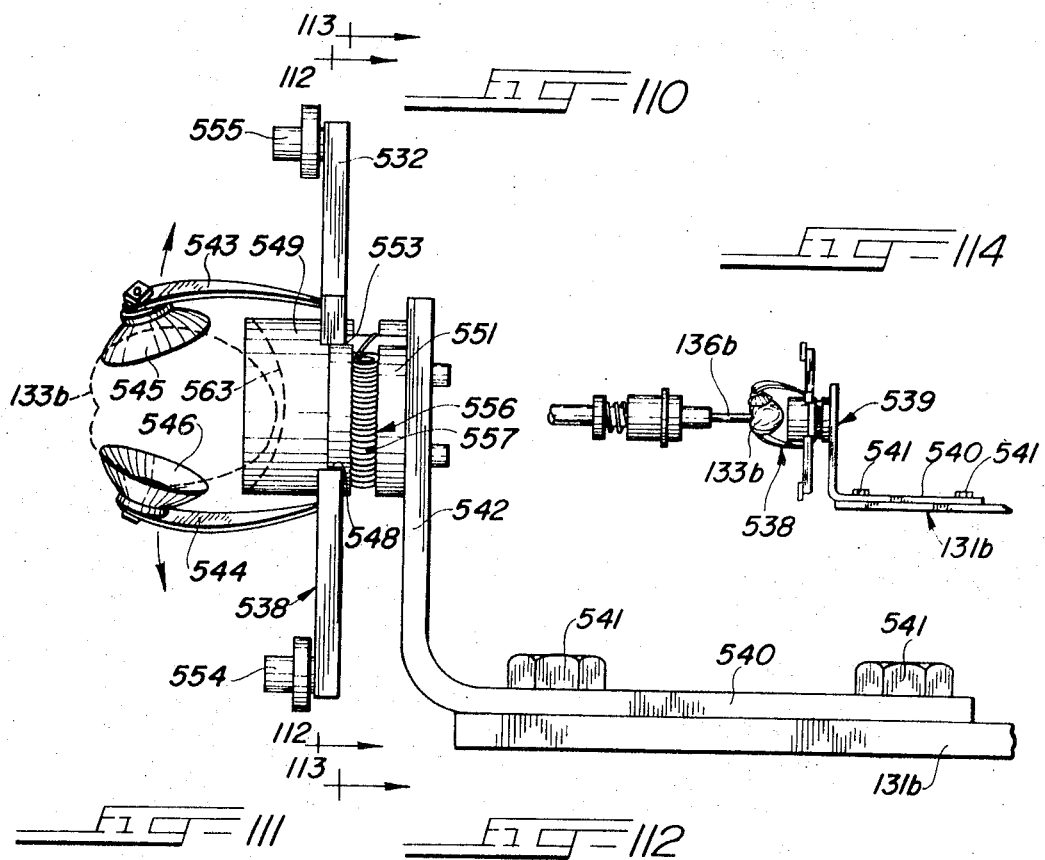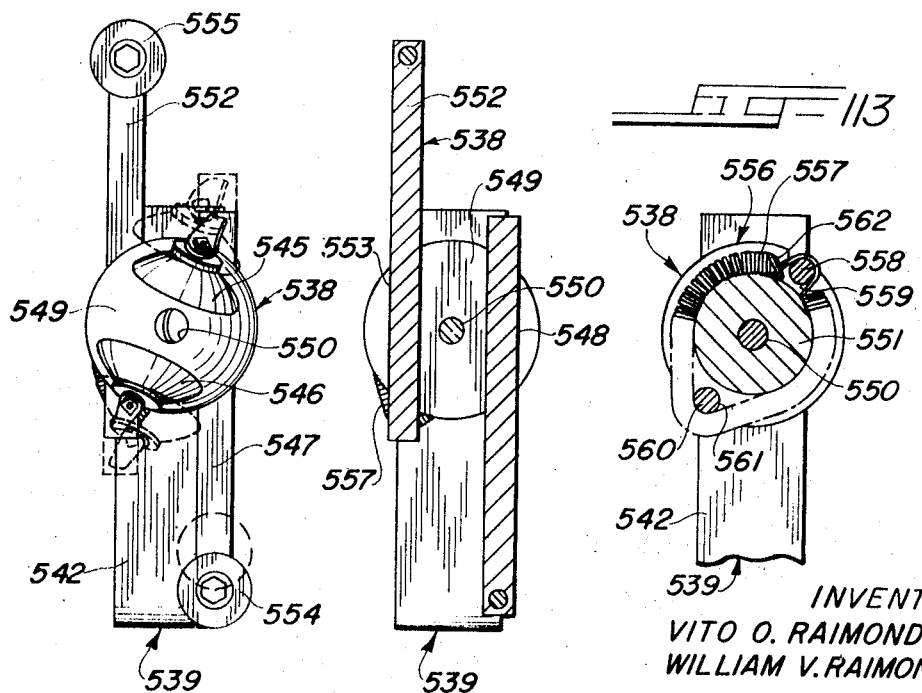

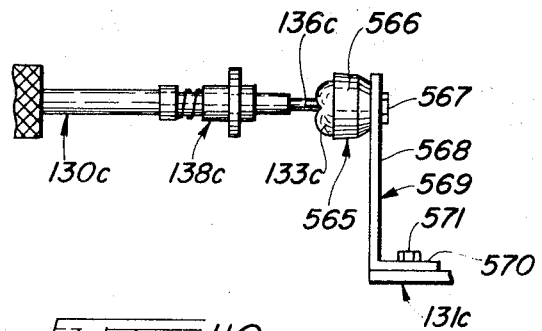
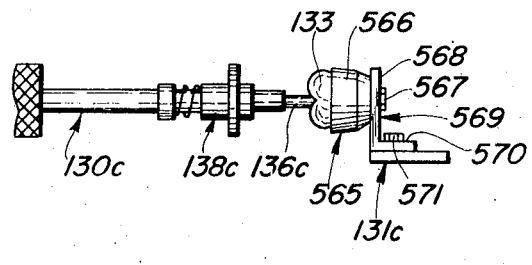
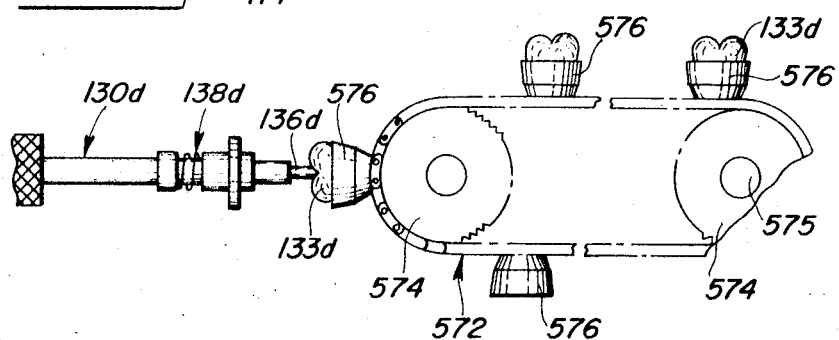

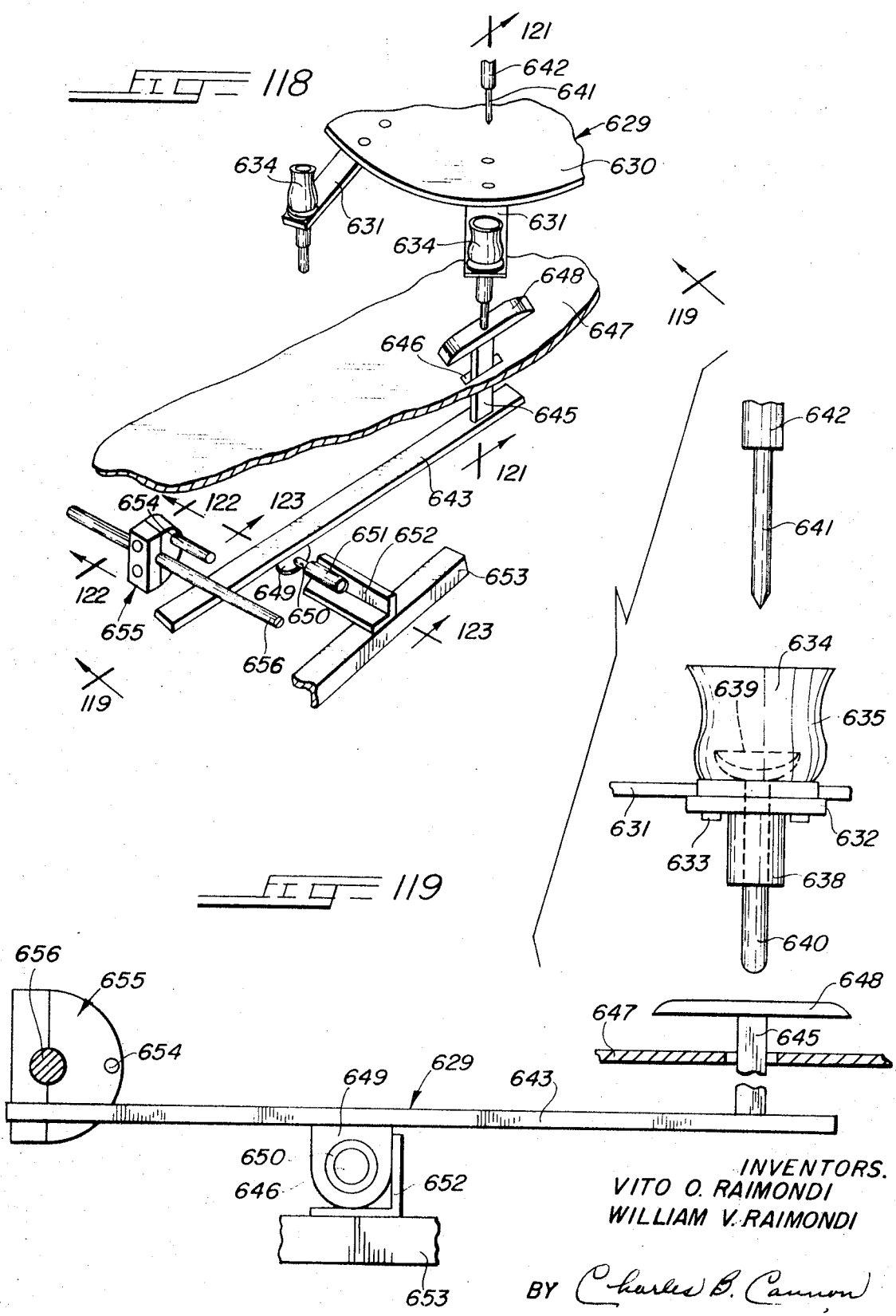

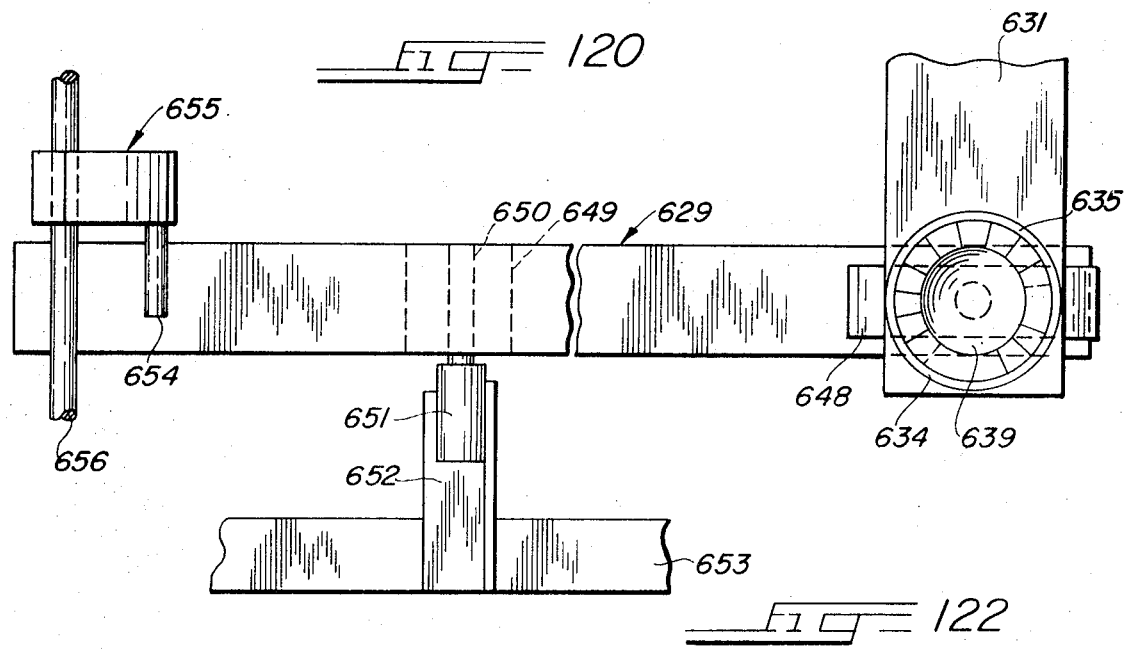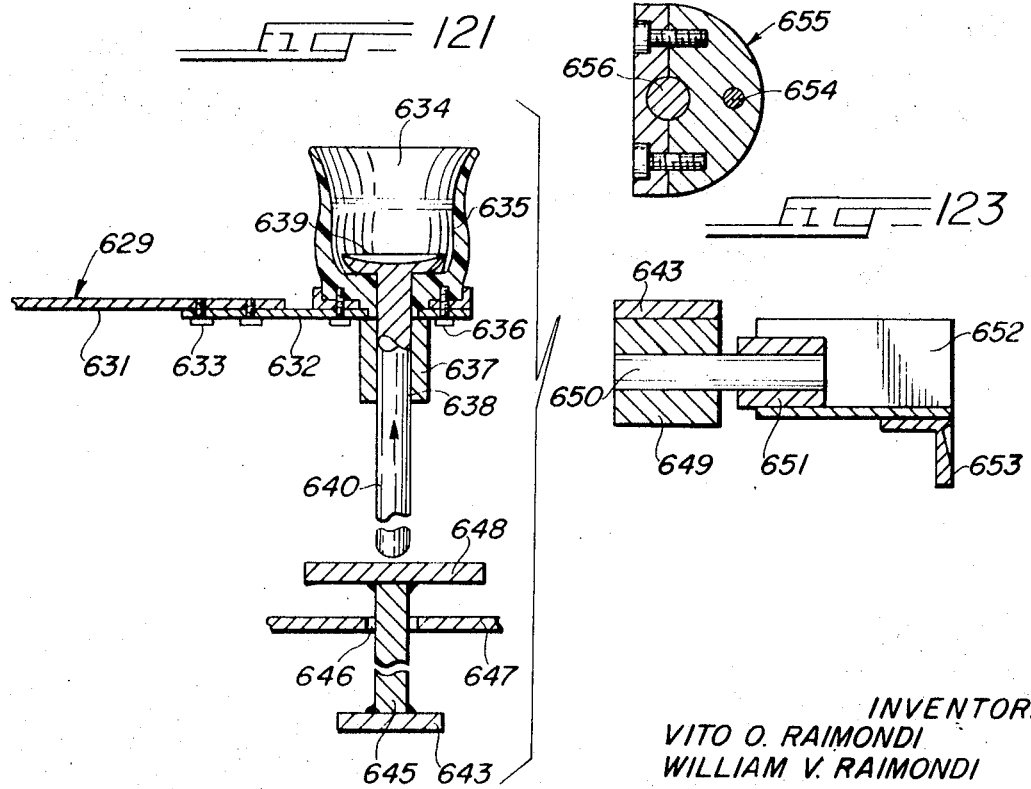

INVENTORS.
VITO O. RAIMONDI
WILLIAM V. RAIMONDI
BY Charles B. Cannon

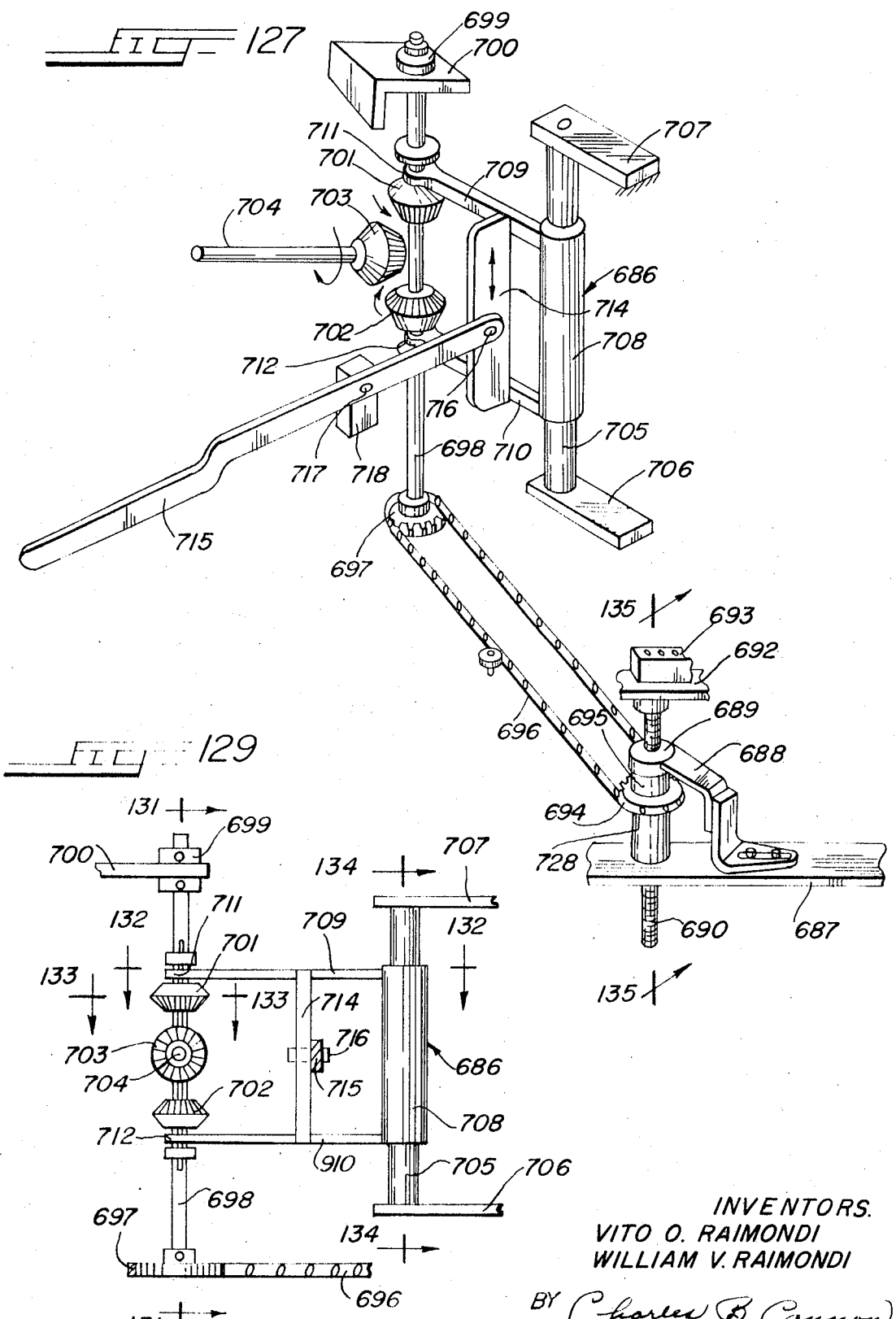

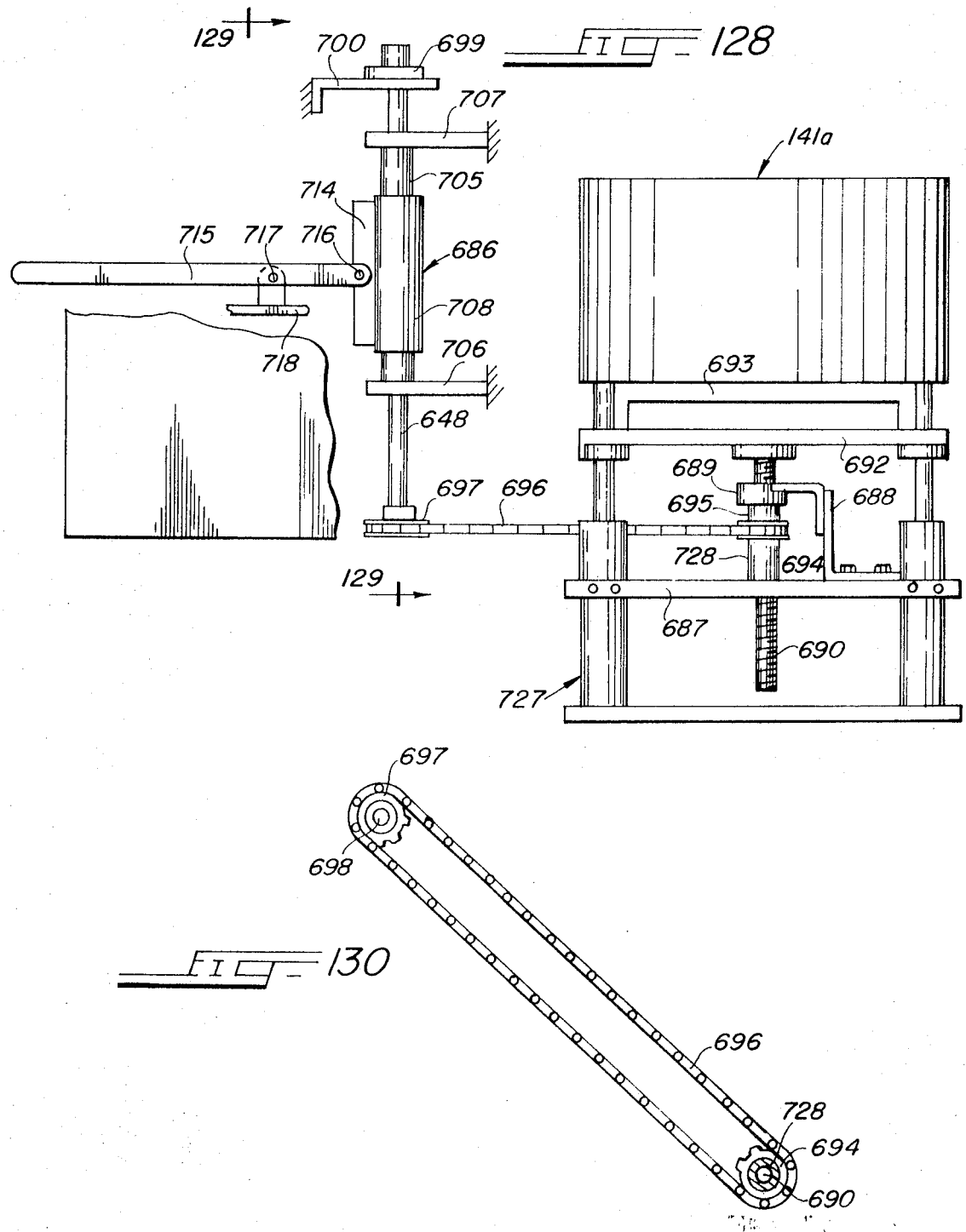

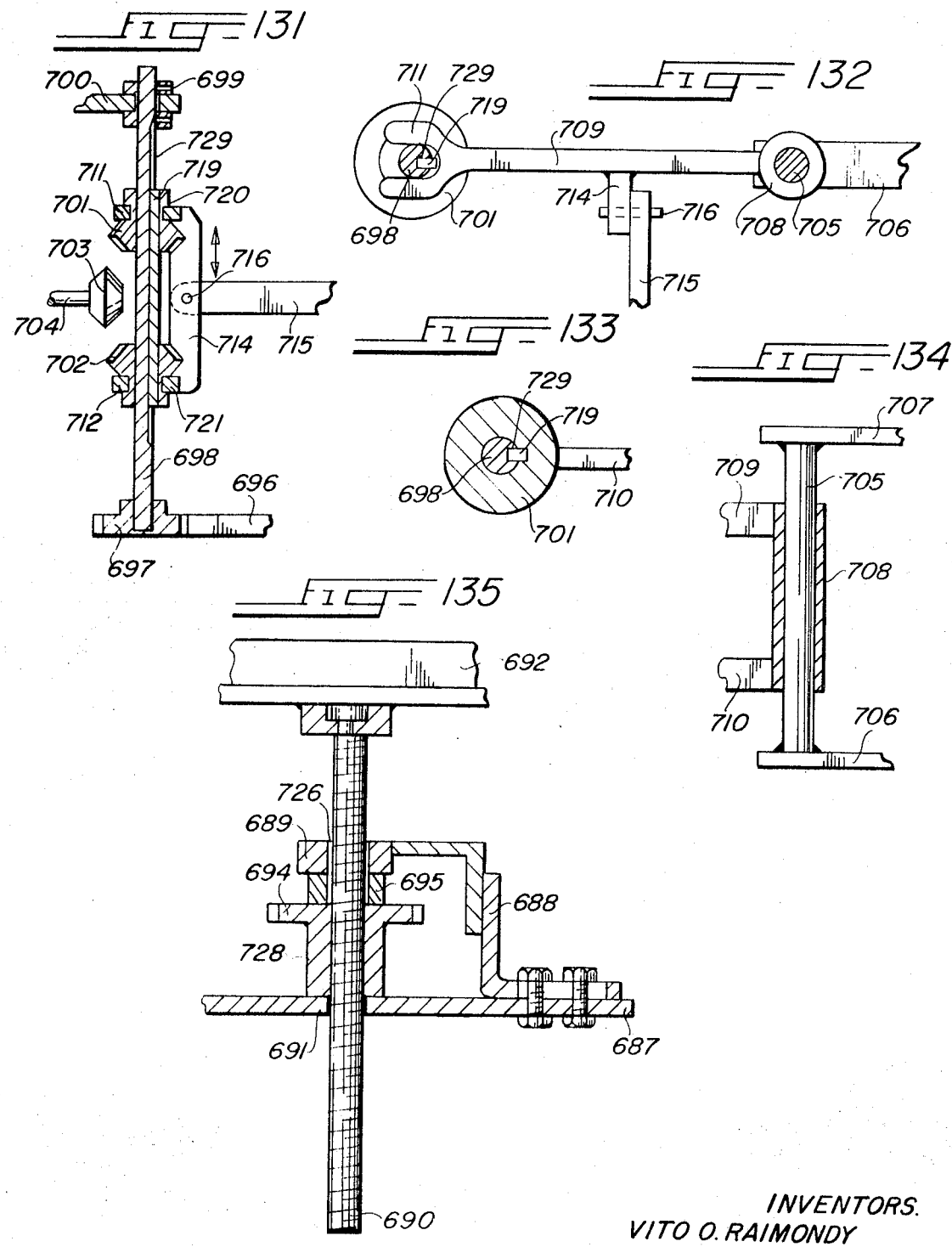

3,660,118

COATED APPLE CONFECTION MAKING MACHINE

OBJECTS

An object of the present invention is to provide a new and improved coated apple confection making machine which cyclically and automatically during one rotational cycle of a main movable endless or rotary turntable carrier performs sequentially a number of different operations namely: (1) discharges handle sticks one at a time from a handle stick storage hopper and inserts them automatically at a first work station, one at a time, into handle stick-gripping and apple-holding devices carried by the main movable endless or rotary turntable carrier; (2) inserts the handle sticks automatically, one at a time, at a second work station, into the cores of apples carried by a movable endless apple carrier disposed adjacent the main movable endless or rotary turntable carrier; (3) ejects the handle sticks automatically from the handle stick-gripping and holding devices at a third work station, in the event that a handle stick, for any reason, fails to pick up an apple at the second and apple pick-up work station; (4) moves the handle stick-gripping and apple-holding devices and the apples held thereby one at a time into a position above a caramel container vat or tank into which the apples are lowered and in which they are rotated to coat the apples with a coating of caramel; (5) raises the caramel-coated apples above the level of the caramel in the caramel container vat or tank and rotates them to remove any excess of the caramel coating on the apples; (6) moves the caramel-coated apples and attached handle sticks to a fifth work station where the caramel-coated apples are lowered into a receptacle for ground nuts and rotated therein to provide them with a coating of ground nuts over the caramel coating; and (7) then moves the caramel-coated and ground nut-coated apples and attached handle sticks to a sixth and final work station above a second ground nut receptacle or tray into which the coated apple confections are discharged and given an additional coating of ground nuts, whereupon the thus finished coated apple confections are ready for removal, sale and consumption.

Another object of the invention is to provide in the new cyclically rotated coated apple candy confection making machine novel handle stick-gripping and apple-holding devices each embodying a handle stick-gripping chuck unit for releasably gripping a handle stick, and novel means for ejecting the handle sticks automatically one at a time from a handle stick storage hopper and inserting them into the handle stick-gripping chuck units of the handle stick-gripping and apple-holding devices.

Another object of the invention is to provide in the new coated apple confection making machine novel movable endless apple carrier means for moving apples cyclically into an apple pick-up work station adjacent the main movable endless or rotary turntable carrier, and novel means for moving the handle stick-gripping and apple-holding devices and the handle stick-gripping chuck units embodied therein past the apple pick-up station and for automatically inserting the handle sticks one at a time into the cores of apples at the apple pick-up work station so that the apples will be carried on their attached handle sticks by the handle stick-gripping and apple-holding devices, and the main movable endless or rotary turntable carrier, through succeeding operations in a cycle of operation of the machine.

A further object of the invention is to provide novel means for automatically ejecting handle sticks from the handle stick-gripping chuck units of the handle stick-gripping and apple-holding devices after the handle stick-gripping and apple-holding devices have moved past the apple pick-up work station and before they reach the caramel coating work station in the event that a handle stick fails, for any reason, to pick up an apple at the apple pick-up work station.

An additional object of the invention is to provide in the new coated apple confection making machine novel handle stick-gripping devices and handle stick-gripping chuck units embodied therein, and novel means cooperating therewith for (a) gripping the handle sticks; (b) inserting the handle sticks into the cores of apples at the apple pick-up work station; (c) holding the handle sticks and attached apples while they are lowered into and rotated in the caramel container; (d) holding the handle sticks and attached apples while they are raised above the level of the caramel in the caramel container vat or tank and are rotated to remove excess caramel coating thereon; (e) holding the caramel-coated apples and attached handle sticks while they are moved into and rotated in a receptacle for ground nuts to provide them with a coating or layer of ground nuts; (f) holding the caramel-coated and ground nut-coated apples while they are moved into a discharge position; and (g) ejecting the finished caramel-coated and ground nut-coated apple candy confections into a receptacle or tray at the final work station in the operation of the machine.

Still another object of the invention is to provide in the new coated apple confection making machine novel means for cyclically raising the caramel container or vat or tank and the heating unit therefor in small increments as the apples and attached handle sticks are moved sequentially through the caramel container or vat or tank, and the level of the caramel therein drops in use, so that an adequate coating of caramel will be applied to each apple as it is moved into and rotated in the heated caramel container or vat or tank.

A further object of the invention is to provide in the new coated apple confection making machine novel means for automatically supplying ground nuts from a nut storage hopper to a ground nut receptacle or tray.

Another object of the invention is to provide in the new coated apple confection making machine novel means for controlling the operation of a nut-grinding device located in the nut storage hopper in response to the level of ground nuts in a ground nut receptacle or tray so that an adequate supply of ground nuts will always be present in the said ground nut receptacle or tray.

DESCRIPTION OF THE DRAWINGS

FIG. 1 is a front perspective view of a coated apple confection machine embodying the present invention;

FIG. 1A is a fragmentary rear perspective view of the new coated apple confection making machine;

FIG. 1B is a front elevational view of the new coated apple confection making machine with certain of the parts shown in FIG. 1 omitted;

FIG. 2 is a top plan view of the new machine;

FIG. 2A is a fragmentary broken central vertical sectional view on line 2A—2A in FIG. 2;

FIG. 2B is a fragmentary sectional detail on line 2B—2B in FIG. 2 of the cam track and main movable endless or rotary turntable carrier embodied in the new machine;

FIG. 3 is a perspective view of the generally annular stationary cam track member embodied in the present invention, and which is partially illustrated in FIG. 2B;

FIG. 4 is a top plan view of the stationary cam track shown in FIGS. 2 and 3 and showing its relationship to the main movable endless or rotary turntable carrier embodied in the new machine;

FIGS. 5 to 13, inclusive, are transverse sectional detail views on lines 5—5, 6—6, 7—7, 8—8, 9—9, 10—10, 11—11, 12—12 and 13—13 in FIG. 4 showing the configuration of the risers and dwells in the stationary cam track member shown in FIGS. 2B, 3 and 4 at the locations indicated;

FIG. 14 is a chart related to the timing chart shown in FIG. 91, showing the various operations which are performed by the new machine in one cycle of rotation of 360° of the main movable endless or rotary turntable carrier which is embodied in the invention;

FIG. 15 is a top plan view of the supporting frame embodied in the new machine;

FIG. 16 is a side elevational view of the supporting frame shown in FIG. 15, as seen from the bottom in FIG. 15;

FIG. 17 is an end elevational view of the supporting frame of the new machine as seen from the right hand end in FIGS. 15 and 16;

FIG. 18 is a top plan view of a movable endless or rotary turntable apple carrier embodied in the machine;

FIG. 19 is an elevational view of a typical form of an apple-holding device mounted on and carried by the movable endless or rotary turntable apple carrier shown in FIG. 18;

FIG. 20 is a top plan view of the apple-holding device shown in FIG. 19;

FIG. 21 is a central vertical sectional view of the apple-holding device shown in FIGS. 18, 19 and 20 on line 21—21;

FIG. 22 is a reduced central sectional view of the apple-holding device shown in FIGS. 19 to 21, inclusive, with an apple disposed therein;

FIG. 23 is a fragmentary elevational view of the handle stick storage hopper and the means for ejecting the handle sticks one at a time from the handle stick storage hopper and for inserting them into the handle stick-gripping chuck units of the handle stick-gripping and apple-holding devices as the latter are rotated by the main movable endless or rotary turntable carrier;

FIG. 24 is a fragmentary side elevational view of the handle stick storage hopper and the handle stick ejecting and inserting means shown in FIG. 23;

FIG. 25 is a fragmentary perspective view of the handle stick ejecting and inserting means shown in FIGS. 23 and 24;

FIG. 25A is a fragmentary exploded perspective view of parts of the handle stick ejecting and inserting means shown in FIG. 25;

FIG. 26 is an elevational view, partly in section, showing the handle stick ejecting and inserting means ejecting a handle stick from the handle stick storage hopper and inserting it into the chuck unit of one of the handle stick-gripping and apple-holding devices;

FIG. 27 is a fragmentary elevational view of the handle stick storage hopper and a part of the handle stick ejecting and inserting means shown in FIGS. 23, 24, 25, 25A, 26 and 27;

FIG. 28 is a sectional plan view, on line 28—28 in FIG. 23, showing part of a cam mechanism embodied in the new machine for controlling the operation of the handle stick ejecting and inserting means;

FIG. 29 is a sectional plan view, on line 29—29 in FIG. 23, showing part of the handle stick storage hopper and of the handle stick ejecting and inserting means;

FIG. 30 is a fragmentary detail view, partly in section, of the handle stick storage hopper and of a device associated therewith for keeping the handle sticks in proper alignment as they are ejected from the handle stick storage hopper;

FIG. 31 is a fragmentary vertical sectional view, on line 31—31 in FIG. 23, showing part of the handle stick storage hopper and of a rotary impeller device mounted therein;

FIG. 32 is a perspective view of one of the apple stick-gripping and apple-holding devices and attached handle stick-gripping chuck units which are mounted on the main movable endless or rotary turntable carrier and of the supporting means for pivotally mounting the handle stick-gripping and apple-holding devices on the main movable endless or rotary turntable carrier;

FIG. 33 is a central longitudinal sectional view, partly in elevation, of the parts shown in FIG. 32;

FIG. 34 is an enlarged sectional top plan view on line 34—34 in FIG. 33;

FIG. 35 is an elevational view of one of the handle stick-gripping chuck units embodied in the handle stick-gripping and apple-holding device shown in FIGS. 32, 33 and 34, and showing the parts circled in FIG. 33, with the handle stick-gripping cam mechanism embodied therein in effective or handle stick-gripping position;

FIG. 36 is a bottom plan view of the handle stick-gripping chuck unit as shown in FIG. 35;

FIG. 37 is an elevational view of the handle stick-gripping chuck unit shown in FIGS. 35 and 36 with the handle stick-gripping cam mechanism shown in open or retracted or handle stick-releasing position;

FIG. 38 is a bottom plan view of the handle stick-gripping chuck unit as shown in FIG. 37;

FIG. 39 is a central vertical sectional view of the handle stick-gripping chuck unit shown in FIGS. 35 to 38, inclusive, with the handle stick-gripping cam mechanism shown in effective or handle stick-gripping position;

FIG. 40 is a bottom sectional plan view on line 40—40 in FIG. 39;

FIG. 41 is a fragmentary central vertical sectional view of the handle stick-gripping chuck unit shown in FIGS. 35 to 40, inclusive, and showing a handle stick gripped and held thereby, and showing the handle stick-gripping chuck unit attached to the supporting and operating shaft of the handle stick-gripping and apple-holding device;

FIG. 42 is an elevational view of one of the handle stick-gripping and apple-holding devices and attached handle stick-gripping chuck units and the supporting and operating means therefor as they appear at the second or apple pick-up work station and after a handle stick has been inserted into the core of an apple;

FIG. 43 is a fragmentary elevational view of the handle stick-gripping chuck unit shown in FIGS. 35 to 41, inclusive, with the handle stick-gripping cam mechanism in open or retracted and handle stick-releasing position;

FIG. 44 is an elevational view of the handle stick-gripping chuck unit shown in FIGS. 35 to 43, inclusive, and showing a part of the mechanism for lowering the handle stick-gripping and apple-holding device and attached chuck unit and a handle stick held thereby so as to insert the handle stick into the core of an apple at the second or apple pick-up work station;

FIG. 45 is an elevational view showing part of the mechanism embodied in the new machine for lowering the handle stick-gripping and apple-holding devices and attached chuck unit and handle stick held thereby so as to insert the handle stick into the core of an apple at the second or apple pick-up work station;

FIG. 46 is an elevational view of the lowering mechanism shown in FIG. 45;

FIG. 47 is a top plan view of the lowering mechanism shown in FIGS. 45 and 46;

FIG. 48 is an elevational view, partly in section, of the means embodied in the new machine for ejecting a handle stick from the chuck unit of the handle stick-gripping and apple-holding device in the event that it does not pick-up an apple at the second and apple pick-up work station;

FIG. 49 is an elevational view of the parts shown in FIG. 48 as seen from the right hand side thereof;

FIG. 50 is a top plan view of the parts shown in FIGS. 48 and 49;

FIG. 51 is an elevational view, partly in section, showing the operation of the means embodied in the new machine for releasing a handle stick from the handle stick-gripping chuck unit of the apple stick-gripping and apple-holding device at the third work station, in the cycle of operations of the machine, if the handle stick fails, for any reason, to pick up an apple at the apple stick pick-up station;

FIG. 52 is a view on line 52—52 of FIG. 50, partly in section and partly in elevation;

FIG. 53 is an elevational view, partly in section, showing the parts illustrated in FIGS. 48, 49, 50 and 52 in retracted position;

FIG. 54 (see sheet 14) is an elevational view of the means embodied in the new machine for lowering the handle stick-gripping and apple-holding device and attached chuck unit and the apple held thereby into the caramel container tank or vat to provide the apple with a coating of caramel;

FIG. 55 (see sheet 16) is a fragmentary elevational view of certain of the parts shown in FIG. 54;

FIG. 56 is a fragmentary elevational view of the parts shown in FIG. 55, as seen from the right hand side in FIG. 55;

FIG. 57 is a top plan view of the parts shown in FIGS. 55 and 56;

FIG. 58 is a central longitudinal sectional view on line 58—58 in FIG. 55;

FIG. 59 is a transverse sectional view on line 59—59 in FIG. 55;

FIG. 60 is a transverse sectional view on line 60—60 in FIG. 55;

FIG. 61 is a sectional detail view on line 61—61 in FIG. 55;

FIG. 62 is an elevational view, partly in section, showing the handle stick-gripping and apple-holding device and an apple carried thereby moved into position over the caramel container vat or tank at the fourth or caramel-coating work station;

FIG. 63 is an elevational view, partly in section, showing the handle stick-gripping and apple-holding device and the apple carried thereby moved from the horizontal position in which they are shown in FIG. 62 into a vertical position and with the apple lowered into the caramel container vat or tank;

FIG. 64 is a top plan view of a spinning mechanism embodied in the new machine for spinning the handle stick-gripping and apple-holding devices and the caramel-coated apples held thereby to remove excess caramel from the apples after the caramel coating operation;

FIG. 65 is a side elevational view, partly in section, of the spinning mechanism shown in FIG. 64;

FIG. 66 is a sectional view on line 66—66 in FIG. 64 illustrating part of the spinning mechanism shown in FIGS. 64 and 65;

FIG. 67 is an elevational view, partly in section, showing one of the apple stick-gripping and apple-holding devices and supporting arm structure therefor and attached handle stick-gripping chuck unit and a caramel-coated apple held thereby being rotated by the spinning mechanism shown in FIGS. 64, 65 and 66 to remove excess caramel from the apple after the caramel-coating operation, and showing the relationship of the cam follower on the aforesaid supporting arm structure to the stationary cam track member;

FIG. 68 is a view, partly in elevation and partly in section, showing one of the handle stick-gripping and apple-holding devices and attached chuck unit and a caramel-coated apple held thereby being moved into position over a first ground nut tray or receptacle preliminary to provide a coating of ground nuts on the caramel-coated apple, and showing the relationship of the cam follower on the supporting arm structure for the handle stick-gripping and apple-holding device to the stationary cam track member;

FIG. 69 is a view of the parts shown in FIG. 68 with the parts moved into position to lower the caramel-coated apple into the first ground nut tray or receptacle to provide a coating of ground nuts thereon;

FIG. 69A is a detail view, partly in section and partly in elevation, of the means for rotating the handle stick-gripping and apple-holding device so as to rotate the caramel-coated apple held thereby in the first ground nut receptacle or tray;

FIG. 70 is a central vertical sectional view, on line 70—70 in FIG. 2, of a second rotatable tray or receptacle for ground nuts and into which the caramel-coated and ground nut-coated apples are discharged to receive a further coating of ground nuts and for removal for consumption at the completion of a cycle of operations of the new machine;

FIG. 70A is a fragmentary sectional view of certain of the parts shown in FIG. 70;

FIG. 71 is a view of one of the handle stick-gripping and apple-holding devices and attached chuck units and the supporting arm structure therefor and showing a caramel-coated and ground nut-coated apple being discharged into the second ground nut tray or receptacle shown in FIG. 70;

FIG. 71A is a fragmentary perspective view, partly in section, of a part of the means embodied in the invention for opening the handle stick-gripping chuck unit to discharge a caramel-coated and ground nut-coated apple therefrom, as shown in FIG. 71;

FIG. 72 is an elevational view of the caramel container vat or tank and the heating means and hydraulic raising and lowering mechanism therefor;

FIG. 73 is a top plan view of the caramel container vat or tank shown in FIG. 72;

FIG. 74 is an end elevational view of the parts shown in FIG. 72, as seen from the right hand side in FIG. 72;

FIG. 75 is a vertical sectional view, on line 75—75 in FIG. 72, showing the caramel container vat or tank and the heating unit therefor and the hydraulic lifting mechanism therefor in raised position;

FIG. 76 is a detail sectional view, on line 76—76 in FIG. 72 of the guiding mechanism for guiding the caramel container vat or tank and the heating unit therefor during vertical movement thereof;

FIG. 77 is a sectional plan view, on line 77—77 in FIG. 72 showing parts of the hydraulic raising and lowering device for the caramel container vat or tank and the guiding means therefor;

FIG. 78 is a fragmentary perspective view of part of the guiding mechanism for guiding the caramel container vat or tank during vertical movement thereof;

FIG. 78A is a schematic view illustrating the hydraulic circuit embodied in the new machine for operating the hydraulic raising and lowering mechanism for the caramel container vat or tank and the heating unit carried thereby;

FIG. 79 is a perspective view of the ground nut storage hopper and of the ground nut tray or receptacle embodied in the invention and showing part of the control mechanism for the nut-grinding mechanism which is arranged in the nut storage hopper;

FIG. 80 is a fragmentary vertical sectional view, on line 80—80 in FIG. 79;

FIG. 81 is a fragmentary elevational view, partly in section, on line 81—81 in FIG. 2, illustrating parts of the ground nut level-sensing device embodied in the invention for controlling the operation of the nut-grinding mechanism in the nut storage hopper;

FIG. 81A is a detail view of the ground nut level responsive device and of the microswitch control unit therefor, embodied in the new machine, for controlling the operation of the nut-grinding mechanism in the nut storage hopper;

Figure 124:
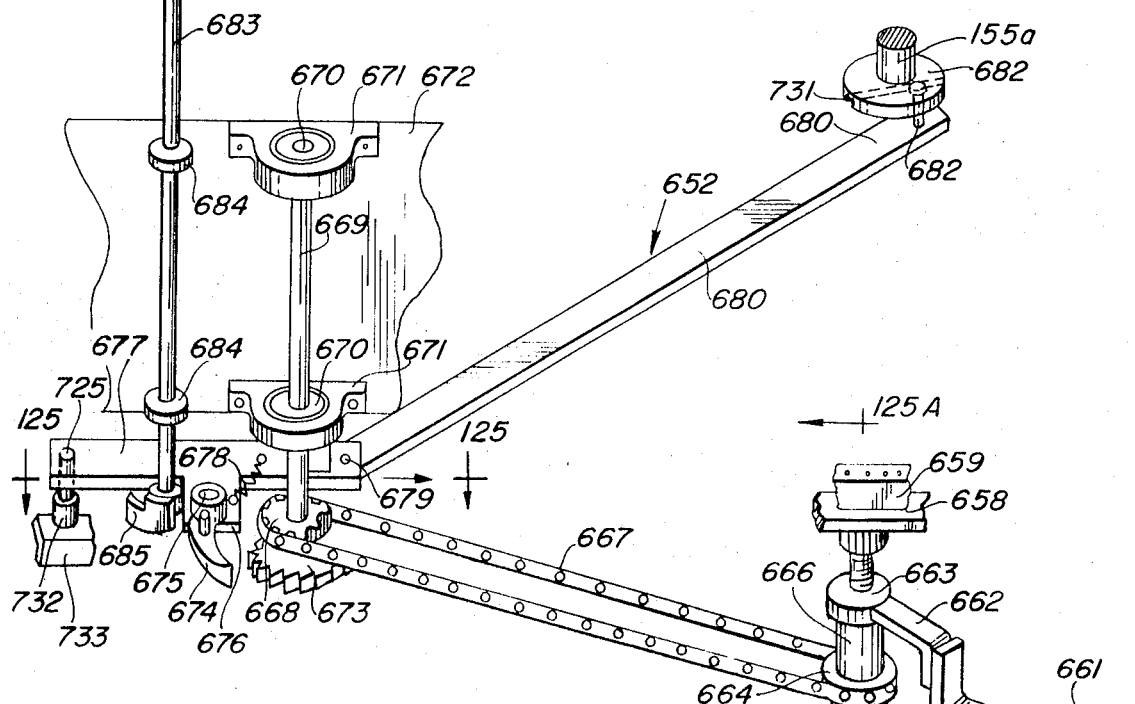
Figure 125:
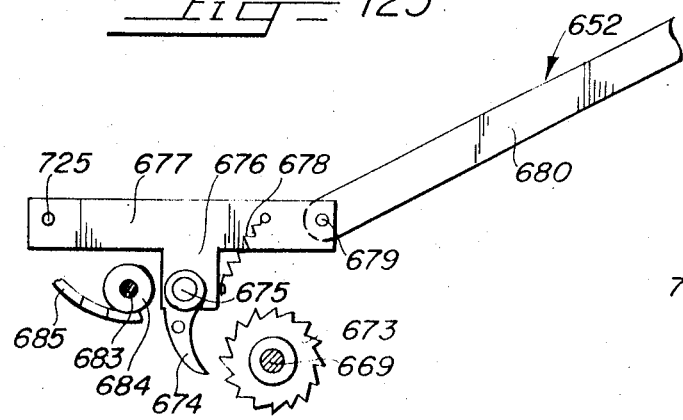
Figure 126:
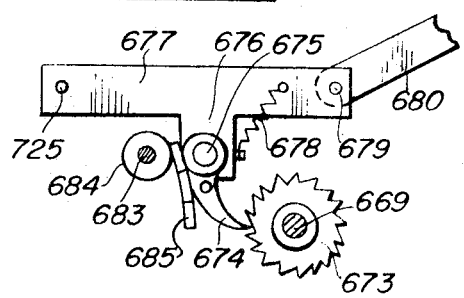
Figure 125A:
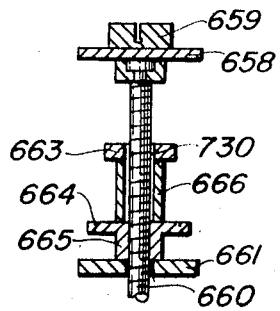

FIG, 81B is a fragmentary detail view similar to FIG. 81 but showing the movable switch member of the microswitch unit and the ground nut level-responsive device in the position which these parts assume when the supply of ground nuts in the auxiliary ground nut storage hopper is at a predetermined desired level;

FIG. 82 is a fragmentary perspective view of the nut storage hopper and the nut-grinding mechanism arranged therein, and showing part of the control mechanism for the nut-grinding mechanism;

FIG. 83 is a vertical sectional view, partly in elevation, on line 83—83 in FIG. 82, showing the nut-grinding mechanism and the power transmission means and clutch mechanism therefor, and showing parts of the control means for the clutch mechanism of the nut-grinding mechanism;

FIG. 84 is an enlarged central longitudinal sectional view showing part of the nut-grinding mechanism, and part of the control mechanism therefor and showing the power transmission means and clutch mechanism for the nut-grinding mechanism in engaged or driving position;

FIG. 85 is a view of the parts shown in FIG. 84 but showing the power transmission means and clutch mechanism for the nut-grinding mechanism in disengaged or idling position;

FIG. 85A is a transverse sectional detail view on line 85A—85A in FIG. 85, showing part of the clutch mechanism for the power transmission means for the nut-grinding mechanism;

FIG. 86 is a fragmentary elevational view, partly in section, of the nut-grinding mechanism shown in FIGS. 80 to 85, inclusive, and FIG. 85A;

FIG. 87 is a transverse sectional view of the parts of the nut-grinding mechanism shown in FIG. 86;

FIG. 88 is a perspective view of parts of the clutch mechanism which is embodied in the power transmission means for the nut-grinding mechanism shown in FIGS. 80 to 85, inclusive, 85A, 86 and 87;

FIG. 89 is a schematic view illustrating certain parts of the power transmission means and driving mechanisms embodied in the new machine;

FIG. 89A is a schematic view illustrating the power transmission means which operates the means, shown in FIGS. 64 to 67, inclusive, for spinning off excess caramel from the caramel-coated apples after the caramel-coating operation;

FIG. 90 is a schematic diagram illustrating the electrical control and operating circuits embodied in the new machine;

FIG. 91 is a timing chart, related to the chart shown in FIG. 14, showing the various operations which are performed during a 360° cycle of rotation of the main movable endless or rotary turntable carrier embodied in the machine and the parts carried thereby;

FIG. 92 is an elevational view of a modified form of a handle stick-gripping chuck unit embodied in the invention, as shown in closed or handle stick-gripping position;

FIG. 93 is a top plan view of the modified form of handle stick-gripping chuck unit as shown in FIG. 92;

FIG. 94 is a central longitudinal sectional view on line 94—94 in FIG. 93;

FIG. 95 is an elevational view of the modified form of handle stick-gripping chuck unit illustrated in FIGS. 92 to 94, inclusive, showing the handle stick-gripping jaws thereof in open or handle stick-releasing position;

FIG. 96 is an end elevational view of the modified form of handle stick-gripping chuck unit as shown in FIG. 95, as seen from the right hand end thereof;

FIG. 97 is an end elevational view of the modified form of handle stick-gripping chuck unit shown in FIGS. 92 to 96, inclusive, but showing the handle stick-gripping jaws in closed position;

FIG. 98 is a transverse sectional view on line 98—98 in FIG. 95;

FIG. 99 is a transverse sectional view on line 99—99 in FIG. 95;

FIG. 100 is a side elevational view of a second modified form of handle stick-gripping chuck unit embodied in the invention and showing the handle stick-gripping jaws thereof in open or handle stick-receiving position;

FIG. 101 is an end elevational view of the modified form of handle stick-gripping chuck unit shown in FIG. 100, as seen from the right hand end in FIG. 100;

FIG. 102 is an elevational view of the modified form of handle stick-gripping chuck unit shown in FIGS. 100 and 101 showing the handle stick-gripping jaws embodied therein in closed or handle stick-gripping position;

FIG. 103 is an end elevational view of the second modified form of handle stick-gripping chuck unit shown in FIGS. 100 to 102, as seen from the right hand end in FIG. 102;

FIG. 104 is a central longitudinal sectional view on line 14—104 in FIG. 101, illustrating the second modified form of handle stick-gripping chuck unit shown in FIGS. 100 to 102, inclusive, but showing the handle stick-gripping jaws in open or handle stick-receiving position;

FIG. 105 is a transverse sectional view on line 105—105 in FIG. 104;

FIG. 106 is an elevational view, partly in section, illustrating a first modified form of apple-holding device which is embodied in the invention and showing the same mounted on the movable endless or rotary turntable apple carrier and showing an apple in position for a handle stick to be inserted into the core thereof while the core of the apple is disposed in a horizontal position;

FIG. 107 is an elevational view of the first modified form of apple-holding device shown in FIG. 106, as seen from the left hand side in FIG. 106;

FIG. 108 is a view on line 108—108 in FIG. 106, partly in section and partly in elevation;

FIG. 109 is a view on line 109—109 in FIG. 106, partly in section and partly in elevation;

FIG. 110 is an elevational view of a second modified form of apple-holding device embodied in the invention for holding apples in a position on the movable endless apple or rotary turntable apple carrier with the cores of the apples disposed in a horizontal position so that the handle sticks may be inserted horizontally into the cores of the apples;

FIG. 111 is an end elevational view of the modified form of apple-holding device shown in FIG. 110, as seen from the left hand side in FIG. 110;

FIG. 112 is a vertical sectional view on line 112—112 in FIG. 110;

FIG. 113 is a view, partly in section and partly in elevation, on line 113—113 in FIG. 110;

FIG. 114 is an elevational view of the second modified form of apple-holding device shown in FIGS. 110 to 113, inclusive, and showing a handle stick being inserted into the core of an apple while the core of the apple is disposed in a horizontal position;

FIG. 115 is a fragmentary elevational view illustrating a third modification of an apple-holding device for holding an apple on the movable endless or rotary turntable apple carrier with the core of the apple disposed in a horizontal position and showing one of the apple stick-gripping and apple-holding devices inserting a handle stick into the core of the apple from a horizontal position;

FIG. 116 is a top plan view of the third modified form of apple-holding device shown in FIG. 115;

FIG. 117 is a fragmentary elevational view illustrating a modified form of the movable endless apple carrier embodied in the invention and showing apple-holding devices mounted thereon for holding apples in a position such that the handle sticks may be inserted into the cores of the apples while the cores of the apples are disposed in a horizontal position;

FIG. 118 is a fragmentary perspective view of a modification of the new machine for raising the apples upwardly into engagement with the handle sticks;

FIG. 119 is a side elevation, partly in cross section, on line 119—119 in FIG. 118;

FIG. 120 is a plan view of the parts shown in FIGS. 118 and 119;

FIG. 121 is a vertical sectional view on line 121—121 in FIG. 118;

FIG. 122 is a sectional view on line 122—122 in FIG. 118;

FIG. 123 is a sectional view on line 123—123 in FIG. 118;

FIG. 124 is a perspective view of a modification of the means embodied in the invention for raising and lowering the caramel tank;

FIG. 125 is a sectional plan view on line 125—125 in FIG. 124;

FIG. 125A is a sectional view on line 125A—125A in FIG. 124;

FIG. 126 is a view similar to FIG. 125 but showing the parts in engaged position;

FIG. 127 is a perspective of another modification of the means embodied in the new machine for raising and lowering the caramel tank;

FIG. 128 is a side elevational view of the mechanism shown in FIG. 127;

FIG. 129 is a rear elevational view, partly in section, on line 129—129 in FIG. 128;

FIG. 130 is a plan view of the drive mechanism embodied in the modification shown in FIGS. 127 to 129, inclusive;

FIG. 131 is a sectional view on line 131—131 in FIG. 129;

FIG. 132 is a sectional plan view on line 132—132 in FIG. 129;

FIG. 133 is a sectional view on line 133—133 in FIG. 129;

FIG. 134 is a sectional view on line 134—134 in FIG. 129; and

FIG. 135 is a sectional view on line 135—135 in FIG. 127.

GENERAL DESCRIPTION OF THE CONSTRUCTION AND OPERATION OF THE MACHINE

A typical and preferred embodiment of the invention is illustrated in FIGS. 1, 1A, 1B, 2, 2A, and 2B to 91, inclusive, of the drawings, wherein it is generally indicated at 125 (FIGS. 1, 1A, 2 and 2A) and comprises a preferably portable wheel or caster-bearing supporting frame 126 (FIGS. 1, 1A, 2, 15, 16 and 17) which includes a main and upper body frame portion 127, which supports most of the operating parts of the new machine 125, and a lower end frame portion 128 which supports a movable endless or rotary turntable apple carrier 131 (FIGS. 1, 1A, 1B, 2 and 2A) which is embodied in the new machine, and as will be described hereinafter. A main movable endless or rotary turntable carrier 129 is rotatably mounted on the main and upper body portion 127 of the supporting frame 126, and a plurality of handle stick-gripping and apple-holding devices 130 and attached handle stick-gripping chuck units 138 are mounted on the peripheral edge portion of the main movable endless or rotary turntable carrier 129, at spaced intervals circumferentially therearound.

An inclined tub-shaped apple supply hopper 606 is stationarily mounted above the movable endless or rotary turntable carrier unit 131, by means of a supporting means in the form of a fixed bushing 607 which is mounted in the lower portion 128 of the supporting frame 126 and projects upwardly through a centrally arranged opening in the rotary endless apple turntable carrier 131 (FIG. 1). The apple supply hopper 606 has an inclined discharge chute 608 from which the apples 133 may be picked manually by a workman and inserted one at a time into the apple-holding devices 132 on the rotary endless apply turntable carrier 131 (FIG. 1).

A plurality of apple-holding devices 132 are mounted on the peripheral edge portion of the movable endless or rotary turntable apple carrier unit 131 at spaced intervals circumferentially therearound (FIGS. 1, 1A, 2 and 18 to 22, inclusive). Each of the apply-holding devices 132 is adapted to releasably hold an apple 133 which is removed from the discharge chute 609 and each of which apples are adapted to be picked up by one of the handle stick-gripping and apple-holding devices 130 and attached handle stick-gripping chuck units 138 at a second and apple pick-up work station, and carrier thereby, during a cycle of rotation of the main movable endless or rotary turntable carrier 129, through following work stations at which the apple is provided with a coating of comestible material, such as caramel, or the like, and with one more additional coatings of comestible material, such as ground nuts, such as ground peanuts, or the like.

A handle stick storage hopper, generally indicated at 134 is mounted on an extension 135 of the main and upper body portion 127 of the supporting frame 126 and is adapted to hold a supply of wooden or like apple-holding sticks 136, each of which has a sharpened or apple-piercing end portion 137 (FIGS. 41, 42 and 44) which is adapted to be inserted into the core of an apple 133 so as to provide a handle for holding the apple as it is being moved by the handle stick-gripping and apple-holding device 130 and attached handle stick-gripping chuck 138, on the main movable endless or rotary turntable carrier 129, through the caramel-coating and ground nut-coating work stations, and to hold the finished apply candy confection while it is being eaten by the consumer.

Each of the handle stick-gripping and apple-holding devices 130 includes a handle stick-gripping chuck unit 138 (FIGS. 1, 1A, 2, 26, 32, 33, 35 to 44, inclusive, 51, 61, 63, 67, 68, 69 and 71) which is adapted to grip and to hold one of the handle sticks 136 and to hold an apple 133 mounted on the handle stick 136, during the various operations performed by the machine.

The new machine 125 includes means, generally indicated at 397 (FIGS. 1, 1A, 23, 24, 25, 25A, 26, 27, 28 and 29), and including a handle stick-ejecting and inserting push rod member 199, for ejecting handle sticks 136, one at a time, from the handle stick storage hopper 134 and inserting them sequentially into the handle stick-gripping chuck units 138 of the handle stick-gripping and apple-holding devices 130, at the first work station in the operation of the new machine 125 and in the cycle of rotation of the main movable endless or rotary turntable carrier 129 (FIGS. 14 and 91). During this handle stick ejecting and inserting operation, at the first work station in a cycle of operations of the machine, the handle stick-gripping and apple-holding devices 130, and attached chuck units 138 are pivoted on and relative to the main movable or endless rotary turntable carrier 129 into a generally horizontal position, as in FIG. 26, by cam structures embodied in the machine, and after a handle stick has been inserted into the chuck unit 138 the handle stick-gripping and apple-holding device 130 and its attached chuck unit 138, and the handle stick 136 held thereby, are carried by the main movable endless or rotary turntable carrier 129 to the second or apple pick-up work station (FIGS. 14 and 91). During this movement between the first or handle stick ejecting and inserting work station and the second or apple pick-up work station (FIGS. 14 and 91) the handle stick-gripping and apple-holding device 130 and attached chuck unit 138, and the handle stick 136 held thereby, are pivoted on and relative to the main movable endless or rotary turntable carrier 129, by cam structures embodied in the machine, into an upright or generally vertical position, for insertion of the handle stick 136 into the core of an apple 133 at the second or apple pick-up work station (FIGS. 14 and 91).

The new machine 125 also includes means, generally indicated at 139 (FIGS. 42, 43, 45, 46 and 47) which will be described hereinafter, for lowering the handle stick-gripping and apple-holding device 130, and the handle stick-gripping chuck unit 138 embodied therein, and a handle stick 136 held thereby, at the second or apple pick-up work station so as to insert the handle stick 136 into the core of an apple 133 disposed in one of the apple-holding devices 132 on the movable endless or rotary turntable apple carrier 131, at the second or apple pick-up work station in the operation of the new machine 125, and in a cycle of rotation of the main movable endless or rotary turntable apple carrier 129 (FIGS. 14 and 91).

The new machine 125 further includes means, generally indicated at 140 (FIGS. 48 to 51, inclusive), and which will be described hereinafter, for ejecting an unloaded handle stick 136 from the handle stick-gripping chuck unit 138 of the handle stick-gripping and apple-holding device 130 in the event that the handle stick 136 fails, for any reason, to pick up an apple 133 at the second and apple pick-up work station (FIGS. 14 and 91) during a cycle of rotation of the main movable endless or rotary turntable carrier 129 and the handle stick-gripping and apple-holding devices 130 carried thereby (FIG. 52).

A heated caramel container tank or vat, generally indicated at 141, is provided for holding caramel or like comestible coating material for coating the apples 133, and a hydraulic operating means or unit 142, and a hydraulic operating circuit therefor (FIG. 78A) are provided for raising the heated caramel container tank or vat 141 in small increments, of about one-sixteenth inch as the supply of caramel or like comestible coating in the caramel container tank or vat 141 is consumed in use so as to assure that each apple will be provided with an adequate coating of caramel during operation of the machine (FIGS. 1, 1A, 2, 62, 63, 67 and 72 to 78, inclusive, and 78A). A heating unit 143 (FIGS. 1B, 72, 74 and 75) is disposed below the carmel container tank or vat 141 for heating the caramel therein.

In the use of the new machine 125, as the handle stick-gripping and apple-holding devices 130, and attached handle stick-gripping chuck units 138, and the apples 133 held thereby are rotated, by the main movable endless or rotary turntable carrier 129, each of the handle stick-gripping and apple-holding devices 130 and attached handle stick-gripping chuck units 138, and the apples 133 carried thereby, are sequentially moved or pivoted on the main movable endless or rotary turntable carrier 129 by cam structures embodied in the machine, from an upright or vertical position, as at the second or apple pick-up work station, and as at the third or handle stick reject station, into a generally horizontal position above the caramel container vat or tank 141, as in FIG. 62, at the fourth or caramel-coating work station (FIGS. 14 and 91).

The handle stick-gripping and apple-holding device 130, and attached handle stick-gripping chuck unit 138, and the apple 133 carried thereby, are then lowered, by a mechanism which will be described hereinafter, so as to lower the apple 133 into the caramel or like comestible coating 144 in the caramel container tank or vat 141 so as to provide the apple with a coating of caramel or like comestible material 144, at the caramel-coating or fourth work station, in a cycle of rotation of the main movable endless or rotary turntable carrier 129 (FIGS. 14 and 91).

After the apple 133 has been provided with its first coating of caramel or like comestible coating 144 the handle stick-gripping and apple-holding device 130, and attached handle stick-gripping chuck unit 138, and the caramel-coated apple 133 carried thereby, are then raised above the upper level of the caramel or like coating 144 in the caramel container tank or vat 141, into a position, as in FIG. 67, wherein the handle stick-gripping chuck unit, the handle stick 136, and the caramel-coated apple 133 carried thereby, are rotated or spun by an apple-rotating or spinning means, which is generally indicated at 145 (FIGS. 2, 64 to 67, inclusive), to remove excess of the caramel or like coating 144 from the apple 133, at the fifth work station (FIGS. 14 and 91).

As the cycle of rotation of the movable endless or rotary carrier 129, and the handle stick-gripping and apple-holding devices 130 and attached handle stick-gripping chuck units 138, and the caramel coating apples 133 carried thereby, continues, each of the handle stick-gripping and apple-holding devices 130 and attached handle stick-gripping chuck units 138 and the caramel-coated apple 133 held thereby is s sequentially moved, by the cam structure embodied in the machine, into a generally horizontal position with the caramel-coated apple 133 disposed above a first ground nut receptacle or tray 146 (FIGS. 1B, 2, 68 and 69), which is rotatably mounted on the main and upper body portion 127 of the supporting frame 126 adjacent the peripheral edge portion of the main movable endless or rotary turntable carrier 129, at the sixth or first ground nut-coating work station (FIGS. 14 and 91). The ground nut receptacle or tray 146 is adapted to hold a supply of ground nuts such as peanuts, cocoanuts, or like comestible coating material 147, and as the cycle of rotation of the main movable endless or rotary turntable carrier 129 and the handle stick-gripping and apple-holding devices 130, and attached handle stick-gripping chuck units 138 carried thereby continues, each of the caramel-coated apples 133 is lowered into and is moved through and is rotated in the first ground nut receptacle or tray 146 so as to provide each of the caramel-coated apples 133 with a coating of ground nuts, such as ground peanuts, or like comestible coating. During this operation the caramel-coated apple 133 is rotated in the rotating first ground nut receptacle or tray 146 by means which coacts with the handle stick-gripping and apple-holding device 130, and attached handle stick-gripping chuck unit 138, to rotate the handle stick 136 and the apple 133 carried thereby.

A second ground nut receptacle or tray 148 (FIGS. 1A, 70 and 71) for the finished apple candy confections is rotatably mounted on an extension 149 on the main and upper body portion 127 of the supporting frame 126, at the seventh and final work station in the machine 125, and as the cycle of rotation of the main movable endless carrier or turntable 129, and the handle stick-gripping devices 130 and attached handle stick-gripping chuck units 138 carried thereby continues, each of the handle stick-gripping devices 130 and attached handle stick-gripping chuck units 138 and the caramel-coated and ground nut-coated apples 133 carried thereby are sequentially moved or pivoted into a generally vertical position, as in FIG. 71, by the cam structure embodied in the machine, whereupon the handle stick-gripping chuck unit 138 is actuated by means generally indicated at 398 (FIGS. 71 and 71A), to release the coated apple confection 133 and attached handle stick 136 which are thus discharged by means 398 (FIG. 71A), into the rotatable receptacle or tray 148 for the coated apple confections. The receptacle or tray 148 is adapted to hold a supply of ground nuts, or like comestible coating, so that when the caramel-coated and ground nut-coated apples 133 are discharged into the receptacle or tray 148 they may be given a further and supplemental coating of ground nuts, which may be desirable, particularly if the first coating of ground nuts has been adequate or the caramel coating on the apples 133 has not fully dried.

The new coated apple confection making machine 125 includes a nut storage hopper 150, which is mounted on the main and upper body portion 127 of the supporting frame 126, above the first ground nut receptacle or tray 146, and an auxiliary ground nut hopper 151 is arranged within the first ground nut receptacle or tray 146 below the nut storage hopper 150 and in communication therewith (FIGS. 1, 1B, 2, 79, 80, 81, 82 and 83).

The nut storage hopper 150 has a discharge throat 152 which opens at its lower end into the auxiliary ground nut receptacle or tray 151 and a nut grinding mechanism, generally indicated at 153 (FIGS. 80 to 87, inclusive) is arranged in the discharge throat 152 of the nut storage hopper 150 for grinding nuts, such as peanuts, and supplying the ground nuts to the auxiliary ground nut receptacle or tray 151 and thence to the first ground nut receptacle or tray 146.

The new machine 125 includes ground nut level-responsive means, generally indicated at 154 (FIGS. 79 to 83, inclusive) which is responsive to the level or height of the ground nuts in the auxiliary ground nut receptacle or tray 151 for controlling the operation of clutch mechanism 369 and of a power transmission means therefor (FIGS. 82 to 88, inclusive) for the nut-grinding mechanism 153. This construction is such that the nut-grinding mechanism is normally in continuous operation while the machine is operating. However, as the level of ground nuts in the first ground nut receptacle or tray 146, and in the auxiliary ground nut receptacle or tray 151, reaches a predetermined level, means including a solenoid 381 under control of the ground nut level-responsive means 154 is actuated to disengage the clutch mechanism 369 (FIGS. 82 to 88, inclusive) for the nut-grinding mechanism 153, and thus stop the operation of the nut-grinding mechanism 153 which remains inactive as long as the level of ground nuts in the auxiliary ground nut receptacle or tray 151 remains at a predetermined desired level. However, the construction of these parts is such that as the level of ground nuts in the auxiliary ground nut receptacle or tray 151 falls below the desired predetermined level, a control circuit (FIG. 90) for the solenoid 381, under control of the ground nut level-responsive means 154, is deenergized to release the spring-biased clutch mechanism 369 for the power transmission means 368–370 (FIGS. 82 to 85, inclusive) for the nut-grinding mechanism 153, thereby setting the nut-grinding mechanism 153 in operation and the nut-grinding mechanism 153 continues to operate until the level of ground nuts in the auxiliary tray or receptacle 151 reaches a predetermined desired level, whereupon the ground nut level-responsive means 154 again operates to close circuit to the solenoid 381 which, when energized, disengages the clutch mechanism 369 and thus stops the operation of the nut-grinding mechanism 153.

The new coated apple confection making machine 125 includes a nut storage hopper 150, which is mounted on the main and upper body portion 127 of the supporting frame 126, above the first ground nut receptacle or tray 146, and an auxiliary ground nut hopper 151 is arranged within the first ground nut receptacle or tray 146 below the nut storage hopper 150 and in communication therewith (FIGS. 1, 1A, 1B, 2, 79, 80, 81, 82 and 83).

The nut storage hopper 150 has a discharge throat 152 which opens at its lower end into the auxiliary ground nut receptacle or tray 151 and a nut-grinding mechanism or device, generally indicated at 153 (FIGS. 80 to 87, inclusive) is arranged in the discharge throat 152 of the nut storage hopper 150 for grinding nuts, such as peanuts, or the like, and supplying the ground nuts to the auxiliary ground nut receptacle or tray 151 and thence to the first ground nut receptacal or tray 146.

DETAILED DESCRIPTION OF THE CONSTRUCTION AND OPERATION OF THE MACHINE

The Main Endless Or Rotary Turntable Carrier, The Stationary Annular Cam Track Member Associated Therewith, And The Movable Endless Or Rotary Apple Turntable Carrier The main movable endless carrier or rotatable turntable carrier 129 is mounted on a supporting shaft 155 which is rotatably journaled in a bearing structure 419 which is mounted in the main and upper body portion 126 of the supporting frame 126 (FIGS. 2A and 89). The handle stick-gripping and apple-holding devices 130 and attached handle stick-gripping chuck units 138 are pivotally mounted on the peripheral edge portion of the main endless or rotary turntable carrier 129, at spaced intervals circumferentially therearound (FIGS. 1, 1B and 2) by supporting means, generally indicated at 156 (FIGS. 1, 26, 32, 33, 34, 42, 51, 62, 67, 78, 69 and 71) which will be described more fully hereinafter in connection with the detailed description of the handle stick-gripping and apple-holding devices 130 and attached handle stick-gripping chuck units 138.

Each of the supporting means 156 embodies a supporting arm member 157 which supports the handle stick-gripping and apple-holding device 130 and attached chuck unit 138, and each of these supporting arm members 157 has cam means thereon in the form of a can follower member 158 attached thereto, as at 159, on the bottom surface of the supporting arm member 157 (FIGS. 26, 33, 42, 51, 62, 67, 68, 69 and 71). The cam follower members 158 ride on a generally annular stationary cam track member, which is generally indicated at 160, and which is stationarily mounted, as at 161, on the main body portion 127 of the supporting frame 126 (FIG. 2B). This stationary cam track member 160 is generally shown in FIGS. 1, 1B, 2, 2B, 3 and 4, and the risers and dwells therein are shown in detail in FIGS. 5 to 13, inclusive and the said stationary cam track member 160 is further partially shown in FIGS. 26, 42, 51, 62, 63, 67, 68, 69 and 71. As shown in FIG. 2, internal bracing means 577-580 are provided for the stationary cam track member 160, and this bracing means 577–580 includes a pair of radially extending brace members 577 which are interconnected at their radially inner end portions, as at 578, at the center of the stationary cam track member 160, and the brace members 577 are attached at their radially outer end portions, as at 579, to the peripheral edge portion of the stationary cam track member 160. In addition, a brace member 580 extends between and has its end portions connected, as at 581, to the radially extending brace members 577 (FIG. 2).

The design and construction of the stationary cam track member 160 are such that as the main movable endless or rotary turntable carrier 129 is rotated (clockwise, FIGS. 2 and 4) by power means and power transmission means shown in FIG. 89, and which will be described hereinafter, the cam follower members 158 on the supporting arm members 157 of the handle stick-gripping and apple-holding devices 130 successively and sequentially ride over the varying cam surfaces of the stationary cam track member 160, that is, sequentially over the riser 161, dwell 162, dwell 163, riser 164, dwell 165, dwell 166, riser 167, riser 168, and dwell 169 as shown in FIGS. 5 to 13, inclusive. This movement of the cam follower members 158 over the aforesaid risers and dwells in the cam surface of the stationary cam track member 160 sequentially lowers and raises the handle stick-gripping and apple-holding devices 130, and attached chuck units 138, and the handle sticks 136 and apples 133 held thereby, during a cycle of rotation of the main movable endless or rotary turntable carrier member 129. During these movements the handle stick-gripping and apple-holding devices 130 and attached handle stick-gripping chuck units 138 pivot in a generally vertical plane on their pivotal mountings 229 on the supporting arms 230 (FIGS. 62, 63, 67, 68, 69 and 71) relative to the main movable endless or rotary turntable carrier 129 and the stationary cam track member 160.

As shown in FIGS. 1B, 2, 2A and 89, the movable endless or rotary turntable apple carrier 131 is rotatably mounted, as at 170, upon a centrally arranged bearing structure 171, which is mounted in the lower portion 128 of the supporting frame 126, and is rotatably driven by a speed-reducing gear train 172—173 (FIGS. 1B,2, 2A and 18) which will be described more fully hereinafter.

As shown in FIGS. 18 to 22, inclusive, each of the apple-holding devices 132 on the movable endless or rotary turntable apple carrier 131 comprises a flexible, resilient and generally cylindrical or cup-shaped body 174 which may be made of rubber, or flexible, resilient synthetic plastic resinous material, and includes a generally frusto-conical base portion 175 within which is arranged a clamping member 176 which is attached by suitable fastening means, in the form of a bolt and nut unit 177, to the movable endless or rotary turntable apple carrier 131. The flexible, resilient and generally cylindrical or cup-shaped body 174 of each apple-holding device 132 is vertically slotted to provide a series of radially spaced upwardly extending flexible apple-gripping arms 178 to facilitate holding an apple therein and the insertion and removal of the apples 133 from the apple-holding devices 132.

In the use of the new coated apple confection making machine 125 apples 133 from the discharge chute 609 of the apple supply hopper 606 (FIG. 1) may be placed manually, or otherwise, into each of the cup-shaped apple-holding devices 132, whereupon the movable endless or rotary turntable apple carrier 131 is rotated past the second or apple pick-up work station (FIGS. 14 and 91). Thus, when the apples 133 are inserted into the cup-shaped apple-holding devices 132 they are yieldably grasped or gripped by the flexible, resilient arms 178 thereof which releasably hold the apples 133 in proper position of use on the movable endless or rotary turntable apple carrier 131 as the latter is rotated, and handle sticks 136 are inserted into the cores of the apples 133, at the second or apple pick-up work station by means of the handle stick-gripping and apple-holding devices 130 and attached handle stick-gripping chuck units 138, as will be described in detail hereinafter.

The Handle Stick Storage Hopper And The Means For Ejecting Handle Sticks One At A Time Therefrom Into The Handle Stick-Gripping Chuck Units Of The Handle Stick-Gripping And Apple-Holding Devices The means for ejecting the handle sticks 136 one at a time from the handle stick storage hopper 134 into the handle stick-gripping chuck units 138 of the handle stick-gripping and apple-holding devices 130 is illustrated in FIGS. 23 to 25 and 25A to 31, inclusive. As therein shown, the handle stick storage hopper 134 includes a pair of closed side walls 179 and 180, a closed rear wall 182, an open top wall, a closed bottom wall 183, a partially open front wall which includes a generally rectangular-shaped central opening 404 therein through which the handle sticks 136 may be seen from the exterior of the storage hopper 134 with the end portions of the handle sticks 136 being retained in the handle stick storage hopper 134 by the side portions 405 of the front wall panel member 181 (FIGS. 1 and 23). The rear wall 182 of the handle stick storage hopper 134 has a forwardly inclined lower end portion 184 (FIGS. 24, 27 and 31). As shown in FIG. 23, the handle stick storage hopper 134 is mounted on and is attached to the angularly outwardly extending supporting arm 135 of the main body portion 127 of the supporting frame 126 by means of supporting brackets 185.

As shown in FIGS. 23, 29 and 31, a rotary generally cylindrical impeller member 186 is mounted in the lower portion of the handle stick storage hopper 134 on a shaft 187 which is rotatably journaled in suitable bearing openings 192 in the side walls 179 and 180 of the handle stick storage hopper 134 (FIGS. 29 and 21) and the rotary impeller 181 has a pair of radially spaced fingers 610 mounted circumferentially thereon (FIG. 31).

As shown in FIG. 31, the inclined rear wall 184 of the handle stick storage hopper 134 has a slot 611 therein, and a partition wall member 612 is mounted in the handle stick storage hopper 134 inwardly of the front wall 181 thereof; the partition wall member 612 having a vertically extending slot 613 formed therein. The front wall 181 and the partition wall member 612 cooperate to form a vertically extending storage hopper chute 614 for the handle sticks 136 (FIG. 31) from which the handle sticks 136 are ejected, one at a time, in a manner which will be described hereinafter. The handle stick storage hopper chute 614 has an open top (not shown) through which the handle sticks 136 may be fed manually into the handle stick storage hopper chute 614.

A bearing collar 188 is mounted on the shaft 187 outwardly of each of the side walls 179 and 180. A bevel gear 189 is mounted on the shaft 187, outwardly of the side wall 180, and this bevel gear 189 meshes with a bevel gear 190 which is mounted on a vertical drive shaft 191 on the lower end portion of which a sprocket gear 194 is mounted (FIG. 23). A sprocket chain 195 works over the sprocket gear 194 and the sprocket chain 195 also works over a sprocket gear 445 which is attached to a shaft 447 which carries a gear 448 which meshes with the main drive gear 432 for the movable endless or rotary turntable 129, all of which parts are embodied in the power transmission system of the new machine 125, as shown in FIG. 89, and as will be described more fully hereinafter. However, as the sprocket chain 195 is operated, power is transmitted by way of the sprocket gear 194, shaft 191, gears 190 and 189 to the shaft 187, thereby rotating the impeller member 196 (clockwise, FIG. 3) so as to urge the handle sticks 136 downwardly in the handle stick storage hopper chute 591 toward a discharge outlet 196 therein (FIGS. 27 and 28). During this operation the fingers 610 on the rotary impeller 186 successively project into the slot 613 in the partition wall member 612 and engage the handle sticks 136 to urge them downwardly in the handle stick storage hopper chute 614 and the fingers 610 successively pass through the slot 611 in the inclined rear wall 184 of the storage hopper 134 as the rotary impeller member 186 is rotated (FIG. 31).

As best shown in FIGS. 27 and 29, a handle stick discharge outlet 196 is formed in the lower end portion of the side wall 179 of the handle stick storage hopper 134. A generally L-shaped handle stick guide member 197 (FIGS. 27 and 30) is pivotally mounted at its upper end, as at 198, on the outer surface of the lower end portion of the side wall 180 of the handle stick storage hopper 134 (FIG. 30), and this member 197 has an inwardly extending arm or nose portion 400 which normally projects, under the force of its own weight, by gravity, through a slot 265 which is formed in the lower end portion of the side wall 180 of the handle stick storage hopper 134 (FIG. 30). Thus, the inwardly extending arm or nose portion 400 of the L-shaped handle stick guide member 197 engages the lateral surface of the adjacent lower most handle stick 136 in the handle stick storage hopper chute 614 (FIG. 30) as the handle stick 136 is being ejected from the discharge outlet 196, and keeps the handle stick 136 in proper position or alignment as it is being ejected by a handle stick ejecting and inserting push rod member 199 (FIGS. 25 and 29) through the discharge outlet 196 into the handle stick-gripping chuck unit 138 of one of the handle stick-gripping and apple-holding devices 130.

The new machine 125 includes means for supporting and operating the handle stick ejecting and inserting push rod member 199. This supporting and operating means is generally indicated at 201 (FIGS. 23, 25, 25A and 26) and includes an elongated slidable carrier member 203 for the handle stick ejecting and inserting push rod member 199. This slidable carrier member 203 has an inner end portion 204 which projects into and is slidably guided in a guideway 403 which is formed in a guide block member 399 which is mounted on and is suspended below the bottom wall 183 of the handle stick storage hopper 134 (FIG. 25). The inner end portion 202 of the handle stick ejecting and inserting push rod member 199 projects through and is slidably guided in an opening 401 which is formed in a guide block member 402 which is mounted on the upper surface of the bottom wall 183 of the handle stick storage hopper 134, as best shown in FIG. 25, and the inner end portion 202 of the handle stick ejecting and inserting push rod member 199 projects through the opening 401 in the guide block member 402 into the interior and lower end portion of the handle stick storage hopper chute 614, above the bottom wall 183 thereof (FIGS. 23, 26 and 29).

As shown in FIGS. 23, 25, 26 and 29, the handle stick ejecting and inserting push rod member 199 has an inner end portion 202 which projects through and is slidable in an opening 200 formed in the lower end portion of the side wall 180 of the handle stick storage hopper 134.

The means for operating the handle stick-ejecting and inserting member 199 includes a pin 206 which has its upper end portion attached to a slide block 205 which is mounted on and is carried by the slidable member 201, the lower end portion of the pin 206 being attached to a movable cam member 222, which will be described hereinafter.

One end portion of a coil spring 207 is attached, as at 109, to the pin 206 and the other end portion of the coil spring 207 is attached, as at 208, to the guide block member 399 (FIG. 23).

The operating means for moving the slidable handle stick ejecting and inserting push rod member 199 includes the vertically extending drive shaft 199, which also drives the rotary impeller member 186–610 in the handle stick storage hopper 134–614 and a cam 222 which is mounted on a bearing plate 221 which is attached to and is rotatable with the drive shaft 191. The cam 222 engages a cam follower 223 which is attached to and is carried by the lower end portion of a vertically extending stub shaft 224; the upper end portion of the stub shaft 224 being attached to the outer end portion of the slidable carrier member 203 for the handle stick ejecting and inserting push rod member 199 so that the stub shaft 224 and the cam follower 223 carried thereby are carried by and are movable with the slidable carrier member 203 for the handle stick ejecting and inserting push rod member 199.

The slidable carrier member 203–204 for the handle stick ejecting and inserting push rod member 199, and attached slide block 205 and the handle stick-ejecting and inserting push rod member 199–200 are normally urged by the tensioned coil spring 207, inwardly (right to left, FIGS. 23, 25, 26 and 29) into a position to cause the handle stick-ejecting and inserting push rod member 199–200 to engage one of the handle sticks 136 in the lower portion of the handle stick storage hopper chute 614 and eject it through the discharge slot or opening 196 and insert it into the handle stick-gripping chuck unit 138 of one of the handle stick-gripping and apple-holding devices 130 at the first work station in a cycle of rotation of the main movable endless or rotary turntable carrier 129 (FIGS. 14 and 91). However, this ejecting and inserting movement of the handle stick ejecting and inserting push rod member 199–200 is normally prevented by a restraining device, which is generally indicated at 210 (FIGS. 23, 24, 25, 25A and 27), and which includes a generally L-shaped restraining member 211 which has a horizontally extending portion 212 which is journaled for limiting rocking or pivotal movement in bearings 214 and 215 which are carried by a supporting member 213 which is attached to the wall 181 of the handle stick storage hopper 134.

The generally L-shaped restraining member 211 of the restraining device 210 has a depending restraining arm or stop arm portion 216 which normally extends downwardly in front of and in the path of movement of the slide block 205 so as to prevent or restrain movement of the slidable carrier member 203–204, the slide block 205, and the handle stick ejecting and inserting push rod member 199–200 under the influence of the tensioned coil spring 207.

A collar 217 is attached to the outer end portion of the horizontally extending arm portion 212 of the generally L- shaped restraining member 214 outwardly of but adjacent to the side wall 179 of the handle stick storage hopper 134, and an operating arm 218 is attached to and depends from the collar 217 into the path of movement of the body of the handle stick-gripping chuck unit 138 of the handle stick-gripping and apple-holding device 130 as the latter is rotated by and upon the main movable endless or rotary turntable 129 (FIG. 23). The engagement of the handle stick-gripping chuck unit 138 with the depending operating arm 218 pivots or rocks the generally L-shaped restraining member 211, in its bearings 214 and 215, in a direction to move the depending restraining arm or stop portion 216 thereof out of the path of movement of the slide block 205, so as to allow the tensioned coil spring 207 to urge the slidable carrier member 203-204 for the handle stick ejecting and inserting push rod member 199 and attached slide block 205, and the handle stick ejecting and inserting push rod member 199-200 in a direction (right to left, FIGS. 23, 25 and 26) to engage a handle stick 136 an the bottom portion of the handle stick storage hopper chute 614 and discharge it through the discharge slot or outlet 196 of the handle stick storage hopper 134 and insert it into the handle stick-gripping chuck unit 138 of one of the handle stick-gripping and apple-holding devices 130, as shown in FIG. 26, at the first work station in a cycle of rotation of the main movable endless or rotary turntable carrier 129 (FIGS. 14 and 91).

A collar 219 is mounted on and is fastened to the generally horizontally extending portion 212 of the generally L-shaped restraining member 211, and a stop or motion-limiting arm 220 is attached to and depends from the collar 219 adjacent the side wall 180 of the handle stick storage hopper 134 (FIGS. 23, 24, 25 and 25A). A resetting coil spring 225 has one end portion attached to the collar 219 as 406 (FIG. 25), and the resetting coil spring 225 has its other end portion attached, as at 226, to the wall 180 of the handle stick storage hopper 134 (FIGS. 24, 25 and 25A).

As shown in FIGS. 23, 26, 27 and 29, a pair of parallel and generally horizontally extending cam-releasing plate members 264 are mounted in spaced relationship on the lower end portion of the side wall 179 of the handle stick storage hopper 134, in the path of movement of the handle stick-gripping chuck units 138 of the handle stick-gripping and apple-holding devices 130, and as the handle stick gripping chuck units 138 are rotated by the main movable endless or rotary turntable carrier 129 into position to receive a handle stick 136 from the discharge outlet 196 of the handle stick storage hopper 134 a cam-releasing disc member 246, which is embodied in the handle stick-gripping chuck unit 138, engages the cam-releasing plate members 264 (FIG. 26) and thereby opens the handle stick-gripping chuck unit 138 for the reception of the handle stick 136 as it is ejected from the discharge outlet 196 of the handle stick storage hopper 134, as will be described more fully hereinafter in connection with the description of the handle stick-gripping and apple-holding device 130 and attached chuck units 138. The handle stick-gripping and apple-holding device 130 and its chuck unit 138, with a handle stick 136 held thereby, is then rotated by and upon the main movable endless or rotary turntable carrier 129 to the second or apple pick-up work station in a cycle of rotation of the main movable endless or rotary turntable carrier 129 (FIGS. 14 and 91).

The operation of the means for ejecting the handle sticks 136 one at a time from the handle stick storage hopper chute 614 through the discharge outlet 196 therein, sequentially into the handle stick-gripping chuck units 138 of each of the handle stick-gripping and apple-holding devices 130, as they are sequentially rotated by and upon the main movable endless or rotary turntable carrier 129, at the first work station (FIGS. 14 and 91) is as follows: The restraining device 210 is normally disposed, as in FIGS. 23, 24 and 25, with the depending restraining or stop arm portion 216 thereof extending downwardly in front of the slide block 205, the slidable carrier member 203-204 for the handle stick ejecting and inserting push rod member 199, and the handle stick ejecting and inserting push rod member 199 under the influence of the tensioned coil spring 207. However, as the handle stick-gripping chuck unit 138 of the handle stick-gripping and apple-holding device 130 is rotated, by the main movable endless or rotary turntable carrier 129, into position at the first work station (FIGS. 14 and 91) it engages the depending operating arm 218 of the generally L-shaped restraining member 211 and pivots or rocks the latter, in its bearings 214-215, in a direction (clockwise, FIGS. 24 and 25, counterclockwise, FIG. 27) to move the depending restraining or stop arm 216 out of the path of movement of the slide block 205 (see FIG. 25). The tensioned coil spring 207 then moves the slide block 205, the slidable carrier member 203-204, and handle stick ejecting and inserting push rod member carried thereby (right to left, FIGS. 23 and 25). During this operation the inner end portion 202 of the handle stick ejecting and inserting push rod member 199 slides in the opening 401 in the guide block member 402, and through the opening 200 in the lower end portion of the side wall 180 of the handle stick storage hopper 134, and engages the handle stick 136 which is disposed in alignment with the discharge outlet 196 of the handle stick storage hopper 134, and thereby forces and inserts the said handle stick 136 into the handle stick-gripping chuck unit 138 of the handle stick-gripping and apple-holding device 130. During this operation the lower inner end portion or nose 199 of the L-shaped guide member 197 projects into the slot 265 in the said wall 180 of the handle stick storage hopper 134 and maintains the handle stick 136, which is being ejected through the discharge outlet 196, in proper alignment or position as it is ejected out of the discharge outlet 196.

As will be explained more fully hereinafter, when the handle stick-gripping chuck unit 138 of the handle stick-gripping and apple-holding device 130 is moved, by the movable endless or rotary turntable carrier 129, into a position, as in dotted lines (FIG. 23), to receive handle stick 136 from the discharge outlet 196 in the handle stick storage hopper 134, an annular cam-actuating flange or disc 246 on the chuck unit 138 engages the stationary parallel cam-releasing plate members 264 (FIGS. 23 and 29) and the annular cam-actuating flange or disc 246 on the handle stick-gripping chuck unit 138 is moved into a position to move a handle stick-gripping cam mechanism in the chuck unit 138 (FIGS. 35 to 41, inclusive) into open position for the reception of a handle stick 136, as will be described more fully hereinafter in connection with the description of the handle stick-gripping and apple-holding devices 130 and attached chuck units 138 (FIGS. 32 to 44, inclusive).

After each of the handle sticks 136 is thus ejected from the handle stick storage hopper 134 through the discharge outlet 196 therein and is inserted into the handle stick-gripping chuck unit 138 of the handle stick-gripping and apple-holding device 130, at the first work station (FIGS. 14 and 91), the handle stick ejecting and inserting means is returned or reset back into its normal position, as in FIG. 25, this being accomplished as follows: Power being delivered to the drive shaft 195 acts, through the gears 194-193, to rotate the vertically extending drive shaft 191 which, in turn, acts to rotate the cam 222 which is attached to the drive shaft 191 (counterclockwise, FIG. 25). This movement of the cam 222 rotates the cam follower 223 (clockwise, FIG. 25) and this rotary movement of the cam follower 223 acts, through the stub shaft 224, to move the slidable carrier member 203-204 and the slide block 205 mounted thereon, and the handle stick ejecting and inserting push rod member 199-200 carried thereby (left to right, FIGS. 23 and 25) back into their normal position, as in FIG. 25, thereby tensioning the coil spring 207.

During this operation the slidable carrier member 203 slides in the guideway 403 which is formed in the guide block member 399 and the handle stick ejecting and inserting push rod member 199-200 slides in the opening 401 which is provided therefor in the guide block 402 and in the opening 200 which is provided in the lower end portion of the side wall 180 of the handle stick storage hopper 134 (FIGS. 25, 25A, 26 and 29).

In the cyclical operations of the new machine 125, including the cycle of movements performed during one revolution of the main movable endless or rotary turntable carrier 129, the return or resetting movement of the slidable carrier member 203 and attached slide block 205, and the handle stick ejecting and inserting push rod member 199-200 carried thereby takes place just prior to the time the depending operating arm 218 of the generally L-shaped restraining member 211 clears the body of the chuck unit 138 of the handle stick-gripping and apple-holding device 130, whereupon the generally L-shaped restraining member 211 is returned or pivoted back into its normal position, as in FIG. 25, by the resetting spring 225 (FIGS. 24, 25 and 25A).

As the resetting spring 225 thus returns the generally L-shaped restraining member 211 back to its normal position, as in FIG. 25, the depending restraining arm portion 215 of the generally L-shaped restraining member 211 drops down in front of the slide block 205 and thus retains the slidable carrier member 203 and attached slide block 205 and the handle stick ejecting and inserting push rod member 199-200 in their normal, outwardly extended position, as in FIG. 25, against the force of the tensioned resetting spring 207.

As the resetting spring 225 returns the generally L-shaped restraining member 211-212-216 back to its normal position, as in FIG. 25, the depending stop arm or motion-limiting arm 220 engages one of the bearing collars 188 on the horizontally extending portion 212 of the generally L-shaped restraining member 211-212 (FIG. 23) and thus limits the pivotal or rocking movement of the generally L-shaped restraining member 211-212 as it is returned to its normal position, as in FIGS. 23, 24 and 25.

The Handle Stick-Gripping And Apple-Holding Devices And Attached Handle Stick-Gripping Chuck Units A preferred embodiment of the handle stick-gripping and apple-holding devices 130, and attached handle stick-gripping chuck units 138, is shown generally in FIGS. 1, 1A, 1B and 2, and is shown in detail in FIGS. 32 and 44, inclusive, and is further shown in FIGS. 26, 32, 33, 34, 35 to 44, inclusive, 62, 63, 67, 68, 69 and 71 of the drawings.

As shown, each of the handle stick-gripping and apple-holding devices 130 includes an elongated supporting and operating shaft member 227 which is rotatably mounted in a generally cylindrical or tubular sleeve 228 which is rigidly attached to one end portion of the supporting arm 157 which forms part of the supporting means 156 by which the handle stick-gripping and apple-holding devices 130 and attached chuck units 138 are attached to the main movable endless or rotary turntable carrier 129. This supporting arm 157, in turn, has its other end portion pivotally attached, as at 229, to the lower end portion of a guide member 230, which is generally U-shaped in horizontal cross section, and has a vertically extending guideway 231 formed therein for the reception of the supporting arm 157 (FIGS. 32 and 33). The generally U-shaped guide member 230 is attached to the outer peripheral edge portion 237 of the main movable endless or rotary turntable carrier 129 by means of a downwardly angled arm portion 232 of a mounted bracket member 233 which is rigidly attached, as by welding, to the rear wall 234 of the generally U-shaped guide member 230, the other end portion of the mounting bracket member 233 being attached, by suitable fastening means, such as the nut and bolt units 234 and 236, to the outer peripheral edge portion 237 of the main movable endless or rotary turntable carrier 129, as shown in FIGS. 33, 42, 51, 62, 63, 67, 68, 69 and 71.

The supporting and operating shaft 227 of the handle stick-gripping and apple-holding device 130 has an enlarged head 238 which is rigidly attached to the upper end portion thereof. A collar 239 is loosely mounted or floats on the shaft 227 above the generally cylindrical or tubular sleeve 228, and a coil spring 240 is mounted on the shaft 227 between the enlarged head 238 thereof and the collar 239.

As shown in FIG. 41, the shaft 227 of each of the handle stick-gripping and apple-holding devices 130 has an externally threaded lower end portion 241 which is threaded into an internally threaded bore or cavity 242 which is formed in the generally cylindrical main body portion 243 of the handle stick-gripping chuck unit 138, and a generally cylindrical cam-operating sleeve 245 is slidably mounted on the generally cylindrical body 243 of the handle stick-gripping chuck unit 138 between the ends thereof.

The generally cylindrical cam-operating sleeve 245 has the enlarged annular or disc-shaped flange 246 formed thereon and this annular or disc-shaped flange 246 is of substantially larger diameter than the body of the cam-operating sleeve 245, for reasons which will be pointed out hereinafter.

A compression coil spring 247 is mounted on the generally cylindrical or tubular body 243 of the handle stick-gripping chuck unit 138 between the generally cylindrical cam-operating sleeve 245 and the collar 244 (FIGS. 33, 35, 37, 39, 41, 43 and 44.

As best shown in FIGS. 39 and 41, the main tubular body portion 243 of the handle stick-gripping chuck unit 138 has an axially extending slot 248 formed in the side wall thereof. A generally U-shaped cam-operating member 249 is slidably mounted on the generally cylindrical body portion 243 of the handle stick-gripping chuck unit 138, radially inwardly of the generally cylindrical cam-operating sleeve 245 (FIGS. 39 and 41). This generally U-shaped cam-operating member 249 has a laterally and right-angularly extending upper arm portion 250 which is slidable in the axially extending slot 248 which is formed in the generally cylindrical body portion 243 of the handle stick-gripping chuck unit 138. The generally U-shaped slidable cam-operating member 249 has a laterally and right-angularly extending lower arm portion 251, and a connecting link member 252 has an upper end portion which is hingedly, connected as at 253, to the lower arm portion 251 of the generally U-shaped slidable cam-operating member 249. The lower end portion of the connecting link member 252 is hingedly connected, as at 254, to a handle stick-gripping cam member 255 which has an inner end portion 256 which is pivotally mounted, as at 257, in a slot 258 which is formed in the lower end portion of the main generally cylindrical body 243 of the handle stick-gripping chuck unit 138, and this slot 258 opens at its radially outer side on the outer surface of the main generally cylindrical body 243 of the handle stick-gripping chuck unit 138, as shown in FIGS. 39 and 41. The slot 258 opens at its radially inner side into a handle stick-receiving bore or cavity 261 which is formed in the lower end portion of the generally cylindrical body 243 of the chuck unit 138, this handle stick-receiving bore or cavity 261 being open at its lower end at the bottom of the generally cylindrical body 243 of the chuck unit 138 for the reception of a handle stick 136 (FIGS. 39 and 41).

The handle stick-gripping cam member 255 has at its lower and inner end an inwardly extending handle stick-gripping camming arm or nose portion 259 which is adapted to engage the upper end portion 260 of a handle stick 136 which is disposed within the handle stick-receiving bore or cavity 261 in the lower end portion of the generally cylindrical body 243 of the handle stick-gripping chuck unit 138 (FIG. 41).

When the parts of the handle stick-gripping chuck unit 136 are disposed in handle stick-gripping position, as in FIGS. 39, 40 and 41, the inwardly extending camming arm or nose portion 259 of the handle stick-gripping cam member 255 engages the upper end portion 260 of the handle stick 136 and holds the same within the handle stick-receiving bore or cavity 261 of the generally cylindrical body 243 of the handle stick-gripping chuck unit 138.

However, during the operation of the coated apple confection making machine 125, the annular or disc-shaped flange 246 is engaged at different times, by operating mechanisms, which will be described hereinafter, from below the annular flange 246, so as to move the annular or disc-shaped flange 246 and the generally cylindrical cam-operating sleeve 245 axially inwardly on the body 243 of the chuck unit 138, against the action of the spring 247.

This axially inward movement of the cam-operating sleeve 245, and its attached annular or disc-shaped flange 246, on the generally cylindrical body 243 of the chuck unit 138 causes the cam-operating sleeve 245 to engage the upper arm portion 250 of the generally U-shaped cam-operating member 249 and thereby slidably moves the generally U-shaped cam-operating member 249 in the slot 248, against the action of the spring 247. This slidable movement of the generally U-shaped cam-operating member 249 in the slot 248 acts, through the lower end portion 251, and the connecting link member 252 to pivot the handle stick-gripping cam member 255, on its pivotal mounting 257, (counterclockwise, FIGS. 39 and 41) from handle stick-gripping position, as in FIGS. 35–36, 39–40, 41 and 44, into handle stick releasing position, as in FIGS. 37–38.

After the handle stick-releasing operation is thus accomplished, the resetting coil spring 247 acts, through the generally U-shaped cam-operating member 249, and the connecting link member 252, to return the handle stick-gripping cam member 255 to its normal and inwardly extending position, as in FIGS. 35–36 and 39–40.

It will be noted, in this connection, that the internally threaded cavity or bore 242, in which the externally threaded portion 241 of the supporting and operating shaft 227 is mounted, is separated, by a transverse wall portion 262 of the generally cylindrical main body portion 243 of the handle stick-gripping chuck unit 138, from the handle stick-receiving bore or cavity 261 which is formed in the lower end portion of the generally cylindrical main body portion 243 of the handle stick-gripping chuck unit 138 (FIGS. 39 and 41).

An externally knurled generally cylindrical knob member 263 is mounted on and is fixed to the shaft 227, at the lower end of the generally cylindrical or tubular sleeve member 228, and in certain operations of the new machine 125 the main supporting and operating shaft 227 for the handle stick-gripping and apple-holding device 130 and attached handle stick-gripping chuck unit 138, and a handle stick 136 and an apple 133 held thereby, are moved vertically downwardly and are rotated, by mechanisms coacting with the knurled knob member 263, and which will be described hereinafter.

It will be noted that as each of the handle stick-gripping devices 130 and attached handle stick-gripping chuck units 138 is rotated by the main movable endless or rotary turntable carrier 129 into the first or handle stick-receiving work station (FIGS. 14 and 91) the cam follower 158 engages the vertically extending cam surface "a" of the first vertical rise or riser 161 in the stationary cam track member 160 (FIG. 5), and at this time the handle stick-gripping and apple-holding device 130 and attached handle stick-gripping chuck unit 138 are disposed in a generally horizontal position so that the chuck unit 138 will be in a position to receive a handle stick 136 ejected through the discharge outlet 196 of the handle stick storage hopper 134, as explained hereinbefore. However, as the handle stick-gripping and apple-holding device 130 and attached handle stick-gripping chuck unit 138, and attached handle stick 136, are rotated by the main movable endless or rotary turntable carrier 129 toward the second or apple pick-up work station, the cam follower 158 on the supporting arm 157 rides up onto and travels over the upper cam surface "b" of the first dwell 162 in the cam surface of the stationary cam track member 160 (FIG. 6). Thus, when the cam follower 158 is in this position the handle stick-gripping and apple-holding device 130 and attached handle stick-gripping chuck unit 138 are disposed in a generally vertical position on the main movable endless or rotary turntable carrier 129 for insertion of a handle stick 136 into the core of an apple 133 at the second or apple pick-up work station.

The Means For Inserting The Handle Sticks, As Carried By The Handle Stick-Gripping and Apple-Holding Devices And Attached Chuck Units, Into The Cores Of Apples At The Second And Apple Pick-Up Work Station (FIGS. 44, 45, 46 and 47)

The means for inserting the handle sticks 136 into the cores of apples 133 at the second and apple pick-up work station (FIGS. 14 and 91) is shown in FIGS. 42–44–45–46 and 47, wherein it is generally indicated at 139, and will now be described.

Thus, the means 139 for inserting the handle sticks 136 into the cores of the apples 133 comprises a pressure-applying head 266 which is generally U-shaped in plan (FIG. 46).

As shown in FIGS. 45-47, the pressure-applying head 266 is mounted on a supporting arm 267 and this supporting arm 267 has a centrally arranged right-angularly offset portion 268 which projects through a vertically extending slot 269 which is formed in an end wall 270 of the main and upper body portion 127 of the supporting frame 126 (FIGS. 17, 45 and 47). A lever arm 271 is pivotally mounted, as at 272, on a portion 273 of the main body portion 127 of the supporting frame 126. The lever arm 271 has a cam follower 274 on one end portion thereof and this cam follower 274 engages and rides on a cam 275 which is eccentrically mounted on a drive shaft 276, which will be further described hereinafter.

The lever arm 271 has an upwardly extending portion 615 at its other end. This lever arm portion 615 has a pair of rollers 616 mounted thereon in vertically spaced relationship, and the supporting arm 267 has a pin 617 thereon which projects between the rollers 616 (FIG. 46).

As will be described further hereinafter, in connection with the description of the power means and the power transmission means shown in FIG. 89, and the electrical operating and control circuit therefor shown in FIG. 90, when the shaft 276 and the eccentrically mounted cam 275 thereon are rotated the eccentric cam 275 engages the cam follower 274. This engagement of the eccentrically mounted cam 275 with the cam follower 274 on the lever arm 271 pivots or rocks the lever arm 271, at 272 (clockwise, FIG. 45), thereby causing the upper roller 616 on the upward extension 615 of the lever arm 271 to engage the pin 617 on the supporting arm 267, and thus moving the supporting arm 267–268 downwardly in the slot 269. This action lowers the pressure-applying head 266 downwardly into engagement with the upper surface of the knurled knob 263 on the handle stick-gripping chuck unit 138, as shown in FIG. 42, so as to force the main supporting and operating shaft 227 of the handle stick-gripping and apple-holding device 130, and attached chuck unit 138, and the handle stick 136 carried thereby, downwardly, and thus insert the handle stick 136 into the core of an apple 133 in one of the apple-holding devices 132 on the movable endless or rotary apple carrier 131 at the second or apple pick-up work station (FIGS. 14 and 91) in a cycle of rotation of the main movable endless or rotary turntable carrier 129 as described above.

As the handle stick-gripping and apple-holding device 130 and attached chuck unit 138 are thus lowered by engagement of the pressure-applying head 266 of the supporting arm 267 with the upper surface of the knurled knob 263, the slidable cam-operating sleeve 245 of the handle stick-gripping chuck unit 138, the main operating and supporting shaft 227 of the handle stick-gripping and apple-holding device 130 slides downwardly in and relative to the tubular sleeve 228 and relative to the supporting means 156 by which the handle stick-gripping and apple-holding device 130 and attached chuck unit 138 are pivotally mounted on the main movable endless or rotary turntable carrier 129, thereby compressing the resetting spring 240, on the shaft 227, between the head 238 and the collar 239 on the shaft 227. However, as the motion of the drive shaft 276, the eccentrically mounted cam 275 thereon, cam follower 274 and lever 271 continues, the supporting arm 267–268 moves upwardly in the slot 269 in the wall 270 of the main and upper portion 127 of the supporting frame 126, by engagement of the lower roller 616 with the pin 617 on the supporting arm 267, thereby moving the pressure-applying head 266 upwardly out of engagement with the knurled knob 263 on the shaft 227. The then tensioned coil spring 240 on the shaft 227 raises the shaft 227 and the other parts of the handle stick-gripping and apple-holding device 130, and attached chuck unit 138, and attached handle stick 136 and the apple 133 carried thereby, relative to the tubular sleeve 228 and the supporting means 156, thereby lifting the apple 133 out of the apple-holding device 132 on the movable endless or rotary turntable apple carrier 131. Continued rotation of the main movable endless or rotary turntable carrier 129 then moves the handle stick-gripping and apple-holding device and attached chuck unit 138, and the handle stick 136 and apple 133 held thereby, to the next and caramel-coating work station (FIGS. 14 and 91) where the apple 133 is coated with a coating of caramel, or like comestible material, as will be described hereinafter.

The Reject Means For Ejecting An Unloaded Handle Stick From The Handle Stick-Gripping And Apple-Holding Devices And Handle Stick-Gripping Chuck Units In The Event That They Fail To Pick Up An Apple At The Apple Pick-Up Work Station As the handle stick-gripping and apple-holding device 130 and attached chuck unit 138 is rotated by the main movable endless or rotary turntable carrier 129 away from the second or apple pick-up work station, the cam follower 158 carried thereby rides over the upper horizontal cam surface "c" of the dwell 163 in the stationary cam track member 160 (FIG. 7), and during this movement the handle stick-gripping and apple-holding device 130 and attached chuck unit 138 remain in upright or generally vertical position.

The means for ejecting an unloaded handle stick 136 from the handle stick-gripping chuck unit 138 of the handle stick-gripping and apple-holding device 130 in the event that, for any reason, one of the handle stick-gripping chuck units 138 fails to pick up an apple 133 from one of the apple-holding devices 132 on the movable endless or rotary turntable apple carrier 131 at the apple pick-up work station, is illustrated in FIGS. 48 to 53, inclusive, of the drawings, wherein it is generally indicated at 140, as set forth hereinbefore. The handle stick ejecting means 140 is located adjacent to and is operative at the third work station in the cycle of operations of the new coated apple confection making machine 125 and the main movable endless or rotary turntable carrier 129 embodied therein (FIGS. 14 and 91) and includes a solenoid mechanism 278 which includes a solenoid arm or plunger 279 which projects through a slot or opening 280 in the wall 270 of the main and upper body portion 127 of the supporting frame 126 (FIGS. 17, 48, 49, 50 and 53).

The solenoid arm or plunger 279 has a generally arcuate-shaped operating head 281 attached thereto at its outer end and the solenoid arm or plunger 279 and attached operating head 281 are normally urged outwardly (left to right, FIGS. 48, 50 and 53) by a coil spring 282 which has one end portion attached, at 283, to the inner surface of the supporting frame wall 270 and has its other end attached, as at 284, to the solenoid motor 285 which is mounted on a wall 286 of the main body portion 127 of the supporting frame 126 and the solenoid motor 285, when energized, draws the solenoid arm or plunger 179 inwardly, against the action of the coil spring 282, (from the position in which the parts are shown in FIGS. 48 and 50) into the position in which they are shown in FIG. 53.

The solenoid mechanism 278 includes a microswitch control unit 287 which is mounted on the outer surface of the supporting frame wall 270 and this microswitch control unit 287 includes a pivotal trip or switch control arm 288 which projects into the path of movement of the apples 133 carried by the handle sticks 136 of the handle stick-gripping chuck units 138 as the handle stick-gripping and apple-holding devices 130 and attached chuck units 138 and the handle sticks 136 and the apples 133 carried thereby are rotated by the main movable endless or rotary turntable carrier 129 from the second or apple pick-up work station toward the fourth or caramel-coating work station (FIGS. 14 and 91).

As shown in FIG. 49, the microswitch control unit 287 is located forwardly, on the supporting wall 270, of the operating head 281 of the solenoid arm or plunger 279, relative to the direction of movement of the main movable endless or rotary turntable carrier 129, as indicated by the arrow in FIG. 49, for a reason which will be pointed out presently.

As will be described more fully hereinafter, in connection with the electrical control and operating circuit for the new machine 125, as shown in FIG. 90, when the trip or switch control arm 288 is actuated the microswitch unit 287 closes an electrical circuit to the solenoid motor 285 which, when energized, retracts the solenoid arm or plunger 279 and attached operating head 281 inwardly, as described above.

In the operation of the new machine 125, if the handle stick-gripping and apple-holding device 130 and attached chuck unit 138 and the handle stick 136 carried thereby pick up an apple 133 at the second and apple pick-up work station, in the cycle of rotation of the main movable endless or rotary turntable carrier 129, the apple 133 will engage the trip or switch control arm 288 of the microswitch unit 287 (FIG. 90) and thus energize the solenoid motor 285 which, when energized, pulls the solenoid arm or plunger 279 and attached arcuate operating head 281 inwardly out of the path of travel of the handle stick-gripping and holding device 130 and attached handle stick-gripping chuck unit 138 (from the position in which the parts are shown in FIGS. 48 and 50 into the position in which they are shown in FIG. 53).

However, in the event that the handle stick-gripping and apple-holding device 130, and attached handle stick-gripping chuck unit 138, and the handle stick 136 carried thereby fail, for any reason, to pick up an apple 133 at the second or apple pick-up work station, the trip or switch control arm 288 of the microswitch unit 287 will not be actuated by an apple 133, with the result that the solenoid arm or plunger 279, and its operating head 281, will remain in their outwardly extended position, as in FIGS. 48 and 50. Hence, when the handle stick-gripping and apple-holding device 130, and attached handle stick-gripping chuck unit 139, moves past the microswitch unit 287 and its trip or switch control arm 288 (FIG. 49) the annular or disc-shaped flange 246 on the cam-operating sleeve 245 of the handle stick-gripping chuck unit 138 will engage and ride over the operating head 281 on the solenoid arm or plunger 279, thereby raising the slidable cam-operating sleeve 245 and its attached annular or disc-shaped flange 246 on the generally tubular body 243 of the handle stick-gripping chuck unit 138.

This upward movement of the cam-operating sleeve 245 and attached annular or disc-shaped flange 246 on the generally tubular body 243 of the handle stick-gripping chuck unit 138 acts to slide the generally U-shaped cam-operating member 249–250–251 upwardly in the slot 248 formed in the generally tubular body 243 of the chuck unit 138, and this upward movement of the generally U-shaped cam-operating member 249–250–251 acts, through the connecting link member 252, to pivot the handle stick-gripping cam member 255–259, on its pivot 257 (counterclockwise, FIGS. 39 and 41) so as to move the handle stick-gripping and camming arm or nose portion 260 of the handle stick 136 (FIG. 41), from handle stick-gripping position, as in FIGS. 37–38. This upward movement of the cam-operating sleeve 245, and its annular or disc-shaped flange 246 compresses the coil spring 247 between the fixed collar 244 on the shaft 227 and the right-angularly extending upper arm portion 250 of the generally U-shaped cam-operating member 249.

The handle stick 136, being thus released from the handle stick-gripping chuck unit 138, drops by gravity into a guide chute 289 from which it falls into a reject handle stick receptacle 290, both the guide chute 289 and the receptacle 290 being mounted on a wall 191 of the lower section 128 of the main supporting frame 126 (FIGS. 1, 24, 50 and 51).

After the handle stick-gripping and apple-holding device 130 and attached handle stick-gripping chuck unit 138 have thus rejected an unloaded handle stick 136 at the third or handle stick reject work station, and the annular flange 246 on the cam-operating sleeve 245 of the chuck unit 138 passes beyond the operating head 281 of the solenoid arm or plunger 279, the then compressed coil spring 247 returns the cam-operating sleeve 245, and its annular or disc-shaped flange 246, the cam-operating members 249-250, the connecting link member 252, and the handle stick-gripping cam 255-259, back to their normal position, as in FIGS. 35-36 and 39-40.

The Means For Lowering The Handle Stick-Gripping And Apple-Holding Devices, And Attached Handle Stick-Gripping Chuck Units And The Apples Carried Thereby, Into The Caramel Container Vat Or Tank To Coat The Apples With Caramel As pointed out hereinbefore, the new coated apple confection making machine 125 includes a caramel container vat or tank 141 which is adapted to hold a quantity of caramel or like comestible coating 144 (FIGS. 1, 1B, 2, 62, 63 and 67).

After each of the handle stick-gripping and apple-holding devices 130, and attached handle stick-gripping chuck units 138, and the apples 133 carried thereby passes the third or handle stick reject work station, in a cycle of rotation of the main endless or rotary turntable carrier 129, the cam follower 158 on the supporting arm 157 rides off the upper and generally horizontal cam surface "c" of the horizontal dwell 163 on the stationary cam track member 160 (FIG. 7) and engages the radially inner vertically extending cam surface "d" of the vertical riser 164 of the stationary cam track member 160 (FIG. 8) whereupon the handle stick-gripping chuck unit 138, and the handle stick 136 and the apples 133 carried thereby, are pivoted, at 229, on the supporting arm 157 (FIGS. 32-33-34) into a generally horizontal position relative to and, in part, above the caramel container vat or tank 141, as shown in FIG. 62.

However, as the handle stick-gripping and apple-holding device 130 and attached handle stick-gripping chuck unit 138, and the handle stick 136 and the apple 133 carried thereby, are further rotated by the main movable endless or rotary turntable carrier 129, the cam follower 158 rides off the vertically extending and radially inner cam surface "d" of the vertical riser 164 in the stationary cam track member 160 (FIG. 8) and into the upper and generally horizontal cam surface "e" of the dwell 165 thereof (FIG. 9). This motion pivots the handle stick-gripping and apple-holding device 130, and attached handle stick-gripping chuck unit 138, and the handle stick 136 and apple 133 carried thereby, at 229, on the supporting arm 157 (clockwise, FIG. 62) into a generally vertical position above the caramel container vat or tank 141, as in FIG. 63. The main supporting and operating shaft 227 of the handle stick-gripping and apple-holding device 130, and the handle stick-gripping chuck unit 138 embodied therein and attached handle stick 136 and apple 133 carried thereby, are then lowered, by means of pressure applied by the curved or arcuate-shaped pressure-applying head 292 (FIGS. 1B, 54, 55 to 61, inclusive, and 63) on the knurled knob 263 on the shaft 227 of the handle stick-gripping chuck unit 138 (FIG. 63). This action of the pressure-applying head 292 is accomplished by operating means shown in FIGS. 1B, 54, 55 to 61, inclusive, and 63) which will now be described.

The operating means for the curved or arcuate-shaped pressure applying head 292 is partially shown in FIG. 1B and is shown in detail in FIGS. 55 to 61, inclusive, and 63 wherein it is generally indicated at 293, and is mounted in the main and upper portion 127 of the supporting frame 126 below the main movable endless or rotary turntable carrier 129 (FIG. 1B) and includes a vertically extending and reciprocable slide bar 294 on which the pressure-applying head 292 is mounted. The slide bar 294 is slidably guided in a vertically extending guideway 295 which has its lower end portion mounted on a horizontal supporting member 296 of the main body 127 of the supporting frame 126 (FIGS. 1B, 54, 55 and 58). A headed pin 297 is mounted on the upper end portion of the reciprocable slide bar 294 and this pin 297 projects through and is slidable in a vertically extending slot 298 which is formed in the upper portion of the guideway 295 (FIG. 58). The pin 297 likewise projects through and works in a slot 299 which is formed in an enlarged head portion 300 of a reciprocating eccentric bar 301 which forms part of an eccentric mechanism 302 which is embodied in the operating mechanism 293 for the pressure-applying head 292.

The reciprocating eccentric bar 301 has an eccentric crank arm 303 pivotally connected thereto between its ends, as at 407 (FIG. 55), and this eccentric crank arm 303 has a cam follower 304 mounted on the lower end portion thereof. This cam follower 304 projects into and works in an annular cam track 305 which is formed in an annular cam member 306 which is mounted on the driving shaft 276 which has been referred to hereinbefore (FIGS. 45-47) and which is rotatably mounted in the main body 127 of the supporting frame 126 and is driven by the power means and power transmission means illustrated in FIG. 89, and as will be described hereinafter.

One end portion of the reciprocating eccentric bar 301 is pivotally mounted, as at 308, on a supporting bracket 309 which is mounted on an upright portion 310 of the main and upper body portion 127 of the supporting frame 126 (FIGS. 54 and 55).

In the use of the new machine 125, and in a cycle of rotation of the main movable endless or rotary turntable carrier 129, when the driving shaft 276 for the eccentric mechanism 302 is rotated (FIGS. 54, 55 and 89) it rotates the annular cam member 306, thereby causing the cam follower 304 on the eccentric crank arm 303 to travel in the annular cam track 305 in the annular cam member 306. This motion of the annular cam member 306, cam follower 304, and eccentric crank arm 303, imparts an eccentric reciprocating motion to the reciprocating bar 301-300, and the headed pin 297, working in the slot 299 of the head 300 of the reciprocating bar 301, translates the reciprocating motion of the reciprocating bar 301-300 into vertically reciprocating movement of the slide bar 294 and its attached pressure-applying head 292, in the guideway 295.

The vertically reciprocating motion of the slide bar 294, and its attached pressure-applying head 292, takes place in timed relationship in a cycle of rotation of the main movable endless or rotary turntable carrier 129, and this timed relationship is such that when the handle stick-gripping and apple-holding device 130, and attached chuck unit 138, and the handle stick 136 and apple 133 held thereby, are rotated by the main movable endless or rotary turntable carrier 129 into position at the fourth or caramel-coating work station (FIGS. 14 and 91), and are pivoted on the supporting means 156 into vertical position, as in FIG. 63, by the engagement of the cam follower 158 with the generally horizontal upper cam surface "e" of the dwell 165 in the stationary cam track member 160 (FIGS. 8, 62 and 63) the pressure-applying head 292 engages the upper surface of the knurled knob 263 on the shaft 227, thereby moving the entire handle stick-gripping and apple-holding device 130, and attached chuck unit 138, and the handle stick 136 and apple 133 held thereby, downwardly, with the main supporting and operating shaft 227 of the handle stick-gripping and apple-holding device 130 sliding in the tubular sleeve 228 on the supporting arm 157. In this manner the apple 133 is lowered into the caramel container tank or vat 141 in which it is coated with a coating of caramel or like comestible material, as shown in FIG. 63.

During this operation the coil spring 240 on the main supporting and operating shaft 227 of the handle stick-gripping and apple-holding device 130 is compressed, and as the cycle of rotation of the main movable endless or rotary turntable carrier 129 continues, and the vertically reciprocating slide bar 294 and its attached pressure-applying head 292 move in their upward stroke in the guideway 295, the pressure-applying head 292 moves upwardly away from the annular or disc-shaped flange 246 of the chuck unit 138, whereupon the coil spring 240 raises the main supporting and operating shaft 227 of the handle stick-gripping and apple-holding device 130, and the handle stick-gripping chuck unit 138 attached thereto, and the caramel-coated apple 133 carried thereby, relative to the caramel container vat or tank 141, into the position in which the parts are shown in FIG. 67, to enable the next operation of the machine 125 to be carried out, that is, spinning off excess caramel from the caramel-coated apple 133 (FIGS. 64–67), as will now be described.

The Means For Removing Excess Caramel From The Caramel-Coated Apples (FIGS. 64–67)

As the handle stick-gripping and apple-holding device 130 and attached chuck unit 138, and the handle stick 136 and the caramel coated apple 133 carried thereby, are thus raised after the caramel-coating operation, the cam follower 158 rides over the generally horizontal upper cam surface "*f*" of the horizontal dwell 166 in the stationary cam track member 160 (FIG. 10), thereby maintaining the handle stick-gripping and apple-holding device 130 and attached chuck unit 138, and the handle stick 136 and the caramel-coated apple 133 held thereby, in a generally vertical position, as in FIG. 67, for removal of excess caramel from the caramel-coated apple 133.

As indicated above, the new coated apple confection making machine 125 includes means, generally indicated at 145 (FIGS. 64 to 67, inclusive, and 89A) for removing excess caramel coating from the caramel-coated apple 133 after the apples have been provided with a coating of caramel in the caramel container vat or tank 141. This means 145 includes a pair of generally triangularly arranged vertically spaced horizontally extending movable belts 312 which are adapted to engage the knurled knob 263 on the main supporting and operating shaft 227 of the handle stick-gripping and apple-holding device 130 so as to rotate or spin the shaft 227, and the handle stick-gripping chuck unit 138 attached thereto, and the caramel-coated apple 133 carried thereby, so as to spin off any excess caramel coating which may be on the caramel-coated apple 133 as the latter is raised upwardly in the caramel container vat or tank 141 (FIG. 67). The triangularly arranged belts 312 are guided around a pair of double-grooved guide pulleys 313–314 which are arranged, with a center double-grooved drive pulley 315, in a triangular pattern (FIGS. 64 and 89A).

As shown in FIG. 65, the guide pulley 313 is mounted on a shaft 341 which is rotatably journaled in a vertically extending supporting bracket 586 which is attached to a part 584 of the main body 127 of the supporting frame 126, and the guide pulley 314 is similarly mounted on a shaft 585 which is rotatably journaled in the supporting bracket 586. Similarly, the center and drive pulley 315 is mounted on a shaft 582 which is rotatably journaled in a vertically extending supporting bracket 583 which is attached to the part 584 of the main body 127 of the supporting frame 126.

As shown in FIGS. 65, 66 and 89A, the center double-grooved drive pulley 315 has a depending vertical extension 316 which has a pulley 317 mounted on the lower end portion thereof and this pulley 317 is driven by a belt 318. The belt 318, in turn, is driven by a pulley 319 which is attached to vertically extending shaft 320 of a speed-reducing gear mechanism 321. The speed reducing gear mechanism 321 is operated by the drive shaft 408 of a motor 409, (FIGS. 89A and 90), and the speed-reducing gear mechanism 321 and the motor 409 are mounted, as at 410, on a supporting member 296 which is, in turn, mounted on a horizontal supporting member 595 of the main upper body 127 of the supporting frame 126 (FIG. 1C). As shown in FIG. 89A, the belt 318 works around an idler roller 311 which is suitably mounted in the main body 127 of the supporting frame 126.

In the use of the new machine 125, in the cycle of rotation of the main movable endless or rotary turntable carrier 129, when the driving motor 409 is energized it acts, through the shaft 408, the speed-reducing gear mechanism 321, shaft 320, sprocket gear 319, belt 318, pulley 317, the shaft 316, and the drive pulley 315 to rotate the belts 312 around the guide pulleys 313–314. During this movement the belts 312 engage the knurled knob 263 on the main supporting and operating shaft 227 of the handle stick-gripping and apple holding device 130 and attached chuck unit 138, thereby rotating the handle stick-gripping and apple-holding device 130, and attached chuck unit 138, and the caramel-coated apple 133 carried thereby, and thus spinning off any excess caramel on the caramel-coated apple 133, the thus spun off excess caramel dropping down into the caramel container vat or tank 141 (FIG. 67). During the spinning operation the main supporting and operating shaft 227 of the handle stick-gripping and apple-holding device 130, and attached chuck unit 138, rotates in the tubular sleeve 228 which is rigidly attached to the supporting arm 157 of the supporting means 156, and in this manner the entire handle stick-gripping and apple-holding device 130, and attached chuck unit 138, and the handle stick 136 and the caramel-coated apple 133 carried thereby are rotated relative to the tubular sleeve 228 and the supporting means 156–157 by which the handle stick-gripping and apple-holding device 130 and attached chuck unit 138 are pivotally mounted on the main movable endless or rotary turntable carrier 129.

The Ground Nut Coating Means

As pointed out above, during the operation of spinning off the excess caramel coating from the apple 133, as described above, the cam follower 158 on the supporting arm 157 for the handle stick-gripping and apple-holding device 130 rides over the upper horizontal cam surface "*f*" of the dwell 166 in the stationary cam track member 160 (FIGS. 10 and 67), and as the movable endless or rotary turntable carrier 129 continues to rotate, in the cycle of operations of the machine 125, the cam follower 158 rides up off the upper horizontal cam surface "*f*" of the dwell 166 in the stationary cam track member 160 (FIGS. 10 and 67) and engages the vertically extending radially inner cam surface "*g*" of the vertical riser 167 in the stationary cam track member 160 (FIGS. 11 and 68), thereby pivoting the handle stick-gripping and apple-holding device 130, and attached handle stick-gripping chuck unit 138, the handle stick 136, and the caramel-coated apple 133 carried thereby, at 229, on the supporting arm 157 (FIGS. 67–68) into a generally horizontal position, above the first ground nut tray or receptacle 146, as shown in FIG. 68.

The first ground nut tray or receptacle 146 is mounted on a vertically extending shaft 322 (FIGS. 1B, 2A and 89) which is journaled in a bearing structure 323 which is mounted on a horizontal supporting member 324 of the main and upper body portion 127 of the supporting frame 126 (FIG. 1B). The shaft 322 is driven by power means and power transmission means shown in FIG. 89, and which will be described hereinafter.

As the cycle of rotation of the movable endless or rotary turntable carrier 129 continues, the cam follower 158 on the supporting arm 157 of the supporting means 156 for the handle stick-gripping and apple-holding device 130 engages the angularly extending radially inner cam track surface "*h*" of the riser 168 in the stationary cam track member 160 (FIGS. 12 and 69), thereby pivoting the handle stick-gripping and apple-holding device 130, and attached handle stick-gripping chuck unit 138, and the caramel-coated apple 133 carried thereby angularly downwardly, on the pivotal mounting 229 (FIGS. 68–69), into the body of ground nuts 147 in the first ground nut tray or receptacle 146. As the rotation of the main movable endless or rotary turntable carrier 129 continues, the caramel-coated apple 133 is moved through the ground nuts 147 in the first ground nut tray or receptacle 146, by the handle stick-gripping and apple-holding device 130, and attached handle stick-gripping chuck unit 138, and during this operation the ground nut tray or receptacle 146 is rotate on its supporting shaft 322.

As the handle stick-gripping and apple-holding device 130, and the handle stick-gripping chuck 138 embodied therein, and the caramel-coated apple 133, are thus moved through the ground nuts 147 in the first ground nut tray or receptacle 146 (FIG. 69) the knurled knob 263 on the main supporting and operating shaft 227 of the handle stick-gripping and apple-holding device 130 engages the upper surface of a generally rectangular-shaped plate member 411, which may be made of any suitable material such as metal, fabric belting, or the like and preferably has a roughened or serrated upper surface, and which is mounted on the upper surface of the top wall 324 of the main body 127 of the supporting frame 126 (FIGS. 1B, 69 and 69A). This engagement of the knurled knob 263 with the upper surface of the member 411, rotates the knurled knob 263 and the main supporting and operating shaft 227 of the handle stick-gripping and apple-holding device 130, and the handle stick-gripping chuck 138 embodied therein, and the caramel-coated apple 133 carried thereby, in and relative to the tubular sleeve 228 of the supporting means 156 by which the handle stick-gripping and apple-holding device 130 and its handle stick-gripping chuck unit 138 are pivotally mounted on the main movable endless or rotary turntable carrier 129. In this manner the caramel-coated apple 133 is provided with a coating of ground nuts 147 at the first ground nut coating or fifth work station in a cycle of rotation of the main movable endless or rotary turntable carrier 129, as the caramel-coated apple 133 is moved through the first ground nut tray or receptacle 146.

It will be noted, in this connection, that the member 411 is mounted on acute angle relative to the horizontal (FIG. 69) so that its upper surface extends substantially parallel to the plane of the handle stick-gripping and apple-holding device 130, and the handle stick-gripping chuck unit 138 embodied therein, as the caramel-coated apple 133 is moved through and is rotated in the ground nuts 147 in the first ground nut tray or receptacle 146, so as to assure effective rotation of the handle stick-gripping and apple-holding device 130, and its chuck unit 138, and the caramel-coated apple 133 carried thereby, as the caramel-coated apple 133 is moved through and rotated in the first ground nut tray or receptacle 146.

The Discharge of The Caramel-Coated And Ground Nut-Coated Apples Into The Final Receiving And Second Ground Nut Tray Or Receptacle And The Discharge Means Therefor The final receiving and second ground nut coating tray or receptacle 148 for the caramel-coated and ground nut-coated apples 133 is rotatably mounted on a vertically extending supporting shaft 326 which is mounted, as at 414 (FIG. 70), on the laterally extending supporting arm or extension 149 of the main body 127 of the supporting frame 126 at the side thereof opposite the side shown in FIG. 1 (FIGS. 1A, 2, 15 and 70). The shaft 326 is driven by a part of the power means and power transmission means shown in FIG. 89, and which will be described hereinafter.

The final receiving and second ground nut tray or receptacle 325 for the caramel-coated and ground nut-coated apples 133 may contain a further body of ground nuts 147 (FIG. 70) so that if the caramel-coated and ground nut-coated apples 133, which have previously been given a first coating of ground nuts in the first ground nut tray or receptacle 146 (FIGS. 68 and 69) have not been given an adequate coating of ground nuts 147 in the first ground nut tray or receptacle 146, or if the carpel coating thereon has not fully dried, a further coating of ground nuts 147 will be provided on the apples 133 in the final receiving and second ground nut tray or receptacle 148 as the caramel-coated and ground nut-coated apples 133 are discharged into the final receiving and second ground nut tray or receptacle 148, a the final and seventh work station in a cycle of rotation of the main movable endless or rotary turntable carrier 129, by means which will be described presently.

As shown in FIGS. 2, 70 and 70A, a ground nut leveling member or scraper 415 is mounted adjacent the second ground nut receptacle or tray 148 by means of a horizontally extending arm 417 which is attached to the lateral and angularly extending arm 149 of the main body 127 of the supporting frame 126. This ground nut leveling member or scraper 415 has a depending arm 416 which projects downwardly into the interior of the final receiving and second ground nut tray or receptacle 148 into the path of the ground nuts as the supply of ground nuts is rotated in the final receiving and second ground nut tray or receptacle 148. Hence, as the caramel-coated and ground nut-coated apples 133 are rotated in the final receiving and second ground nut tray or receptacle 148 the ground nut leveling member or scraper 415 engages the supply of ground nuts in the tray or receptacle 148 and maintains it generally level. In this manner it is assured that the apples 133 will be given an additional coating of ground nuts 147 in the final receiving and second ground nut tray or receptacle 148. This is desirable in the event that the apples were not given an adequate coating of ground nuts in the first ground nut tray or receptacle 146, or in the event that the caramel coating on the apples 133 has not fully dried.

The means 398 for discharging the caramel-coated and ground nut-coated apples 133 and their attached handle sticks 136 into the ground nut tray or receptacle 148 is shown in FIG. 71A and comprises a lever arm 619 which is pivotally mounted between its ends, as at 620, on a supporting member 621 of the main and upper body portion 127 of the supporting frame 126. The lever arm 619 has a generally rectangular-shaped camming head 420 attached thereto at one end thereof, and the lever arm 619 has a cam follower 622 mounted on the opposite end portion thereof, and this cam follower 622 rides upon the cam surface of a cam 623 which is mounted on a shaft 460 (FIGS. 71A and 89).

In the operation of the new machine 125, as the handle stick-gripping and apple-holding devices 130, and the handle stick-gripping chuck units 138 embodied therein, and the caramel-coated and ground nut-coated apples 133 carried thereby approach the discharge and final or seventh work station in the cycle of rotation of the main movable endless or rotary turntable carrier 129, the cam follower 158 on the supporting arm 157 rides off the generally horizontal upper cam surface "*i*" of the dwell 169 in the stationary cam track member 160 (FIGS. 13 and 71) whereupon the cam 623 on the shaft 460 engages the cam follower 622 and thus pivots the lever arm 619 at 620 (clockwise, FIG. 71A), thereby moving the camming head 420 on the lever arm 619 upwardly into engagement with the lower surface of the disc-shaped flange 246 of the chuck unit 138, as shown in FIG. 71, thereby moving the cam-operating sleeve 245 of the chuck unit 138 slidably upwardly on the generally tubular body 243 of the chuck unit 138. This movement of the cam-operating sleeve 245, and its attached annular or disc-shaped flange acts, through the slidable cam-operating member 249–250–251 and the connecting link member 252, to pivot the handle stick engaging cam member 255 at 257 (counterclockwise, FIGS. 39 and 41) into open or handle stick-releasing position, as in FIGS. 37 and 38, thereby discharging the handle stick 136 and the caramel-coated and ground nut-coated apple 133 carried thereby into the final receiving and second ground nut tray or receptacle 148 (FIGS. 2B and 71).

As explained hereinbefore, the then tensioned coil spring 240 on the shaft 227 then returns the cam-operating sleeve 245 and its annular or disc-shaped flange 246, and the cam-operating mechanism 249–250–251–252, and the handle stick-gripping cam member 255, into their normal position, as in FIGS. 35, 36, 39, 40 and 41.

The Caramel Container Vat Or Tank The Heating Means Therefor, And The Hydraulic Means For Raising And Lowering The Caramel Container Vat Or Tank And Attached Heating Means Therefor The caramel container vat or tank 141, the heating means therefor, and the means for cyclically raising the caramel container vat or tank in small increments of approximately one-sixteenth inch, as the caramel supply therein is consumed in use, is shown generally in FIGS. 1, 1B and 2 and is shown in detail in FIGS. 72 to 78 and 78A, and will now be described.

Thus, as shown in FIG. 75, the caramel container vat or tank 141 includes a metallic or like tub-shaped body 328 which is composed of an inner wall 329 and an outer wall 330 which are spaced from each other to provide an intrawall space 331 for the reception of a suitable oil or like fluid heat-transmitting medium for uniformly heating the caramel container vat or tank 141. The oil or like fluid heat-transmitting medium is adapted to be poured into the intrawall space 331 through a suitable inlet pipe 332 which is mounted on the outer wall 330 of the body 328 of the caramel container vat or tank 141 adjacent the top thereof (FIGS. 1, 1B, 2 and 72-73).

A suitable oil drain member 333 is provided in the bottom wall of the body 328 of the caramel container vat or tank 141 for draining caramel out of the body 328 of the caramel vat or tank 141, as and when necessary.

The gas heater unit 143 for the caramel container vat or tank 141 is disposed below the bottom wall thereof (FIGS. 72, 74 and 75) and is provided with a suitable gas fuel supply line 334. The gas heater unit 143 is mounted on a supporting member 335 which is attached to and is carried by a head 336 which is mounted on the upper end portion of a piston rod member 337 on the lower end portion of which a piston 338 is mounted. The piston 338 works in a hydraulic lifting cylinder 338 which is provided with an inlet port 340 adjacent the bottom thereof and is provided with an air breather outlet 341 in the top wall thereof, for the escape of air therefrom and the cylinder 339 is provided with an outlet 624 adjacent the top thereof, which is connected by a return line 625 to a two-way automatic valve unit 349 which will be described more fully hereinafter.

The new coated apple confection making machine 125 includes guide means, generally indicated at 342 (FIGS. 1, 1B, 72, 74, 75, 76, 77 and 78) for guiding the caramel container vat or tank 141-328, and the heating means 143 therefor, as the caramel container vat or tank 141 is raised in small increments as the supply of caramel therein is consumed in use. This guide means 342 includes a pair of guide cylinders 343 which are arranged below the caramel container vat or tank 141-328 on opposite sides of the hydraulic lifting cylinder 339. These guide cylinders 343 are mounted on a supporting base 344 which is disposed below the caramel container vat or tank 141, at one side of the body portion 127 of the main supporting frame 126 (FIGS. 1 and 1B), and brace member 420 extends between and is fastened to the hydraulic lifting cylinder 339 and the guide cylinders 343 (FIG. 77).

A guide rod member 345 is slidably guided in each of the guide cylinders 343 for vertical sliding movement therein, and the supporting member 335 is attached to and extends between the upper end portion of the guide rod members 345 and, as described above, the supporting member 335 is attached at its mid-portion to the head 336 on the piston rod 337 of the hydraulic lifting cylinder 339. A pair of generally rectangular and channel-shaped guide members 346 are mounted in spaced relationship on the supporting member 335, at opposite ends thereof, and below the caramel container vat or tank 141-328. Each of these generally rectangular-shaped and channel-shaped guide members 346 is open at its upper end and has a guide plate member 347 disposed therein, each of the guide plate members 347 being attached to the bottom portion of the outer eall 330 of the caramel container vat or tank 141-328 (FIGS. 74 and 76).

The hydraulic operating circuit for the hydraulic lifting cylinder 142 is shown in FIG. 78A, wherein it is generally indicated at 420, and, as there shown, the inlet port 340 of the hydraulic lifting cylinder 339 is connected to an oil or hydraulic fluid line 589 which, in turn, is connected to one outlet side of an automatically operating two-way valve unit 349 of conventional construction such, for example, as that made and sold by Veckell Manufacturing Co., Detroit, Michigan, and known as its Model B2A3S. The inlet side of the automatic two-way valve unit 349 is connected by a hydraulic fluid line 350 to the outlet side of an oil pump 351 which is driven by suitable power means and power transmission means 352 (FIGS. 78A and 89), and the other outlet side of the two-way valve unit 349 is connected by a hydraulic line 353 to a fluid supply or oil storage reservoir or tank 354 which, in turn, is connected by a hydraulic fluid line 355 to the inlet side of the oil or like hydraulic fluid pump 351. As pointed out hereinbefore, the outlet 624 of the hydraulic cylinder 339 is connected by an hydraulic line 625 to an inlet port of the two-way valve unit 349.

As shown in FIGS. 78A and 89, the pump 351 has a shaft 456 on which a sprocket gear 457 is mounted, and a sprocket chain 458 works over and drives the sprocket gear 457.

As shown in FIG. 89, the sprocket chain 458 works over a sprocket gear 457 which is carried by a power transmission shaft 460 and this shaft 460 carries a gear 461 which meshes with a gear 462 on the main vertically extending drive shaft 434 which has a gear 433 on the upper end portion thereof which meshes with the main driving gear 432 on the supporting shaft 155 for the movable endless or rotary turntable carrier 129 (FIG. 89).

General Operation Of The Caramel Container Vat Or Tank And The Heating Means And The Hydraulic Lifting Means Therefor In the use of the new coated apple confection making machine 125, gas is supplied by the fuel line 334 to the gas heater 143 so as to heat the oil or like fluid in the intrawall space 331 of the body 328 of the caramel container vat or tank 141, so as to maintain the caramel in the caramel container vat or tank 141 in a liquid condition and at a preselected desired temperature of approximately 232° F.

As the supply of caramel in the caramel container vat or tank 141-328 is consumed in use, the caramel container vat or tank 141 and the gas heating unit 143 therebelow are automatically raised, in small increments, preferably of the order of about one-sixteenth inch up toward the rotary main movable endless or rotary turntable carrier 129, and the handle stick-gripping devices 130 and handle stick-gripping chuck units 138 embodied therein, so as to assure that there will at all times be an adequate supply of caramel in the caramel container vat or tank 141 to assure proper coating of the apples 133 as the apples 133 on the handle sticks 136 are lowered by the handle stick-gripping devices 130 ad their handle stick-gripping chuck units 138 into the caramel container vat or tank 141-328 (FIGS. 62-63).

This automatic raising of the caramel vat 141-328 and the gas heating unit 143 therefor is effected by the hydraulic system 420 shown in FIG. 78A including particularly the design and construction of the two-way automatic valve unit 349 in cooperation with the hydraulic lifting cylinder 339 and the piston 338 and piston rod 337 and attached piston head 336 thereon, as will be described more fully hereinafter. Thus, by reference to FIG. 78A, it will be noted that when the pump 351 is operated by the power transmission means 352, oil or like hydraulic fluid, is drawn from the oil storage tank or reservoir 354, by way of the hydraulic line 355, through the pump 351 and the hydraulic line 350 into the two-way valve unit 349 by which it is forced or pulsed, by way of the hydraulic line 589 into the inlet port 340 of the hydraulic lifting cylinder 339 below the piston 338, so as to raise, in small increments, the piston 338, piston rod 337, piston head 336 and attached supporting member bar 335, and the gas heater unit 143, and caramel container vat or tank 141 which are mounted on the supporting member 335. During this operation air in the cylinder 339 escapes through the breather port 341 in the top wall of the cylinder 339 and any hydraulic fluid in the cylinder 339 above the piston 338 will flow from the cylinder 339 by way of the line 625 back into the automatic two-way valve unit 349 (FIG. 78A).

As the supporting member 335 is thus raised by the hydraulic piston 338 and attached piston rod 337 and the piston head 336 carried thereby, the caramel container vat or tank 141 is guided by the guide rods 345 working in the guide cylinders 343, in cooperation with the guide plate members 347 which are mounted in the generally rectangular-shaped and channel-shaped guide plate holder members 346 so as to stabilize the movement of the caramel container vat or tank 141–328 as it is thus raised by the hydraulically operated lifting system 420, as described.

When the piston 338 reaches the upper end portion of the hydraulic cylinder 339 the electrical control and operating circuit to the two-way valve unit 349 may be opened by a manually operable control switch 588 (FIG. 90), or by means of an automatic control switch 601, as will be described more fully hereinafter in connection with the description of the electrical control and operation circuit for the new machine 125, as shown in FIG. 90. The hydraulic fluid in the hydraulic cylinder 339 below the piston 338 then flows out of the cylinder 339 by way of the port 340, and the hydraulic line 589 back into the cam-operated automatic switch unit 349, and the by way of the hydraulic line 353 back to the storage tank or reservoir 354, member 335, gas heater unit 143 and the caramel container vat or tank 141 to return or drop downwardly to their initial or lowered position, whereupon the supply of caramel in the caramel container vat or tank 141–328 may be manually replenished and the cycle of operations thereof, as described above, repeated.

The Electrical Control System For The Hydraulic Circuit 420 (FIG. 78A) And Lifting Means For The Caramel Container Vat Or Tank 141–328 (FIGS. 72–78)

As shown in FIG. 90, the two-way automatic valve unit 349 (FIGS. 78A and 90), which is embodied in the hydraulic circuit 420 (FIG. 78A) has a dual switch control system, namely, a main manually operated switch control unit 588 which is arranged in the operating and control circuit 424 for the new machine 125 (FIG. 90) and an auxiliary manually operable switch control unit 601, which forms a part of the two-way valve unit 349, and is manually closed and remains closed at all times during operation of the two-way valve 349. The two-way valve unit 349 also includes a main automatic switch control unit 307 which includes movable switch element 606 which is operated by the eccentric cam 275 on the shaft 276 (FIGS. 45, 46 and 47) which operates the pressure-applying head 266 which lowers the handle stick-gripping and apple-holding devices and attached chuck units 138 and the handle sticks 136 carried thereby at the second or apple pick-up work station (FIGS. 14 and 91).

The electrical control and operating circuit for the two-way valve unit 349 may be energized by closing the main manual control switch 588 and by closing the manually operable auxiliary control switch 601 for the two-way valve unit 349 which is connected, by the line 602, to the main automatic switch control unit 307 which includes a movable switch member 606 which forms part of the two-way valve unit 349 (FIG. 90). The switch control unit 307 is mounted on a suitable supporting member 607 which forms part of the main body 127 of the supporting frame 126 (FIG. 45). The movable switch member 606 of the main automatic switch control unit 307 for the two-way valve unit 349 rides on the cam surface of the eccentric cam 275 which is mounted on the shaft 276 (FIGS. 45–47 and 90).

The construction of the two-way valve unit 349 and its arrangement in the hydraulic circuit 420 (FIG. 78A) and in the electrical control and operating circuit 444 (FIG. 90) are such that when the hydraulic pump 351 is in operation and hydraulic fluid is flowing through the hydraulic circuit 420 (FIG. 78A) the two-way valve unit 349 forces or pulses the flow of hydraulic fluid through the two-way valve unit 349 and the line 589 into the hydraulic lifting cylinder 339 for the caramel container vat or tank 141–328 so as to raise the caramel container vat or tank in small increments as the supply of caramel therein is consumed in use. During this operation the hydraulic fluid in the cylinder 339 above the piston 338 flows out of the outlet port 624 by way of the line 625 into the two-way valve unit 349. This pulsing operation of the two-way valve unit 349 is controlled by the engagement of the eccentric cam 275 on the shaft 276 with the movable switch member 606 of the main automatic switch control 307–606 for the two-way valve unit 349 (FIGS. 45, 46, 47 and 90) so that the main automatic switch control unit 307–606 is closed and opened once during each revolution of the eccentric cam 275 and its supporting shaft 276. However, as and when the caramel container vat or tank 141–328 reaches the upper limit of its travel and it becomes necessary to replenish the supply of caramel therein, the operating circuit to the two-way valve unit 349 may be opened to deenergize the two-way valve circuit 349 in either of two ways, namely, by opening the main manual switch control unit 588 for the two-way valve unit automatic switch 349 (FIG. 90) or the auxiliary switch control 601, whereupon the hydraulic fluid in the hydraulic lifting cylinder 339 below the piston 330 will flow out of the hydraulic lifting cylinder 339, through the line 589 into and through the two-way valve unit 349 and thence by way of the line 353 back to the hydraulic storage reservoir 354, thereby allowing the piston 338 and piston rod 337 to drop down into their initial position, as in FIG. 78A, and thus permitting the caramel container vat or tank 141–328 to drop by gravity down into its initial position in which the supply of caramel in the caramel container vat or tank 141–328 may be manually replenished.

The Nut Storage Hopper, The Nut Grinding Mechanism Therein, And The Ground Nut-Level Responsive Means In The First Ground Nut Tray Or Receptacle For Controlling Operation Of The Nut Grinding Mechanism As pointed out hereinbefore, the new coated apple confection making machine 125 includes a nut storage hopper 150 and a first ground nut tray or receptacle 146 which are mounted on the main body 127 of the supporting frame 126 adjacent the main movable endless or rotary turntable carrier 129, at the sixth work station in a cycle of rotation of the main movable endless or rotary turntable carrier 129 (FIGS. 14 and 91).

As shown in FIGS. 82 and 83, the nut storage hopper 150 is mounted on a horizontal arm 389 of a supporting bracket 390 which has a lower arm 391 which is attached, as at 392, to the top horizontal wall 324 of the main body 127 of the supporting frame 126 (FIGS. 1, 1B, 2, 82 and 83).

As shown in FIG. 79, the auxiliary ground nut tray or storage hopper 151 has an upright rear wall 423 which is attached to a supporting bracket 430 which is mounted on the throat portion 152 of the nut storage hopper 150, and the auxiliary nut storage hopper or tray 151 has notches or recesses 431 in the lower edge portion thereof (FIGS. 79 and 83) for a reason which will be pointed out hereinafter.

The nut grinding mechanism 153 is mounted in the lower end or throat portion 152 of the nut storage hopper 150 (FIGS. 82–83) and the ground nut level-responsive means 154 is mounted in the auxiliary ground nut tray or receptacle 151 and is responsive to the level of ground nuts therein for controlling the operation of the nut-grinding mechanism 153 in the throat portion 152 of the nut storage hopper 150, as will be described hereinafter.

Thus, it will be noted (FIGS. 82 to 88, inclusive) that the nut-grinding mechanism 153 includes a pair of intermeshing nut-grinding rollers 357 and 358. The nut-grinding roller 357 is mounted on a power shaft 359 which is rotatably journaled in bearings 360 which are attached to the side walls 361 of the lower end portion or throat 152 of the nut storage hopper 150. The nut grinding roller 358 is mounted on an idler shaft 362 which is rotatably journaled in bearings 628 which are attached to the side walls 361 of the lower end portion or throat 152 of the nut storage hopper 150 (FIG. 86).

The idler shaft 362 of the nut-grinding mechanism 153 carries a gear 364 which is arranged in a housing 365 which is disposed exteriorly of and at one side of the lower end portion or throat 152 of the nut storage hopper 150 (FIGS. 82–83) and the power shaft 359 carries a gear 366 which meshes with the gear 364 (FIG. 86).

The new machine 125 includes a power transmission system 367 for the nut-grinding mechanism 153 an this power transmission system 367 includes an endless sprocket chain drive member 368 (FIGS. 82, 83, 84, 85 and 89) and a clutch mechanism, which is generally indicated at 369, is operatively associated with and controls the operation of the power transmission system 367 for the nut-grinding mechanism 153. The clutch mechanism 369 includes a combination sprocket gear and clutch disc member 363 which is loosely mounted or floats on the power shaft 359 and includes a sprocket gear portion 370 which meshes with the sprocket chain drive member 368 (FIGS. 84 and 85). The clutch mechanism 369 also includes a complementary clutch disc member 371 which is slidably mounted on and is keyed to the power shaft 359 for rotation therewith and is arranged axially outwardly of the sprocket gear clutch disc member 393–370 (FIGS. 83–84–85). The clutch disc member 371 is attached to the axially inner surface of a flanged clutch operating spool-shaped collar 372 which is slidably mounted on the power shaft 359 axially outwardly of the clutch disc member 393–370 (FIGS. 83, 84 and 85). The slidable mounting of the clutch disc member and attached flanged clutch operating spool-shaped collar 372 is effected by means of a key member 421 which is attached to the radially inner surface of the flanged clutch-operating spool-shaped collar 372 and is slidably mounted in an axially extending slot or keyway 422 which is formed in the outer peripheral surface of the power shaft 359 (FIGS. 85 and 85A).

A coil clutch spring 373 is mounted on the power shaft 359 between the flanged clutch-operating spool-shaped collar 372 and an enlarged head 374 which is fixed on the axially outer end portion of the power shaft 359 (FIGS. 82, 83, 84 and 85); this arrangement being such that the coil clutch spring 373 normally urges the flanged clutch-operating spool-shaped coils 372 and the attached clutch disc member 371 attached thereto into clutching engagement with the combination sprocket gear-clutch disc member 393–370, as shown in FIGS. 82, 83 and 84.

The clutch mechanism 369 includes a clutch operating lever 375 which has an annular yoke portion 376 at its upper end and this yoke portion 376 extends over and embraces the hub of the flanged clutch-operating spool-shaped collar 372 (FIGS. 84–85). The clutch-operating lever 375 is pivotally connected between its ends, as at 394, to a supporting arm 395, the inner end portion of which is attached, as at 396, to the supporting bracket 390 which supports the nut storage hopper 150 (FIG. 82). The lower end portion of the clutch-operating lever 375 is pivotally attached, as at 377, to a lever 429 which is attached to the plunger arm 378 of a solenoid motor 381 which is slidably mounted in an opening 379 in the vertical end wall 380 of the main body portion 127 of the supporting frame 126 (FIG. 83). The inner end portion of the lever 429 is attached to the plunger arm 378 of a solenoid motor 381 which is mounted on the wall 382 of the main body 127 of the supporting frame 126 (FIG. 83).

As pointed out hereinbefore, the new machine 125 includes means, generally indicated at 154 (FIGS. 79, 80, 81A, 81B, 82 and 83), which is responsive to the level of the ground nuts in the auxiliary round nut hopper 151 for controlling the operation of the nut-grinding mechanism 153 in the lower end portion or throat 152 of the nut storage hopper 150. This control means 154 includes a microswitch unit 383 which is mounted on a supporting arm member 589 which is mounted on the upwardly extending rear wall 423 of the auxiliary ground nut storage hopper 151 (FIG. 79) and includes a movable switch member 384 which projects vertically upwardly toward and is adapted to be engaged and to be depressed into open circuit position by a rigid switch-operating rod member 385. This switch-actuating rod member 385 has an end portion 590 which is operatively connected to an upwardly extending mounting block 386 which is mounted on the upper surface of a ground nut level-responsive plate member 387 which is loosely mounted in the auxiliary ground nut storage hopper 151 and floats or rides loosely on the upper surface of the body of ground nuts therein.

A horizontal supporting bracket or shalf 425 is mounted on the outer wall of the throat portion 152 of the storage hopper 150, above the auxiliary ground nut storage hopper 151, and a hinged plate member 426 is mounted on the bottom surface of the bracket 425. A movable hinge plate member 427 is hingedly connected, as at 428, to and depends from the fixed hinged plate member 426 and the movable hinge plate member 427 has a right-angularly extending lower end portion 592. The end portion 591 of the switch-operating rod member 385 is attached to the arm 592 of the movable hinge plate member 427 and is movable therewith on the hinge connection 428 (FIGS. 81 and 81A).

As shown in FIG. 90, and as will be described more fully hereinafter, the microswitch unit 383-384 and the solenoid motor 381-378 are arranged in an electrical control circuit for the new machine 125, and which is generally indicated at 424 (FIG. 90).

In the use of the new machine 125, a supply of nuts, such as peanuts, cocoanuts, or other comestibles, may be poured into the nut storage hopper 150 through the open top thereof, whereupon the nuts will drop down into the throat 152 of the nut storage hopper 150 and engage the nut-grinding mechanism 153.

As pointed out above, the coil spring 373 on the power shaft 359 for the nut-grinding mechanism 369 normally tends to urge the flanged clutch-operating spool-shaped collar and the attached disc-shaped clutch disc member 371 and the yoke portion 376 of the clutch control lever 375 into position to engage the clutch disc member 371 with the sprocket gear clutch disc member 393–370 so as to drive the power shaft 359 for the nut-grinding mechanism 153.

When the movable switch member 384 is normally urged into raised position to maintain the circuit to the solenoid motor 381 in closed or energized condition so that the solenoid motor 381 and the clutch-operating parts 378-429-377-375-376 associated therewith are disposed as in FIGS. 83 and 84 with the clutch mechanism 369 in engaged and operating position. This arrangement is such that as long as the level of ground nuts in the auxiliary nut storage hopper 151 is disposed below a predetermined desired level the rigid switch-operating rod 385 engages the movable switch member 384 and maintains the movable switch member in its depressed or lowered and open circuit position. However, when the auxiliary ground nut storage hopper 151 is filled with ground nuts to a predetermined level the ground nut level-responsive plate member 386–387 raises the rigid switch-operating rod 385 out of engagement with the movable switch member 384 of the microswitch unit 383, into the position in which the parts are shown in FIG. 81B, whereupon the movable switch member 384 closes the circuit to the solenoid motor 381 and thereby energizes the solenoid motor 381 (FIGS. 83 and 90). When the solenoid motor 381 is thus energized, its plunger arm 378 is moved into and is disposed in an inwardly retracted position, (to the right of the position in which it is shown in FIG. 82), thereby moving the lever arm 429 attached thereto (left to right, FIG. 83). This movement of the solenoid plunger arm 378 and attached lever arm 429 acts to pivot the clutch control lever 375 at 394 (counterclockwise, FIG. 83), and this movement of the clutch control lever 375 causes the yoke portion 376 at the upper end thereof to slide the flanged clutch-operating spool-shaped collar 372 and the clutch disc member 371 attached thereto, against the action of the coil spring 373, from the position in which these parts are shown in FIGS. 83 and 84 into open or disengaged position in which the parts are shown in FIG. 85, thereby moving the clutch disc member 371 out of engagement with the combination clutch disc member and sprocket gear 370 and thus cutting off power to the drive shaft 359 for the nut-grinding mechanism 151. During this movement the key member 421, which is attached to the flanged spool-shaped clutch-operating member 372 and attached clutch disc member 371 slides in the keyway 422 in the power shaft 359 (FIGS. 85 and 85A).

However, when the level of ground nuts in the auxiliary ground nut storage hopper 151 falls below the desired predetermined level the ground nut level-responsive plate member 387–386 falls or drops by gravity therewith, thereby causing the rigid switch-operating rod 385 to move into engagement with and to depress the movable switch member 384 of the microswitch unit 383 into open circuit position, one end portion of the rigid switch-operating member 385 pivoting on the hinged plate member 427 and its horizontally extending arm 591, to which it is attached (FIGS. 79, 81 and 81A), thereby opening the circuit (FIG. 90) to and deenergize the then tensioned coil spring 373 acts through the flanged clutch-operating spool-shaped collar 372 and the yoke 375 to pivot the clutch control lever 375 at 394 (clockwise, FIG. 83) thereby moving the clutch control lever 375 and attached lever arm 429 and solenoid plunger 378 back into the position in which the parts are shown in FIGS. 82, 83 and 84. During this operation the then tensioned coil spring 373 slides the flanged spool-shaped clutch-operating collar 372 and attached clutch disc member 371 on the power shaft 359 from the position in which the parts are shown in FIG. 85 into the position in which they are shown in FIGS. 82, 83 and 84, thereby moving the clutch disc member 371 into clutching engagement with the combination sprocket gear and clutch disc member 370 so that power will again be delivered to the power shaft 359 and the nut-grinding mechanism 153 to replenish the supply of ground nuts in the auxiliary ground nut hopper 151.

When the clutch mechanism 369 is thus engaged, and the power transmission system (FIG. 90) is operated, as will be described more fully hereinafter, power is delivered to the sprocket chain drive member 368 which acts, through the sprocket gear-clutch disc member 370 and the combination flanged spool-shaped clutch-operating member and clutch disc member 371, to rotate the power shaft 359, and power is delivered from the power shaft 359 to the gear 366, to the gear 364, and the idler shaft 362, thereby rotating the two intermeshing grinding rollers 357 and 358 which thus operate to grind the nuts in the lower end portion or throat 152 of the nut storage hopper 150 from which the ground nuts fall by gravity into the stationary auxiliary nut storage hopper 151, and as the first ground nut tray or receptacle 146 is rotated, the ground nuts pass from the stationary auxiliary ground nut tray or receptacle 151 into the rotatable ground nut tray or receptacle 146. During this operation the ground nuts flow, in part, through the notched recesses 431 in the bottom edge of the side wall of the stationary auxiliary ground nut storage hopper or tray 151 (FIG. 79).

It will be noted, in this connection, that the rigid switch-operating rod member 385 remains in engagement with the movable switch member 384 of the microswitch unit 383 at all times as the level of ground nuts in the stationary ground nut tray or receptacle 151 falls below a predetermined desired level and until the level of ground nuts reaches a predetermined desired upper level so as to maintain the solenoid motor 381 in deenergized condition and the clutch mechanism 369 in engaged position so as to operate the nut-grinding mechanism 153 at all times until the level of ground nuts in the auxiliary ground nut tray or receptacle 151 reaches the predetermined desired level, whereupon the switch-operating rod member 385 moves upwardly out of engagement with the movable switch member 384 of the microswitch unit 383 and the switch member 384 then rises into position (as in FIG. 81B) to close the circuit to and energize the solenoid motor 381, thereby opening the clutch mechanism 369 and thus cutting off the power to the drive shaft 359 for the nut-grinding mechanism 153.

THE POWER MEANS AND POWER TRANSMISSION SYSTEM FOR THE NEW COATED APPLE CONFECTION MAKING MACHINE (FIG. 89)

The power means and power transmission system for most of the operating mechanisms embodied in the new coated apple confection making machine 125 is illustrated in FIG. 89, wherein it is generally indicated at 431, and will now be described.

It will be noted, however, that the power means and power transmission means for the spinning mechanism for removing excess caramel from the caramel-coated apples 133 have been described hereinbefore in connection with the said spinning means as shown in FIGS. 64 to 67, inclusive, and in FIG. 89A.

The Power Means And Power Transmission Means For The Main Movable Endless Or Rotary Turntable Carrier 129

The power means and power transmission means for the main movable endless or rotary turntable carrier 129 includes the central vertical supporting shaft 155, on which the main movable endless or rotary turntable carrier 129 is mounted, and a main driving gear 432 for the main movable endless or rotary turntable carrier 129 which is attached to the supporting shaft 155 (FIG. 89). This main driving gear 432 meshes with a smaller and speed-reducing gear 433 which is carried by a two part vertical shaft 434–626 on which a gear 435 is mounted, the two parts 434 and 626 of the shaft 434–626 being interconnected by a shear pin and safety clutch unit 627 (FIG. 89). The gear 435 meshes with a gear 436 which is attached to a horizontal shaft 437 which is operatively connected to a speed-reducing gear train unit 438 which, in turn, is connected to a horizontal drive shaft 439. The horizontal drive shaft 439 carries a pulley 440 which is driven by a belt 441 which engages with a pulley 442 which is carried by the drive shaft 443 of the main electric operating motor 444 for the power transmission system 431 for the new machine 125; all of such parts being suitably mounted and journaled in the main body portion 127 of the supporting frame 126.

In the use of the new machine 125, when the electric control circuit (FIG. 90) and the main operating motor 444 are energized, power is delivered by the main operating motor 444 through the motor shaft 443, pulley 442, belt 441, pulley 440, shaft 439, speed-reducing gear train 438, shaft 437, gear 436, gear 435, shaft 434–626, gear 433, and gear 432 to rotate the vertically extending supporting shaft 155 for the main movable endless or rotary turntable carrier 129 which is thus rotated (clockwise, FIGS. 1 and 89), with the handle stick-gripping and apple-holding devices 130 and attached chuck units 138 mounted thereon, relative to the stationary cam track member 160 and the other parts and devices hereinbefore described.

The power means and power transmission 431 for the main movable endless or rotary turntable carrier 129 are so designed that the speed of rotation thereof is preferably in the order of approximately 7 revolutions per minute.

The Power Means And Power Transmission Means For The Rotary Impeller 186–610 In The Handle Stick Storage Hopper 134–614

The power means and power transmission means for the rotary impeller 186–610 in the handle stick storage hopper 134–614 have been partially described hereinbefore in connection with the description of the means for operating the handle stickejecting and inserting push rod member 199-200, for ejecting handle sticks 136 one at a time from the handle stick storage hopper 134-614 (FIGS. 23, 24, 25, 25A, 28 and 29) and inserting them into the chuck units 138, and includes the sprocket chain 195, the sprocket gear 194, the shaft 191 which carries the sprocket gear 194, the gear 190 on the vertically extending shaft 191, the gear 189 on the shaft 187, shaft 187, which carries the rotary impeller 186-614, shaft 447, sprocket gear 445 on shaft 447 which meshes with sprocket chain 195, and gear 448 on shaft 447 which meshes with the main driving gear 432 for the main endless or rotary turntable 129 (FIGS. 23 and 89).

The power transmission means for the rotary impeller 186-610 in the storage hopper 134-614, as described above, is such that when the main drive gear 432 for the main movable endless or rotary turntable carrier 129 is rotated, power is transmitted therefrom through the gear 448, shaft 447, sprocket gear 445, sprocket chain 195, sprocket gear 194, shaft 191 and gears 190-189 to the supporting shaft 187 to rotate the rotary impeller 186-610 in the handle stick storage hopper 134-614 and thus urge the handle sticks 136 in the handle stick storage hopper chute 614 downwardly toward the bottom wall 183 thereof and into a position to be ejected, one at a time, from the handle stick storage hopper 134-614 through the discharge opening 196, by the handle stick-ejecting and inserting push rod member 199-200, into the handle stick-gripping chuck units 138 of the handle stick-gripping and apple-holding devices 130 (FIGS. 23, 24, 25, 25A, 26 and 29).

The Power Means And Power Transmission Means For The Movable Endless Or Rotary Turntable Apple Carrier 131

The power means and power transmission means for the movable endless or rotary turntable apple carrier 131 are shown in FIGS. 1B, 2, 2A, 18 and 89, and include a vertically extending supporting shaft 170 on which the movable endless or rotary turntable apple carrier 131 is mounted, and the main driving gear 172 on the shaft 170. The main driving gear 172 for the movable endless or rotary turntable apple carrier 131 meshes with a smaller and speed-reducing gear 449 which is carried by a vertical shaft 450 which carries a gear 451 at its lower end and this gear 451 meshes with a gear 452 on a horizontal shaft 453. The horizontal shaft 453 carries a gear 454 which meshes with a gear 455 on the vertically extending drive shaft 434-626 (FIG. 89).

The power means and power transmission means for the movable endless or rotary turntable apple carrier 131, as just described, are such that when the drive shaft 434 for the main driving gear 432 for the main movable endless or rotary turntable carrier 129 is rotated, as described above, power is transmitted by way of the drive shaft 434-626, gears 545-455, shaft 453, gears 542-451, shaft 450 and gear 449 to the main driving gear 172 for the movable endless or rotary turntable apple carrier 131 which is thus rotated (counterclockwise, FIGS. 2 and 89) in timed relationship with the rotation of the main movable endless or rotary turntable carrier 129. Thus, the power transmission means for the movable endless or rotary turntable apple carrier 131, as just described, is such that the preferred speed of rotation thereof is approximately 7 revolutions per minute.

The Power Means And Power Transmission Means For The Means 139 For Operating The Pressure-Applying Head 266 At The Second Or Apple Pick-Up Work Station (FIGS. 42, 45-47 and 89)

The power means and power transmission means for the means 139 for operating the pressure-applying head 266 for lowering the handle stick-gripping and apple-holding devices 130 and attached chuck units 138, and the handle sticks 136 carried thereby (FIGS. 42, 45-47 and 89) so as to insert the handle sticks 136 into the apples 133 at the second and apple pick-up work station, includes the power shaft 276 which is rotatably mounted in the main body 127 of the supporting frame 126 and is operatively connected to the speed-reducing gear train unit 438 (FIG. 89), and the eccentric cam 275 on the shaft 276. Hence when power is delivered from the main operating motor 444 for the machine 125 power is supplied by way of the shaft 443, sprocket gear 442, sprocket chain 441, sprocket gear 440, shaft 439, speed-reducing gear train unit 438, shaft 276 and the eccentric cam 275 thereon to operate the operating mechanism 139 shown in FIGS. 42, 45-47 and 89 for the pressure-applying head 266 to lower the pressure-applying head into engagement with the upper surface of the knurled knob 263 on the shaft 227 and thus lower the handle stick-gripping and apple-holding device 130 and the handle stick-gripping chuck unit 138 attached thereto, and the handle stick 136 held thereby, so as to insert the handle stick 136 into the core of an apple 133 at the second and apple pick-up work station, as hereinbefore described in connection with FIGS. 42, 45-47 and 89.

The Power Means And Power Transmission Means For the Means 293 For Operating The Pressure-Applying Head 292 at the Fourth And Caramel Coating Work Station (FIGS. 54, 55-60 and 63 and 89)

The power means and the power transmission means for the means 293 for operating the pressure-applying head 292 at the fourth and caramel-coating work station (FIGS. 54, 55-60 and 63 and 89) includes the drive shaft 276, described above, and the eccentric cam 306 thereon (FIG. 89). Hence when the drive shaft 276 is operated, as described above in connection with the power means and power transmission means for the operating means 139 for the pressure-applying head 266 (FIGS. 42, 45-47), the eccentric cam 306 is rotated to operate the operating means 293 for the pressure-applying head 292 to lower the pressure-applying head 292 into engagement with the upper surface of the knurled knob 263 on the shaft 227 and thus lower the handle stick-gripping and apple-holding devices 130 and attached chuck units 130, and the handle sticks 136 and apples 133 carried thereby, into the caramel container vat or tank 141, as described above in connection with FIGS. 54, 55-60 and 63 and 89).

The Power Means And Power Transmission Means For The Hydraulic Lifting Means For The Caramel Container Vat Or Tank 141-328

The hydraulic circuit for the hydraulic lifting means 142 for the caramel container vat or tank 141-328 is shown in FIG. 78A as described above, and the power transmission means therefor is also partially shown in FIG. 78A (left hand side), is further shown in FIG. 89, and includes the hydraulic pump 351, its drive shaft 456, a sprocket gear 457 on the pump shaft 456, the sprocket chain 458 which engages a sprocket gear 459 on a horizontally extending drive shaft 460, and a gear 461 which meshes with a gear 462 on the vertically extending drive shaft 434 for the main movable endless or rotary turntable carrier 129 (FIG. 89).

The power means and power transmission means for the hydraulic pump 351 for the hydraulic lifting means 142, as described above, are such that when power is applied to the vertically extending drive shaft 434-626 for the main movable endless or rotary turntable carrier 129, as described above, power is then also applied, by way of the drive shaft 434-626, gears 462-461, shaft 460, sprocket gear 459, sprocket chain 458 and sprocket gear 457 to the drive shaft 456 of the hydraulic pump 351 so as to circulate oil or like hydraulic fluid through the hydraulic system (FIG. 78A) for the hydraulic lifting means 142 for the caramel container vat or tank 141-328 and the heating 143 carried thereby, as described above.

The Power Means And Power Transmission Means For Rotating The First Crushed Nut Tray Or Receptacle 146

The power means and power transmission means for rotating the first crushed nut tray or receptacle 146 are partially shown in FIGS. 1B, 2A, 68 and 69, and are further shown in FIG. 89, and include the main vertically extending supporting shaft 322 on which the first crushed nut tray or receptacle 146 is mounted (FIGS. 1B and 2A). The supporting shaft 322 has a gear 463 mounted on the lower end portion thereof and this gear 463 meshes with a gear 464 on a horizontal shaft 465 which carries a sprocket gear 466, and a sprocket chain 467 works over the sprocket gear 466. This sprocket chain 467 also works over a sprocket gear 468 which is attached to the shaft 460, and the shaft 460 carries a gear 461 which meshes with a gear 462 on the main drive shaft 434-626 for the main movable endless or rotary turntable carrier 129 (FIG. 89).

The power means and power transmission means for the first crushed nut tray or receptacle 146, as just described, are such that when the main driving shaft 434-626 for the main movable endless or rotary turntable carrier 129 is operated, as described above, power is transmitted by way of the drive shaft 434-626, gear 462, gear 461, shaft 460, sprocket gear 468, sprocket chain 467, sprocket gear 466, shaft 465, and gears 464 and 463 to the vertically extending supporting shaft 322 for the first crushed nut tray or receptacle 146 so as to rotate the latter; the power transmission means for the first crushed nut tray or receptacle 146 being such that the crushed nut tray or receptacle 146 is preferably rotated at a speed in the order of approximately 14 revolutions per minute.

The Power Means And Power Transmission Means For The Nut-Grinding Mechanism 153 In The Nut Storage Hopper 150-152

The power means and power transmission means for the nut-grinding mechanism 153 in the nut storage hopper 150-152 have been partially described hereinbefore in connection with the description of the nut-grinding mechanism 152 and the clutch mechanism 369 therefor (FIGS. 79, 80, 81, 81A and 82 to 88, inclusive) and include the sprocket chain drive member 368 for the power shaft 359 and the combination sprocket gear and clutch disc member 370 on the power shaft 359 and over which the sprocket chain drive member 368 works, and a sprocket gear 369 on the shaft 460 over which the sprocket chain drive member 368 also works.

The power means and power transmission means for the drive shaft 359 for the nut-grinding mechanism 153, as just described, are such that when power is delivered to the main drive shaft 434-626 for the movable endless or rotary turntable 129, power is transmitted from the drive shaft 434-626 by way of the gears 462-461, shaft 460, sprocket gear 469, sprocket chain drive member 368, the combination sprocket gear and clutch disc member 363-370 and the clutch disc member 371 to the power shaft 359 for the nut-grinding mechanism 153 to operate the latter, in the manner described above.

The Power Means And Power Transmission Means For Rotating The Final Receiving And Second Ground Nut Tray Or Receptacle 148

The power means and power transmission means for rotating the final receiving and second ground nut tray or receptacle 148 for the caramel-coated and ground nut-coated apple candy confections are partially illustrated in FIG. 70, and is further shown in FIG. 89, and include the main vertically extending supporting shaft 326 on which the receiving tray or receptacle 148 is mounted. This supporting shaft 326 has a gear 470 mounted on the lower end portion thereof and this gear 470 meshes with a gear 471 which is mounted on a horizontal shaft 472, the shaft 472 carrying a gear 473 which meshes with the gear 461 on the shaft 460.

The power means and power transmission means for the final receiving and second ground nut tray or receptacle 148 for the caramel-coated and nut-coated apple candy confections, as just described, are such that when power is transmitted to the main driving shaft 434-626 for the main movable endless or rotary turntable carrier 129, power is delivered by way of the gears 462-461-473, shaft 472, and gears 471-470 to rotate the main supporting shaft 326 and the final receiving and second ground nut tray or receptacle 148 for the caramel-coated and ground nut-coated apple candy confections.

THE ELECTRICAL CONTROL AND OPERATING CIRCUIT (FIG. 90)

The electrical control and operating circuit for the new machine 125 is shown schematically in FIG. 90, wherein it is generally indicated at 424, and includes a power inlet source 474 which is adapted to be connected to a suitable source of electrical power such as a 220 volt line, and a manually operable master control switch 475, one side of which leads, by the lines 476-477-478 to one side of the main electrical driving motor 444 for the new machine 125.

Lines 479 and 480 lead from the lines 478 and 477, respectively, to the motor 409 which drives the spinning mechanism 145 for removing excess caramel from the caramel-coated apples 133 (FIGS. 1, 2, 64 to 67, inclusive, and 89A) and a line 481 leads from the line 476 to the motor 409. A line 482-593 leads from the line 480 to one side of the solenoid motor 285 which operates the handle stick reject mechanism 287 (FIGS. 48-53), and a line 594-595 leads from the microswitch control unit 287 for the solenoid 285 to the line 481.

A line 596 leads from the line 482 to one side of the solenoid motor 381 which control the clutch mechanism 369 for the nut-grinding mechanism 153. The other side of the solenoid 381 is connected to one side of the microswitch control unit 385 for the solenoid 381, the other side of the microswitch unit 383 being connected by a line 597-598-595 to the line 481. A line 599 leads from the line 596 to one side of a manual control switch 588 for the two-way solenoid valve 349 for the hydraulic circuit 420 for the lifting cylinder 339 for the caramel container vat or tank 141-328, and a line 600 leads from one side of the manual control switch 588 to one side of an automatic switch 601 for the two-way valve 349. A line 602 leads from one side of the automatic switch 601 to one side of the two-way valve 349 and a line 603-604 leads from the other side of the two-way valve 349 to the other side of the manual control switch 588 therefor, and a line 603-605 leads from the two-way valve 349 to the line 598 (FIG. 90).

The operating and control 424 for the new machine 125, as shown in FIG. 90, is such that when the circuit is energized to deliver power to the main operating motor 444, by way of the power inlet source 474, switch 475, and the line 476-477-478, power is also delivered by way of the line 479-480-481 to the operating motor 409 for the caramel spin-off mechanism 145 (FIGS. 64-67). At the same time power is delivered by way of the line 481-482-593-285-288-287-594-595 to energize the solenoid 285 for the unloaded handle stick reject mechanism (FIGS. 48-53), and when the microswitch unit 383-384 is closed power is delivered by way of the line 480-481-96-381-383-384-387-597-598-595-481 to energize the solenoid 381 which controls the throw out for the clutch mechanism 369 for the nut-grinding mechanism 153 (FIGS. 79-88), as described herebefore.

Likewise, upon energization of the operating and control circuit 424 (FIG. 90) power is delivered by way of the line 481-482-99 to one side of the manual control switch 588 for the two-way valve 349, and power is delivered by way of the line 481-482-599-600 to one side of the manually operable control switch 601 for the two-way valve 349; thence by way of the line 602 to one side of the main automatic control switch 307-606 for the two-way valve 349; and thence by way of the line 603-605-598-595 from the other side of the two-way valve 349 to the line 481, as shown in FIG. 90.

THE TIMING SEQUENCE OF THE OPERATIONS PERFORMED BY THE MACHINE (FIGS. 14 AND 91)

The timing sequence of the various operations performed by the new coated apple confection making machine 125 are shown in the chart illustrated in FIG. 14, and in the timing chart shown in FIG. 91 wherein the horizontal bar graphs numbered 1 to 7 inclusive, represent the approximate time intervals at which and during which the various operations performed by the machine are carried out in relation to one complete revolution 360° of the main movable endless or rotary turntable carrier 129.

Thus it will be noted (bar graph 1 in FIG. 91) that the operation of inserting a handle stick 136 into the handle stick-gripping chuck unit 138 of each of the handle stick-gripping and apple-holding devices 130 at the first work station (FIG. 91) takes place toward the end of the first 80° of one cycle of revolution of the main movable endless or rotary turntable and requires a time interval of approximately 2.5° of a cycle of revolution of the said main movable endless or rotary turntable carrier 129, as shown by the cross-hatched outer end portion 483 of bar graph 1 (FIG. 91).

As shown by bar graph 2 (FIG. 91) the operation of inserting a handle stick 136 into the core of an apple 133 at the second or apple pick-up work station takes place during the next succeeding approximately 40° of one cycle of revolution of the main movable endless or rotary turntable carrier 129 and requires a time interval of approximately 2.5° of revolution of the said main movable endless or rotary turntable carrier 129, as shown by the cross-hatched outer end portion 484 of bar graph 2 (FIG. 91).

The operation of ejecting an unloaded handle stick 136 from the handle stick-gripping chuck unit 138 of one of the handle stick-gripping and apple-holding devices 130 at the third work station (FIGS. 14 and 91), in the event that an apple 133 is not picked up by the handle stick 136, for any reason, takes place in the next approximately 20° of a cycle of revolution of the main movable endless or rotary turntable carrier 129 following the second or apple pick-up or receiving work station (FIG. 91) and, as shown by the cross-hatched outer end portion 495 of bar graph 3 (FIG. 91), requires a time interval of approximately 2.5° of one cycle of revolution of the main movable endless or rotary turntable carrier 129 for completion.

The caramel-coating operation at the fourth work station (FIG. 91) takes place during approximately the next 80° of one cycle of revolution of the main movable endless or rotary turntable carrier 129, following the third or handle stick reject work station and, as shown by the cross-hatched outer end portion 496 of bar graph 4, requires a time interval equal to approximately 25° of one cycle of revolution of the main movable endless carrier 129 for completion (FIG. 91).

As shown by bar graph 5 (FIG. 91) the operation of removing the excess caramel from the caramel-coated apple 133 at the fifth work station (FIG. 91) takes place immediately following the caramel-coating operation at the fourth work station (bar graph 4) and requires a time interval equal to approximately 20° of one cycle of revolution of the main movable endless or rotary turntable carrier 139 for completion, as shown by the cross-hatched outer end portion 499 of bar graph 5 (FIG. 91).

The first operation of coating the caramel-coated apples with ground nuts, at the sixth work station, commences approximately 40° of revolution following the removal of the excess caramel from the caramel-coated apples at the fifth work station, and, as shown by the cross-hatched portion 498 of bar graph 6 (FIG. 91), requires a time interval equal to approximately 30° of one revolution of the main movable endless or rotary turntable carrier 129 for completion.

As shown by bar graph 7 in FIG. 91, the release of the caramel-coated and ground nut-coated apples 133 from the handle stick-gripping and apple-holding devices 130, and attached chuck units 138 embodied therein at the seventh work station, follows the first ground nut coating operation (at the sixth work station) and, as shown by the cross-hatched portion 499 of bar graph 7, requires a time interval equal to approximately 2.5° of one revolution of the main movable endless or rotary turntable carrier 129 for completion.

RESUME OF THE OPERATION OF THE NEW COATED APPLE CONFECTION MAKING MACHINE

As explained hereinbefore, when the main control switch 475 is closed to the operating and control circuit 424, shown in FIG. 90, the main driving motor 444 is energized and acts through the shaft 443, sprocket gear 442, sprocket chain 441, sprocket gear 440, shaft 439, speed-reducing gear mechanism 438, shaft 437, gears 436–435, driving shaft 626–434 and gears 433–432 to rotate the vertically extending supporting shaft 155 for the main movable endless or rotary turntable carrier 129 and the handle stick-gripping and apple-holding devices 130, and attached handle stick-gripping chuck units 138 carried thereby, in a clockwise direction as seen in FIG. 2, as indicated by the arrows on the main driving gear 432 (FIG. 89).

As the main movable endless or rotary turntable carrier 129 and attached handle stick-gripping and apple-holding devices 130 and attached chuck units 138 are thus rotated, the handle stick-gripping and apple-holding devices 130, and attached handle stick-gripping chuck units 138, are rotated sequentially into the first work station adjacent the handle stick storage hopper 134–614. As each of the handle stick-gripping and apple-holding devices 130, and attached handle stick-gripping chuck units 138, approaches the first work station, and the handle stick storage hopper 134–614 the cam follower 158 on the supporting arm 157 of the supporting means 156 by which the handle stick-gripping and apple-holding devices 130 and attached handle stick-gripping chuck units are pivotally mounted on the main movable endless or rotary turntable carrier 129, engages the vertically extending cam surface "a" on the riser 161 in the stationary cam track member 160, (FIG. 5), thereby pivoting the handle stick-gripping and apple-holding devices 130 and its attached handle stick-gripping chuck unit 138, at 229, on the supporting means 156–157 into a generally horizontal position, as in FIG. 26. As the handle stick-gripping chuck unit 138 thus approaches the first work station, and the handle stick storage hopper 134, the handle stick-gripping chuck unit 138 engages the depending operating arm 218 of the control means 211 for the handle stick-inserting mechanism 201, which is shown in FIGS. 23, 24, 25, 25A, 26, 28 and 29. At this time the generally annular-shaped or disc-shaped flange 246 on the slidable cam-operating sleeve 245 of the handle stick-gripping chuck unit 138 rides against and engages the stationary cam plates 264 on the side wall 179 of the handle stick storage hopper 134–614, thereby sliding the cam-operating sleeve 245 and its attached annular-shaped flange 246 axially on the generally tubular-shaped body 243 of the handle stick-gripping chuck unit 138, and thereby moving the slidable cam-operating member 249–250–251 in the slot 248 of the generally tubular body 243 of the handle stick-gripping chuck unit 138, and the connecting link member 252, into position to pivot the handle stick-gripping cam member 255–259, at 257 (counterclockwise, FIG. 39), into open or handle stick-receiving position, as in FIGS. 37 and 38 of the drawings. During this operation the control means 211 for the handle stick-inserting mechanism 201, including the generally U-shaped control member 212, is rocked or pivoted upwardly by engagement of the chuck unit 138 with the depending arm 218, thereby moving the depending stop arm 216 of the U-shaped member 212 out of the path of travel of the slide block member 205 on the slidable carrier member 201 for the handle stick ejecting and inserting push rod member 199. The coil spring 207 then acts, through the pin 206 and the slide block member 205, to move the slidable carrier member 201 in the guideway 203, thereby sliding the handle stick ejecting and inserting push rod member 199–200 through the opening 200 in the side wall 180 of the handle stick storage hopper 134–614

(FIG. 29) and into engagement with a handle stick 136 disposed on the bottom wall 181 of the chute 614 of the handle stick storage hopper 134-614 whereupon the handle stick 136 is projected through the discharge outlet 196 in the side wall 179 of the storage hopper 134-614 into the handle stick-receiving cavity 261 of the generally tubular body 243 of the handle stick-gripping chuck unit 138 (FIGS. 23, 26, 29 and 41).

As the handle stick-gripping and apple-holding device 130 and attached handle stick-gripping chuck unit 138 are rotated, by the main movable endless or rotary turntable carrier 129, away from the first work station and the handle stick storage hopper 134-614, the then tensioned coil spring 247 on the generally tubular body 243 of the handle stick-gripping chuck unit 138 slidably moves the U-shaped cam-operating member 249-250-51 and the cam-operating sleeve 245 and its annular flange 246 axially outwardly on the main supporting and operating shaft 227 of the handle stick-gripping and apple-holding device 130, and this movement of the parts 249-250-51 and 245-246 acts, through the connecting link member 252, to pivot the handle stick-gripping cam member 255-259, at 257, back into handle stick-gripping position, as in FIGS. 35-36, 39-40 and 41, thereby attaching the handle stick 136 to the handle stick-gripping chuck unit 138.

After a handle stick 136 has thus been ejected by the handle stick ejecting and inserting push rod member 199 out of the chute 614 of the handle stick storage hopper 134-614 into the handle stick-gripping chuck unit 138, the rotary cam 222 on the vertical shaft 191 acts, through the cam follower 223 and its supporting shaft 224, to return the slide block member 205, the slidable carrier member 201, and the handle stick ejecting and inserting push rod member 199, which is mounted on the slidable carrier member 201, back to their initial position, as shown in FIGS. 23, 24, 25 and 29, against the action of the coil spring 207 which is again tensioned during this movement. At the end of this operation the resetting spring 225 pivots or rocks the generally U-shaped control member 212 and its depending arms 218 and 216 back into their initial position, as shown in FIGS. 23, 24, 25, 27 and 29, and during this movement the depending stop arm 216 moves in front of the slide block 205 to hold the slide block 205, and the slidable carrier member 201, and the handle stick ejecting and inserting push rod member 199 carried thereby against movement by the tensioned coil spring 207 until the next cycle of this phase of the operation of the machine 125 is repeated.

During the handle stick ejecting and inserting operation, as described above, the vertical drive shaft 191 for the cam 222 and the rotary impeller 186-610 on the horizontal shaft 187 in the handle stick storage hopper 134-610 are driven by the power means and power transmission means therefor, shown in FIG. 89, including the main driving gear 432 for the main movable endless or rotary turntable carrier 129, gear 448, shaft 447, sprocket gear 445, sprocket chain 195, sprocket gear 194, shaft 191, gears 190-189, and shaft 187 so as to rotate the rotary impeller 186-610 and urge the handle sticks 136 downwardly toward the bottom wall 183 of the chute 614 of the handle stick storage hopper 134-614 while, at the same time, rotating the vertical driving shaft 191 and the cam 222 attached thereto (FIG. 25).

After the handle stick-gripping and apple-holding device 130 and attached handle stick-gripping chuck unit 138 have thus picked up a handle stick 136 from the storage hopper 134-614, at the first work station in a cycle of operation of the main movable endless or rotary turntable carrier 129, the handle stick-gripping and apple-holding device 130 and attached handle stick-gripping chuck unit 138 are rotated, by the main movable endless or rotary turntable carrier 129, into the second work station to pick up an apple 133 from one of the apple-holding devices 132 on the movable endless or rotary turntable apple carrier 131 which, as described hereinbefore, is rotated counterclockwise, as seen in FIG. 2, by the power means and power transmission means therefor shown in FIG. 89 including the main drive shaft 434-626 for the main movable endless or rotary turntable carrier 129, gears 455-454, shaft 453, gears 452-451, shaft 450, gear 449 and the main driving gear 172 which rotates the vertical supporting shaft 170 and the movable endless or rotary turntable apple carrier 131 mounted thereon.

As the handle stick-gripping and apple-holding device 130, and attached handle stick-gripping chuck unit 138 attached thereto, are rotated by the main movable endless or rotary turntable carrier 129 into the second work station, the cam follower 158 on the supporting arm 157 rides onto and over the upper cam surface "b" of the dwell 162 of the stationary cam track member 160 (FIG. 6), and thus pivots the handle stick-gripping and apple-holding device 130, and attached handle stick-gripping chuck unit 138, and the handle stick 136 carried thereby, at 229, into a generally vertical position, as shown in FIG. 42. Thus, when the vertically extending handle stick gripping and apple-holding device 130, and attached handle stick gripping chuck unit 138, and the handle stick 136 carried thereby, reach the second or apple pick-up work station, the operating means 139 shown in FIGS. 42, 44 and 45 to 47, inclusive, for slidably moving the main supporting and operating shaft 227 of the handle stick-gripping and apple-holding device 130, and attached chuck unit 138, downwardly in and relative to the stationary tubular sleeve member 228 on the supporting arm 157, acts to move the supporting arm 267-268 and the pressure-applying head 266 carried thereby downwardly in the opening 269 of the wall 270, as described hereinbefore, in connection with the operation of this mechanism, as shown in FIGS. 42, 44 and 45 to 47, inclusive, so that the pressure-applying head 266 engages the upper surface of the knurled knob 263 on the shaft 227, and the pressure of the pressure-applying head 266 on the upper surface of the knurled knob 263 slides the main supporting and operating shaft 227 of the handle stick-gripping and apple-holding device 130, and attached chuck unit 138, and the handle stick 136 carried thereby, downwardly in and relative to the relatively stationary tubular sleeve 228 which is carried by the supporting arm 157, and thus inserts the handle stick 136 into the core of an apple 133 disposed in one of the apple-holding devices 132 on the movable endless or rotary turntable apple carrier 131, at the second or apple pick-up work station.

As explained hereinbefore, the power means and power transmission means for the first pressure-applying means 139 for moving the main supporting and operating shaft 227 of the handle stick-gripping and apple-holding device 130, and attached chuck unit 138, in and relative to the relatively fixed tubular sleeve 228 on the supporting arm 157, includes the eccentric mechanism 275-274-273-271, and the arm 267-268 and the pressure-applying head 266 carried thereby, and the drive shaft 276, as shown in FIGS. 42 and 43 to 47, inclusive and 89.

After the handle stick-gripping and apple-holding device 130, and attached chuck unit 138, and the handle stick 136 carried thereby have thus picked up an apple 133 from one of the apple-holding devices 132 on the movable endless or rotary turntable carrier 131, at the second or apple pick-up work station, the then tensioned coil spring 240 on the main supporting and operating shaft 227 for the handle stick-gripping and apple-holding device 130, and attached chuck unit 138, and the handle stick 136 and the apple 133 carried thereby, raises the main supporting and operating shaft 227 for the handle stick-gripping and apple-holding device 130, and attached chuck unit 138, and the handle stick 136 and apple 133 held thereby, upwardly relative to the stationary sleeve 228, thereby lifting the apple 133 up out of the apple-holding device 132 on the movable endless or rotary turntable apple carrier 131.

After the handle stick-gripping and apple-holding device 130, and attached chuck unit 138, and the handle stick 136 carried thereby, have thus picked up an apple 133 at the second or apple pick-up work station, they are carried, by further rotation of the main movable endless or rotary turntable carrier 129, toward the next or third work station where the apple 133 on the handle stick 136 will engage the depending switch arm 288 of the microswitch unit 287 and thus energize the solenoid 285, and its operating circuit (FIG. 90). When the solenoid 285 is thus energized it acts, through the solenoid plunger arm 279, to slidably retract the pressure-applying head member 281 in the opening 280 in the wall 270 of the lower supporting frame portion 126 (FIG. 17), out of the path of travel of the apple 133 carried by the handle stick 136, into the position in which the parts are shown in FIG. 53.

However, if for any reason the handle stick-gripping and apple-holding device 130, and the handle stick-gripping chuck unit 138 attached thereto, and the handle stick 136 carried thereby, fail to pick up an apple 133 at the second or apple pick-up work station, as the handle stick-gripping and apple-holding device 130 and attached chuck unit 138 move into the third or unloaded handle stick reject work station they will pass by and not actuate the depending switch arm 288 of the microswitch unit 287 (FIGS. 48, 49, 50 and 53). The generally annular-shaped disc or flange 246 on the chuck unit 238 will then ride over the upper surface of the head 281 on the solenoid arm or plunger 279, which causes the generally annular flange or disc 246 on the cam-operating sleeve 245 of the chuck unit 138 to be raised on and relative to the main supporting and operating shaft 227 of the handle stick-gripping and apple-holding device 130, against the action of the coil spring 240, thus moving the handle stick-gripping chuck unit 138 into open position, as shown in FIGS. 37 and 38 and 51, and thereby discharging the unloaded handle stick 136 into the guide chute 289 and thence into the receptacle 290 for the unloaded and thus rejected handle sticks 136.

As the main movable endless or rotary turntable carrier 129 and attached handle stick-gripping and apple-holding device 130, and attached chuck unit 138, and the handle stick 136 and the apple 133 carried thereby, leave the third or unloaded handle stick reject work station, the cam follower 158 on the supporting arm 157 engages the vertically extending and radially inner cam surface "d" of the riser 164 of the stationary cam track 160 (FIG. 8), and thus pivots the handle stick-gripping and apple-holding device 130, and attached chuck unit 138, and the handle stick 136 and the apple 133 carried thereby, at 229, on the supporting means 157–230, into a generally horizontal position as in FIG. 62, above the caramel container vat or tank 141–328. Further rotation of the main movable endless or rotary turntable carrier 129, and of the handle stick-gripping and apple-holding device 130, and attached chuck unit 138, then causes the cam follower 158 on the supporting arm 157 to ride onto and over the horizontal upper cam surface "e" of the dwell 165 in the stationary cam track member 160 (FIG. 9), thereby pivoting the handle stick-gripping and apple-holding device 130, and attached chuck unit 138, and the handle stick 136 and the apple 133 held thereby, at 229, on the supporting means 157–230 into a generally vertical position above the caramel container vat or tank 141, prior to the position which these parts assume as shown in FIG. 63.

As the handle stick-gripping and apple-holding device 130, and attached chuck unit 138, and the handle stick 136 and apple 133 carried thereby, are thus moved into a generally vertical position above the caramel container vat or tank 141, the second pressure-applying means, shown in FIGS. 54 and 55 to 61, inclusive, for moving the main supporting and operation shaft 227 for the handle stick-gripping and apple-holding device 130, and attached chuck unit 138, downwardly in and relative to the fixed tubular sleeve 228 on the supporting arm 157, acts to move the slide bar 294 downwardly in its guideway 295 and thereby moves the pressure-applying head 292 thereon into engagement with the upper surface of the knurled knob 263 on the shaft 227, thereby slidably moving the main supporting and operating shaft 227 of the handle stick-gripping and apple-holding device 130, and the chuck unit 138 and handle stick 136, and the apple 133 carried thereby, against the action of the coil spring 240, downwardly in and relative to the fixed tubular sleeve 228 on the supporting arm 157, and thereby lowering the apple 133 into the caramel 144 in the caramel container vat or tank 141 to provide the apple 133 with a caramel coating.

The main supporting and operating shaft 227 of the handle stick-gripping and apple-holding device 130, and attached chuck unit 138, and the handle stick 136, and the caramel-coated apple 133 carried thereby, are then raised upwardly by the then tensioned coil spring 240, and during this operation the main operating and supporting shaft 227 slides upwardly in the fixed tubular sleeve 228 carried by the supporting arm 157, into the next and fifth work station and into the position in which the parts are shown in FIG. 67, and in which the knurled knob 263 on the main supporting and operating shaft 227 engages the spinning belts 312 of the spinning mechanism 145 shown in FIGS. 64 to 67, inclusive. The main supporting and operating shaft 227 of the handle stick-gripping and apple-holding device 130 and attached chuck unit 138, and apple stick 136, and the caramel-coated apple 133 carried thereby are then rotated in and relative to the fixed tubular sleeve 228 of the supporting arm 157 by engagement of the spinning belts 312 of the spinning mechanism 145 with the knurled knob member 263 on the main supporting and operating shaft 227. During this operation the spinning belts 312 are operated by the power means and power transmission means therefor, shown in FIGS. 64, 65, 66 and 89A, as hereinbefore described.

After the removal of the excess caramel from the caramel coated apple 133 at the fifth work station, as described above, further rotation of the main movable endless or rotary turntable carrier 129 rotates the handle stick-gripping and apple-holding device 130, and attached chuck unit 138, and the handle stick 136 and the caramel-coated apple 133 carried thereby, toward the next and sixth work station in the cycle of rotation of the main movable endless or rotary turntable carrier 129. During this operation the cam follower 158 on the supporting arm 157 rides off the upper cam surface "f" of the dwell 166 in the stationary cam track member 160 (FIG. 10) and engages the radially inner vertically extending cam surface "g" on the riser 167 of the stationary cam track 160 (FIGS. 11 and 68). This action pivots the handle stick-gripping and apple-holding device 130, and attached chuck unit 138, and the handle stick 136, and the caramel-coated apple 133 carried thereby, at 229, into a generally horizontal position above the first ground nut tray or receptacle 146, as shown in FIG. 68. However, further rotation of the main movable endless or rotary turntable carrier 129, and the handle stick-gripping and apple-holding device 130, and attached chuck unit 138, and the handle stick 136, and the caramel-coated apple 133 carried thereby, causes the cam follower 158 on the supporting arm 157 to engage the inclined radially inner cam surface "h" of the angularly extending riser 168 of the stationary cam track member 160, thereby pivoting the handle stick-gripping and apple-holding device 130, and attached chuck unit 138, and handle stick 136, and the caramel-coated apple 133 carried thereby, at 229, into a position at an acute angle relative to the horizontal and into a position over the first ground nut tray or receptacle 146, and thereby moving the caramel-coated apple 133 into contact with the ground nuts 147 in the first ground nut tray or receptacle 146, as shown in FIG. 69.

As the caramel-coated apple 133 is thus moved into and through the first ground nut tray or receptacle 146, and in contact with the ground nuts 147 therein, by continual rotation of the main movable endless or rotary turntable carrier 129, the knurled knob member 263 of the main supporting and operating shaft 227 engages the inclined member 411 (FIGS. 1, 69 and 69A) and this engagement of the parts 263 and 411 rotates the main supporting and operating shaft 227, and the handle stick-gripping chuck unit 138, and the handle stick 136 and caramel-coated apple 133 carried thereby, in the ground nuts 147 of the first ground nut tray or receptacle 146 so as to provide an intimate contact between the caramel-coated apples 133 and the ground nuts 147 and thus assure as far as possible, that the caramel-coated apples 133 are provided with an adequate coating of ground nuts 147 in the first ground nut tray or receptacle 146 at the first ground nut coating and sixth work station.

During the first ground nut coating operation, as described above, the first ground nut tray or receptacle 146 is rotated on its supporting shaft 322 by the power and power transmission means therefor, shown in FIG. 89, including the main driving shaft 434-626 for the main movable endless or rotary turntable carrier 129, gears 462-461, shaft 460, sprocket gear 468, sprocket chain 467, sprocket gear 466, shaft 465, gears 464-463 and the vertically extending supporting shaft 322 on which the first ground nut tray or receptacle 146 is mounted. This rotation of the first ground nut tray or receptacle 146 at the first ground nut coating and sixth station assures a good contact between the caramel-coated apples 133 and the ground nuts 147 in the first ground nut tray or receptacle 146, and thus assures an adequate coating of ground nuts 147 on the caramel-coated apples 133.

After the caramel-coated apples 133 have thus been provided with a first coating of ground nuts 147 in the first ground nut tray or receptacle 146, at the sixth work station and first ground nut coating work station, in a cycle of rotation of the main movable endless or rotary turntable carrier 129, further rotation of the main movable endless or rotary turntable carrier 129 and the handle stick-gripping and apple-holding device 130, and attached chuck unit 138, and the handle stick 136 and caramel-coated and ground nut-coated apple 133 carried thereby, causes the cam follower 158 on the supporting arm 157 to engage and rode over the upper horizontal cam surface "i" of the dwell 169 of the stationary cam track member 160, thereby pivoting the handle stick-gripping and apple-holding device 130 and attached chuck unit 138, and the handle stick 136 and the caramel-coated and ground nut-coated apple 133, at 229, on the supporting arm 157, into the generally vertical position in which the parts are shown in FIG. 71.

As the handle stick-gripping and apple-holding device 130 and attached chuck unit 138 and the handle stick 136 and caramel coated and ground nut coated apple 133 reach the seventh and final work station, in the cycle of rotation of the main movable endless or rotary turntable carrier 129, the camming head 420 on the pivoted lever arm 619 engages the lower surface of the generally annular or disc-shaped flange 246 on the cam-operating sleeve 245 of the chuck unit 138 as shown in FIGS. 71 and 71A, thereby sliding the cam-operating sleeve 245 of the chuck unit 138 upwardly on the generally tubular body 243 of the chuck unit 138, and thus moving the parts of the chuck unit 138 into open or handle stick-releasing position, as in FIGS. 37, 38 and 71, and thus discharging the handle stick 136 and the caramel-coated and ground nut-coated apple 133 attached thereto into the final receiving tray and second ground nut receptacle 148 where the apples 133 are given a further and additional coating of ground nuts 147

As the caramel-coated and ground nut-coated apples 133 are thus discharged into the final receiving and second ground nut tray or receptacle 148, the ground nuts tray or receptacle 148 is rotated on its supporting shaft by the power means and power transmission means therefor shown in FIG. 89, including the main drive shaft 434-616 for the main movable endless or rotary turntable 129, gears 462-461-473, shaft 472, gears 471-470 and the vertically extending shaft 326 which supports the final receiving and second ground nut tray or receptacle 148. During this operation of the final receiving and second ground nut tray or receptacle 148 the leveling member or scraper 415 maintains the supply of groundnuts in the final receiving and second ground nut tray or receptacle 148 generally level.

The additional coating of ground nuts 147 in the final receiving and second ground nut tray or receptacle 148 assures an adequate coating of the ground nuts on the caramel-coated and previously ground nut-coated apples 133 if, for any reason, the first coating of ground nuts 147 in the first ground nut tray or receptacle 146 has been inadequate or in the event that the caramel-coating on the apples 133 has not fully dried when the apples 133 are discharged into the final receiving and second ground nut coating tray 148.

As described hereinbefore, as the caramel 144 in the caramel container vat or tank 141 is consumed in use, and the level of the caramel therein drops, the hydraulic lifting means illustrated in FIGS. 72 to 77, inclusive and in 78A, operates in conjunction with the electrical operating and control circuit 424 (FIG. 90) including the two-way automatic valve 349 and its main automatic control switch 307-606 which is operated by the eccentric cam 275 on the shaft 276, to raise the piston 338, the piston rod 337 and the piston head 336 attached thereto, so as to raise the caramel container vat or tank 141-328, and its heating unit 143, which are mounted on and carried by the piston head 336 in small increments as the supply of caramel 144 in the caramel container vat or tank 141 is consumed in use, thus assuring that the apples 133 at the fourth or caramel-coating work station will be given an adequate coating of caramel 144.

After the caramel container vat or tank 141-328 has reached the upper limit of its travel, the two-way valve unit 349 may be deenergized either by opening the main manual control switch 588 or by opening the auxiliary manually operable control switch 601 for the two-way valve 349 (FIG. 90), thereby deenergizing the two-way valve 349 and thus inactivating the hydraulic control circuit 420 for the lifting cylinder 339 (FIG. 78A), and thereby causing the piston 338, piston rod 337, piston head 336 and the caramel container vat or tank 141-328 to drop by gravity into their lowered position, as described above, whereupon the supply of caramel 144 in the caramel container vat or tank 141-238 may be manually replenished.

During the raising and lowering movement of the caramel container vat or tank 141-328, and the heating unit 143 therefor, as described above, the caramel container vat or tank 141-328 and the heating unit 143 therefor, are guided by the guiding means shown in FIGS. 72, 74, 75, 76, 77 and 78, including the guide rod members 345 which work in the guide cylinders 343 and which carry the supporting member 335 and attached guiding members 346 and 347, as described hereinbefore.

As likewise described hereinbefore, a supply of nuts, such as peanuts, cocoanuts, or the like, is provided in the nut storage hopper 150 whereupon the nuts fall by gravity into the lower end or throat portion 152 of the nut storage hopper 150 and into engagement with the nut grinding rollers 357 and 358 of the nut grinding mechanism 153. When the electrical operating and control circuit for the main driving motor 444 for the machine 125 is energized, by closing the master control switch 445, as shown in FIG. 90, power is supplied to the power drive shaft 359 of the nut-grinding mechanism 153 by way of the power means and power transmission means for the nut-grinding mechanism 153 which is shown partly in FIGS. 82 to 88, inclusive, and in FIG. 89, and which includes the vertical drive shaft 434-626 for the main movable endless or rotary turntable carrier 129, gears 462-461, shaft 460, sprocket gear 469, sprocket chain 368, sprocket gear 370, and the power drive shaft 359 for the nut-grinding mechanism 153 which acts, through the gears 366 and 364 and the idler shaft 362, to drive the nut-grinding rollers 357 and 358, thereby grinding nuts in the lower end or throat portion 152 of the nut storage hopper 150. The ground nuts thus ground by the nut-grinding mechanism 153 thereupon fall, by gravity, into the auxiliary ground nut storage hopper or tray 151 from which they flow through the notched recesses 388 in the bottom edges of the side wall of the auxiliary nut storage hopper 151 into the first ground nut tray or receptacle 156 as the latter is rotated in use, as described above.

When the solenoid 381 and the electrical control and operating circuit therefor, as shown in FIG. 90, are energized, as described hereinbefore, the solenoid plunger 378 and attached lever arm 429 are retracted inwardly, to the right of the position in which the parts are shown in FIG. 83, thereby moving the clutch operating lever 375 counterclockwise from the position in which it is shown in FIG. 83, thus moving the flanged spool-shaped clutch control member 372 and the clutch mechanism into open or disengaged position, as in FIG. 85, and power transmission to the power shaft 359 for the nut-grinding mechanism 353 is thus cut off.

However, as the supply of ground nuts is fed from the nut-grinding mechanism 153 through the lower end or throat portion 152 of the nut storage hopper 150 into the auxiliary ground nut storage hopper 151, the ground nut level-responsive plate member 387-386 floats or rides loosely on the upper surface of the ground nuts in the auxiliary ground nut storage hopper 151. Thus, when the supply of ground nuts in the auxiliary ground nut storage hopper 151 is at a desired or predetermined level, the switch-operating rod 385, which has one end portion 590 thereof attached to the ground nut level-responsive plate member 387-386, is disposed in its upwardly extended position, out of contact with the movable switch member 384 of the microswitch unit 383 so that the electrical circuit to the solenoid 381, as shown in FIG. 90, is energized and the solenoid plunger 378 and attached lever arm 429 are moved relative to the position in which these parts are shown in FIG. 83, thereby moving the clutch control lever 375, and its attached yoke portion 376, and the flanged spool-shaped clutch member 372 are shown in FIG. 83, thus moving the combination flanged clutch control spool-shaped member 372 and attached clutch disc member 371, against the action of the coil spring 373, out of engagement with the combination sprocket gear and clutch disc member 370, and thus cutting off power transmission from the driving sprocket chain member 378, through the clutch mechanism 369, to the power shaft 379 for the nut-grinding mechanism 153.

As the supply of ground nuts in the auxiliary ground nut storage hopper 151 is consumed in use and the level thereof falls, the level-responsive plate member 387-386, and its attached switch operating rod 385, drop or fall with the level of the ground nuts in the auxiliary ground nut storage hopper 151, with the switch operating rod member 385 pivoting on the hinged plate member 592-427. During this operation the downward movement of the ground nut level-responsive plate member 387-386, and attached rigid switch operating rod arm 385, causes the switch operating rod 385 to engage the movable switch member 384 of the microswitch unit 383, thereby depressing the movable switch member 384 into position to open control circuit for the solenoid 381 (FIG. 90), in open circuit position. This contact between the rigid switch-operating rod member 385 and the movable switch member 384 of the microswitch unit 383 is maintained at all times, and the circuit to the solenoid 381 is maintained in open condition, as long as the ground nut level-responsive plate member 387-386 continues to fall and until it rises and reaches a point slightly above the predetermined desired level of ground nuts in the auxiliary ground nut tray or receptacle 151, whereupon the switch-operating rod 358 is moved slightly upwardly out of engagement with the movable switch member 384 of the microswitch unit 383, whereupon the movable switch member 384 moves into closed circuit position, thereby energizing the operating and control circuit for the solenoid 381, whereupon the solenoid plunger 378 and attached lever arm 429 will be drawn inwardly (to the right of the position in which the parts are shown in FIG. 83), thereby pivoting the clutch control lever 375; and its attached yoke portion 376, at 394, (counterclockwise from the position in which the parts are shown in FIG. 83), thus opening the clutch mechanism 369 and cutting off the power supply to the nut-grinding mechanism 153, as described hereinbefore.

As pointed out hereinbefore, as the combination flanged clutch control spool-shaped member 372 and attached clutch disc member 371 are moved on the power shaft 359 for the nut-grinding mechanism 153, the key member 421, which is attached to the combination flanged clutch control spool-shaped member 372 and to the clutch disc member 371, slides in the keyway 422 formed in the power shaft 359 for the nut-grinding mechanism 153 (FIGS. 85 and 85A).

MODIFICATION OF CERTAIN PARTS OF THE NEW COATED APPLE CANDY CONFECTION MAKING MACHINE

First Modification of the Handle Stick-Gripping Chuck Unit For the Handle Stick-Gripping And Apple-Holding Devices
(FIGS. 92 to 99)

A first modification of the handle stick-gripping chuck unit for the handle stick-gripping and apple-holding device is illustrated in FIGS. 92 to 99, inclusive, of the drawings, wherein it is generally indicated at 138a, and those parts thereof which correspond to parts of the handle stick-gripping chuck unit 138 shown in detail in FIGS. 35 to 41, inclusive, have been given similar reference numerals followed by the additional and distinguishing reference character "a."

In the modified form of chuck unit 138a shown in FIGS. 92 to 99, inclusive, a pair of handle stick-gripping jaw members 500 are provided and the outer end portion 501 of each of the same is pivotally connected, as 504, to the axially outer end portion 251a of one of a pair of generally U-shaped slidable cam-operating members 249a-250a-251a, each of which is slidably mounted in an axially extending slot 248a formed in the generally tubular shaped body 243a of the handle stick-gripping chuck unit 138a.

Each of the handle stick-gripping jaw members 500 has an axially inner end portion which is pivotally connected, as at 505, to the generally tubular-shaped body 243a of the handle stick-gripping and chuck unit 138a (FIG. 94).

The generally tubular-shaped body 243a has a centrally arranged internally threaded bore or cavity 242a for the attachment thereto of the externally threaded lower end portion of the main operating and supporting shaft 227 of one of the handle stick-gripping and apple-holding devices 130 (FIG. 41).

The internally threaded central bore or cavity 242a is separated by a transverse wall portion 262a of the generally tubular-shaped body 243a from the central handle stick-receiving bore or cavity 161a which is formed in the axially outer end portion of the generally tubular-shaped body 243 of the handle stick-gripping chuck unit 138a for the reception of a handle stick 136.

In the use of the modified form of the handle stick-gripping chuck unit 138a illustrated in FIGS. 92 to 99, inclusive, the coil spring 247a normally acts on the right-angularly extending arm 250a of the slidable cam-operating members 249a, and the connecting link members 503 to urge the handle stick-gripping jaw members 500 into closed and handle stick-gripping position, as in FIGS. 92-93-94-97-99, so that a handle stick, as 136, for an apple, as 133, may be held within the handle stick-receiving recess or cavity 261a in the generally tubular-shaped body 243a of the chuck unit 138a.

However, if and when the annular flange 246a on the slidable cam-operating sleeve 245a is engaged from its axially outer side, as at the first work station (FIG. 91), to open the chuck unit 138a for the reception of a handle stick 136 at the handle stick storage hopper 134, or first work station, or if the annular flange 246a is engaged from below at the third work station, to eject an unloaded handle stick 136 therefrom, or to eject a handle stick 136 and caramel-coated and ground nut-coated apple 133 therefrom, as at the seventh work station (FIG. 91), by any of the devices described hereinbefore, in connection with the form of the invention illustrated in FIGS. 1 to 91, inclusive, the slidable cam-operating sleeve 245a will be slidably moved on the generally tubular-shaped body 243a of the chuck unit 138a (from the closed position in which the parts are shown in FIGS. 92, 93, 94, 97 and 99) into the open position in which the parts are shown in FIGS. 95, 96, 98 and 99, against the action of the resetting coil spring 247a. This motion of the slidable cam-operating sleeve 245a and attached annular flange 246a acts, on the generally rightangularly extending arms 250a of the generally U-shaped cam-operating members 249a, to move the latter axially inwardly, and this motion of the slidable cam-operating members 249a acts, through the connecting link members 503, and their pivotal connections 504 and 502 to the slidable cam-operating members 249a and to the handle stick-gripping jaw members 500, respectively, to pivot the handle stick-gripping jaw members 500, at 505, into open position, as in FIGS. 95, 96, 98 and 99, thereby opening the handle stick-gripping jaw members 500 for the reception of a handle stick 136 or for releasing a handle stick, as 136, from position between the handle stick-gripping jaw members 500, so that the handle stick may fall from or be ejected from the handle stick-receiving cavity 261a in the generally tubular-shaped body 243a of the handle stick-gripping chuck unit 138a, following which the coil spring 247a will act to return the parts 249a–503 and 500 to their normal or closed position, as in FIG. 92–94 and 97–99.

Second Modification of the Handle Stick-Gripping Chuck Units (FIGS. 100–105)

A second modification of the handle stick-gripping chuck units of the present invention is illustrated in FIGS. 100 to 105, inclusive, of the drawings, wherein it is generally indicated at 506, and comprises a generally tubular-shaped chuck body 507 which may be made of any suitable material such as flexible resilient metal, synthetic plastic resinous material, or the like.

The longitudinally outer end portion of the tubular body 507 of the chuck unit 506 is provided with a group, shown as four, longitudinally extending slots 508, thereby providing a plurality, shown as four, flexible, resilient handle stick-gripping jaw members 509, which project longitudinally outwardly from a handle stick-receiving cavity 514 which is formed in the tubular body 507 of the chuck unit 506, in the space between the handle stick-clamping jaw members 509 (FIGS. 101, 103, 104 and 105).

A camming sleeve 511 is slidably mounted on the tubular body 507 for movement longitudinally thereover and over and for camming movement over the flexible, resilient handle stick-gripping jaw members 509, and this slidable camming sleeve member 511 has a generally annular-shaped flange or disc 512 thereon which corresponds to the generally annular-shaped flange or disc 246 on the cam-operating sleeve 245 in the handle stick-gripping chuck unit 138 which is embodied in the form of the invention illustrated in FIGS. 1 to 91, inclusive.

The generally tubular-shaped body 507 has a generally cylindrical cavity or base 510 formed therein for the reception of the lower end portion of a main supporting and operating shaft of a handle stick-gripping and apple-holding device, and a threaded or tapped opening 608 is provided in the generally tubular-shaped body 507 of the chuck unit 506. A fastening element, in the form of a threaded bolt 513, is adapted to be threaded into the threaded opening 512 so as to attach the chuck unit 506 to the lower end portion of a main operating and supporting shaft of a handle stick-gripping and apple-holding device, such as the main supporting and operating shaft 227 of the handle stick-gripping and apple-holding device 130 which is embodied in the form of the invention illustrated in FIGS. 1 to 91, inclusive.

In the use of the modified form of handle stick-gripping chuck unit 506 shown in FIGS. 100 to 105, inclusive, the same be attached, as at 512–513, to the main supporting and operating shaft of a handle stick-gripping and apple-holding device, such as the shaft 227 in the form of the invention illustrated in FIGS. 1 to 91, inclusive. When so attached, a handle stick, as 136, may be inserted into the handle stick-receiving cavity 514, between the flexible, resilient handle stick-gripping jaw members 509, while the latter are in open or radially expanded position, as in FIGS. 100–101 and 104–105, with the slidable camming sleeve 511 and its annular flange 512 disposed in an axially inwardly retracted position, as in FIGS. 100–101 and 104–105.

However, when the slidable camming sleeve 511 and its annular flange 512 are moved longitudinally or axially outwardly (downwardly in use) into closed or handle stick-gripping position, in which the parts are shown in FIGS. 102 and 103, means, such as the operating means for the slidable cam-operating means for the slidable cam-operating sleeve 245 and its attached annular flange 246, in the form of the invention illustrated in FIGS. 1 to 91, inclusive, will engage and cause the slidable camming sleeve 511 to ride over the flexible, resilient handle stick-gripping jaw members 509 and thus force them radially inwardly into closed and handle stick-gripping position, as in FIGS. 102 and 103, so as to grip a handle stick, as 136, between the said flexible, resilient gripping jaw members 509, and in the handle stick-receiving cavity 514 therebetween.

In the use of the chuck unit 506, on a handle stick-gripping and apple-holding device, as 130, as in the form of the invention illustrated in FIGS. 1 to 91, inclusive, when the annular flange 512 is engaged from below by any of the operating devices, such as the operating devices for the slidable cam-operating sleeve 245 and attached annular flange 246 which are embodied in the form of the invention illustrated in FIGS. 1 to 91, inclusive, the slidable camming sleeve 511–512 will be slidably moved longitudinally inwardly (upwardly in use) from closed and handle stick-gripping position as in FIGS. 102 and 103, into open position, as in FIGS. 100–101 and 104–105, whereupon the flexible resilient handle stick-gripping jaw members 509 will separate or spread under the force of their own innate resiliency into open and handle stick-releasing position, as in FIGS. 100–101 and 104–105, thereby allowing a handle stick, as 136, with or without a caramel-coated and nut-coated apple 133 held thereby to drop or be ejected from the handle stick-gripping chuck unit 506.

First Modification Of The Apple-Holding Device For The Movable Endless Apple Carrier (FIGS 106–109)

A first modification of the apple-holding means for holding the apples 133 on a movable endless apple carrier, such as 131a, is illustrated in FIGS. 106–109 of the drawings, wherein it is generally indicated at 515, and embodies a supporting bracket portion 516 which includes a horizontal arm portion 517 which may be attached, by suitable fastening means 537, to a movable endless or rotary turntable carrier, as 131a, and such as embodied in the form of construction illustrated in FIGS. 1 to 91, inclusive. The supporting bracket 516 includes an upright supporting arm portion 518 on which a pair of parallel shafts 519 and 520 are rigidly mounted in spaced parallel relationship, as by means of externally threaded end portions 521 which are mounted in internally threaded openings 522 in the upright arm 518 of the supporting bracket 516 (FIG. 106). The shaft 519 has a gear 523 loosely mounted or floating thereon and the gear 523 meshes with a similar gear 524 which is loosely mounted or floats on the shaft 520. A sleeve 525 is attached to the gear 523 and a similar sleeve 526 is attached to the gear 524.

An apple-gripping and holding member 527 has a lower end portion 528 which is attached to the sleeve 525 and the apple-gripping and holding member 527 has an inwardly curved apple-gripping upper jaw portion 529 (FIG. 107).

An apple-gripping and holding member 530, has a mid portion 531 which is attached to the sleeve 526 and this member 530 has an inwardly curved apple-gripping and holding upper jaw portion 532 (FIG. 107). The apple-gripping and holding member 531 has an inwardly curved lower end and handle portion 533 (FIG. 107).

A rod member 534 is attached, in any suitable manner as by welding, to the outer side wall of the apple-gripping and holding member 527, adjacent the inwardly curved upper end portion 529 thereof, and a similar rod member 535 is similarly attached to the apple-gripping and holding member 531 adjacent the inwardly curved upper end portion 532 thereof. A coil spring 536 extends between and has its end portions attached to the rod members 534 and 535 (FIGS. 106 to 109, inclusive).

The modified form of apple-gripping and apple-holding device illustrated in FIGS. 106 to 109, inclusive, is particularly adapted for use in connection with a movable endless apple carrier, as 136a, for picking up the apples, by means of a handle stick-gripping and holding device, from a horizontal position, rather than from a vertical position, as in the form of the invention illustrated in FIGS. 1 to 91, inclusive.

To this end the horizontal arm portion 517 of the supporting bracket 516 may be attached to a movable endless or rotary turntable apple carrier, as 131a, by suitable fastening means, as 537, with the upright supporting arm portion 518 thereof disposed as shown in FIG. 106.

When the parts of the apple-gripping and apple-holding device 515 are so disposed, the apple-gripping and apple-holding members 527 and 531 may be manually spread apart, by means of the inwardly curved lower end and handle portion 533 of the member 531, against the action of the coil spring member 536, so as to separate the inwardly curved apple-gripping and holding upper jaw portions 529 and 532 thereof, respectively, whereupon an apple 133 may be inserted into position between the inwardly curved upper and apple-gripping and holding jaw portions 529 and 532 of the apple-gripping and apple-holding members 527 and 531, respectively. During this operation, the apple-gripping and holding members 527 and 531, and the sleeves 525 and 526 to which they are attached, turn or rotate in opposite directions, through a partial revolution on the shafts 519 and 520 and the intermeshing gears 523 and 524 turn or rotate with the sleeves 525 and 526, respectively. During this operation the resetting coil spring member 536 is expanded or tensioned.

Accordingly, when the apple-grinding and apple-holding members 527 and 531 are manually released the tensioned resetting coil spring 536 acts on the apple-gripping and apple-holding members 527 and 531 to return them to their initial positions; this being accomplished by a partial revolution of the sleeve members 526 and 526 and attached gears 523 and 524, respectively, on the shafts 519 and 520, respectively.

However, when a handle stick, as 136, inserted from a horizontal position into the core of an apple held between the curved apple-gripping and apple-holding upper jaw portions 529 and 532 of the apple-gripping and apple-holding members 527 and 531, respectively, the apple-gripping and apple-holding members 527–529 and 531–532, will readily separate, turning on the sleeves 525 and 526 and attached gears 523 and 524, respectively, so as to enable the apple 133 to be removed therefrom by a handle stick, as 136, and from a handle stick-gripping and holding device, and attached chuck unit, such as the handle stick-gripping and apple-holding devices 130 and attached chuck units 138 described hereinbefore in connection with the form of the invention illustrated in FIGS. 1 to 91, inclusive.

Second Modification of the Apple-Holding Device For the Movable Endless Apple Carrier (FIGS 110–114)

A second modified form of apple-holding device for use with a movable endless apple carrier is illustrated in FIGS. 110–114 of the drawings, wherein it is generally indicated at 528, and includes an L-shaped supporting bracket 539, which includes a horizontal arm portion 540 which is adapted to be attached, in any suitable manner, as by suitable fastening means 541, to a movable endless apple carrier as 131b (FIG. 110). The L-shaped supporting bracket 539 includes an upright supporting arm portion 542.

The modified form of apple holding device 538 shown in FIGS. 110–114 is particularly adapted for use in inserting a handle stick, as 136, into the core of an apple, as 133, from a horizontal position, by means of a suitable handle stick-gripping and apple-holding device, such as the handle stick-gripping and apple-holding device 130 and attached chuck unit 138 in the form of the invention illustrated in FIGS. 1 to 91, inclusive.

The modified form of apple-holding device 538, shown in FIGS. 110–114, includes a pair of spaced rigid arcuately curved apple-gripping and holding arms 543 and 544, which are curved toward each other (FIG. 110). The apple gripping and holding arm 543 has a flexible rubber or like suction cup member 545 attached thereto at its outer end and on inner or lower side thereof and the apple-gripping and holding arm 544 has a similar flexible rubber or like suction cup member attached thereto at its outer end and on the upper side thereof, as shown in FIGS. 110 and 111.

The inner end portion of the lower caramel apple-gripping and holding arm 544 is attached in any suitable manner, as by welding to the upper end portion of a slidable operating member 547 which is slidably mounted in a slot 548 which is formed in and extends tangentially through the body of a cylindrical member 549 which is attached, by suitable fastening means, such as the bolt 550, to the upright supporting arm 542 of the L-shaped supporting bracket 539. A second and disc-shaped member 551 is likewise attached, by the bolt 550, to the upright supporting arm 542 of the supporting bracket 539 in axially spaced relationship to the cylindrical body member 549 (FIG. 110).

The radially inner end portion of the upper apple-gripping and holding arm 543 is attached in any suitable manner, as by welding to a slidable operating member 552 which is slidably mounted in a slot 553 which is formed in and extends tangentially through the cylindrical body 549 opposite the slot 548 (FIG. 112), and the inner end portion of the apple-gripping and holding arm 544 is similarly attached to a slidable operating member 547 which is slidably mounted in a slot 548 which is formed in and extends tangentially through the cylindrical body member 549 in axially spaced relationship to the slot 553 (FIG. 112).

A cam follower 554 is rotatably mounted on the lower end portion of the slidable operating member 547 and a similar cam follower 555 is rotatably mounted in the upper end portion of the slidable operating member 552.

A generally annular coil spring-receiving recess 556 is provided between the disc-shaped member 551 and the generally cylindrical body 549 and a generally annular resetting coil spring 557 is arranged in the recess 556. A pin 558 is attached to the lower end portion of the upper slidable operating member 552 and the pin 558 projects laterally inwardly across the spring-receiving recess 556 and has an end portion which is disposed in a notch or recess 559 which is formed in the peripheral surface of the disc-shaped member 551 (FIG. 113). Similarly, a pin 560 is attached to the upper end portion of the lower slidable operating member 547 and projects laterally inwardly across the spring-receiving recess 556 and engages in a notch or recess 561 which is formed in the peripheral surface of the disc-shaped member 551 (FIG. 113).

The generally annular resetting coil spring 556 extends around the pin 560 and has its end portions attached, as at 562, to the pin 558 (FIG. 113).

As shown in FIG. 110, the cylindrical body member 549 has a concave apple-receiving recess or cavity 563 formed therein and this apple-receiving recess or cavity 563 opens at its outer end toward the flexible resilient, rubber or like apple-gripping suction cup members 545 and 546.

The apple-holding device 538 shown in FIGS. 110 to 114, inclusive, is particularly adapted for use in holding an apple, as 133, in position, to enable a handle stick, as 136b, to be inserted into the core of an apple 133 from a horizontal position, as by means of one of the apple-stick gripping and holding devices 130 and attached chuck units 138 embodied in the form of the invention illustrated in FIGS. 1 to 91, inclusive. Thus, an apple, as 133b, may be manually inserted into position with a part thereof disposed in the apple-receiving cavity 563 of the generally cylindrical body member 549 and with the apple gripped and held by the flexible, resilient rubber or like suction cup members 545 and 546, which are carried by the apple-gripping and holding arms 543 and 544, respectively.

Thus, to insert the apple 133b into position, as described, the applengripping and holding arms 543 and 544 may be moved manually and slidably radially inwardly in the slots 553 and 548, respectively, relative to the generally cylindrical body member 549, thereby separating the flexible, resilient rubber or like suction cup and apple-holding members 545 and 546, and the apple-gripping and holding arms 552 and 547, respectively, so that an apple 133b may be inserted partially into the apple-receiving cavity 563 in the generally cylindrical body member 549 and between the flexible resilient apple-gripping suction cup members 545 and 546. During this operation the apple-gripping and holding and supporting arms 552 and 549 slide in the slots 553 and 548, respectively, in the generally cylindrical body member 549, thereby tensioning the resetting coil spring 557 with the pins 558 and 560 moving radially outwardly of the notched recesses 559 and 561, respectively, in the disc-shaped member 551. However, when manual pressure on the apple-gripping and holding and supporting arms 543 and 544 is released the tensioned coil resetting spring 557 urges the slidable operating members 547 and 552 and attached apple-gripping and holding and supporting arms 543 and 544, respectively, and attached flexible, resilient apple-gripping suction cup members 545 and 546, respectively, radially inwardly relative to the generally cylindrical body member 549, thereby causing the flexible, resilient apple-gripping and suction cup members 545 and 546 and their apple-gripping and holding and supporting arms 543 and 544, respectively, to grip the apple 133b and releasably hold it in the apple-receiving cavity 563 in the generally cylindrical body member 549 for the reception of a handle stick, as 136b (FIG. 114).

The cam followers 554 and 555 on the slidable operating members 547 and 552, respectively, may be mounted in a machine, such as the new machine 125, so that operating cams timed to move with a movable endless or rotary turntable carrier, as 139, in the form of the invention illustrated in FIGS. 1 to 91, inclusive, may engage the cam followers 554 and 555 and urge the slidable operating members 547 and 552 and attached apple-gripping and holding and supporting arms 543 and 544, respectively, and the flexible resilient apple-gripping suction cup members 545 and 546 carried thereby, apart, to release the apple 133b and attached handle stick, as 136b, therefrom, as and when the apple 133b has been caramel-coated and nut-coated.

Third Modification of the Apple-Holding Device for the Movable Endless Apple Carrier (FIGS. 115–116)

A third modification of the apple-holding device for holding an apple on a movable endless apple carrier is illustrated in FIGS. 115 and 166 of the drawings, wherein it is generally indicated at 565, and includes a cup-shaped apple-holding member, such as the flexible resilient rubber or like cup-shaped apple-holding member 132 shown in FIGS. 1, 2 and 18 to 22, inclusive, and which is attached at its inner end, as at 567, to an upright supporting arm 568 of an L-shaped supporting bracket 569. This L-shaped supporting bracket 569 has a lower end portion 570 which may be attached, as at 571, to a movable endless apple carrier, such as 131c.

It will be noted that in the modified form of apple-holding device 555 shown in FIGS. 115–116, the cup-shaped apple-holding member 566 is disposed with its axis extending horizontally so that a handle stick as 136a, may be inserted by means of a suitable handle stick-gripping apple-holding device 130c and attached handle stick gripping chuck unit such as 138c, such as are embodied in the form of the invention illustrated in FIGS. 1 to 91, inclusive, while the parts are disposed in a generally horizontal plane, into the horizontally extending core of the apple 133c held by the cup-shaped apple-holding member 566.

Modification of the Movable Endless Apple Carrier (FIGS. 115–117)

A modification of the movable endless apple carrier for the new coated apple confection making machine 125 is illustrated in FIG. 117 of the drawing, wherein it is generally indicated at 572, and includes a movable endless apple carrier in the form of a movable endless belt or sprocket chain 573 which is driven by sprocket gears 574 carried by shafts 575 which may be rotatably mounted in a suitable supporting frame therefor, and has apple-holding devices 576 mounted on the outer side thereof, at spaced intervals therealong, such as the apple-holding devices 132 shown in FIGS. 1, 2 and 18 to 22, inclusive. As shown in FIG. 117, the movable endless apple carrier 572 and the apple-holding devices 576 thereon move in a vertical plane.

The movable endless apple carrier 572 embodying the construction illustrated in FIG. 117, may be used with any suitable handle stick-gripping members, such as those which are embodied in the form of the invention illustrated in FIGS. 1 to 91, inclusive, and as the movable endless apple carrier 572 and attached apple-holding devices 576 move in a vertical plane the apple-holding devices or cup members 576 are moved, one at a time, into a horizontal position so as to present the apples 133d held therein to the handle sticks 136d carried by the handle stick-gripping chuck unit 138d of the handle stick-gripping and apple-holding devices 130d in such a manner that the handle sticks 136d may be inserted into the cores of the apples 133d while the parts and the cores of the apples 133d are disposed in a horizontal position, as in FIG. 117.

Second Modification Of The Movable Endless Apple Carrier And Fourth Modification Of The Apple-Holding Devices Therefor A second modification of the movable endless apple carrier and a fourth modification of the apple-holding devices therefore, are shown in FIGS. 118 to 123, inclusive, of the drawings where the means embodied therein is generally indicated at 629, and includes a movable rotary endless apple carrier or turntable 630, which is similar to the rotary endless apple carrier or turntable 131 which is embodied in the form of the invention shown in FIGS. 1 to 91, inclusive.

A plurality of circumferentially spaced radially arranged supporting arms 631 are mounted on the lower surface of the rotary endless apple carrier or turntable 630, and extend outwardly beyond the periphery thereof, and each of these supporting arms 631 has a second supporting arm 632 attached thereto, as at 633 (FIG. 121). Each of the supporting arms 631–632 has a generally cup-shaped apple-holding devices 634 mounted thereon and each of these cup-shaped apple-holding devices 634 is composed of a body 635 of flexible, resilient rubber or like flexible, resilient plastic resinous material, which is attached, as at 636 to one of the supporting arms 632 (FIG. 121).

Each of the cup-shaped apple-holding devices 634 has a depending extension 637 which projects below the supporting arm 632 and each of the cup-shaped apple-holding devices 632 has a centrally arranged opening 638 which extends through the body 635 and downwardly through the depending extension 634 thereof. A generally disc-shaped apple-supporting member 639 is movably mounted in the body 635 of each of the cup-shaped apple-holding 634 and each of these apple-supporting members 639 has a generally concave upper surface for the reception of and to provide a seat for an apple. Each of the apple-supporting members 639 has a depending supporting stem or rod 640 attached thereto and each of these supporting stems or rods 640 is slidably mounted in the opening 638 in the body 636 of the cup-shaped apple-holding device 634 and in its depending extension 637 (FIG. 121).

The form of the invention illustrated in FIGS. 118 to 123, inclusive, of the drawings includes operating means for cyclically raising the apple-supporting members 639 in and relative to the cup-shaped apple-holding devices 634 during rotation of the rotary endless turntable or carrier 630 so as to raise the apples held thereby successively into engagement with handle sticks 641 held by chuck units, as 642, which correspond to the handle sticks 136 and chuck units 138 in the form of the invention shown in FIGS. 1 to 91, inclusive. This operating means includes a main operating bar 643 which is pivotally mounted in the machine, such as the machine 125 of FIGS. 1 to 91, in a manner which will be described hereinafter, and one end portion of this main operating bar 643 is attached, as at 644, (FIG. 121), to a vertically extending pusher bar member 645 which projects slidably upwardly through and is slidably mounted in a slot 646 which is formed in a top wall 647 of a supporting frame for the machine, such as the top wall of the upper portion 127 of the supporting frame 126 in the form of the invention shown in FIGS. 1 to 91, inclusive (FIGS. 118 and 121). The pusher bar member 645 has a pusher head 648 mounted thereon and this pusher head 648 is adapted cyclically to engage the vertically extending and depending stem or rod 640 of each of the apple-supporting members 634 as the rotary endless turntable apple carrier 630 is rotated, during operation of the machine, so as to raise each of the apple-supporting members 639 and an apple held thereby upwardly in the corresponding cup-shaped apple-holding device 634 and into engagement with one of the handle sticks 641 as the handle sticks 641 are sequentially lowered by the chuck units 642 in the cyclical movement of the rotary endless apple carrier or turntable 630 as the latter is rotated and the chuck units 642 are opened by operating mechanisms such as those as embodied in the form of the invention illustrated in FIGS. 1 to 91, inclusive. In this manner the insertion of the handle sticks 641 into the cores of the apples at the second and apple pick-up work station is facilitated and it is assured that each handle stick 641 will successfully pick up and retain an apple at the second and apple pick-up work station.

The main operating bar 643 which is embodied in the operating means shown in FIGS. 118–121 is pivotally mounted between its ends, on a rocker member 649 which is attached to a stub shaft 650. The stub shaft 650, in turn, carries a bearing collar 651 which is rockably mounted in a channel-shaped supporting member 652 which is rigidly attached to a part 653 of the supporting frame of the machine, such as the supporting frame 126 in the form of the invention illustrated in FIGS. 1 to 91, inclusive.

A rocking motion is cyclically imparted to the main operating bar 643 during operation of the machine by a cam shaft 654 which is attached to and is carried by an eccentric cam 655 which is mounted on a shaft 656 which is rotatably mounted in the machine and which corresponds generally to the shaft 453 in the form of the machine shown in FIGS. 1 to 91, inclusive.

Operation Of The Modification Shown in FIGS. 118 to 123, Inclusive

The operation of the modification of the invention shown in FIGS. 118 to 123, inclusive, is as follows: Apples are inserted into the flexible resilient cup-shaped apple-holding devices 634 so that they rest on the concave upper surface of the apple-supporting members 639, and as the rotary endless apple carrier or turntable 630 is rotated in the cyclical operation of the machine, such as the machine 125 shown in FIGS. 1 to 91, inclusive, the shaft 656, being rotated, rotates the cam shaft 654 into engagement with one end portion of the main operating bar 643, thereby pivoting the main operating bar 643 on its pivotal mounting 649–650–651–652 (counterclockwise, FIG. 118). This motion of the main operating bar 643 raises the pusher bar 645 in the slot 646, and thus moves the pusher head 648 on the pusher bar 645 into engagement with the lower end portion of the depending rod or stem 640 of the apple-supporting member 639, thereby raising the apple-supporting member 639 in and relative to the cup-shaped apple-holding device 632 upwardly into engagement with the handle stick 641 as the handle stick 641 is moved downwardly toward and into the core of an apple held by the apple-holding member 639 in the apple holding device 634.

This cooperative action of the upwardly moving apple-supporting member 639 and the downwardly moving chuck 642 and the handle stick 641 carried thereby causes the handle stick 641 to penetrate the core of the apple and assures that an apple will be picked up and retained on each handle stick 641 at the second and apple pick-up work station in the use of the modification of the invention, as shown in FIGS. 118 to 123, inclusive, in an apple candy confection making machine such as the machine 125 shown in FIGS. 1 to 91, inclusive.

As the cyclical operation of the machine continues and the shaft 654 and the eccentric cam 655 thereon are rotated, the cam 654 passes upwardly out of engagement with the main operating bar 643 which thereupon pivots, under its own weight, downwardly (clockwise, FIG. 118) thereby moving the pusher bar 645 and the pusher head 648 thereon downwardly with the pusher bar 645 sliding in the slot 646 in the top wall 647 of the supporting frame of the machine. The apple-supporting member 639 and its attached depending stem 640 then drop by gravity into their normal position, as shown in FIG. 121.

First Modification Of The Means For Intermittently Raising The Caramel Vat or Tank (FIGS. 124 to 126, Inclusive)

A first modification of the means for intermittently raising the caramel vat or tank, such as the caramel vat or tank 141, in the form of the invention shown in FIGS. 1 to 91, inclusive, is illustrated in FIGS. 124 to 126, inclusive, of the drawings, wherein it is generally indicated at 657, and is shown associated with a support 658 (similar to the support 335, FIG. 1 to 91) for the caramel vat or tank (not shown) and a gas heating unit 659 therefor, which is similar to the gas heating unit 143 (FIGS. 1 to 91). The supporting member 658 for the caramel vat or tank is mounted on and is carried by a vertically extending operating and supporting screw member 660 which is mounted in a supporting member 661, which may be a part of the supporting frame, as 126, in the form of the invention shown in FIGS. 1 to 91, inclusive. A supporting bracket 662 is attached to the supporting member 661 and this supporting bracket 662 has a guide and holding member 663 rigidly attached thereto. The guide and holding member 663 has a central aperture 730 formed therein for the passage of the screw member 660 (FIG. 125A). A sprocket gear 664 is mounted on the screw member 660 and has an internally threaded hub portion 665 which is threadedly connected to the screw member 660 (FIG. 125A). A bearing bushing 666 is mounted on the screw member 660 between the guide and holding member 663 and the sprocket gear 664–665.

A sprocket chain 667 works around the sprocket gear 664–665, and the sprocket chain 667 also works around a sprocket gear 668 which is mounted on and is rigidly attached to the lower end portion of a vertically extending operating shaft 669 which is rotatably journaled in bearings, as 670, which are carried by supporting brackets 671 which are attached to a vertical wall or like supporting member 672 of the supporting frame of the machine, such as the supporting frame 126 of the machine 125 shown in FIGS. 1 to 91, inclusive. A ratchet 673 is likewise mounted on and is fastened to the lower end portion of the operating shaft 669, below the sprocket gear 668, and a ratchet pawl 674 is adapted to engage the teeth of the ratchet 673. The ratchet pawl is pivotally mounted, as at 675, on a central arm 676 of a generally T-shaped ratchet pawl-supporting member 677 which is pivotally connected at one end, as at 679, to a ratchet operating bar member 680 which will be described further hereinafter. The other end portion of the generally T-shaped ratchet pawl-supporting member 670–677 is pivotally mounted on a pivot pin 725 (FIGS. 124, 125 and 126) which is pivotally mounted in a bearing bushing 732 which, in turn, is mounted on a supporting member 733 which forms part of the supporting frame, as 126, for a machine, as 125 (FIGS. 1 to 91).

The ratchet pawl 674 is normally urged out of engagement with the ratchet 673 by a coil spring 678 which has one end portion attached to the generally T-shaped supporting member 677–676 and has its other end portion attached to the pivotal mounting 675 for the ratchet pawl 674.

A manually operable control rod member 683 for the ratchet pawl 674 is journaled in bearings 684 which are attached to the supporting member 672. This manually operable control rod member 683 has a cam plate member 685 mounted on the lower end portion thereof which is adapted to engage the ratchet pawl 674, as will be described hereinafter.

As shown in FIG. 124, the other end portion of the ratchet operating bar member 680 has a cam pin 682 rigidly attached thereto on its upper surface and this cam pin 682 projects into and works in a slot 731 which is formed in the lower surface of an eccentric cam 681 which is mounted on and is rigidly connected to a main operating and supporting shaft 155a for a movable endless carrier, such as the movable endless carrier 155 in the form of the machine shown in FIGS. 1 to 91, inclusive.

Operation Of The Modification Illustrated in FIGS. 124 To 126, Inclusive, For Intermittently Raising The Caramel Vat Or Tank The operation of the modification illustrated in FIGS. 124 to 126, inclusive, for intermittently raising the caramel vat or tank, as 141, is as follows: The caramel vat or tank, as 141a, and the gas heating unit, as 659 therefor, are mounted on the supporting member 658 which is carried by the vertically extending operating and supporting screw member 660. When it is desired to set the device 657, illustrated in FIGS. 124 to 126, inclusive, in operation, so as to intermittently raise the caramel vat or tank and its gas heating unit 659 intermittently in small increments or vertical steps, as the supply of caramel or other edible coating material in the caramel vat or tank is consumed in use, the manually operable control rod 683 may be manipulated in its bearings 684 so as to move the cam plate member 685 thereon into engagement with the ratchet pawl 674 and thereby move the ratchet pawl 674 into engagement with the teeth of the ratchet 673. When the ratchet pawl 674 is thus moved into engagement with the teeth of the ratchet 673, and the machine is in operation, the main supporting and drive shaft, as 155a, acts, through the eccentric cam mechanism 681–682, to reciprocate the ratchet operating bar 680 which thereby pivots the generally T-shaped pawl supporting member 676–677 for the ratchet pawl 674 on its pivotal mounting 725–732–733 and on its pivotal connection 679 with the ratchet pawl operating bar 680.

This motion of the ratchet pawl operating bar 680 and the generally T-shaped pawl supporting member 676–677 intermittently moves the ratchet pawl 674 into engagement with the teeth of the ratchet 673 and thus rotatably moves the vertical supporting shaft 699 intermittently in sequential steps. This motion of the vertical supporting shaft 669 is transmitted, by the sprocket gear 668, sprocket chain 667, and sprocket gear 664–665, to the vertically extending operating and supporting screw member 660 which is thereby rotated in and relative to the guide and supporting member 663, and relative to its supporting bracket 662 and the supporting member 661, so as to intermittently raise the supporting member 658 for the caramel vat or tank and the gas heating unit 659 therefor in sequential vertical steps or increments, thereby moving the caramel vat or tank sequentially upwardly as the supply of caramel or other edible coating material therein is consumed in use.

When it is desired to discontinue the upward movement of the caramel vat or tank, the manually operable control rod 683 may be manipulated in its bearings 684 so as to move the cam plate 685 thereon out of engagement with the ratchet pawl 674, whereupon the spring 678 will pivot the ratchet pawl 674 out of engagement with the ratchet 673, thereby operatively disconnecting the ratchet-operating bar 680, the supporting member 675–677, and the ratchet pawl 674 carried thereby from the ratchet 673, and thus operatively disconnecting the sprocket gear 668, sprocket chain 667, and sprocket gear 664–665 from the vertically extending operating and supporting screw member 660. The caramel vat or tank may then be lowered into its original position by rotation of the vertically extending operating and supporting screw member 660 relative to the stationary bracket 662, the guide and supporting member 663 and the supporting member 661.

Second Modification of the Means for Raising and Lowering the Camamel Vat or Tank (FIGS. 127 to 135, Inclusive)

A second modification of the means for continuously raising and lowering the caramel vat or tank, as 141a (FIG. 128), is shown in FIGS. 127 to 135, inclusive, wherein it is generally indicated at 686 and comprises an angularly extending supporting member 687 which may be a part of the supporting frame, as 126, in the form of the machine 125 shown in FIGS. 1 to 91, inclusive. A supporting bracket 688 is mounted on a supporting member 687, which forms part of the guide structure 728 for the caramel vat or tank 141a, and a generally cylindrical guide and holding member 689 is carried by and is rigidly attached to the upper end portion of the supporting bracket 688.

A vertically extending operating and supporting screw member 690 projects through an opening 691 in the supporting member 687, and the upper end portion of the vertically extending operating and supporting screw member 690 projects through a central opening 726 in the generally cylindrical guide and holding member 689 (FIG. 135) and has a supporting member 692 mounted thereon (FIG. 128). As shown in FIG. 128, the supporting member 692 supports the caramel vat or tank, as 141a, and a gas heating unit 693 therefor, as in the form of the invention illustrated in FIGS. 1 to 91.

A sprocket gear 694, having an internally threaded hub portion 728 (FIG. 135), is threadedly attached to the vertically extending operating and supporting screw member 690, below the stationary guide and holding member 689, and a bearing bushing 695 is mounted on the screw member 690 between the sprocket gear 694–728 and the guide and holding member 689 (FIG. 135).

A sprocket chain 696 works around the sprocket gear 694–728 and the sprocket chain 696 also works around a sprocket gear 697 which is attached to and is carried by a vertically extending shaft 698 which has its upper end portion mounted in and rotatably journaled, as at 699, in a supporting member 700 which forms part of the supporting frame, as 126, of a machine, such as the machine 125 in the form of the invention shown in FIGS. 1 to 91, inclusive (FIGS. 127–128–131).

A pair of spaced driven bevel gears 701 and 702 are slidably mounted on and are splined by a tongue and groove connection 719–729, of the shaft 689 (FIGS. 131 and 133) in spaced relationship, and these bevel gears 701 and 702 are selectively and alternatively engageable with a driving bevel gear 703 which is mounted on a drive shaft 704, such as the shaft 460, in the form of the machine shown in FIGS. 1 to 91, inclusive, of the drawings.

The modification 686 of the means for raising the caramel vat or tank, as 141a, as shown in FIGS. 127 to 135, inclusive, includes a vertically extending generally cylindrical supporting member or column 705 which is mounted on and is supported by and between two horizontally extending supporting members 706 and 707 which may be attached to or form a part of the supporting frame, as 126, in the form of the invention illustrated in FIGS. 1 to 91, inclusive, of the drawings.

A generally cylindrical sleeve member 708 is slidably mounted on the generally cylindrical column member 705 and this sleeve member 708 has a pair of spaced upper and lower yoke arm members 709 and 710, respectively, integrally attached thereto, and these yoke arms 709 and 710 are extended in spaced generally horizontal parallel relationship. The upper yoke arm member 709 has a yoke or bifurcated end portion 711 which embraces the vertically extending shaft 698 and engages in a recess 720 formed in the bevel gear 701, and the lower yoke arm member 710 has a similar bifurcated end portion 712 which likewise embraces the vertically extending shaft 698 below the bevel gear 702 and engages in a recess 721 formed in the bevel gear 702 (FIG. 131).

A connecting link member 714 extends centrally between and has its upper and lower end portions integrally attached to the yoke arm members 709 and 710, and a manually operable level member 715 has one end portion pivotally connected to the connecting link member 714, as at 716. This manually operable lever member 718 is pivotally mounted between its ends, as at 717, on a supporting member 718 which may be a part of the supporting frame, as 126, in the machine 125 shown in FIGS. 1 to 91, inclusive.

Operation of the Second Modification Shown in FIGS. 127 to 135, Inclusive, For Raising the Caramel Vat or Tank In the use of the modified form of the invention shown in FIGS. 127 to 135, inclusive, for continuously raising the caramel vat or tank, as 141a, the manually operable level arm member 715 may be pivoted at 717 (counterclockwise, FIG. 127) so as to pivot the level arm member 715 and 716 on the connecting link member 714. This motion acts through the yoke arm members 709 and 710, and their bifurcated end portions 711 and 712, respectively, to slide the bevel gears 701 and 702 on their splined connection 719-720 with the shaft 698 upwardly from the position in which the parts are shown in FIG. 127. This motion of these engages the lower driven bevel gear 702 with the driving bevel gear 703 on the drive shaft 704 and when the machine is in operation the drive shaft 704 transmits power through the driving bevel gear 703, driven bevel 702, vertical shaft 698, sprocket gear 697, sprocket chain 696, and sprocket gear 694 to the vertically extending supporting screw 670 which is thus rotated by the internally threaded sprocket gear 694-728 relative to the stationary guide and holding member 689 and its supporting bracket 688 and the supporting member 687. In this manner the vertically extending screw member 690 and the supporting member 692 and the gas heating unit 693 and the caramel vat or tank 141a are continuously raised as the supple of caramel or other edible coating material in the vat or tank 141a is consumed in use.

When it is desired to lower the caramel vat or tank 141a from its uppermost position, after the supply of caramel or other edible coating material therein has been consumed in use, this may be accomplished by moving the manually operable lever arm 715 clockwise from the position in which it is shown in FIG. 127, thereby pivoting the lever arm 715 on its pivotal mounting 718 and pivoting it downwardly on its pivotal connection 716 with the connecting link member 714. This motion acts through the connecting link member 714, to lower the yoke arm members 709 and 710 which are slidably guided by the sleeve member 708 on the column 705. This motion of the yoke arm members 709 and 710 slidably moves the upper and lower driven bevel gears 701 and 702, respectively, on their splined connection 719-720 with the shaft 698, thereby moving the lower driven bevel gear 702 out of engagement with the driving bevel gear 703 and moving the upper driven bevel gear into engagement with the driving bevel gear 702. Motion is thus imparted from the drive shaft 704 through the bevel gears 703 and 702 to rotate the shaft 698 in a direction opposite to the direction hereinbefore described, and this rotation of the shaft 698 acts, through the sprocket gear 697, sprocket chain 696 and sprocket gear 694-728 to rotate the vertically extending operating and supporting screw member 690 in a direction opposite to the direction of rotation of the vertically extending operating and supporting screw member 690 described, thereby lowering the supporting member 692 and the gas heating unit 693 and the caramel vat or tank 141a relative to the supporting member 687. This rotation of the vertically extending operating and supporting screw member 690 continues until the caramel vat or tank, as 141a, is lowered into its normal or lowermost position, whereupon the lower driven bevel gear 702 may be disengaged from the driving bevel gear 703 by manipulating the lever arm 715 to move the parts into their normal or idle position, in which they are shown in FIG. 127.

It will thus be seen from the foregoing description, considered in conjunction with the accompanying drawings, that the present invention provides a new and improved coated apple confection making machine having the desirable advantages and characteristics and accomplishing its intended objects including those hereinbefore set forth and those which are inherent in the invention.

We claim:

1. A machine for making a coated apple or like confection which includes a coated apple having a handle stick embedded therein comprising
   a. a supporting frame;
   b. a turntable carrier member rotatably mounted on the said supporting frame;
   c. means for rotating the said turntable carrier member in the said supporting frame relative to and past a plurality of work stations where operations are to be performed by the said machine during a cycle rotation of the said turntable carrier member;
   d. a plurality of handle stick-gripping and apple-holding devices carried by and arranged at spaced intervals circumferentially around the said turntable carrier member for releasably gripping the said handle sticks and for holding an apple carrier thereby;
   e. a handle stick storage hopper arranged adjacent the said turntable carrier member at a first one of the said work stations and adapted to hold a supply of the said handle sticks;
   f. means for ejecting handle sticks one at a time from the said handle stick storage hopper into the said handle stick-gripping and apple-holding devices as the latter are rotated sequentially by the said turntable carrier member into a position adjacent the said handle stick storage hopper at the said first work station;
   g. a movable endless apple-holding carrier arranged adjacent said turntable carrier member for holding a plurality of apples in spaced relationship thereon;
   h. a plurality of apple-holding devices arranged in spaced relationship on the said movable endless apple-holding carrier for releasably holding apples thereon;
   i. means for movably mounting the said movable endless apple-holding carrier and the said apple-holding devices thereon adjacent the said turntable at a second one of the said work stations;
   j. handle stick-inserting means coacting with the said handle stick-gripping and apple-holding devices at the said second one of the said work stations for sequentially inserting handle sticks carried by the said handle stick-gripping and apple-holding devices into the cores of apples held by the said apple-holding devices on the said movable endless apple-holding carrier; and
   k. means for coating each of the said apples as carried and held by the said handle stick-gripping and apple-holding devices with an edible coating at another and coating one of said work stations during a cycle of rotation of the said turntable carrier member.

2. A machine for making a coated apple or like confection as defined in claim 1 which includes
   a. means coacting with the said handle stick-gripping and apple-holding devices at a work station following the said second work station, and in advance of the said first coating work station, in a cycle of rotation of the said turntable carrier member, for automatically ejecting handle sticks from the said handle stick-gripping and apple-holding devices in the event that an apple is not picked up by the said handle stick-gripping and apple-holding devices at the said second one of said work stations.

3. A machine for making a coated apple or like confection as defined in claim 1 which includes
 a. a container for an edible fluid coating material arranged adjacent the said turntable carrier member for holding a supply of an edible fluid coating material at the said coating one of said work stations; and
 b. means coacting with the said handle stick-gripping and apple-holding devices, in timed relationship with the said turntable carrier member, for lowering the said apples carried thereby on the said handle sticks into the said container for the said edible fluid coating material to coat each of the said apples with a coating of the said edible fluid coating material at the said coating work station during a cycle of rotation of the said turntable carrier member.

4. A machine for making a coated apple or like confection as defined in claim 3 which includes
 a. means for automatically raising the said container for the said edible fluid coating material in relatively small increments upwardly toward the said turntable carrier member and the said handle stick-gripping and apple-holding devices mounted thereon as the supply of the said edible fluid coating material therein is consumed in use.

5. A machine for making a coated apple or like confection as defined in claim 3 which includes
 a. means disposed below the said container for the said edible fluid coating material for heating the said edible fluid coating material therein;
 b. means for supporting the said container for the said edible fluid coating material and the said heating means therefor for movement in a generally vertical plane relative to the turntable carrier member and the said handle stick-gripping and apple-holding devices carried thereby;
 c. means for automatically raising the said container for the edible fluid coating material and the said heating means therefor in relatively small increments upwardly toward the said turntable carrier member and the said handle stick-gripping and apple-holding devices carried thereby as the supply of the said edible fluid coating material in the said container therefor is consumed in use; and
 d. means for guiding movement of the said container for the said edible fluid coating material and the said heating means therefor as the said container for the said edible fluid coating material and the said heating means are moved on the said supporting means therefor in use.

6. A machine for making a coated apple or like confection as defined in claim 5 in which the said means for automatically raising the said container for the said edible fluid coating material and the said heating means therefor includes
 a. hydraulic lifting means disposed below the said container for the said edible fluid coating material; and
 b. means for supplying hydraulic fluid under pressure to the said hydraulic lifting means so as to raise the said container for the said edible fluid coating material and the said heating means therefor in relatively small increments as the said edible fluid coating material is consumed in use.

7. A machine for making a coated apple or like confection as defined in claim 3 which includes
 a. a receptacle for ground nuts arranged adjacent the said turntable carrier member at a second coating one of said work stations; and
 b. means coacting with the said handle stick-gripping and apple-holding devices at the said second coating one of said work stations, in timed relationship with the said turntable carrier member, for lowering the said apples, as coated with a coating of the said edible fluid coating material, into the said ground nut receptacle to coat the said apples with a coating of ground nuts over the said coating of edible fluid coating material thereon during a cycle of rotation of the said turntable carrier member.

8. A machine for making a coated apple or like confection as defined in claim 7 which includes
 a. means coacting with the said handle stick-gripping and apple-holding devices at a final one of said work stations, in timed relationship with the said turntable carrier member, and beyond the said second and ground nut receptacle coating work station, for automatically ejecting the said apple confections with the said coating of edible fluid coating material and with the said coating of ground nuts thereon from the said handle stick-gripping and apple-holding devices during a cycle of rotation of the said turntable carrier member.

9. A machine for making a coated apple or like confection as defined in claim 7 which includes
 a. means for rotating the said handle stick-gripping and apple-holding devices and the said apples held thereby in the said ground nut receptacle so as to coat the said apples with a coating of ground nuts over the said coating of edible fluid coating material thereon.

10. A machine for making a coated apple or like confection as defined in claim 7 which includes
 a. a storage hopper for nuts disposed adjacent the said turntable carrier member at the said second coating work station and above the said ground nut receptacle and having
  1. a discharge outlet for discharging ground nuts from the said nut storage hopper into the said ground nut receptacle;
 b. nut grinding means in the said nut storage hopper;
 c. level responsive means in the said ground nut receptacle responsive to the level of ground nuts therein; and
 d. means under control of the said level-responsive means for controlling the operation of the said nut-grinding means in the said nut storage hopper and the discharge of the ground nuts through the said discharge outlet from the said nut storage hopper into the said ground nut receptacle as the supply of ground nuts in the said ground nut receptacle is consumed in use.

11. A machine for making a coated apple or like confection as defined in claim 10 in which the said nut-grinding means includes
 a. power means;
 b. power-transmission means operated by the said power means for operating the said nut-grinding means;
 c. clutch means for controlling the operation of the said power-transmission means; and
 d. means under control of the said level-responsive means in the said ground nut receptacle for controlling the said clutch means.

12. A machine for making a coated apple or like confection which includes a coated apple and handle stick attached thereto comprising
 a. a supporting frame;
 b. a main movable endless carrier member movably mounted on the said supporting frame and having a plurality of work stations arranged therealong;
 c. means for moving the said main movable endless carrier member on the said supporting frame relative to and past the said work station;
 d. a plurality of handle stick-gripping and apple-holding devices carried by the said main movable endless carrier member and arranged at spaced intervals thereon;
 e. each of the said handle stick-gripping and apple-holding devices including
  1. a handle stick-gripping chuck unit for gripping and holding one of the said handle sticks;
 f. a storage hopper for the said handle sticks arranged adjacent the said main movable endless carrier member at a first one of the said work stations;
 g. means coacting in timed relationship with the said movable endless carrier member for ejecting handle sticks one at a time from the said handle stick storage hopper into the said handle stick-gripping chuck unit of each of the said handle stick-tripping and apple-holding devices at the said first one of the said work stations as the said apple stick-gripping and apple-holding devices are moved sequentially by the said main movable endless carrier member past the said first work station;

h. a movable endless apple carrier member arranged adjacent the said main movable endless carrier member at a second one of the said work stations;

i. means for supporting the said movable endless apple carrier member;

j. a plurality of apple-holding devices carried by the said movable endless apple carrier member and arranged at spaced intervals thereon for releasably holding apples therein;

k. means for moving the said movable endless apple carrier member in timed relationship with the said main movable endless carrier member so as to bring the said apples held thereby sequentially into the path of movement of the said handle stick-gripping and apple-holding devices at the said second one of the said work stations during movement of the said handle stick-gripping and apple-holding devices by the said main movable endless carrier;

l. means coacting with the said main movable endless carrier and with the said handle stick-gripping and apple-holding devices arranged thereon at the said second one of the said work stations for inserting handle sticks held by the said handle stick-gripping chuck units of the said handle stick-gripping and apple-holding devices sequentially into the cores of apples releasably held by the apple-holding devices on the said movable endless apple carrier so as to withdraw apples from the said apple-holding devices and attach them to the said handle sticks held by the said handle stick-gripping chuck units;

m. a container arranged adjacent the said main movable endless carrier member in its path of travel at a coating one of said work stations for holding an edible fluid coating material; and n. means coacting in timed relationship with the said main movable endless carrier member and with the said apple stick-gripping and apple-holding devices thereon for sequentially lowering apples held by the said handle sticks in the said handle stick-gripping chuck units into the said container during movement of the said main movable endless carrier member to coat the said apples with a coating of the said edible fluid coating material.

13. A machine for making a coated apple or like confection as defined in claim 12 which includes a. means for sequentially rotating the said handle stick-gripping and apple-holding devices and the said apples held thereby after the said apples have been provided with a coating of the said edible fluid coating material to remove excess of the said edible fluid coating material therefrom.

14. A machine for making a coated apple or like confection as defined in claim 12 which includes a. means coacting with the said handle stick-gripping and apple-holding devices and the said handle stick-gripping chuck units embodied therein, and in timed relationship with the said main movable endless carrier, at a work station between said second work station and in advance of the said coating one of said work stations for actuating the said handle stick-gripping chuck unit to release the said handle stick held thereby in the event that a handle stick held by the said handle stick-gripping and apple-holding device and the said handle stick-gripping chuck unit embodied therein does not engage and pick up an apple at the said second one of said work stations.

15. A machine for making a coated apple or like confection as defined in claim 14 which includes a. a ground nut receptacle arranged adjacent the said main movable endless carrier member in its path of travel at the said second coating one of said work stations; and b. means coacting with the said apple stick-gripping and apple-holding devices, and in timed relationship with the said main movable endless carrier member, for sequentially moving the said apples held thereby, as coated with the said coating of edible fluid coating material, into and through the said ground nut receptacle to coat the said apples with a coating of ground nuts over the said coating of edible fluid coating material thereon.

16. A machine for making a coated apple or like confection as defined in claim 15 which includes a. means coacting with the said handle stick-gripping and apple-holding devices and the said handle stick-gripping chuck units embodied therein, and in timed relationship with the said main movable endless carrier member, for rotating the said apples in the said ground nut receptacle in contact with ground nuts therein to coat the said apples with a coating of ground nuts over the said coating of edible fluid coating material thereon.

17. A machine for making a coated apple or like confection as defined in claim 16 which includes a. a final receptacle for the coated apple confections arranged adjacent to and in the path of travel of the said main movable endless carrier member at a final one of the said work stations; and b. means coacting with the said handle stick gripping and apple-holding devices, in timed relationship with the said main movable endless carrier member, for ejecting the said coated apple confections and the said handle sticks attached thereto from the said handle stick-gripping chuck units into the said final receptacle for the said coated apple confections.

18. A machine for making a coated apple or like confection ad defined in claim 17 in which a. the said final receptacle is adapted to hold a supply of ground nuts therein; and which includes b. means for rotating the said final receptacle with the said coated apple confections therein to provide the said coated apples with a second and further coating of ground nuts.

19. A machine for making a coated apple or like confection which includes a coated apple having a handle stick attached thereto comprising a. a supporting frame;

b. a main rotary turntable carrier member rotatably mounted on the said supporting frame, and including
1. a peripheral edge portion;

c. means for rotating the said main rotary turntable carrier member on the said supporting frame successively past a plurality of work stations disposed adjacent the said peripheral edge portion of the said main turntable carrier member;

d. a generally annular cam track member stationarily mounted on the said supporting frame and surrounding a generally coextensive with the said peripheral edge portion of the said main rotary turntable carrier member;

e. a plurality of handle stick-gripping and apple-holding devices movably mounted on the said main rotary turntable carrier member at spaced intervals circumferentially thereon and for movement therewith and each including
1. a handle stick-gripping chuck unit adapted to receive and to grip a handle stick;

f. means for movably mounting the said handle stick-gripping and apple-holding devices and the said handle stick-gripping chuck units embodied therein on the said main rotary turntable carrier member for movement in a generally vertical plane radially of and relative to the main rotary turntable carrier member and the said generally annular stationarily mounted cam track member;

g. a handle stick storage hopper for holding a supply of said handle sticks disposed adjacent the said main rotary turntable carrier member and the said stationarily mounted cam track member at a first on of the said work stations and having
1. a discharge outlet;

h. a first cam means on the said stationarily mounted cam track member;

i. cam follower means carried by each of the said handle stick-gripping and apple-holding devices and engageable with the said first cam means on the said stationarily mounted cam track member for moving the said handle stick-gripping and apple-holding devices and the said handle stick-gripping chuck units embodied therein upon and relative to the said main rotary turntable carrier and the said stationarily mounted cam track member successively into position to receive one of the said handle sticks from the said discharge outlet of the said handle stick storage hopper at the said first one of the said work stations;

j. means for ejecting the said handle sticks one at a time from the said discharge outlet of the said handle stick storage hopper successively into each of the said handle stick-gripping chuck units as the said handle stick-gripping chuck units are moved sequentially by the said main rotary turntable carrier member into registry with the said discharge outlet of the said handle stick storage hopper at the said first one of said work stations;

k. a movable endless apple carrier member arranged adjacent the said peripheral edge portion of the said main rotary turntable carrier member at a second one of said work stations and having arranged thereon in spaced relationship
  1. a plurality of apple-holding devices for releasably holding apples therein;

l. means for moving the said movable endless apple carrier in timed relationship with the said main rotary turntable carrier member so as to move the said apples carried thereby successively into a position adjacent the said peripheral edge portion of the said main rotary turntable carrier member at the said second one of said work stations;

m. a second cam means on the said stationarily mounted cam track member and engageable with the said cam follower means carried by the said handle stick-gripping and apple-holding devices for moving the said handle stick-gripping and apple-holding devices and the said handle stick-gripping chuck units embodied therein relative to the said main rotary turntable carrier member and the said stationarily mounted cam track member into position to align the said handle sticks carried thereby successively with the cores of apples disposed in the said apple-holding devices on the said movable endless apple carrier member at the said second one of the said work stations;

n. means coacting in timed relationship with the said main rotary turntable carrier member at the said second one of the said work stations for moving each of the said handle stick-gripping and apple-holding devices and the said handle stick-gripping chuck units embodied thereby in a direction to insert the said handle sticks held thereby sequentially into the cores of apples releasably held by the said apple-holding devices at the said second one of the said work stations;

o. a container for holding a supply of an edible coating material for said apples disposed adjacent the said peripheral edge portion of the said rotary turntable carrier at a coating one of said work stations; and p. a third cam means on the said stationarily mounted cam track member coacting with the said cam follower means carried by the said handle stick-gripping and apple-holding devices for lowering the said apples held thereby sequentially into and for moving them through the said container to coat each of the said apples sequentially with a coating of the said edible fluid coating material at the said coating work station during a cycle of rotation of the said main rotary turntable carrier member.

20. A machine for making a coated apple or like confection as defined in claim 19 in which
a. the said third cam means on the said stationarily mounted cam track member coacts with the said cam follower means carried by the said handle stick-gripping and apple-holding devices to lower the said handle stick-gripping and apple-holding devices and the said handle stick-gripping chuck units embodied therein and the said handle sticks and apples held thereby in a generally vertical plane into the said container at the said third work station for coating the said apples with a coating of the said edible fluid coating material in the said container.

21. A machine for making a coated apple or like confection as defined in claim 19 in which
a. the said edible fluid coating material is caramel; and which includes
  1. supporting means for the said caramel container;
  2. means for movably mounting the said caramel container and the said supporting means therefor for vertical movement relative to and below the said main rotary turntable carrier member;
  3. means for guiding the said caramel container and the said supporting means therefor during vertical movement thereof;
  4. heating means carried by the said supporting means below the said caramel container and movable therewith for heating the said caramel container and the caramel therein; and
  5. hydraulic means for elevating the said caramel container and the said heating means therefor in relatively small increments and in a generally vertical plane relative to the path of travel of the said handle stick-gripping and apple-holding devices and the said handle stick-gripping chuck units embodied therein and the said handle sticks and apples held thereby as the supply of caramel in the said caramel container is consumed in use.

22. A machine for making a coated apple or like confection as defined in claim 19 which includes
a. means for raising the said handle stick-gripping and apple-holding devices and the said handle stick-gripping chuck units embodied therein and the apples held thereby within the said container but above the level of the said edible fluid coating material therein after the apples have been coated with a coating of the said edible fluid coating material; and
b. means for rotating the said handle stick-gripping and apple-holding devices and the handle stick-gripping chuck units embodied therein and the apples held thereby within the said container but above the level of the edible fluid coating material therein to remove excess of the said edible fluid coating material from the said thus coated apples.

23. A machine for making a coated apple or like confection as defined in claim 19 in which
a. the said movable apple carrier is in the form of a horizontally rotatable turntable carrier member including
  1. a peripheral outer edge portion having the said apple-holding devices arranged at spaced intervals circumferentially therearound.

24. A machine for making a coated apple or like confection defined in claim 19 in which
a. the said movable apple carrier is in the form of
  1. a movable endless apple carrier member having the said apple-holding devices arranged at spaced intervals therealong; and in which
  2. each of the said apple-holding devices embodies
    a. means for holding an apple with its core disposed in a generally vertical plane at the said second work station and adjacent the said peripheral edge portion of the said main rotary turntable carrier member; and which includes
  3. cam means on the said stationarily mounted cam track member at the said second work station coacting with the said cam follower means carried by the said handle stick-gripping and apple-holding devices to move the said handle stick-gripping and apple-holding devices relative to the said main rotary turntable carrier member and relative to the said stationarily mounted cam track member so as to move the said handle sticks held thereby into a generally vertical plane at the said second work station; and which includes 4. means operating in timed relationship with the said main rotary turntable carrier member and coacting with the said second cam means on the said stationarily mounted cam track member for lowering the said handle stick-gripping and apple-holding devices and the said handle stick-gripping chuck units embodied therein and the said handle sticks held thereby relative to the said main turntable carrier member and in a generally vertical plane and inserting the said handle sticks sequentially into the cores of apples disposed in the said apple-holding devices on the said movable endless apple carrier member.

25. A machine for making a coated apple or like confection as defined in claim 19 which a. the said handle stick-gripping and apple-holding devices and the said handle stick-gripping chuck units embodied therein are moved by the coaction of the said first cam means on the said stationarily mounted cam track member and the said cam follower means carried by the said handle stick-gripping and apple-holding devices into a generally horizontal position at the said first work station for the reception of a handle stick from the said discharge outlet of the said handle stick storage hopper.

26. A machine for making a coated apple or like confection as defined in claim 19 in which a. the said handle stick-gripping and apple-holding devices and the said handle stick-gripping chuck units embodied therein and the said handle sticks held thereby are moved by the coaction of the said second cam means on the said stationarily mounted cam track member and the said cam follower means carried by the said handle stick-gripping and apple-holding devices into a predetermined position, relative to the said main rotary turntable carrier member and relative to the said movable endless apple carrier member, at the said second one of said work stations for insertion of the said handle sticks into the cores of apples disposed in the said apple-holding devices on the said movable endless apple carrier.

27. A machine for making a coated apple or like confection as defined in claim 19 which includes a. a receptacle for ground nuts disposed at a fifth one of the said work stations adjacent the said peripheral edge portion of the said main rotary turntable carrier member and adapted to hold a supply of ground nuts and having
  1. an open top; and
b. a fourth cam means on the said stationarily mounted cam track member coacting with the said cam follower means carried by the said handle stick-gripping and apple-holding devices, and in timed relationship with the rotation of the said main rotary turntable carrier member to move the said handle stick-gripping and apple-holding devices and the said chuck units embodied therein and the said handle sticks and the apples held thereby relative to the said main turntable carrier member and the said stationarily mounted cam track member and for automatically lowering the said apples into the said ground nut receptacle through the said open top thereof to coat the said apples with a coating of ground nuts over the said coating of edible fluid coating material thereon during rotation of the said main rotary turntable carrier member.

28. A machine for making a coated apple or like confection as defined in claim 27 which includes a. means coacting with the said main rotary turntable carrier member and with the said handle stick-gripping and apple-holding devices for rotating the said handle stick-gripping and apple-holding devices and the said handle stick-gripping chuck units embodied therein and the said apples held thereby in the said receptacle for ground nuts to coat the said apples with a coating of ground nuts over the said coating of edible fluid coating material thereon.

29. A machine for making a coated apple or like confection as defined in claim 28 which includes a. a ground nut storage hopper arranged adjacent to and above the said ground nut receptacle for holding a supply of ground nuts and having
  1. a discharge outlet passage therein for discharging ground nuts into the said ground nut receptacle;
b. nut-grinding means in the said discharge outlet passage of the said nut storage hopper for grinding nuts therein;
c. power means;
d. power transmission means driven by the said power means for operating the said nut-grinding means;
e. clutch means normally engaging the said power transmission means with the said nut-grinding means;
f. ground nut level-responsive means in the said ground nut receptacle responsive to the level of ground nuts therein; and
g. means responsive to the said ground nut level-responsive means in the said ground nut receptacle for disengaging the said clutch means from the said power transmission means for the said nut-grinding means when the level of ground nuts in the said ground nut receptacle reaches a predetermined level.

30. A machine for making a coated apple or like confection as defined in claim 28 which includes a. a final receptacle for the coated apple confections arranged at a sixth one of the said work stations adjacent the said peripheral edge portion of the said main rotary turntable carrier member;
b. a fifth cam means on the said stationarily mounted cam track member at the said sixth work station and coacting with the said follower means carried by the said handle stick-gripping and apple-holding devices to move the said handle stick-gripping and apple-holding devices and the said chuck units embodied therein and the said apple candy confections held thereby, relative to the said main rotary turntable carrier and the said stationarily mounted cam track member, into a generally vertical position above the said final receptacle for the said coated apple confections; and
c. means coacting in timed relationship with movement of the said main rotary turntable carrier member and with the said handle stick-gripping and apple-holding devices and with the said handle stick-gripping chuck units embodied therein for releasing the said handle sticks and the said coated apple confections from the said handle stick-gripping chuck units and discharging them into the said final receptacle therefor at the said sixth one of the said work stations.

31. A machine for making a coated apple or like confection as defined in claim 19 in which a. the said movable endless apple carrier is in the form of a rotary apple-carrying turntable carrier member having
  1. an upper surface; and in which
b. the said apple-holding devices are arranged in spaced relationship circumferentially on the said upper surface of the said rotary apple-carrying turntable member; and in which
c. the said means for moving the said handle stick-gripping and apple-holding devices and the said handle stick-gripping chuck units embodied therein moves the said handle stick-gripping and apple-holding devices and the said handle stick-gripping chuck units embodied therein downwardly in a generally vertical plane from a normally raised position above the said upper surface of the said rotary apple-carrying turntable carrier member into a lowered position relative thereto to insert the said handle sticks carried by the said handle stick-gripping chuck units vertically and sequentially into the cores of apples disposed in the said apple-holding devices on the said rotary apple-carrying turntable carrier member.

32. A machine for making a coated apple or like confection as defined in claim 31 which includes a. means for raising the said handle stick-gripping and apple-holding devices and the said handle stick-gripping chuck units embodied therein from their said lowered position into their said normally raised position so as to lift the apples held thereby out of the said apple-holding devices for rotational movement with the said main rotary turntable carrier member.

33. A machine for making a coated apple or like confection as defined in claim 32 which includes
   a. handle stick-ejecting means coacting with the said handle stick-gripping and apple-holding devices and with the said handle stick-gripping chuck units embodied therein in timed relationship with movement of the said main rotary turntable carrier member at a third one of the said work stations for ejecting the handle sticks from the said handle stick-gripping chuck units of the said handle stick-gripping and apple-holding devices in the event that the said handle stick-gripping and apple-holding devices and the said handle stick-gripping chuck units embodied therein do not pick up an apple from one of the said apple-holding devices at the said second work station.

34. A machine for making a coated apple or like confection as defined in claim 32 which includes
   a. means arranged between the said second and third work station and including
      1. means disposed in the path of travel of an apple carried by one of the said handle stick-gripping chuck units in advance of the said handle stick-ejecting means, relative to the path of travel of the said main rotary turntable carrier member engageable by an apple carried by the said handle stick-gripping and apple-holding device and the said handle stick-gripping chuck unit embodied therein for moving the said handle stick-ejecting means out of the path of travel of the said handle stick-gripping chuck unit and an apple carried thereby if an apple has been picked up by the said handle stick-gripping and apple-holding device and its handle stick-gripping chuck unit at the said second one of said work stations and is held by the said handle stick-gripping chuck unit of the said handle stick-gripping and apple-holding device as the latter is moved by the said main rotary turntable carrier member between the said second and third work stations.

35. A machine for making a coated apple or like confection as defined in claim 33 which includes
   a. a receptacle arranged at the said third work station for the reception of the said ejected handle sticks.

36. A machine for making a coated apple or like confection as defined in claim 24 in which
   a. each of the said apple-holding devices on the said movable endless apple-holding carrier embodies
      1. means for releasably holding one of the said apples with the core thereof disposed in a generally vertical plane as the said handle stick is inserted into the core of the said apple by the said handle stick-inserting means.

37. A machine for making a coated apple or like confection as defined in claim 19 in which
   a. the said means for movably mounting the said handle stick-gripping and apple-holding devices and the said handle stick-gripping chuck units embodied therein includes
      1. means for pivotally mounting the said handle stick-gripping and apple-holding devices and the said handle stick-gripping chuck units embodied therein on the said main rotary turntable carrier member for movement in a generally vertical plane radially of the said main rotary turntable carrier member and radially relative to the said generally annular stationarily mounted cam track member; and in which the said machine includes
   b. means carried by the main rotary turntable carrier member for guiding each of the said handle stick-gripping and apple-holding devices and the said handle stick-gripping chuck units embodied therein during pivotal movement thereof radially relative to the said main rotary turntable carrier member and relative to the said generally annular stationarily mounted cam track member.

38. A machine for making a coated apple or like confection as defined in claim 37 in which
   a. the said means for movably mounting the said handle stick-gripping and apple-holding devices includes
      1. a first supporting arm member having
         a. a radially inner end portion rigidly attached to the said main rotary turntable carrier member; the said first supporting arm member having
         b. a radially outer end portion;
      2. a guide member including a generally U-shaped body portion rigidly attached to the said radially outer end portion of the said first supporting arm member;
      3. a second supporting arm member having
         a. a radially inner end portion pivotally connected to the said generally U-shaped guide member;
         b. said second supporting arm member being adapted to be moved into the said generally U-shaped body portion of the said guide member when in raised position; and
      4. means for attaching the said handle stick-gripping and apple-holding device and the said handle stick-gripping chuck unit embodied therein to the said radially outer end portion of the said second supporting arm member.

39. A machine for inserting handle sticks into and coating an edible body comprising
   a. a supporting frame;
   b. a main movable endless carrier member movably mounted on said supporting frame and having a plurality of work stations arranged along the periphery thereof;
   c. a stationary cam track member mounted on said supporting frame adjacent to and generally coextensive with the said main movable endless carrier member;
   d. means for moving the said main movable endless carrier member successively past the said work stations;
   e. a storage hopper for handle sticks arranged at a first one of the said work stations and having a discharge outlet for the said handle sticks;
   f. a plurality of handle stick-gripping and edible body-holding devices movably mounted on the said main movable endless carrier at spaced intervals therealong for movement with the said main movable endless carrier and for movement in a generally vertical plane transversely relative to the path of travel of the said main movable endless carrier member;
   g. means for movably mounting the handle stick-gripping and edible body holding devices on the said main movable endless carrier for movement relative thereto in a generally vertical plane transversely relative to the path of travel of the said main movable endless carrier member;
   h. a first cam means on the said stationary cam track member arranged adjacent the said first work station;
   i. cam means carried by each of the said handle stick-gripping and edible body holding devices and coacting with the said first cam means, and in timed relationship with the said movable endless carrier member, for moving each of the said handle stick-gripping and edible body-holding devices relative to the said main movable endless carrier member and in a plane transverse relative to the path of movement of the said main movable endless carrier member into a position to receive a handle stick from the said discharge outlet of the said handle stick storage hopper;
   j. means operating in timed relationship with the said main movable endless carrier member for ejecting a handle stick from the said discharge outlet of the said handle stick storage hopper sequentially into each of the said handle stick-gripping and edible body-holding devices at the said first work station;

k. a second movable endless carrier member disposed adjacent the said main movable endless carrier member at a second one of the said work stations;

l. a plurality of edible body-holding devices carried by the said second movable endless carrier member and arranged at spaced intervals thereon and each adapted to releasably hold a body of edible material;

m. a second cam means on the said stationary cam track member adjacent the said second work station;

n. the said second cam means coacting with the said cam means carried by the said handle stick-gripping and edible body-holding devices to move each of the said handle stick-gripping and edible body-holding devices and the handle sticks carried thereby sequentially into a position to insert one of the said handle sticks into each of the said edible bodies at the said second work station;

o. means coacting with the said handle stick-gripping and apple-holding devices for moving the latter and a handle stick carried thereby to insert the said handle stick into the said edible body at the said second work station;

p. container for comestible material arranged adjacent the said main movable endless carrier member at a first coating one of said work stations; and q. means operating in timed relationship with the said main movable endless carrier member for moving each of the said handle stick-gripping and edible body-holding devices and the said edible bodies held thereby sequentially into and through the said container to coat each of the said edible bodies with a coating of the said comestible material at the said first coating one of said work stations.

40. A machine for inserting handle sticks into and coating an edible body as defined in claim 39 which includes a. a second container for comestible material arranged adjacent the said main endless carrier member at a second coating one of said work stations; and b. means operating in timed relationship with the said main movable endless carrier member for moving each of the handle stick-gripping and edible body-holding devices and the said coated edible bodies with a second coating of comestible material over the said first coating of comestible material thereon.

41. A machine for inserting handle sticks into and coating an edible body, as defined in claim 40, in which the said means for movably mounting the said handle stick-gripping chuck units embodied therein on the said main movable endless carrier includes a. a first supporting member rigidly attached to the said main movable endless carrier;

b. a second supporting member pivotally mounted on the said first supporting member;

c. a tubular sleeve member rigidly attached to the said second supporting member; and in which each of the said handle stick-gripping and edible body-holding devices includes d. a shaft member slidably mounted in the said tubular sleeve member and having 1. an upper end or head portion; and in which said shaft member includes 2. a lower end portion having the said handle stick-gripping chuck unit attached thereto; and 3. resetting spring means on the said shaft member between the said tubular sleeve member and the said upper end or head portion of the said shaft member normally urging the said shaft member and the said handle stick-gripping chuck unit embodied therein into a raised position relative to the said tubular sleeve member.

42. A machine for inserting handle sticks into and coating an edible body as defined in claim 41 which includes a. a sleeve member carried by and slidably mounted on the said shaft member, and having b. a radially outwardly projecting flange portion; and c. means coacting in timed relationship with the said main movable endless carrier member for engaging the said radially outwardly projecting flange portion of the said sleeve member for slidably moving the said handle stick-gripping and edible body-holding device and the said handle stick-gripping chuck unit embodied therein on the said shaft member and relative to the said tubular sleeve member.

43. A machine for inserting handle sticks into and coating an edible body, as defined in claim 41, in which each of the said handle stick-gripping chuck units embodies a. a main and generally tubular body member rigidly attached to the said shaft member, and having 1. a handle stick-receiving cavity therein adapted to receive and hold a portion of one of the said handle sticks;

b. cam means carried by the said main generally tubular body member of the said handle stick-gripping chuck unit for releasably gripping and holding the said portion of the said handle stick disposed in the said handle stick-receiving cavity in the said main and generally tubular body member of the said chuck unit;

c. resilient means on the said main generally tubular body member of the said chuck unit normally urging the said cam means on the generally tubular body of the said handle stick-gripping and edible body-holding device into position to grip and hold the said portion of the said handle stick disposed in the said handle stick-receiving cavity of the said main generally tubular body member of the said handle stick-gripping chuck unit;

d. cam-releasing means movably mounted on the said main generally tubular body member of the said handle stick-gripping chuck unit for releasing the said cam means on the said handle stick-gripping and holding chuck unit from engagement with the said portion of a handle stick gripped and held thereby in the said handle stick-receiving cavity, including e. a radially outwardly projecting flange member on the said main generally tubular body member of the said handle stick-gripping chuck unit; and f. means coacting in timed relationship with the said main movable endless carrier member for engaging the said radially outwardly projecting flange member on the said generally tubular body member for moving the said cam-releasing means to move the said cam means on the said generally tubular body member, against the action of the said resilient means, into position to release a handle stick gripped and held by the said cam means and the said handle stick-gripping chuck unit.

44. A machine for making edible confections which includes an edible body having a handle stick attached thereto, comprising a. a supporting frame;

b. a movable endless carrier movably mounted on the said supporting frame and movable past a plurality of work stations in a cycle of operations thereof;

c. a handle stick storage hopper arranged at a first one of the said work stations and having 1. a discharge outlet;

d. a plurality of handle stick-gripping and edible body-holding devices mounted at spaced intervals on the said movable endless carrier;

e. means for moving the said movable endless carrier and the said handle stick-gripping and edible body-holding devices carried thereby sequentially past the said discharge outlet of the said handle stick storage hopper, at the said first one of said work stations, in a cycle of movement of the said movable endless carrier;

f. means for ejecting handle sticks one at a time from the said discharge outlet of the said handle stick storage hopper and inserting the said handle sticks into the said handle stick-gripping and edible body-holding devices at the said first work station; and g. means coacting with the said handle stick-gripping and edible body-holding devices, at a second one of the said work stations, to insert the said handle sticks carried by the said handle stick-gripping and edible body-holding devices into edible bodies arranged at the said second one of the said work stations in a cycle of movement of the said movable endless carrier;

h. means coacting with the said handle stick-gripping and edible body-holding devices at a first coating one of the said work stations to coat the said edible bodies with a coating of comestible material in a cycle of operation of the said movable endless carrier;

i. a ground nut receptacle mounted on the said supporting frame at the said second coating one of the said work stations in the path of travel of the said movable endless carrier and the said handle stick-gripping and edible body holding devices carried thereby;

j. a nut storage hopper mounted on the said supporting frame and having a discharge outlet having communication with the said ground nut receptacle;

k. nut-grinding means in the said nut storage hopper for grinding nuts therein and discharging them through the said discharge outlet of the said nut storage hopper into the said ground nut receptacle;

l. means for operating the said nut-grinding means;

m. means coacting with the said handle stick-gripping and edible body-holding devices for moving the said edible bodies carried thereby into and through the said ground nut receptacle to coat the said edible bodies with a coating of ground nuts; and n. means including level-responsive means arranged in the said ground nut receptacle and responsive to the level of ground nuts in the said ground nut receptacle for controlling the operation of the operating means for the said nut-grinding means.

45. A machine for making edible confections as defined in claim 44 in which
   a. the said level-responsive means is responsive to a predetermined desired level of ground nuts in the said ground nut receptacle for operatively disengaging the said operating means for the said nut-grinding means from the said nut grinding means.

46. A machine for making edible confections as defined in claim 45 which includes
   a. means urging the said operating means for the said nut-grinding means into operative and driving engagement with the said nut-grinding means when the level of ground nuts in the said ground nut receptacle falls below the said predetermined desired level.

47. A machine for inserting handle sticks into and coating an edible body, as defined in claim 42, in which
   a. the said handle stick-gripping chuck unit embodies
      1. a main generally tubular body member having
         a. a plurality of radially arranged flexible resilient handle stick-gripping jaw members formed therein and normally urged apart under the force of their own innate resiliency and providing therebetween
         b. a handle stick-receiving cavity adapted to receive a portion of one of the said handle sticks therein;
      b. a sleeve member slidably mounted on the said main generally tubular body member of the said handle stick-gripping chuck unit for slidable movement over the said flexible, resilient handle stick-gripping jaw members to move the said flexible, resilient handle stick-gripping radially inwardly into position to grip and hold a portion of one of the said handle sticks in the said handle stick-receiving cavity; said sleeve member having thereon
      c. a radially extending flange portion; and
      d. means coacting in timed relationship with the said main movable endless carrier member and engageable with the said radially extending flange portion on the said sleeve member for moving the said sleeve member on the said main generally tubular body member of the said handle stick-gripping chuck unit to move the said flexible, resilient handle stick-gripping jaw members radially inwardly into position to grip and hold the said portion of one of the said handle sticks disposed in the said handle stick-receiving cavity.

48. A machine for making a coated apple or like confection as defined in claim 31 in which each of the said apple-holding devices includes
   a. a supporting bracket member, including
      1. an arm portion attached to the said rotary apple-carrying turntable carrier member; and in which the said supporting bracket member includes
      2. an upright supporting arm member;
      3. a pair of shafts rigidly mounted in spaced relationship on the said upright supporting arm member;
      4. a sleeve member rotatably mounted on each of the said shafts;
      5. a gear fastened to each of the said sleeve members and said gears being in meshing relationship with each other;
      6. an apple-gripping and holding member attached to each of said sleeve members and each of the said apple-gripping and holding members having
         a. an upwardly extending apple-gripping arm portion, and said apple-gripping arm portions being adapted to grip and hold an apple therebetween; and
      7. spring means carried by the said upright supporting arm member of the said supporting bracket and normally urging the said upwardly extending apple-gripping arm portions toward each other and into apple-gripping and holding position so as to releasably grip and hold an apple therebetween.

49. A machine for making coated apple confections, or the like, as defined in claim 48, which includes
   a. means for mounting the said apple-holding device on the said rotary apple-carrying turntable carrier member with the said apple-gripping arm portions extending generally horizontally so as to hold an apple therebetween with its core extending in a generally horizontal plane.

50. A machine for making a coated apple or like confection as defined in claim 31 in which each of the said apple-holding devices includes
   a. a supporting bracket member, including
      1. an arm portion attached to the said rotary apple turntable carrier member, and in which the said supporting bracket member includes
      2. an upright supporting bracket portion;
      3. a pair of slidable supporting members slidably mounted in spaced but generally parallel relationship on the said upright supporting bracket portion;
      4. means for slidably mounting the said supporting arm members on the said upright supporting bracket portion;
      5. a pair of supporting arm members arranged in spaced relationship and each attached to and carried by one of the said slidable supporting members;
      6. a flexible, resilient apple-gripping cup member carried by each of said pair of supporting arm members and arranged in spaced relationship, and said flexible, resilient cup members being adapted to grip and hold an apple therebetween; and
      7. spring means carried by the said means for slidably mounting the said supporting members and normally urging the said slidable supporting members and the said supporting arm members and the said flexible, resilient apple-gripping cup members carried thereby toward each other and urging the said flexible, resilient apple-gripping cup members into position to releasably grip and hold an apple therebetween.

51. A machine for making a coated apple or like confection as defined in claim 19 in which
   a. each of the said apple-holding devices on the said movable endless apple-holding carrier is disposed with its longitudinal axis extending generally horizontal; and which embodies
   1. bracket means for mounting the said apple-holding devices on the said movable endless apple carrier with the cores of the apples disposed in a generally horizontal plane as the said handle stick is inserted into the core of the said apple by the said handle stick-inserting means.

52. A machine for making a coated apple or like confection as defined in claim 19 in which
   a. the said movable endless apple carrier is in the form of an endless chain carrier member having the said apple-holding devices mounted at spaced intervals therealong; and in which
   b. each of the said apple-holding devices on the said endless chain carrier embodies
      1. means for holding an apple therein with the core of the apple disposed in a generally horizontal plane as the said handle stick is inserted therein by the said handle stick-inserting means.

53. A machine for making coated apple confections which include a coated apple having a handle stick attached thereto, comprising
   a. a supporting frame;
   b. a movable endless carrier movably mounted on the said supporting frame and movable past an apple pick-up work station in a cycle of operations of the machine;
   c. a plurality of handle stick-gripping and apple-holding devices carried by the said movable endless carrier and mounted at spaced intervals thereon and each adapted to hold and to carry a handle stick held thereby into position to pick up an apple at the said apple pick-up work station;
   d. a movable endless apple carrier movably mounted at the said apple pick-up work station and having mounted at spaced intervals thereon
      1. a plurality of first apple holding members each adapted to releasable hold an apple;
      2. a second apple-holding member movably mounted in each of said first apple-holding members and movable relative thereto, and each adapted to support an apple in one of the said first apple holding members;
   e. each of the said second apple holding members having a depending portion movably mounted in and extending below the said first apple holding member; and
   f. means for sequentially engaging and raising each of the said depending portions of the said second apple holding members and the said second apple holding members thereon so as to move each of the said second apple holding members upwardly in and relative to the said first apple holding member and thereby move the apple held thereby upwardly toward and into engagement with a handle stick held by one of the said handle stick-gripping and apple-holding devices at the said apple pick-up work station.

54. A machine for making coated apple confections comprising
   a. a supporting frame;
   b. a main movable endless carrier movably mounted on the said supporting frame;
   c. a plurality of handle stick-gripping and apple-holding devices carried by and arranged at spaced intervals on the said main movable endless carrier;
   d. means for sequentially moving the said main movable endless carrier and the said handle stick-gripping and apple-holding devices carried thereby into position at an apple pick-up work station in a cycle of operations of the said machine;
   e. a movable endless apple carrier;
   f. a plurality of apple-holding members carried by the said movable endless apple carrier and arranged at spaced intervals thereon;
   g. means for movably supporting the said movable endless apple carrier and the said apple-holding members carried thereby;
   h. means for moving the said movable endless apple carrier and the said apple-holding members carried thereby sequentially into position at the said apple pick-up work station in timed relationship with movement of the said main movable endless carrier and the said handle stick-gripping and apple-holding devices carried thereby; and
   i. means for sequentially raising the apples held in and by said apple-holding members upwardly relative to the said apple-holding members and toward the said handle stick-gripping and apple-holding devices so as to move each of the said apples into engagement with one of the said handle sticks held by one of the said handle stick-gripping and apple-holding devices at the said apple pick-up work station.

55. A machine for making coated apple confections as defined in claim 54 in which
   a. each of the said apple-holding members is generally cup-shaped in form; and in which
   b. the said means for raising the said apples upwardly in and relative to the said apple-holding members includes
   c. a second apple-holding member movably mounted in each of the said generally cup-shaped apple-holding members and each adapted to hold an apple in one of the said generally cup-shaped first apple-holding members; and
   d. means for raising the said second-named apple-holding members upwardly in and relative to the said generally cup-shaped apple-holding members and toward the said handle sticks carried by the said handle stick-gripping and apple-holding devices.

56. A machine for making a coated apple or like confection which includes a coated apple having a handle stick attached thereto comprising
   a. a supporting frame;
   b. a main rotary turntable carrier member rotatably mounted on the said supporting frame;
   c. means for rotating the said main rotary turntable carrier member on the said supporting frame successively past a plurality of work stations including an apple pick-up work station and a coating work station disposed adjacent the said main rotary turntable carrier member;
   d. a plurality of handle stick gripping and apple-holding devices movably mounted on the said main rotary turntable carrier member at spaced intervals circumferentially thereon and for movement therewith and each including
      1. a handle stick-gripping chuck unit adapted to receive and to grip a handle stick;
   e. means for movably mounting the said handle stick gripping and apple-holding devices and the said handle stick-gripping chuck units embodied therein on the said main rotary turntable carrier member for movement in a generally vertical plane radially of and relative to the main rotary turntable carrier member;
   f. a movable endless apple carrier member arranged adjacent the said peripheral edge portion of the said main rotary turntable carrier member at the said apple pick-up work station and having arranged thereon in spaced relationship
      1. a plurality of apple-holding devices for releasably holding apples therein;
   g. means for moving the said movable endless apple carrier in timed relationship with the said main rotary turntable carrier member so as to move the said apples carried thereby successively into a position adjacent the said peripheral edge portion of the said main rotary turntable carrier member at the said apple pick-up work station;
   h. means coacting in timed relationship with the said main rotary turntable carrier member at the said apple pick-up work station for moving each of the said handle stick-gripping and apple-holding devices and the said handle stick-gripping chuck units embodied thereby in a direction to insert the said handle sticks held thereby sequentially into the cores of apples releasably held by the said apple-holding devices at the said apple pick-up work station;

i. a container for holding a supply of an edible coating material for said apples disposed adjacent the said peripheral edge portion of the said rotary turntable carrier at the said coating work station;
j. screw means for supporting the said containers for movement in a vertical plane;
k. means coacting with the said handle stick-gripping and apple-holding devices for lowering the said apples held thereby sequentially into and for moving them through the said container to coat each of the said apples sequentially with a coating of the said edible coating material at the said coating work station during a cycle of rotation of the said main rotary turntable carrier member;
l. means coacting with the said screw means for raising the said container in a generally vertical plane relative to the path of travel of the said handle stick-gripping and apple-holding devices and the said handle stick-gripping chuck units embodied therein and the said handle sticks and apples held thereby as the supply of edible coating material in the said container is consumed in use.

57. A machine for making a coated apple or like confection as defined in claim 56 in which
 a. the said means coacting with the said screw means for raising the said container includes
  1. means for intermittently raising the said container in relatively small increments as the supply of edible coating material in the said container is consumed in use.

58. A machine for making a coated apple or like confection as defined in claim 56 in which
 a. the said means coacting with the said screw means for raising the said container includes
  1. means for continuously raising the said container as the supple of edible coating material in the said container is consumed in use.

59. A machine for making a coated apple or like confection as defined in claim 56 in which
 a. the said means for coacting with the said screw means includes
  1. means for raising and lowering the said container.

60. A machine for making edible confections, each of which includes an edible body having a handle stick attached thereto, comprising
 a. a supporting frame;
 b. a movable endless carrier movably mounted on the said supporting frame and movable past a plurality of work stations in a cycle of movement thereof;
 c. a handle stick storage hopper arranged at a first one of the said work stations and having
  1. a discharge outlet;
 d. a plurality of handle stick-gripping and edible body-holding devices movably mounted on the said movable endless carrier at spaced intervals thereon for movement with and for movement upon and relative to the said movable endless carrier;
 e. each of the said handle stick-gripping and edible body-holding devices including
  1. handle stick-gripping and holding means for frictionally gripping and holding one of the said handle sticks;
 f. means for moving the said movable endless carrier so as to move the said handle stick-gripping and edible body-holding devices carried thereby sequentially past the said discharge outlet of the said handle stick storage hopper, at the said first one of said work stations, in a cycle of movement of the said movable endless carrier;
 g. means for ejecting handle sticks one at a time from the said discharge outlet of the said handle stick storage hopper into frictional gripping engagement with the said handle stick-gripping and holding means in the said handle stick-gripping and edible body-holding devices at the said first one of said work stations;
 h. means coacting with the said handle stick-gripping and edible body-holding devices and with the said handle stick-gripping and holding means embodied therein, at a second one of the said work stations, to move the said handle stick-gripping and edible body holding devices and the said handle sticks carried thereby upon and relative to the said movable endless carrier to insert the said handle stick-gripping and edible body-holding devices into edible bodies arranged at the said second one of the said work stations in a cycle of movement of the said movable endless carrier;
 i. means coacting with the said handle stick-gripping and edible body-holding devices and with handle sticks held thereby for coating edible bodies carried by the said handle sticks with a coating of comestible material at a fourth and coating one of the said work stations; and
 j. means coacting with the said handle stick-gripping and edible body-holding devices and with the said handle stick-gripping and holding means embodied therein for releasing the said handle stick-gripping and holding means from frictional engagement with an unloaded handle stick held thereby and for ejecting the said unloaded handle stick from a corresponding one of the said handle stick-gripping and edible body-holding devices at a third one of the said work stations and prior to the time the said unloaded handle stick would reach the said fourth and coating one of said work stations in a cycle of movement of the said movable endless carrier if the said handle stick-gripping and edible body-holding device and the handle stick carried thereby fail to pick up one of the said edible bodies at the said second one of the said work stations.

61. A machine for making edible confections, each of which includes an edible body having a handle stick attached thereto, comprising
 a. a supporting frame;
 b. a main movable endless carrier movably mounted on the said supporting frame and movable past a plurality of work stations in a cycle of movement thereof;
 c. a handle stick storage hopper arranged at a first one of the said work stations and having
  1. a discharge outlet;
 d. a plurality of handle stick-gripping and edible body-holding devices movably mounted on the said main movable endless carrier at spaced intervals thereon for movement with and for movement upon and relative to the said main movable endless carrier;
 e. means for moving the said main movable endless carrier so as to move the said handle stick-gripping and edible body-holding devices carried thereby sequentially past the said discharge outlet of the said handle stick storage hopper, at the said first one of said work stations, in a cycle of movement of the said main movable endless carrier;
 f. means for ejecting handle sticks one at a time from the said discharge outlet of the said handle stick storage hopper into the said handle stick-gripping and edible body holding devices at the said first one of said work stations;
 g. an auxiliary movable endless carrier arranged adjacent to the said main movable endless carrier at a second one of the said work stations;
 h. a plurality of edible body-holding devices carried by and arranged at spaced intervals on the said auxiliary movable endless carrier and each adapted to receive and to hold one of said edible bodies for movement independently of the said main movable endless carrier and into registry with the said second one of the said work stations;
 i. means for moving the said auxiliary movable endless carrier and the said edible body-holding devices and edible bodies carried thereby relative to and in timed relationship with the said main movable endless carrier and the said handle stick-gripping and edible body-holding devices carried thereby so as to move the said edible body-holding devices and edible bodies carried thereby sequentially into registry with the said second one of the said work stations in a cycle of movement of said main movable endless carrier; and j. means coacting with the said handle stick-gripping and edible body-holding devices at the said second one of the said work stations to move the said edible body-holding devices and the said handle sticks carried thereby upon and relative to the said main movable endless carrier to insert the said handle sticks carried by the said handle stick-gripping and edible body-holding devices into edible bodies held by said edible body-holding devices carried by the said auxiliary movable endless carrier at the said second one of the said work stations in a cycle of movement of the said main movable endless carrier.

62. A machine for making edible confections, each of which includes an edible body having a handle stick attached thereto, as defined in claim 61, which includes a. means coacting with the said handle stick-gripping and edible-body holding devices for moving the said handle stick-gripping and edible body-holding devices and the handle sticks and edible bodies carried thereby, relative to the said auxiliary movable endless carrier, in a direction to withdraw the said edible bodies out of the said edible-body holding devices on the said auxiliary movable endless carrier after the said handle sticks have been inserted into the said edible bodies at the said second one of the said work stations.

* * * * *